United States Patent [19]

Davenport et al.

[11] Patent Number: 5,101,364

[45] Date of Patent: Mar. 31, 1992

[54] METHOD AND FACILITY FOR DYNAMIC VIDEO COMPOSITION AND VIEWING

[75] Inventors: Glorianna Davenport; Hans P. Brondmo, both of Cambridge, Mass.

[73] Assignee: Massachusetts Institute of Technology, Cambridge, Mass.

[21] Appl. No.: 477,746

[22] Filed: Feb. 9, 1990

[51] Int. Cl.⁵ .............................................. G06F 3/14
[52] U.S. Cl. .................................. 395/152; 360/14.1; 395/133
[58] Field of Search ...................... 364/518, 521, 522; 360/14.1-14.3, 13; 358/311, 903

[56] References Cited

U.S. PATENT DOCUMENTS

| | | | |
|---|---|---|---|
| 4,538,188 | 8/1985 | Barker et al. | |
| 4,569,026 | 2/1986 | Best | 348/903 X |
| 4,591,931 | 5/1986 | Baumeister | 360/13 X |
| 4,616,319 | 10/1986 | Peters et al. | 358/903 X |
| 4,717,971 | 1/1988 | Sawyer | 358/903 X |
| 4,754,342 | 6/1988 | Duffy | 360/14.1 X |
| 4,774,582 | 9/1988 | Hakamada et al. | 358/903 X |
| 4,843,483 | 6/1989 | Bogner | 360/14.1 X |
| 4,964,004 | 10/1990 | Barker | 360/14.1 |

OTHER PUBLICATIONS

Zellweger, "Active Paths Through Multimedia Documents", Proceedings of the Int'l Conference on Electronic Publishing, Document Manipulation and Typography (1988).

Sasnett, "Reconfigurable Video", Master's Thesis submitted Feb. 1986.

Catlin & Smith, "Anchors for Shifting Tides: Designing A 'Seaworthy' Hypermedia System", Proc. of Twelfth International Online Information Meeting (Dec. 1988).

Mackay and Davenport, "Virtual Video Editing in Interactive Multimedia Applications", 32 *Communications of the ACM* 802, Jul. 1989.

Sasnett, "Reconfigurable Video", *Optical Information Systems* '86, MIT Media Laboratory.

Gardner and Scoggins, "A Closed-Loop Digital Video Editing System", *Proc. of 131st SMPTE Technical Conference*, 1989.

Trigg, "Guided Tours and Tabletops: Tools for Communicating in a Hypertext Environment", *Journal of the ACM*, Sep. 1988, at 216.

Teranishi, Horiguchi and Ooshima, "Multi-Media Visual Information Editing Techniques", *Proc. of 1987 IEEE/IECE Global Telecommunications Conference*.

Luther, "You are There . . . And In Control", *IEEE Spectrum*, Sep. 1988, at 45.

*Primary Examiner*—David L. Clark
*Attorney, Agent, or Firm*—Cesari and McKenna

[57] ABSTRACT

A video editing and viewing facility and method allows representation and arbitrary association of discrete image segments, both to create final compositions and to permit selective viewing of related segments. The user represents an image segment by a single frame or series of frames that acts as a mnemonic reference. Information regarding image segments is retained in data structures that facilitate relational designations thereamong and sorting of image segments. Display of a segment may be interrupted and a new segment initiated on command, and provision maintained for return to the original segment when display of the new segment is completed.

14 Claims, 2 Drawing Sheets

METHOD AND FACILITY FOR DYNAMIC VIDEO COMPOSITION AND VIEWING

I. BACKGROUND OF THE INVENTION

A. Program-Listing Appendix

This application is filed with an appendix containing source-code listings.

B. Field of the Invention

The present invention relates generally to the field of video production, editing, presentation, authoring and viewing, and in particular to a computer-resident facility that permits editing and relational linkage among digitally represented video segments.

C. Description of the Related Art

The types of available media for storing and accessing video images have increased significantly in recent years. Magnetic videotape and other forms of analog electronic storage have largely supplanted the traditional media, which are based on silver-halide representations of miniaturized images. With the reductions in computer cycle time and the cost of memory devices that have recently been achieved, digital storage of still and moving video images is increasingly becoming feasible and may ultimately replace analog-electronic media.

Digitized video offers substantial advantages over both miniaturized-image and analog-electronic storage forms. All miniaturized-image and many analog devices require serial access of desired material, necessitating lengthy forwarding or rewinding operations to retrieve remotely located material. By contrast, the mechanical devices that manipulate digitally stored data, such as magnetic or optical disk assemblies, operate at a higher rate of speed and with greater accuracy than those associated with the earlier video technologies. This is due primarily to the topology of digital devices, which allows virtually any portion thereof to be accessed within a short interval.

Both miniaturized-image and analog media must generally be physically modified in order to accommodate duplication or translocation of material. For example, film editing requires cutting and splicing by using specialized equipment; videotape editing requires analogous permanent alterations to the tape. Transfers of overlapping material to more than one new location require even more effort, because the overlap portions must be copied onto new blank media before being inserted. Digital technology, in contrast, permits rapid and straightforward duplication or translocation of a particular video segment, which can be accomplished with simple memory operations.

The mechanical limitations associated with non-digital video technology place fundamental limitations on the manner in which image information can be presented. Because the final image sequence must reside on a single portion of recording medium, the order in which image information is presented is effectively unalterable. Absent a parallel array of multiple, coordinated playback devices, viewers cannot be offered the opportunity to depart from the linear image sequence as originally defined and recorded, or to selectively invoke related sequences. Non-digital technology thus limits the viewer's ability to interact with and tailor the presentation to suit individual interests, as well as the composer's ability to create relationships among discrete video segments based on content or other criteria.

For example, researchers are currently investigating the possibility of replacing mass media vehicles such as newspapers and magazines, which can offer only static images, with video material organized into related segments through which a viewer can browse. These segments can be related in any number of ways. Accordingly, with material organized according to subject relationships, the user could follow his or her own chosen pathway through the material, viewing subjects of interest in greater depth while bypassing other subjects. Furthermore, it is possible to configure an interactive system that permits the user to orchestrate the relationships among video segments.

Application of digital technology to video composition and editing can also enhance the human interface to such material. The analog or miniaturized-image system typically identifies image segments by words or one or more images selected therefrom. Both forms of identification can be difficult for a viewer to understand without ambiguity. For example, a still image of a sports figure can be interpreted as connoting an image segment relating to the portrayed individual, some facet of his or her style of play, or the sport itself. This ambiguity can often be dispelled with a verbal reference, but unless the subject is amenable to description in a few words, an adequate verbal characterization may be too long for labelling purposes. These identification techniques and their attendant limitations stem largely from the constraints imposed by non-digital image storage and assembly.

Current applications of digital video technology are limited by available data-compression algorithms and storage devices. Typically, only a small amount of material can be stored in digitally compressed, full-motion video format, and this technique finds significant commercial application only in post-production creation of relatively short "special-effect" segments (such as peeling). However, hardware power and capacity continue to increase, and an infrastructure supporting widespread delivery of digital services will accompany installation of fiberoptic trunks (which has already begun). Consequently, while digitized video images are not currently commonplace, this situation will likely change in the near future.

Exploiting the flexibility and speed of digitally stored video requires an approach to composition that emphasizes the capabilities of modern computational equipment. A digital composition system should be capable of designating video segments interactively for storage or immediate playback, organizing multilayered relationships among the specified segments, and displaying to the user an ordered and adequately labelled selection of related segments for viewing or editing.

II. DESCRIPTION OF THE INVENTION

A. Summary of the Invention

The present invention provides a computational facility that achieves the foregoing by importing relational database concepts into the domain of video viewing, video composition and editing. The present invention establishes a common data structure applicable to all image source material and segments thereof, which contains data entered directly by the user, derived from the image source material through computational manipulation (e.g. automated tagging or labelling), and/or inferred from the user's pattern of activity. The set of active data structures is then incorporated into a suitable relational schema that permits designation of relationships therebetween. Although ideally suited for digitally represented image source material, the various features of the present invention can, alone or in combination, in many instances be used with analog image sources as well.

The labelling difficulty hereinabove described is addressed in the present invention by permitting the user to select from an analog or digital source a series of scalable image frames that will be repeated endlessly to denote the image segment. These temporally active, user-definable video images serve as labels in much the same way that the static, pictographic "icons" employed in many computer software products specify particular computational operations or functions, but are ideally suited for moving video images. Thus, in the example discussed previously, the single image of the sports figure could be supplemented with additional frames more precisely evocative of the subject. Our "motion icon" image labels, hereinafter referred to as "micons", allow inherently temporal images to be identified with a temporal representation. For purposes of differentiation, static or "picture icons" will be referred to as "picons".

The micon consists of a sequence of frames chosen by the user so as to serve as a mnemonic characterization of the entire segment. This sequence of frames is repeatedly played back as a continuous loop. In a preferred embodiment of the invention, micons appear as miniature on-screen "windows" superposed on a video image and/or within the user interface.

Another aspect of the invention is an interactive user interface that facilitates composition, editing and viewing of image information. The visual elements of the interface appear on the display screen of the computer upon which the present invention is implemented; this screen preferably (but not necessarily) displays the actual video images as well. The user interacts with the interface by using a standard keyboard and/or position-sensor device. Suitable position-sensing devices include pointers, "mice", and voice interfaces The user interface displays descriptive and/or graphical representations of editing and viewing operations, any of which may be selected by the user in the system's "command" mode. These operations include definition of a segment, or series of frames, from source video material, which is stored on any suitable digital or analog medium (e.g. read-only memory, optical disk); definition of the associated micon and/or picon; specification of one or more relationships among segments; examination of the current set of micons and/or picons; playback of the segment represented by a selected micon or picon; imposition of a selected transition effect on the last frame of the segment; and inspection and direct modification of the data structure associated with a segment.

In a particular embodiment of the invention, a displayed video segment or portion thereof is accompanied by simultaneous on-screen presentation of a set of micons that has been chosen by the user or the author of the video segment, and "linked" thereto. During presentation of the video segment (or portion thereof), the viewer may select any of the displayed micons and thereby interrupt the current video segment with the segment represented by the chosen micon. On-screen presentation of the new video segment will feature a new set of micons. Preferably, if the viewer does not cause a further interruption by selection of one of the new micons, the system completes presentation of the selected segment and thereafter returns to the location of the interrupt on the original segment. The remainder of the original segment is then presented.

Alternatively, in more advanced embodiments, links may be created by agencies other than the athor. For example, it is possible to design natural-language processors capable of analyzing an incoming stream of text and video signals (see, e.g. 1 A. Barr and E. Feigenbaum, *Handbook of Artificial Intelligence* 306 [1981]; Glasgow, II, *YANLI: A Powerful Natural Language Front-End Tool, AI Magazine,* Spring 1987, at 40). If processing time is sufficiently rapid, the results of this analysis can be used to identify related segments. The processor might also be programmed to accept user preferences as a means of biasing segment identification toward or away from particular subjects.

The invention may be used in conjunction with any number of storage devices containing digital or analog image information. The data structure contains a sufficient file specification to permit the computer's operating system to access the appropriate storage device and retrieve the relevant video images.

B. Brief Description of the Drawings

The foregoing discussion will be understood more readily from the following detailed description of the invention, when taken in conjunction with the accompanying drawings, in which.

C. Detailed Description of the Invention

The details of the present invention can best be understood by an example of its use. Suppose the user, equipped with a video camera, records various details of a boating regatta. These include images of the boats prior to the race, interviews with crew members, views of the crowd, and portions of the race itself. The user then transfers the recorded images to a digital or analog medium, such as optical disk.

Faced with a series of thematically unconnected video clips, the user wishes both to assemble related clips into series of discrete presentations, and to formulate relationships among those presentations. These relationships will provide a framework to guide the viewer through the presentations, and allow him or her to select a series of presentations according to individual interest.

1. Data Representation and System Organization

Each video presentation defines a basic unit of image information, referred to herein as a "segment". Segments are built from smaller portions of image information, referred to as "subsegments". In our example, a race segment may consist of one or more subsegments recorded at different times or from different camera angles.

Figure 1:
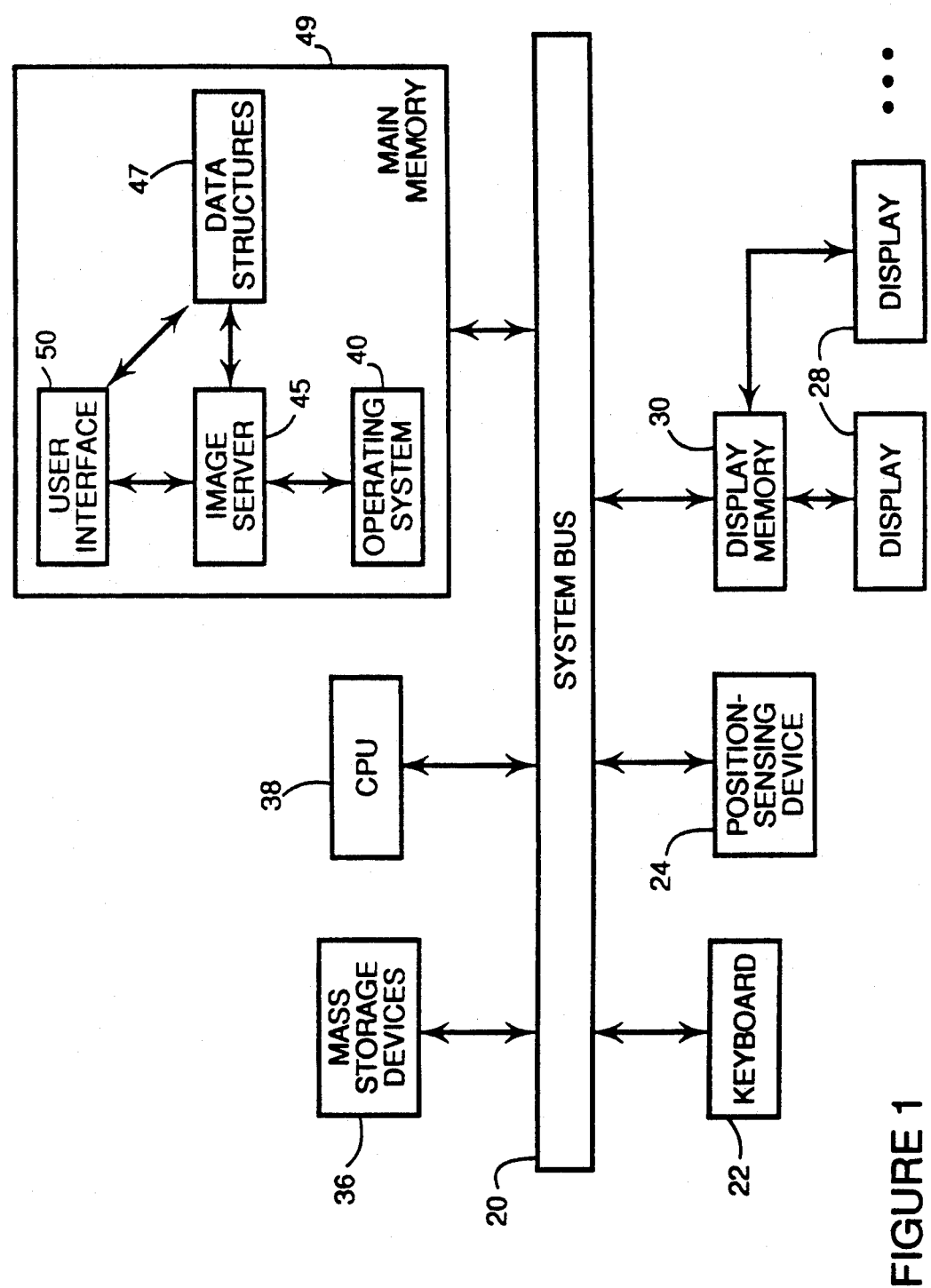
FIG. 1 is a block diagram representation of a system incorporating the present invention.

The present invention organizes the attributes and locations of image information into data structures, each of which represents a defined image segment. A segment data structure contains the following information fields:

Name of segment
Filename of image source material
  disk identification, if necessary
  drive identification, if necessary
  remote (network) address, if necessary
Pointers to micon frames associated with this segment Pointer to a picon frame associated with this segment
Pointers to beginning, end of each set of frames associated with this segment, in the order in which the frame sets are to be presented
Linkages
   names of other segments or information units to be linked to the subject segment
   linkage comments
   linkage attributes
Transition Effect
   name of transition effect
   indication whether the transition effect is to occur at the end of every subsegment or only at the end of the subject segment The manner in which these data structures fit into the schema of the present invention is depicted in FIG. 1, which is a block diagram of a system incorporating the invention. As indicated therein, the system includes a central processing unit (CPU) 38, which performs operations on and interacts with the main system memory 49 and components thereof. The system further includes at least one mass storage device 36, which contains permanent files of image information (such as the optical disk created by the user in our example). All components of the system communicate over a system bus 20.

The user interacts with the system using a keyboard 22 and/or a position-sensing device (e.g, a "mouse") 24. The output of either device can be used to designate information or select particular areas of a screen display 28 corresponding to functions to be performed by the system. As shown in FIG. 1, the system can include more than one screen display, but the contents of all displays are controlled by a display memory 30 and its contents. For example, a low-resolution monitor might be employed for the user interface, thereby reserving use of a high-resolution monitor for display of video images, micons and picons.

The main memory 49 contains a group of modules that control the operation of CPU 38 and its interaction with the rest of the system. An operating system 40 directs the execution of low-level, basic system functions such as memory allocation, file management and operation of mass storage devices 36. An image server 45 operates at a higher system level, and directs display of image files bounded by known address locations. Software capable of executing the functions of image server 45 is well-characterized in the art. File and pointer information contained in the data structures 47 are utilized by image server 45 to access and transfer appropriate image information contained in mass storage devices 36 to display memory 30 over the system bus 20.

The choice of what information the data-structure pointers will contain depends on the manner in which image locations are represented in storage. For example, images can be organized into frames, each of which is assigned a unique reference number, or into temporally discrete divisions labelled by unique time-code stamps. In either case, appropriate boundary information consists of data denoting the beginning and ending of the segment of interest. For convenience, the term "frames" is hereinafter used to designate discrete image divisions, but it is understood that all suitable conventions of locational specification are implicated as well.

Certain design tradeoffs are encountered in constructing the apparatus of the present invention. Micons are intended to be viewed not only during display of other moving video images, but also during editing procedures. Accordingly, significant demands on CPU time must be shared and priorities allocated. We have found it desirable to accord lower CPU priority to execution of micon display instructions than to non-micon instruction cycles, in order to provide maximum user-responsiveness. Thus, although micon motion may slow down or even stop during periods of great computational demand, the result is preferable to distracting delays in the system's response to a direct request or entry of a command. If presentation of video information requires so much CPU time that delays become unacceptable, dedicated video support hardware such as one or more local-refresh frame buffers can be added to the system.

The user interface 50, which operates at the highest level of interactivity, generates words or graphical images on display 28 to prompt action by the user, and accepts user commands entered from keyboard 22 and/or position-sensing device 24. It must be understood that although the modules of main memory 49 have been described separately, this is for conceptual clarity only; so long as the system performs all necessary functions, it is immaterial how they are distributed within the system and the programming architecture thereof.

2. Viewing and Composition Facility

A set of composition "tools" allow the user to create video segments (i.e., to define segment data structures), designate links therebetween, establish micons and/or picons representative thereof, browse the current set of micons, view the video segment represented by a selected micon, and impose a selected transition effect on the last frame of the segment or subsegment.

In a preferred embodiment, the user selects and implements these options by providing information to the user interface.

2.1 Segment Creation

In order to permit the user to designate a segment of video information, user interface 50 must be capable of responding to the user's selection of a displayed frame of the image source material and entering the corresponding frame designation into the appropriate data structure as a segment beginning or ending. Preferably, the interface includes at least rudimentary editing features that permit the user conveniently to browse the source material.

As hereinabove noted, a data structure contains one or a series of frame pointers, each pointer defining a beginning or ending frame. Each set of pointers denotes a separate subsegment. Image server 45 accesses the image source material at the frame that the first segment beginning pointer designates, and it transfers this and successive frames to display memory 30 until it reaches the frame that the first segment ending pointer designates. This process is repeated for all subsegments, the pointer sets of which are preferably organized in the data structure as a stack in their order of designation by the user. This arrangement frees the user from the serial organization of typical analog-electronic storage devices, and permits specification of remotely located or overlapping image sequences as separate subsegments.

In a preferred embodiment of the invention, a menu of options appears to the user on display 28. The user's choice among these options control the display of the source image material contained in storage device(s) 36, and the user may enter his or her option choice during such display; as noted hereinabove, the source image material and menu command options can appear on the same or a different display 28. Furthermore, these command options can be represented on display 28 in words or as graphical images selectable by position-sensing device 24, or a combination of both. For example, to maximize ease of use by editors familiar with videotape technology, graphical symbols similar to those appearing on standard videotape recording equipment can be employed.

The following list of segment-creation and segment-manipulation commands and operational descriptions reflect a selection implemented for maximum user convenience. However, it is understood that user preference may dictate more or fewer commands, and all forms of on-screen representation thereof are intended to be covered hereby.

Source Image: The user enters the filename of the desired source image material, the designation of the mass storage device 36 on which the file is located (if necessary), and the remote address (if necessary). This information allows image server 45 and operating system 40 to access and retrieve the appropriate image information.

Create Segment: In response to this command, user interface 50 and operating system 40 create a data structure file capable of receiving the information that will define the segment.

Segment Name: In response to the Create Segment command, user interface 50 invites the user to type in or otherwise enter the name of the new segment. User interface 50 thereupon enters the name in the new data structure created for the segment. If an existing segment is chosen from the segment browser, discussed below, the user is not prompted for a new name, but may choose to rename the segment by directly accessing the Segment Name field using the Modify command.

Image Scanning Commands: These commands direct the speed at which image server 45 transfers image information to display memory 30. Useful scanning commands include:

Scan Backward: skips a preset number of frames between each frame presentation, which occurs at the normal rate and in the reverse direction Fast Backward: presents every other frame in reverse order, thereby scanning at approximately twice the normal rate Play Backward: presents frames in reverse order at normal speed Step Backward: advances display to previous frame Stop Step Forward: advances display to next frame Play Forward: presents frames at normal speed Fast Forward: presents every other frame, thereby scanning at approximately twice the normal rate Scan Forward: skips a preset number of frames between each frame presentation, which occurs at the normal rate Frame Selection: Allows the user to designate pairs of frames that will serve as beginning points and ending points within a subsegment. User interface 50 transfers the frame designations to the pointer stack.

Modify: This command causes user interface 50 to display the contents of the current data structure, and permit modification of its contents.

2.2 Micon, Picon Designation

Micons and picons consist of digitally scalable frames selected from the image source material, and are associated with the segment to be labelled by designation in the appropriate field of the segment's data structure. The user can choose to associate a segment or portion thereof with a multiple frame micon and/or a single-frame picon, depending on the importance of the segment and its amenability to mnemonic reference with a single image.

Returning to our example, if the user wishes to create a micon to identify a racing sequence, he or she could designate a series of widely separated frames from a segment containing racing images; repeated presentation of these separated frames would convey the appearance of motion.

Preferably upon completion of segment creation, user interface 50 allows the user to enter the segment name(s) of the micon and/or picon that will serve to designate a newly created segment. The user should also be permitted to enter or change these names, add or delete micon frames, and modify the appearance of individual frames, upon command, as desired. Modification of each frame necessitates change of pixel values, which is accomplished by image server 45 using standard image manipulation procedures. For example, in response to a global color-change command, image server 45 will scan through the frame and replace pixel values corresponding to a specified color with new values corresponding to a different specified color.

2.3 Creating Linkages

Again returning to our example, the user may wish to relate the racing sequence to a segment containing an interview with the winning crew. In the preferred embodiment and as discussed in greater detail below, a micon identifying the interview segment will be displayed during presentation of the racing sequence, permitting the viewer to interrupt the latter by selecting the micon. Upon such selection, the racing sequence will terminate and be replaced by the interview sequence (the manner in which one sequence replaces another can also be designated by the user, as discussed below). The interview sequence may contain another series of links, resulting in the presentation of a new set of micons during this sequence. If the viewer does not select one of these micons, the original racing sequence preferably recommences at the point of interrupt upon completion of the interview sequence.

Preferably, linkage information is stored in the linkage field of each data structure. However, it is also possible to store this information in an external relational table or similar configuration. For purposes of the ensuing discussion, storage within the data structure will be assumed.

A link may associate video information with additional video information (video-to-video linkage), video information with text and/or graphic information (video-to-text linkage), or text and/or graphic information with video information (text-to-video linkage). The system accommodates blocks of text and/or graphic material with a data structure containing sufficient identification and locational information to retrieve the material, as well as linkage fields to permit transitions therefrom. This data structure is termed an "information unit". For convenience, references to segments will be deemed to include information units as well.

For text and/or graphics, micons and picons may be replaced with any form of visual cue (e.g. key words or graphic symbols) that serves to identify the information. Miniaturization of the text or graphics is a preferred representation.

The user creates a linkage by designating the name of one or more segments or information units in the "Link" field. The user may also specify "attributes" that help to characterize the type or category of linkage for sorting purposes, or specify its duration. Attributes are stored in a linkage subfield.

A link can also be created automatically, by a suitably configured computational module. For example, a natural-language "front end" can be added to parse and analyze the contents of an incoming stream of text and video signals in real time, and identify related segments (and associated micons or picons) from a library. The front-end module might be further configured to accept user preferences as a means of biasing segment identification toward or away from particular subject matter. Should the front-end module discover a related segment, user interface 50 would respond by displaying the micon or picon for a specified interval or until the front end indicates it is no longer relevant.

The user specifies link duration by designating, as an attribute of the link, the segment frame numbers within which the link applies, and the micon associated with the linked segment. In the case of automatic link creation, link duration can be determined according to real-time contextual analysis of image source material.

The user can also associate "sound bites", or digitized audio fragments stored as files, with a micon or picon designation. To support this feature, user interface 50 must be capable of recognizing and aurally expressing digitized audio information.

The user is also invited to enter verbal information describing the link, its purpose, and the nature of the linked material. Ideally, the micon or picon will provide the viewer with sufficient insight to determine whether or not to trigger a link, but supplemental information may prove useful in some circumstances. This descriptive information is also stored in a linkage subfield, preferably within the data structure.

2.4 Transition Effect Selection

Transition effects represent a variety of visual progressions that replace the end of a current segment or subsegment with the beginning of a new segment or subsegment, e.g., when the current segment is replaced by a new segment as a consequence of micon selection or program continuation. Alternatively or in addition thereto, transition effects can be used between subsegments within a segment being viewed. These effects are well-characterized in the art, and computational procedures for their implementation in digital-image environments are known. In the present invention, these procedures are stored in a library in a mass storage device 36 or within main memory 49. The user interface allows the user to enter the name of the desired transition when a new segment is created; this name is stored in the appropriate field of the data structure. A default transition effect can be designated for segments created automatically.

The transition effect can be applied either to the first frame of the new segment or the last frame of the old segment. Most practitioners in the art choose the last frame of the old segment, and this convention has been adopted in the preferred embodiment. Image server 45 is responsible for calling and executing the routine specified in the Transition Effect field of the current data structure when a new segment is about to replace the current segment.

Useful transition effects include dissolve, chunky dissolve, circle zoom, diamond zoom, box zoom, spiral zoom, venetian blind, vertical blind, checkerboard and wipes.

2.5 Segment Browsing

The segment browser displays all micons (or picons, if no micon is designated for a particular segment) representing the set of currently available segments or a designated subset thereof. Preferably, the name of each segment appears below the associated micon. Operating system 40 is preferably equipped with multiple paging capability, so that if a single screen of display 28 cannot accommodate all available micons and/or picons, the remainder can be "scrolled" or "paged in" as necessary. The viewer may select a desired segment using keyboard 22 or position-sensing device 24.

When the viewer makes his or her selection, user interface 50 obtains the associated data structure and directs image server 45 and operating system 40 to retrieve the image material and display it.

The viewer is also given the option to delete any segment from the segment browser, which results in destruction of the associated data structure and consequent permanent loss of the segment.

2.6 Segment Viewing and Transitions

Before a segment is displayed for viewing, user interface 50 gathers linkage information from the segment data structure. User interface 50 directs image server 45 and operating system 40 to retrieve micons and/or picons representing segments linked to the current segment and display them along with the segment, preferably as small screen sections superposed on the current screen display. If the user has entered a durational limit as an attribute of any link to the current segment, user interface 50 causes image server 45 to suppress display of the associated micon during the non-designated portion of the segment.

The viewer is free to select any of the displayed micons and/or picons at any time, using keyboard 22 or position-sensing device 24, in which case display of the current segment will be interrupted and replaced with the segment represented by the selected micon or picon. The new segment will likewise be accompanied by a selection of micons and/or picons linked thereto, any of which may similarly be chosen by the viewer.

Alternatively, the viewer can inspect the descriptive link information (if any) prior to executing the link. In order to access this information, the viewer must have an alternate way of designating a micon. One suitable approach is use of a two-button mouse, wherein one button selects the sequence associated with the micon and the other button selects linkage information. Pop-up menus or a voice interface can also furnish the additional degree of freedom.

If the viewer chooses to inspect the linkage information, user interface 50 retrieves the descriptive information from the data structure of the current segment and displays it on a "window" opened by the system. The system can be configured such that progression of the current segment continues or is halted during viewing. User interface 50 gives the viewer the option to abandon the linkage, in which case image server 45 continues to access and display the information specified in the current data structure, or to execute the linkage, in which case the linked data structure is invoked.

Each time link is executed, a "return information set" designating the current pointer within the current data structure and the frame number of the current segment is stored in main memory 49. The viewer is always offered the option to return from the linked segment to the previous segment, thereby causing image server 45 to display information beginning at the point of interrupt. Return information sets may be stacked, thereby preserving a pathway through multiple interrupts. By designating the appropriate return set, e.g. from a series of overlapping micons generated by image server 45 and appearing on display 28, the viewer can selectively return to any interrupt point. For image segments, the return information can be automatically invoked at the end of the linked segment.

The viewer may also sort through links on the basis of their attributes or descriptive link information. For example, the viewer may wish to be offered only video-to-video linkages, preferring to bypass the other types. If link type has been entered as an attribute, the viewer can suppress micon or picon designations referring to text with the Sort command. Alternatively, the user can sort on the basis of key words, which are compared with the contents of linkage subfields containing descriptive link information.

The Sort command causes user interface 50 to filter links according to the terms of the command prior to presentation of their associated micons or picons on display 28. The Sort command can also be used to collect the micons or picons comprising a segment browser. This sorting capability requires user interface 50 to possess field-searching capability normally associated with relational databases. This facility is available on HYPERCARD, the preferred implementation of the present invention.

The user can make changes to the data structure of the current segment by selecting the Inspect command. This command causes the contents of the data structure to be displayed visually on display 28, permitting the user to make specific changes thereto. User interface 50 enters the user's changes into the actual data structure.

User interface 50 also permits the user to define a "program" consisting of a series of named segments. The names of these segments are stored in main memory or as a file, in the order they are designated by the user. When a program is invoked, user interface 50 causes image server 45 to sequentially display each segment in the usual fashion.

III. BEST MODE FOR PRACTICING THE INVENTION

The present invention may be implemented on or within any operating system capable of supporting the necessary relational structure, alone or in conjunction with "application" programs. In this context, an application refers to a dedicated, independently operating computer program that interacts with the user to perform data-handling tasks. Examples of suitable application programs include spreadsheets, relational databases and word processors.

In order to be used with the present invention, an application program should offer certain features. First, for ease of implementation, the application should allow the user to define a control structure that correlates user input with desired actions, and directs execution of such actions. Second, in order to accommodate the elements of the present invention as separate, add-on modules, the application should be able to communicate with external functionalities and devices through the use of such object-oriented constructs as message-passing. This latter feature will save the designer from the need to integrate the functions of the present invention directly within the application itself.

We have found that the HYPERCARD facility and its scripting platform HYPERTALK (marketed by Apple Computer, Inc. for use on the MACINTOSH computer), provide a useful hardware and software basis for implementing the invention in a straightforward manner.

HYPERCARD is an event-driven, relational application that can be used to create data files, organize relationships therebetween, and control hardware devices such as disks and displays. HYPERTALK is the programming language of HYPERCARD. It allows the user to create "scripts", or executable procedures that are invoked when a particular action (such as selection of an on-screen label using a position-sensing device) is selected by the user.

Figure 2:
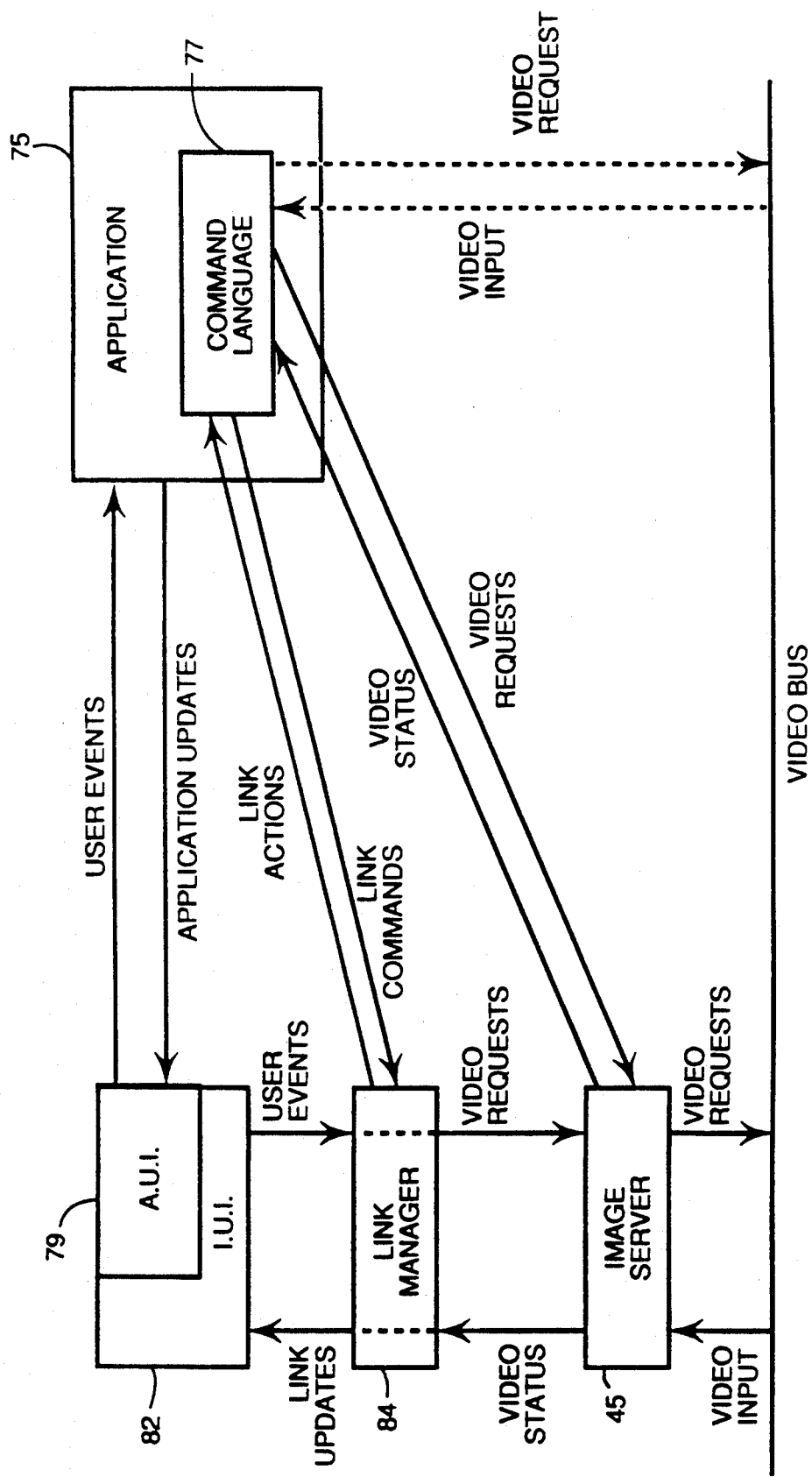
FIG. 2 is a schematic representation of a preferred implementation of the invention.

FIG. 2 illustrates the components and interconnections of an implementation of the present invention. Although the depiction is generic and therefore applicable to a variety of application programs, the ensuing discussion will focus specifically on the preferred HYPERCARD implementation.

Application program 75, which in the preferred embodiment is HYPERCARD, contains a command language 77, namely HYPERTALK. As stated above, command language 77 allows the user to configure application 75 to respond appropriately to input ("user events"), perform predetermined functions and deliver output ("application updates") in accordance with the present invention as described hereinabove. Interaction between application 75 and the user occurs over an application/user interface ("AUI") 79, which appears on the computer's display device. Superimposed on the AUI is an "invention/user interface" ("IUI") 82. (This component is shown simply as user interface 50 in FIG. 1). The functions of IUI 82 have already been been discussed at length. This computational module is most easily programmed using a suitable language such as C or PASCAL, which gives the designer full access to the operating system and to resident libraries such as windowing. environments, graphic drawing primitives and input/output devices.

By "superimposed", we mean that to the extent practicable, the visual and computational elements of IUI 82 do not completely obscure or replace those of AUI 79; rather, IUI 82 is preferably integrated within the general framework established by AUI 79. The compatibility of AUI 79 with the necessary features of the invention determines the degree to which elements of AUI 79 must be supplanted by those of IUI 82. In HYPERCARD, the card-based metaphor lends itself well to display of micons. Thus, in one embodiment, a HYPERCARD card displays textual information relating to a segment and the associated micon, but IUI 82 controls the content and visual presentation of the micon, as well as its association with the segment. The HYPERCARD windowing environment is configured to allocate screen space to AUI and IUI components as appropriate. With applications other than HYPERCARD, command lines or menu bars may or may not be compatible with the features of the present invention, necessitating partial or complete excision in favor of IUI elements.

IUI 82 communicates directly with the link manager 84, the computational module that organizes, maintains and invokes links. (For simplicity, this module was treated as a component of user interface 50 in the earlier discussion.) Link manager 84 responds to commands or data entered by the user ("user events") by configuring data structures, organizing relationships therebetween, and passing video requests to image server 45 (the latter function being denoted by the dashed line). Like IUI 82, link manager 84 is implemented in a language such as C or PASCAL. Link manager 84 also passes user input relating to links ("link actions") to application command language 77 to facilitate appropriate AUI responses. For example, in the case of a video-to-text link, the HYPERCARD AUI would be instructed by command language 77 to retrieve the descriptive information regarding the link upon user command.

As noted above, link manager 84 interprets video requests received from IUI 82 to identify the physical or memory locations of the desired images, and passes these interpreted requests to image server 45. This module is also implemented in a programming language such as C or PASCAL. As discussed above, image server 45 interacts directly with the digital or analog sources of video information (depicted as the "video bus" in FIG. 2), issuing retrieval commands to the storage device(s) ("video requests") and obtaining video information ("video input") therefrom.

In addition to retrieving video information (which is ultimately presented to the user by IUI 82), image server 45 communicates to link manager 84 status information regarding the progress of video imaging (such as the current frame number) on an ongoing basis. This permits link manager 84 to execute links where appropriate, e.g., at a particular frame within a segment or subsegment.

Video requests may originate from IUI 82 or from application 75. If the user initiates the request over IUI 82, image server 45 also communicates with application 75 via command language 77, providing video status information thereto. For example, the user may request a particular segment, which consists of a number of subsegments. This request is passed directly to image server 45, which retrieves and displays the segment video. Link manager 84 identifies associated links, orders image server 45 to retrieve the micons, and passes the names of the linked segments to command language 77. This permits application 75 to position the micons within AUI 79, as appropriate.

Link manager 84 also passes video status information directly to IUI 82, along with other information relating to link status ("link updates"). Link updates can include new micons or a command to cease display of one or more current micons. To preserve flexibility, application 75 retains the ability to access the video bus directly.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

PROGRAM

LISTING

APPENDIX

The following files are included in this Elastic Tools Source Dump.
2.8.90

| FILENAME | NUMBER OF PAGES |
|---|---|
| Worksheet | 1 |
| MMTypes.p | 12 |
| VisualEqu. | 2 |
| VBLFlag.a | 1 |
| VBLSetup.p | 2 |
| SetupPatch.a | 1 |
| CBPatch.a | 2 |
| MSPatch.a | 2 |
| MSPatch.p | 2 |
| GNEPatch.a | 2 |
| GNEPatch.p | 4 |
| HCComm.incl.p | 1 |
| CSControl.incl.p | 1 |
| HCUtils.incl.p | 2 |
| LinkToolUtils.incl.p | 16 |
| SegBoardUtils.incl.p | 11 |
| VideoToolUtils.incl.p | 16 |
| Mimato.p | 2 |
| MMTools.incl.p | 5 |
| MMhc.incl.p | 4 |
| MMSegBoard.incl.p | 2 |
| MMLink.incl.p | 2 |
| MMFilm.incl.p | 8 |
| Mimato.incl.p | 12 |
| ToolUtils.p | 20 |
| LinkFile.p | 7 |
| DevComm.p | 4 |
| HistoryUtils.p | 5 |
| FileProcs.p | 19 |
| MMHCUpdate.p | 3 |
| Iconify.p | 12 |
| Filters.p | 1 |
| Filter.a | 1 |
| DigCGlue.c | 1 |

```
*********************************************************************
* These are the scripts needed to install the GetNextEvent patch-- in HC.    *
* The patches run the tools in a modeless way leaving HC with full functionality.  *
* Contained in folder "{mpw}MultiTools:PatchTools:                            *
*********************************************************************
asm GNEPatch.a
cd {mpw}MultiTools:PatchTools:
pascal -mc68020 FileProcs.p
pascal -mc68020 HistoryUtils.p
pascal -mc68020 DevComm.p
pascal -mc68020 LinkFile.p
pascal -mc68020 ToolUtils.p
pascal -mc68020 GNEPatch.p
link -d -m GNESETUP -ss 48000 -o "Big Elastic:Home" -rt MMpt=6968 -sn Main=GNEPatch∂
    GNEPatch.a.o GNEPatch.p.o ToolUtils.p.o DevComm.p.o "{Libraries}"interface.o∂
    "{PLibraries}"PasLib.o "{Libraries}"DevLib:CSLib.o HistoryUtils.p.o ∂
    LinkFile.p.o FileProcs.p.o "{Libraries}"DevLib:SCLib.o "{CLibraries}"CRuntime.o ::fxSel.c.o ::fxRun.c.o asm SetupPatch.a
cd {mpw}MultiTools:PatchTools:
pascal VBLSetup.p
pascal Mimato.p
link -d -m ENTRYPOINT -o "Big Elastic:Home" -rt XCMD=4444 -sn Main=Mimato Mimato.p.o∂
    "{Libraries}"interface.o "{PLibraries}"PasLib.o VBLSetup.p.o ToolUtils.p.o  DevComm.p.o LinkFile.p.o∂
    SetupPatch.a.o FileProcs.p.o "{Libraries}"DevLib:CSLib.o "{Libraries}"DevLib:SCLib.o "{CLibraries}"CRuntim asm MSPatch.a
pascal MSPatch.p
link -d -m MSSETUP -o "Big Elastic:Elastic Charles:Home" -rt MMpt=6967 -sn Main=MSPatch MSPatch.a.o MSPatch.p
    "{Libraries}"interface.o "{PLibraries}"PasLib.o ToolUtils.p.o LinkFile.p.o FileProcs.p.o asm CBPatch.a
link -o "Big Elastic:Elastic Charles:Home" -rt MMpt=6970 CBPatch.a.o

# Not using these yet....
asm compress.a
c DigCGlue.c

asm Filter.a
pascal Iconify.p
link -m ENTRYPOINT -o "Big Elastic:Elastic Charles:Home" -rt XCMD=999 -sn Main=Iconify Iconify.p.o ∂
    GNEPatch.p.o Filter.a.o DigCGlue.c.o GetDCEHandle.a.o "{Libraries}"interface.o ∂
    DevComm.p.o FileProcs.p.o ToolUtils.p.o "{PLibraries}"PasLib.o∂
    "{Libraries}"DevLib:CSLib.o "{Libraries}"DevLib:SCLib.o "{Libraries}"DigLib:DigLib.o pascal -w MMHCUpdate.p
link -m ENTRYPOINT -o "Big Elastic:Elastic Charles:Home" -rt XCMD=1111 -sn Main=MMHCUpdate MMHCUpdate.p.o∂
    "{Libraries}"interface.o

# VBL Stuff.
asm VBLFlag.a
link -d -m VBLFLAG -o "Big Elastic:Elastic Charles:Home" -rt vbMI=6969 -sn Main=VBLFlag VBLFlag.a.o
```

```
File: MMTypes.p
Date: 11.25.88

Contains all the type definitions for the multi media tools.

UNIT MMTypes;

INTERFACE

USES MemTypes;

CONST
  kCBTrapNum      = $0ec;       { CopyBits trap number.}
  kMSTrapNum      = $13d;       { MenuSelect trap number.}
  kGNETrapNum     = $170;       { GetNextEvent trap number.}

{Key codes.}
  shiftKeyCode    = 56;
  cntrlKeyCode    = 55;

{error codes.}
  errStrID        = 500;        { STR# resource ID for error strings.}
  noArgs          = 1;          {'No arguments'}
  noSession       = 2;          {'No open session'}
  kOutOfMem       = 3;          {'Out of memory'}
  kMiconPlaying   = 4;          {'Micon already playing'}
  kMiconOpenError = 5;          {'Could not find micon'}
  kIconNotFound   = 6;          {'Could not find icon'}
  kNoSuchSeg      = 7;          {'Segment not found'}
  kNoSuchFile     = 8;          {'Could not find segment file.'}
  kSerialErr      = 9;          {'Serial port error.'}
  kInitErr        = 10;         {'Could not initialize tools'}
  kMiscFileErr    = 11;         {'File error'} kDivStrID       = 501;        { STR# resource ID for assortment of strings.}
  kDefaultSegName = 1;          { 'Video Segments' }
  kDefaultPathName= 2;          { '' }
  kUntitled       = 3;          { 'Untitled' }
  kStartMiconStr  = 4;          { 'Start Micon'  Menu item}
  kLinkOffStr     = 5;          { 'Link off' Menu item}
  kLinkOnStr      = 6;          { 'Link on' Menu item}
  kNewBrowser     = 7;          { 'New browser' Menu item.}
  kOpenBrowser    = 8;          { 'Open browser' Menu item}
  kSegNameStr     = 9;          { '<Segment Name>' }
  kOpenSegFile    = 10;         { 'Please open segment browser ' } kAlertsID       = 4443;       {ID for Alert dialog and Alert strings (STR#).}
  kOutOfMemory    = 1;
  kOutOfFiles     = 2;
  kFileError      = 3;
  kSerProblem     = 4;
  kDigProblem     = 5;
  kcnoFile        = 6;          {Could not open file.}
  kcnwFile        = 7;          {Could not write file.}
  kAlreadyOpen    = 8;          {File already open.} kAreUSureID     = 4444;       {ID for are U sure dialog.}
{------------------------------------------------------------------}
  kFramesPrSec    = 15;         {For micons on the segment board.}
  kSecCount       = 4;          {Length of movie in seconds. !!! SHOULD BE IN TICKS} kLinkClickDelay = 15;         {Ticks to wait for popup when clicking on a link.}
  kSegClickDelay  = 20;         {Ticks to wait for popup when clickin on a segment icon/micon.}
{------------------------------------------------------------------} kAnimIcons      = 3;          {Number of icons used to animate moving film.}
  kAppleID        = 1;          {ID of HyperCard apple menu.}
```

```
kFilmToolWindoid  = 202;
kSegBoardWindoid  = 204;
kLinkToolWindoid  = 205;
kDebugToolWindoid = 208;

kPopUpSegMenu  = 201; {ID of the popup menu used in the segment board.}
kPopUpLinkMenu = 202; {ID of the popup used in the link tools.}
kPopUpIndMenu  = 203; {ID of the popup used on link indicators.}
kPopUpHistMenu = 204; {ID of the popup used for history.} kMMMenuID   = 200;    {ID of multi media tool menu.}
kHCGoMenuID = 3;      {ID of HyperCard's "Go" menu.}
kNoTools    = 8;      {Number of tools. There is really only 7 but we've got a disabled item in menu.}
kOpenSeg    = 1;
kGlobalItem = 1;
kVideoItem  = 3;
kSoundItem  = 4;
kSegBoardItem = 5;
kLinkItem   = 6;
kHCItem     = 7;
kDebugItem  = 8;
kAutoLinkItem = 8;
kLinkReturnItem = 9;

kQuitTools = 10;

kNoAction =  0;    {in for widoid tool object selection.}

{Segment type identifiers for segment board.}
kNoType    = 0;
kVideoType = 1;
kSoundType = 2;

{Number of segment icons pr line in the segment board.}
kIconsPrLine = 3;
{Number of lines of segment icons visible in segment board.}
kLinesInBoard = 2;

{Icon IDs}
kTrashID   = 240;
kGrabID    = 250;
kGrayGrabID = 251;
kHandID    = 252;
kLinkID    = 254;
kGrayLinkID = 255;
kCameraID  = 260;
kGrayCameraID = 261;
kProjectID = 270;
kGrayProjectID = 271;

kFilm1 = 202;
kFilm2 = 203;
kFilm3 = 204;
kPlay  = 200;
kStop  = 201;

{Picture IDs}
kInOutPict = 200;
kShutlPict = 201;
kContrPict = 202;

kLinkPict = 210;
kHistPict = 220;

{Grab hand cursor.}
kHandCurs = 300;

{Identifiers for clicks in film tool and link windoids/tools.}
kShuttle = 1;   {in shuttle bar.}
kInPoint = 2;   {In inpoint icon.}
```

```
kOutPoint =   3;    (in outpoint icon.)
kEnd =        4;    (in end icon area.)
kFilmIcon =   5;    (in film icon.)
kStepFBtn =   6;    (in step fwd btn in 'vcr control'.)
kStepBBtn =   7;    (in step bkwd btn in 'vcr control'.)
kStopBtn =    8;    (in end button in 'vcr control'.)
kPlayFBtn =   9;    (in play fwd button in 'vcr control'.)
kPlayBBtn =  10;    (in play bkwd button in 'vcr control'.)
kFFBtn =     11;    (in play fast fwd button in 'vcr control'.)
kFBBtn =     12;    (in play fast bkwd button in 'vcr control'.)
kScanFBtn =  13;    (in scan fwd button in 'vcr control'.)
kScanBBtn =  14;    (in scan bkwd button in 'vcr control'.)
kLinkIn =    15;    (in link in buttonx.)
kLinkOut =   16;    (in link out button.)
kLinkRect =  17;    (in link indicator rectangle.)
kNextLink =  18;    (in next link button.)
kPrevLink =  19;    (in prev link button.)
kPopUpLink = 20;    (in link popup button.)

kSnLeft =     0;    (left boundary of shuttle rectangle.)
kSnTop =     40;    (top boundary of shuttle rectangle.)
kSnRight =  208;    (right boundary of shuttle rectangle.)
kSnBottom =  72;    (bottom boundary of shuttle rect.)
kBarLeft =   98;    (left of shuttle bar.)
kBarRight = 108;    (right of shuttle bar.)
kSnMiddle = 103;    (middle of shuttle bar.)

(IDs for clicks in segment board window.)
kLinkClick =    1;
kGrabClick =    2;
kProjectClick = 3;
kCameraClick =  4;
kPictureClick = 5;
kSegBoard =     6;

( Coordinates for the rectangle where the segments are displayed)
kSegLeft =    86;
kSegRight =  394;
kSegTop =     16;
kSegBottom = 170;

(picture icon sizes.)
khIcon = 80;
kvIcon = 60;

(Search font size for the segment board.)
kSearchFSize = 9;
kIconFSize =   9;

(Digital effect codes.)
kNoEffect =  0;

kVSegNameOK = 1;
kVSegNameCancel = 4;
kVSegName = 3;

(Segment type identifiers.)
kVSEG =  1;
kSSEG =  2;
kHCSEG = 3;

(Link indicator types.)
kMIcon = 1;
kIcon =  2;
kHCIcon = 3;
kRLIcon = 4;    ("Return link" icon.)

(Link indicator window type (and template IDs).)
kNoTitle = 300;
kTitle =   301;
```

```
kWinoid    =    302;

{Constants for LinkIndicator menu.}
kGoLink    =    1;
kMarkLink  =    2;
kChangeWindow =  4;
kLinkInfo  =    5;

{Values for identifying type of communication to HC via CommBlock.}
kSetGlobal    =    1;
kSendCDMessage =   2;
kSendHCMessage =   3;
kMakeHCLink   =    4;

{Device block indexes.}
kNoSpeeds=12;      {Number of speeds for shuttle bar.}
k1FPS  =   1;      {frames pr sec.}
k2FPS  =   2;
k3FPS  =   3;
k4FPS  =   4;
k5FPS  =   5;
k6FPS  =   6;
k7FPS  =   7;
k8FPS  =   8;
k9FPS  =   9;
k10FPS =  10;
k15FPS =  15;
k30FPS =  30;
k60FPS =  60;
k120FPS = 120;

{
The following constants define the entries for a media device
control block's <devData> field.
A value in the datafile where the config info for the particular data
exists must be defined for each of the entires below. If there is no
corresponding command for a device, a NUL (0) entry must be made (ie length = 0).
The format for an entry is [[length_byte]data_byte(s)]

The asterix mark (*) denotes commands accessed by the Elastic Tools 11.25.89
}
{Control characters.}
kFormat       = 0;    (* Defines the command format for a device.
                         s=startFlag, e=endFlag, c=command, a=argument.
                         <sace> = first send start flag followed by
                         argument, command and end flag.)
kStartChar    = 1;    (* Opening character when sending command sequence.)
kEndChar      = 2;    (* End character when sending command sequence.)
kAckChar      = 3;    (* Acknowledge character(s) when command sequence is sent to device.)
kInTerm       = 4;    (* Terminator character(s) for input.)
kOutTerm      = 5;    (* Terminator character(s) for output.)

{Player commands.}
kPlayFwd      = 6;    (* Play at normal speed.)
kDevStop      = 7;    (* Stop device. Freeze frame.)

kSearch       = 8;    (* Go to specified frame/time number.)

{Play speed parameters.}
k1FPSFwd      = 9;
k1FPSRev      = 10;
k2FPSFwd      = 11;
k2FPSRev      = 12;
k3FPSFwd      = 13;
k3FPSRev      = 14;
k4FPSFwd      = 15;
k4FPSRev      = 16;
k5FPSFwd      = 17;
k5FPSRev      = 18;
k6FPSFwd      = 19;
```

```
k5FPSRev       = 20;
k7FPSFwd       = 21;
k7FPSRev       = 22;
k8FPSFwd       = 23;
k8FPSRev       = 24;
k9FPSFwd       = 25;
k9FPSRev       = 26;
k10FPSFwd      = 27;
k10FPSRev      = 28;
k15FPSFwd      = 29;
k15FPSRev      = 30;
k30FPSFwd      = 31;
k30FPSRev      = 32;   {* }
k60FPSFwd      = 33;   {* }
k60FPSRev      = 34;   {* }
k120FPSFwd     = 35;
k120FPSRev     = 36;
kScanFwd       = 37;   {* }
kScanRev       = 38;   {* }
kStepFwd       = 39;   {* }
kStepRev       = 40;   {* }

{Direction settings.}
kDirFwd        = 41;   {* }
kDirRev        = 42;   {* }

{Set speed but don't start playing. Note no direction specified here.}
kSet1FPS       = 43;   {* }
kSet2FPS       = 44;   {* }
kSet3FPS       = 45;
kSet4FPS       = 46;   {* }
kSet5FPS       = 47;
kSet6FPS       = 48;   {* }
kSet7FPS       = 49;
kSet8FPS       = 50;   {* }
kSet9FPS       = 51;
kSet10FPS      = 52;   {* }
kSet15FPS      = 53;   {* }
kSet20FPS      = 54;
kSet30FPS      = 55;   {* }
kSet60FPS      = 56;   {* }
kSet120FPS     = 57;   {* }
kSet240FPS     = 58;
kSetScan       = 59;

kFrameReq      = 60;   {* }
kSetMark       = 61;   {* }
kClearMark     = 62;

{For writable devices.}
kRecordOn      = 63;   {Record mode on.}
kRecordOff     = 64;   {Record mode off.}

{Sound}
kAudioOff      = 65;   {* }
kLeftCh        = 66;   {* }
kRightCh       = 67;   {* }
kStereo        = 68;   {* }

{Image}
kVideoOn       = 69;   {* }
kVideoOff      = 70;   {* } kResetDevice   = 71;   { Reset command for a device. (does not reset the serial port.)}
kEject         = 72;   {* Reject the disc/cassette.}

{Effect}
kEffect        = 0;
kTimeOut       = 0;    {1/60th of sec. timeout ticks.}
```

```
TYPE
-----------------------------------------------------------------------------------------------
  DevEntry = STRING[8];                      {Fixed size entry containing device commands.}

MDevBlockHandle = ^MDevBlockPtr;
  MDevBlockPtr = ^MDeviceBlock;
  MDeviceBlock = RECORD                      {Media Device Block structure.}
    nextDevice:    MDevBlockHandle;          {Might be more than one active device at a time.}
    deviceName:    Str31;                    {Pioneer LaserDisc LD4200, Sony Video8 EV-C3, etc}
    {If there are two driver names for a device, the assumption is made that the first
     driver is the output driver and the second is input. Otherwise only the first driver
     is used and only the inPortRef is used as a driver reference number.
    }
    driver1Name:   STRING[8];                {.AOut, .BOut, .LANC, etc}
    driver2Name:   STRING[8];                {.AIn, .BIn, etc}
    driverCode:    {MDrvr}ProcPtr;           {Device specific function call. If NIL then ignore,
                                              otherwise call with driver arguments. If it returns
                                              TRUE then don't call own driver ,otherwise do.}
    portConfig:    INTEGER;                  {Baudrate, parity, stop bits etc.}
    inPortRef:     INTEGER;                  {Modem = -6, Printer = -8}
    outPortRef:    INTEGER;                  {Modem = -7, Printer = -9} devData:       ARRAY[0..0] OF DevEntry;
  END;

-----------------------------------------------------------------------------------------------
  MenuCvt = RECORD CASE INTEGER OF
    1 : (theResult:    LONGINT); {Information returned by MenuSelect}
    2 : (theMenuNumber,           {Which menu was selected}
         theItemNumber:INTEGER)   {Which item within the menu}
  END;

{Filter for reducing and antialiasing micons.}
  FilterHandle = ^FilterPtr;
  FilterPtr = ^Filter;
  Filter = RECORD
    coeffSum:  Longint;                                 {Sum of all coefficients to be used for averaging.}
    theCoeffs: INTEGER;   {2D array of coefficients for filtering.}
  END;

{
   The segment list is used to keep track of all segment names for the segment
   board. The list is linked. There are routines for keeping it ordered.
  }
  SegListHndl = ^SegListPtr;
  SegListPtr = ^SegmentList;
  SegmentList = RECORD
    nextName:   SegListHndl;    {The next element of the list.}
    segType:    INTEGER;        {video, sound...}
    pictIndex:  INTEGER;        {Index into picture file. -1 means no picture, use icon.}
    hasPreview: BOOLEAN;        {Indicates whether there exists a micon for the segment.}
    name:       Str31;          {Name of the segment.}
  END;

{-----------------------------------------------------------------------------------------------}
  {
   This type is used to define a MultiMedia seqence.
   A sequence is normally dynamic. It consists of one or more media.
   There are discreete events associated with a sequence. These events are
   triggered by the global clock when it is running.
  }
  MMSequence = RECORD
    seqName:  Str31;     {Name of this sequence.}
    running:  BOOLEAN;   {Indicates whether this sequence is currently running.}
  END;

SeqHandle = ^SeqPtr;
  SeqPtr = ^MMSequence;
```

```
The definition of micon buffers.

MiconHandle = ^MiconPtr;
MiconPtr    = ^MiconHeader;
MiconHeader = RECORD
   pixMap:       PixMapHandle;
   updateCount:  INTEGER;    {Each time the micon frame is blitted this counter is decremented.
                              When count hits zero the frame offset is updated.}
   resetCount:   INTEGER;    {Reset value for update count.}
   bufSize:      Longint;
   lastTick:     Longint;
   frameSize:    Longint;
   offset:       Longint;
   frames:       INTEGER;    {this is where the frame data will start.}
END; {MiconHeader}

List of Micons for application.
This list is kept in the session handle and is used by the repetitive task to
"run" the micons.

MiconListHandle = ^MiconListPtr;
MiconListPtr    = ^MiconList;
MiconList = RECORD
   theMicon:    MiconHandle;      {This is the actual micon.}
   miconRect:   Rect;             {Position of micon in its local coordinates.}
   nextMicon:   MiconListHandle;  {NIL terminated list.}
   miconPort:   GrafPtr;          {Port where micon lives.}
   miconName:   Str31;            {Name of the micon (not including the _MICON) extension.}
   segFName:    Str31;            {Name of the segment file with segment defining micon.}
END; {MiconList}

List of Icons for HyperCard.
This list is kept in the session handle and is used by the HC tool to
draw icons on HyperCard.
}
IconListHandle = ^IconListPtr;
IconListPtr    = ^IconList;
IconList = RECORD
   iconIndex:   INTEGER;          {The icon offset in the icon file.}
   iconFRef:    INTEGER;          {Stuffing bytes so we've got same offset as in micon list.}
   iconRect:    Rect;             {Pos of icon in HC local coordinates.}
   nextIcon:    IconListHandle;   {NIL terminated list.}
   iconPort:    GrafPtr;          {Port where icon belongs.}
   iconName:    Str31;            {(Segment) name of icon.}
   segFName:    Str31;            {Name of segment file for icon.}
END;

{
This type implements the linked list abstraction for video segments.
}
LLHandle = ^LLPtr;
LLPtr    = ^LinkedList;
LinkedList = RECORD
   prevElement:  LLHandle;   {Previous element in linked list. NIL if we're first element.}
   nextElement:  LLHandle;   {Next element in linked list. NIL if we're last element.}
   inPoint:      Longint;    {Value for inpoint. In RTUs}
   inRefVal:     Longint;    {Tool specific.}
   outPoint:     Longint;    {Value for outpoint. In RTUs}
   outRefVal:    Longint;    {Tool specific.}
   extra:        Longint;    {Can be used for speed param etc.}
END;

SegmentHandle= ^SegmentPtr;   {The current segment that has been "loaded" in the film tool.}
SegmentPtr   = ^Segment;
Segment = RECORD
```

```
  segName:       Str31;           {Name of this segment.}
  segType:       INTEGER;         {Segment type: Video, sound, hc, segFile...}
  sourceName:    Str31;           {Name of originating source of the segment.}
  copyright:     Str31;           {Copyright information for segment.}
   {Fold this stuff.}
  stillName:     Str31;           {Name of digital still at end of this segment.}
  stillDirID:    INTEGER;         {dirID for the digital still.}
  stillEffect:   INTEGER;         {Digital effect starting the segment.}
  effectRect:    Rect;            {Rectangle in which the effect will happen. Returned by FxSel.}
  effectSpeed:   INTEGER;         {Speed of the effect.}
  fullScreen:    BOOLEAN;         {Indicates whether the effect will fill the entire screen.} segIconIndex:  INTEGER;         {Indexes into the file used to store icon (bitmaps) for segs.}
  noElements:    INTEGER;         {Number of elements in linked list.}
  segmentList:   LLHandle;        {Head of linked list with segment in and out points and time stamps.}
  currSegment:   LLHandle;        {The currently active segment in the segmentList.}
  recording:     BOOLEAN;         {True if we're currently recording a segment.}
  runStart:      Longint;         {TickCount as this segment started.}
END; {Segment}

FileListHandle = ^FileListPtr;
FileListPtr    = ^FileList;
FileList = RECORD
  segFileRef:    INTEGER;         {Reference to segment file.}
  iconFileRef:   INTEGER;         {Reference to segment icon file.}
  vRefNum:       INTEGER;         {Working dir ref num.}
  segFileName:   Str31;           {Name of the segment file.}
  segSaved:      BOOLEAN;         {TRUE if the segment has been saved.}
  autoOpen:      BOOLEAN;         {TRUE if opened "automatically" (by links).}
  elementCount:  INTEGER;         {Counts the number of elements referenced in file.}
                                  {elementCount is only valid if autoOpen = TRUE.}
                                  {When elementCount = 0 the file can be closed.}
  nextFile:      FileListHandle;
END; {FileList}

{The basetool is a type defined so it is possible to refer
 to the fields of any media tool. It therefore contains the
 field that all media tools must begin with.
}
BaseToolHndl = ^BaseToolPtr;
BaseToolPtr  = ^BaseTool;
BaseTool = RECORD
  windoid:       WindowPtr;
  animIcons:     ARRAY [1..kAnimIcons] OF Handle;
  currIcon:      INTEGER;         {Which of kAnimIcons currently displayed.}
END;

GlobalToolHndl = BaseToolHndl;

FilmToolHndl = ^FilmToolPtr;
FilmToolPtr  = ^FilmTool;
FilmTool = RECORD
  windoid:       WindowPtr;
  animIcons:     ARRAY [1..kAnimIcons] OF Handle;
  currIcon:      INTEGER;         {Which of kAnimIcons currently displayed.}
  shBarRect:     Rect;            {Current rectangle of shuttle bar control.}
  playIcon:      Handle;
  stopIcon:      Handle;
  controlPict:   PicHandle;
  shuttlePict:   PicHandle;
  inOutPict:     PicHandle;
  stillPainted:  BOOLEAN;         {Indicates whether there is a still painted on the screen or not.} inActive:      BOOLEAN;         {TRUE indicates that we've had a click in Click In Btn.}
  lastChecked:   Longint;         {Used for blinking in/out button.} theSegment:    SegmentHandle;
END; {FilmToolHndl}

SoundToolHndl = BaseToolHndl;
```

```
SegBoardHndl = ^SegBoardPtr;
SegBoardPtr = ^SegBoard;
SegBoard = RECORD
   aHndle:       WindowPtr;
   animIcons:    ARRAY [1..kAnimIcons] OF Handle;
   currIcon:     INTEGER;      {Which of kAnimIcons currently displayed.}
   linkIcon:     Handle;
   cameraIcon:   Handle;
   graphIcon:    Handle;
   projectIcon:  Handle;
   filmIcon:     Handle;
   iconRefNum:   INTEGER;      {Reference number for picture file.}
   nSegs:        INTEGER;      {Number of segments currently available.}
   segNames:     SegListHndl;  {List of segment names for this file.}
   boardName:    Str31;        {Name of this segment board (file).}
   mIconName:    Str31;        {Name of current micon.}
   nextBoard:    SegBoardHndl; {Link the segment boards together.}
END;

HCToolHndl = ^HCToolPtr;
HCToolPtr = ^HCTool;
HCTool = RECORD
   aHndle:       WindowPtr;    {Pointer to the HC card window.}
END;

The following defines a link structure for monitoring
 and maintaining links in dynamic media.

LinkIcon = RECORD CASE INTEGER OF
   kMicon: (aMicon:   MiconHandle);  {Need a handle to the Micon.}
   kIcon:  (anIcon:   INTEGER);      {We've already got the name of the segment so this isn't needed.}
   kHCIcon:(aHCIcon:  Handle);       {Need a handle to the HC icon bitmap.}
END;

LinkIndicator = RECORD    {Keeps track of the indicator that we're using to represent a link.}
   linkWind:   WindowPtr;  {Should perhaps be region for generality.}
   windType:   INTEGER;    {kWindoid, kTitle, kNoTitle}
   linkPt:     Point;      {Upper left point of indicator.}
   linkRect:   Rect;       {Rectangle of indicator in linkWind.} indType:    INTEGER;    {Type of indicator.(kMicon, kIcon, kHCIcon).}
   indicator:  LinkIcon;   {Micon, Icon or HCIcon.} onVideo:    BOOLEAN;    {TRUE if indicator is "in" or relative to the overlay window.}
END;

{The actual link structure.}
LinkHandle = ^LinkPtr;
LinkPtr = ^ Link;
Link = RECORD
   complete:   BOOLEAN;    {Indicated whether the link has been completed yet.}
   {FROM:}
   frSegType:  INTEGER;    {Type of segment we're linking from. (VSEG, SSEG, HCSEG)}
   frSegment:  Str31;      {Name of segment we're linking from. Card name if HCSEG.}
   frSegFile:  Str31;      {Segment file containing segment we're linking from. Stack name if HCSEG.}
   {TO:}
   toSegType:  INTEGER;    {Type of segment we're linking to. (VSEG, SSEG, HCSEG)}
   toSegment:  Str31;      {Name of segment we're linking to. Card name if HCSEG.}
   toSegFile:  Str31;      {Segment file containing segment we're linking to. Stack name if HCSEG.}
   toRef:      Longint;    {Reference used to denote exactly where the in point occurs. NOT USED}

{The ins and outs of the link, i.e. where they appear.}
   inPoint:    Longint;    {Reference used to denote exactly where the in point occurs for this link.}
   outPoint:   Longint;    {Reference used to denote exactly where the out point occurs for this link.}
   {How about keeping track of exactly what portion (section) of a segment we're linking from???} linkInd:    LinkIndicator;
```

```
^[]: LinkHandle;}

{Linked list of links.}
LinkListHandle = ^LinkListPtr;
LinkListPtr = ^LinkList;
LinkList = RECORD
  theLink:    LinkHandle;
  nextLink:   LinkListHandle;
  prevLink:   LinkListHandle;
END; {LinkList}

{Link history list.}
HistListHandle = ^HistListPtr;
HistListPtr = ^HistList;
HistList = RECORD
  nextHistory:  HistListHandle;   {Next element in the history list.}
  origSegName:  Str31;             {The originating segment name.}
  origSegFName: Str31;             {Originating segment file name.}
  outRef:       Longint;           {Reference used to denote where in orig. seg. the link came from.}
END; {HistList}

LinkToolHndl = ^LinkToolPtr;
LinkToolPtr  = ^LinkTool;
LinkTool = RECORD
  windoid:      WindowPtr;
  linkPict:     PicHandle;         {The picture of buttons 'n stuff in the link tool.} makingLink:   BOOLEAN;           {Indicates whether we're in the process of describing a new link.}
  activeLink:   LinkHandle;        {Current link "active" in tool.}
  allLinks:     LinkListHandle;    {All links for current segment. Ordered by "in-point".}
  nextIn:       LinkListHandle;    {The next link element in allLinks to be "put up"}
  currLinks:    LinkListHandle;    {List of links in the current segment. Ordered by out point.}
  nextOut:      LinkListHandle;    {The next link element in currLinks to be "taken down".}

{History related stuff.}
  histIndicator: WindowPtr;        {The "return link" windoid.}
  indType:      INTEGER;           {Type of history indicator.(kMicon, kIcon, kRLIcon).}
  indicator:    LinkIcon;          {Micon or Icon. If indType = kRLIcon, indicator is histPict below.}
  histPict:     PicHandle;         {"Return link" picture.}
  histCount:    INTEGER;           {Count or "depth" of history list.}
  linkHistory:  HistListHandle;    {Keep track of "where" we are comming from.} nextInRef:    Longint;           {Ref value used to determine when to look for setting up next link.}
  nextOutRef:   Longint;           {Ref. value to determine when to look for next link to remove.} indRect:      Rect;              {Rect for indicator in link tool.}

{The following relates to link indicators, not the link tool itself.}
  lastClickWhen: Longint;          {Tells when the last link indicator mouseDown occured.}
  lastClickWind: WindowPtr;        {Link indicator window where last mouseDown occured.}
END; {LinkTool}

{
  The debug tool is used as a mechanism to monitor where we are.
  Currently it only supports receiving and displaying text strings.
}
DebugToolHndl = ^DebugToolPtr;
DebugToolPtr  = ^DebugTool;
DebugTool = RECORD
  windoid:    WindowPtr;
  animIcons:  ARRAY [1..kAnimIcons] OF Handle;
  currIcon:   INTEGER;    {Which of kAnimIcons currently displayed.}
  debugIcon:  Handle;
  currString: Str255;     {The debug string currently displayed in the windoid.}
END;

MediaToolHandle = ^MediaToolPtr;
MediaToolPtr = ^MediaTool;
MediaTool = RECORD CASE INTEGER OF
  0: (theTool:BaseToolHndl);
```

```
    1: (global: GlobalToolHndl);
    2: (film:   FilmToolHndl);
    3: (sound:  SoundToolHndl);
    4: (segs:   SegSearchHndl);
    5: (hc:     HCToolHndl);
    6: (links:  LinkToolHndl);
    8: (debug:  DebugToolHndl);
END;

MMToolsHandle = ^MMToolsPtr;
MMToolsPtr = ^MMTools;
MMTools = RECORD
    visible:  ARRAY [1..kNoTools] OF BOOLEAN;
    tools:    ARRAY [1..kNoTools] OF MediaTool;
    mmMenu:   MenuHandle;        {Multi media tools menu.}
    hrMenu:   MenuHandle;        {Hierarchical Segment menu.}
END;

{
  The MMSession or MultiMedia Session is kept in the HyperCard application heapzone.
  It contains  current state.
}

MMSesHandle = ^ MMSesPtr;
MMSesPtr = ^MMSession;
MMSession = RECORD
    theIdentifier: STRING[15];   {The identifier used to identify find this block.}
    currSequence:  SeqHandle;    {The currently active sequence.}
    csDevice:      GDHandle;     {GDHandle to device for overlay (ColorSpace board.}
    refVal:        INTEGER;      {CS refval.}
    bkgndWindow:   WindowPtr;    {The window in the background.}
    bkgndRect:     Rect;         {Background rectangle.}
    hasOverLay:    BOOLEAN;      {TRUE then has ColorSpace overlay capabilities.}
    keyClip:       RgnHandle;    {Clip region for background.}
    theTools:      MMToolsHandle;{The multimedia tools.}
    stillName:     Str31;        {Name of the current still painted on the overlay screen.}
    stillvRefNum:  INTEGER;      {RefNum for still picture.} devBlocks:     MDevBlockHandle;{Media Device block.} currScreenIcon: PixMapHandle; {The most recently iconified screen.}
    miconList:     MiconListHandle;{Handle to micon list. NIL if empty.}
    iconList:      IconListHandle; {Handle to HC icon list. NIL if empty.}
    vblFlag:       BOOLEAN;      {Set when vbl task is active to avoid "stacked" interrupts.}
    toolFlag:      BOOLEAN;      {Signals to copybits patch when tools are blitting.} linksChanged:  BOOLEAN;      {Set to TRUE whenever links must be updated.}
    autoLinks:     BOOLEAN;      {TRUE if links to appear dynamically. Otherwise they just stay.}
    linkReturn:    BOOLEAN;      {TRUE if choosing a link automatically return to where we left.} openSegFiles:  FileListHandle; {List of open segment files.}
    {Patch stuff. This should only be relevant on init and end.}
    vblTaskRec:    QElemPtr;     {VBL task pointer.}
    msPatch:       Handle;       {Locked handle containing _MenuSelect patch.}
    origMS:        Longint;      {Original _MenuSelect trap address.}
    cbPatch:       Handle;       {Locked handle containing _CopyBits patch.}
    origCB:        Longint;      {Original _MenuSelect trap address.}
    gnePatch:      Handle;       {Locked handle containing _GetNextEvent patch.}
    origGNE:       Longint;      {Original _MenuSelect trap address.}
END;

BitMapPtr = ^BitMap;
BitMapHandle = ^BitMapPtr;

PatchRecord = RECORD
    oldAddr:  Longint;
    patch:    Handle;
END;

{----------------------------------------------------------------------------------}
{  The CommBlock is used to communicate to HC when the patch needs to send HC commands.    }
```

```
   A patch can locate the block and append a Hypertalk string to it. The HT string is then
   executed by an XCMD that must get called by HC on a regular basis.
}

HTListHandle = ^HTListPtr;
HTListPtr = ^HTList;
HTList = RECORD
  nextMessage:   HTListHandle;
  messType:      INTEGER;        {kSetGlobal, kSendCDMessage, kSendHCMessage}
  message:       Str255;
  globName:      Str31;
END;

CommBlockHandle = ^CommBlockPtr;
CommBlockPtr = ^CommBlockHeader;
CommBlockHeader = RECORD
  theIdentifier: STRING[15];     {The identifier used to identify/find this block.}
  htMessage:     HTListHandle;   {The list of ht statements.}
END;

END.
```

```
;------------------------------------------------------------------
; First created:   July 31,.1989  -  Based on HyperHelp and MMTool code.
;           By:   Hans Peter Brøndmo
;
;   HISTORY:
;
;
;   This file contains all the equates for the below patches.
;
;------------------------------------------------------------------

; Some constants
; The patch numbers
UnImplTrapNo     equ  $9f              ; Trap number for unimplemented trap.
JugDisTrapNo     equ  $8f              ; Trap number for MultiFinder trap.
InitGrafNo       equ  $6e              ; _InitGraf trap number.
InitCPortNo      equ  $201             ; _InitCPort trap number.
DrawMBarNo       equ  $137             ; _DrawMenuBar trap number.
MenuSelectNo     equ  $13d             ; _MenuSelect trap number.
MenuKeyNo        equ  $13e             ; _MenuKey trap number.
GetNextEventNo   equ  $170             ; _GetNextEvent trap number.
WaitNextEventNo  equ  $60              ; _WaitNextEvent trap number.
GetOSEventNo     equ  $31              ; _GetOSEvent trap number.
FrontWindowNo    equ  $124             ; _FrontWindow trap number.
MoveWindowNo     equ  $11b             ; _MoveWindow trap number.
SelectWindowNo   equ  $11f             ; _SelectWindow trap number.
NewWindowNo      equ  $113             ; _NewWindowNo trap number.
NewDialogNo      equ  $17d             ; _NewDialog trap number.
ShowHideNo       equ  $106             ; _ShowHide trap number.
GetNCWindowNo    equ  $246             ; _GetNewCWindow trap number.
NewCWindowNo     equ  $245             ; _NewCWindow trap number.
ZoomWindowNo     equ  $3a              ; _ZoomWindow trap number.

MMID             equ  9696             ; HyperHelp menu & resource ID number.

;Defines the structure of the MMSession handle.
mmSession       RECORD   0
id              ds.w     8       ; STRING[15]
currSeq         ds.l     1       ; SeqHandle
;inLoop         ds.w     1       ; BOOLEAN
cdDevice        ds.l     1       ; GDHandle
refVal          ds.w     1       ; INTEGER
bkgndWindow     ds.l     1       ; windowPtr
bkgndRect       ds.l     2       ; Rect
hasOverlay      ds.w     1       ; BOOLEAN
keyClip         ds.l     1       ; RgnHandle
theTools        ds.l     1       ; MMToolsHandle
stillName       ds.b    32       ; Str31
stillvRefNum    ds.w     1       ; INTEGER
devBlocks       ds.l     1       ; MDevBlockHandle
currSceenIcon   ds.l     1       ; PixMapHandle
miconList       ds.l     1       ; MiconListHandle
iconList        ds.l     1       ; IconListHandle
vblFlag         ds.b     1       ; BOOLEAN
toolFlag        ds.b     1       ; BOOLEAN
linksChanged    ds.b     1       ; BOOLEAN
autoLinks       ds.b     1       ; BOOLEAN
linkReturn      ds.b     1       ; BOOLEAN
dummy           ds.b     1       ; Filler
openSegFiles    ds.l     1       ; FileListHandle
vblTaskRec      ds.l     1       ; QElemPtr
msPatch         ds.l     1       ; Handle
origMS          ds.l     1       ; Ptr
cbPatch         ds.l     1       ; Handle
origCB          ds.l     1       ; Ptr
gnePatch        ds.l     1       ; Handle
origGNE         ds.l     1       ; Ptr
                ENDR
```

```
; GrafPort type
GrafPort    RECORD   0
device      ds.w     1
ortBits     ds.l     1
portRect    ds.l     1
            ENDR ; VBL record.
vblRec      RECORD   0
qLink       ds.l     1       ; Ptr
qType       ds.w     1       ; INTEGER
vblAddr     ds.l     1       ; ProcPtr
vblCount    ds.w     1       ; Longint
vblPhase    ds.w     1       ; INTEGER
            ENDR ; Definition of MiconList structure.
micons      RECORD   0
theMicon    ds.l     1       ; MiconHandle
nextMicon   ds.l     1       ; NextMiconList
miconRect   ds.l     2       ; MiconRect
            ENDR ; Definition of the actual micon buffer.
miconBuffer RECORD   0
pixMap      ds.l     1       ; The micon pixMapHandle
secCount    ds.l     1       ; Longint
lastTick    ds.l     1       ; Longint
frameSize   ds.l     1       ; Longint
offset      ds.l     1       ; Longint - pointer into current pos in buffer
frames      ds.w     1       ; INTEGER
            ENDR
```

```
;--------------------------------------------------------------------
; First created:    July 24, 1989
;           By:     Hans Peter Brøndmo
;
;   HISTORY:
;
;   This file is compiled into the resource 'vbMI'.
;
;   asm VBLMicon.a
;   link -o "{mpw}HyperHelp:Nothing" -rt vbMI=6969 VBLMicon.a.o VBLMicon.p.o {Libraries}interface.o
;
;   NOTE!
;       The entrypoint is after the storage area at the head of this file.
;
;--------------------------------------------------------------------
        MAIN
        BLANKS  ON
        STRING  ASIS INCLUDE     'Traps.a'
        INCLUDE     'SysEqu.a'
        INCLUDE     '::Persuasion:VisualEqu.a'

EXPORT      VBLFlag vblRecord   RECORD  {OldA6},decr    ; VBL task record.
rtsAddr     ds.l    1               ; Return address
OldA6       ds.l    1               ; Space for the old a6
savePort    ds.l    1               ; Old address.
vblFrame    equ     *               ; Size of this frame.
            ENDR session     ds.l    1               ; Session handle (for referencing list of icons/micons.)

;--------------------------------------------------------------------
; Routine:  VBLFlag;
;           The VBL routine that sets "update Micons" flag.
;
;--------------------------------------------------------------------
VBLFlag WITH    mmSession, vblRec
        move.l  session,a0          ; First check to see if we're already doing vb task.
        move.l  (a0),a0             ; Dereference handle.
        move.b  #$01,vblFlag(a0)    ; Set vblFlag to signal that micons should be updated.

move.l  vblTaskRec(a0),a0   ; Get task record pointer. Isn't this in a0 on entry???
        move.w  #4,vblCount(a0)     ; Wait another 4 ticks.
        rts                         ; Return from VBL handler.

END
```

```
History:
First written: 24.7.89  By:    Hans Peter Brøndmo (hpb)

pascal VBLSetup.p

{$D-} { MacsBug symbols on }
{$R-} { No range checking }

UNIT VBLSetup;

INTERFACE

USES    MemTypes, QuickDraw, OSIntf, ToolIntf, PackIntf,
        MMTypes;

PROCEDURE VBLInit(session:MMSesHandle);

PROCEDURE VBLRemove(session: MMSesHandle);

IMPLEMENTATION
{***************************************************************
 *                                                             *
 *                                                             *
 ***************************************************************}

PROCEDURE   MacsBugStr(signalStr:   Str255);
    INLINE  $A9FF;

PROCEDURE VBLInit(session:MMSesHandle);
{
 This function paints the micons on HC in the VBL task.
}
TYPE
  MiconVBLHndl = ^MiconVBLPtr;
  MiconVBLPtr = ^MiconVBL;
  MiconVBL = RECORD
    session:    MMSesHandle;
    theHandler: INTEGER;       {So we can get ptr to vbl handler.}
  END;

VAR
  theVBL:    MiconVBLHndl;
  myVBLPtr:  QElemPtr;

BEGIN
  theVBL := MiconVBLHndl(GetResource('vbMI',6969));
  IF theVBL = NIL THEN Exit(VBLInit);

myVBLPtr := QElemPtr(NewPtr(sizeof(VBLTask)));
  IF myVBLPtr = NIL THEN BEGIN
    ReleaseResource(Handle(theVBL));
    Exit(VBLInit);
  END
  ELSE DetachResource(Handle(theVBL));

MoveHHi(Handle(theVBL));
  HLock(Handle(theVBL));
  theVBL^^.session := session;
  WITH myVBLPtr^.vblQElem DO BEGIN
    qLink := NIL;
    qType := ORD(vType);
    vblAddr := ProcPtr(@theVBL^^.theHandler);
    vblCount := 4;
    vblPhase := 0;
  END;
  session^^.vblTaskRec := myVBLPtr;
  IF VInstall(myVBLPtr) <> noErr THEN BEGIN
    MacsBugStr('User Break: VBL install error.');
  END;
```

```
END;

PROCEDURE VBLRemove(session: MMSesHandle);
{
 Removes a VBLTask if one has been installed.
}
BEGIN
  IF VRemove(session^^.vblTaskRec) <> noErr THEN SysBeep(5);
END;

END.
```

```
; Created: 27.5.89 - hpb
;-------------------------------------------------------------------------------
;
; Removes one argument (patchPtr) and calls the SetupPatch routine pointed to by the patchPtr.
; This routine simply provides "glue" allowing me to call a procedure (SetupPatch) that is
; written in assembler and is loaded dynamically.
;
; FUNCTION/PROCEDURE    SetupPatch(arguments...; patchPtr: Ptr):Longint;
;
        BLANKS  ON
        STRING  Pascal
        EXPORT  SetupCBPatch
        EXPORT  SetupGNEPatch
        EXPORT  SetupMSPatch SetupMSPatch    PROC
SetupCBPatch    PROC
SetupGNEPatch   PROC move.l  a0,-(sp)          ; Push a0
        move.l  8(sp),a0          ; Get patchPtr address.
        move.l  4(sp),8(sp)       ; Shift return address since we've removed patchPtr
        move.l  a0,4(sp)          ; Put patchPtr on stack.
        move.l  (sp)+,a0          ; Restore a0
        rts                       ; Go do it. (Go to address on stack = patchPtr).

END.
```

```
;-----------------------------------------------------------------------
; First created:   April 15, 1989
;         By:   Hans Peter Brondmo
;
;   HISTORY:
;
; This file is compiled into the resource 'MMpt'. It contains the _CopyBits patches.
;
; NOTE!
;   When linking this resource it is imperative that the entrypoint be at the
;   beginning of this file i.e. at "SetupPatch".
;
;   asm CBPatch.a
;   link -o "{mpw}HyperHelp:Nothing" -rt MMpt=6969 CBPatch.a.o {Libraries}interface.o
;
;-----------------------------------------------------------------------

MAIN
        BLANKS  ON
        STRING  ASIS

INCLUDE     'Traps.a'
        INCLUDE     'SysEqu.a'
        INCLUDE     '::Persuasion:VisualEqu.a'

; And some constants
; The patch numbers
CopyBitsNo      EQU     $a8ec           ; _CopyBits trap number.

spRecord        RECORD  (OldA6),decr    ; PatchInstaller record.
hcPort          ds.l    1               ; HC graf port ptr.
mmSession       ds.l    1               ; icon list.
rtsAddr         ds.l    1               ; Return address
OldA6           ds.l    1               ; Space for the old a6
oldCopyBits     ds.l    1               ; Old address.
spFrame         equ     *               ; Size of this frame.
        ENDR
;-----------------------------------------------------------------------
; Routine: SetupPatch(hcGrafPort: GrafPtr; session: MMSesHandle);
;       Sets up patch for _CopyBits in HC.
;
; Sets up the copybits patch for hypercard so icons and micons stamped on a
; card don't get wiped out when HC redraws.
;-----------------------------------------------------------------------
SetupPatch WITH    spRecord
        link    a6,#spFrame             ; Allocate a stack frame.
        movem.l d0/a0,-(sp)             ; Save the regs we use.

move.l  #CopyBitsNo,d0          ; Get the current CopyBits trap address
        _GetTrapAddress newTool         ; Get the trap address in a0 move.l  a0,oldCopyBits(a6)      ; Return old trap address.
        lea     CopyBitsPatch,a0        ; Get the address of CopyBits patch.
        cmp.l   oldCopyBits(a6),a0      ; Compare if already patched.
        beq.s   skipPatch               ; Patch again and die.
        lea     copyBitsAddr,a0         ; Address in a0
        move.l  oldCopyBits(a6),(a0)    ; Store the old trap address at end of patch.

lea     CopyBitsPatch,a0        ; Get the address of CopyBits patch.
        move.l  #CopyBitsNo,d0          ; _CopyBits patch number.
        _SetTrapAddress newTool         ; Now set it to patch (address in a0).

; Put passed values in storage for patch.
        lea     hcGrafPort,a0           ; Address of hcGrafPort storage.
        move.l  hcPort(a6),(a0)         ; Save hcGraf port.
        lea     session,a0              ; Address of session's storage.
        move.l  mmSession(a6),(a0)      ; Save session so it can be referenced from patch.
```

```
sk:PPatch
; Finished!
        move.l   rtsAddr(a6),hcPort(a6)   ; Ugly hack! Write return address over args so we can RTS below.
        movem.l  (sp)+,d0/a0              ; Restore registers.
        unlk     a6                       ; Remove stack frame.
        add.l    #8,sp                    ; Remove (2) arguments (but not return address).
        rts
        ENDWITH PatchStart
; Here is the stackFrame for the _CopyBits patch.
cbRecord       RECORD   {OldA6},decr    ; PatchInstaller record.
destBitMap     ds.l     1               ; Destination bitmap.
destRect       ds.l     1               ; Destination rectangle (address)
sourceRect     ds.l     1               ; Source rectangle (address)
mode           ds.w     1               ; Copybits transfer mode.
maskRgn        ds.l     1               ; The copybits mask region.
rtsAddr        ds.l     1               ; Return address
oldA6          ds.l     1               ; Space for the old a6
rectRgn        ds.l     1               ; Region for m/icon rectangle.
tempPort       ds.l     1               ; Temporary port storage.
cbFrame        equ      *               ; Size of this frame.
               ENDR
;-------------------------------------------------------------------------------
; Routine:  CopyBitsPatch;
;           Patch code for _CopyBits in HC.
;
;-------------------------------------------------------------------------------
CopyBitsPatch

; CODE FOR PATCHING COPYBITS WHEN IT IS BLITTING TO A HC CARD.

;-------------------------------------------------------------------------------
; Subroutine:  MakeMask
;              Makes a mask region from the hcGrafPort's port rect and the icons
;              rectangles.
;
; On entry:    maskRgn on the stack.
; On exit:     mask rgn in d0.
; Modifies:    a0.
;-------------------------------------------------------------------------------
MakeMask

; CODE FOR GENERATING MASK FOR BLITTING TO HC CARD.

Patchend

END
```

```
;-------------------------------------------------------------------
; First created:    April 15, 1989
;          By:      Hans-Peter Brøndmo
;
;   HISTORY:
;
; This file is compiled into the resource 'MMpt'. The _MenuSelect patch
;
; NOTE!
;   When linking this resource it is imperative that the entrypoint be at the
;   beginning of this file i.e. at "SetupPatch".
;
;   asm MSPatch.a
;   link -c ":mpw}HyperHelp:Nothing" -rt MMpt=6967 MSPatch.a.o {Libraries}interface.o
;
;
;-------------------------------------------------------------------
;       MAIN
        SEG        'MSPatch'
        BLANKS     ON
        STRING     Pascal INCLUDE    'Traps.a'
        INCLUDE    'SysEqu.a'

EXPORT     MSSetup
        IMPORT     FilterMenu
        IMPORT     SetupMenu

; And some constants
; The patch numbers
MenuSelectNo    EQU     $13d            ; _MenuSelect trap number.

msRecord        RECORD  (OldA6),decr    ; PatchInstaller record.
mmSession       ds.l    1               ; Session handle.
rtsAdcr         ds.l    1               ; Return address
OldA6           ds.l    1               ; Space for the old a6
realMS          ds.l    1               ; Return argument.
msFrame         equ     *               ; Size of this frame.
                ENDR
;-------------------------------------------------------------------
; Routine:  MSSetup(session: MMSesHandle; menu: MenuHandle);
;           MSSetup(install: BOOLEAN; session: MMSesHandle; menu: MenuHandle);
;           Sets up patch for _MenuSelect in HC.
;
; Sets up the MS patch for hypercard
;-------------------------------------------------------------------
MSSetup PROC WITH    msRecord
        link    a6,#msFrame             ; Allocate a stack frame.
        movem.l d0/a0,-(sp)             ; Save the regs we use.

move.l  #MenuSelectNo,d0        ; Get the current GetNextEvent trap address
        _GetTrapAddress newTool         ; Get the trap address in a0 move.l  a0,realMS(a6)           ; Return old trap address.
        lea     MenuSelectPatch,a0      ; Get the address of GNE patch.
        cmp.l   realMS(a6),a0           ; Has trap already been patched.
        beq.s   skipPatch               ; If patch has been made don't patch again.
        lea     MSAddr,a0               ; Storage address in a0
        move.l  realMS(a6),(a0)         ; Store the real MS address at end of patch.

lea     MenuSelectPatch,a0      ; Get the address of GNE patch.
        move.l  #MenuSelectNo,d0        ; _MenuSelect patch number.
        _SetTrapAddress newTool         ; Now set it to patch (address in a0).

; Put passed values in storage for patch.
        lea     session,a0              ; Address of session's storage.
```

```
            move.l    mmSession(a6),(a0)    ; Save session so it can be referenced from patch.

skipPatch
        ; Finished!
        move.l    rtsAddr(a6),mmSession(a6); Ugly hack! Write return address over args so we can RTS below.
        movem.l   (sp)+,d0/a0           ; Restore registers.
        unlk      a6                    ; Remove stack frame.
        add.l     #4,sp                 ; Remove (1) argument (but not return address).
        rts
        ENDWITH PatchStart
; Here is the stackFrame for the _MenuSelect patch.
mRecord    Record  (OldA6),decr    ; PatchInstaller record.
mItem          ds.w    1               ; Chosen menu item / return value.
mChoice        ds.w    1               ; Chosen menu id.
rtsAddr        ds.l    1               ; Return address
oldA6          ds.l    1               ; Space for the old a6
mFrame         equ     *               ; Size of this frame.
               EndR
;------------------------------------------------------------------------
; Routine:  MenuSelectPatch;
;           Patch code for _MenuSelect in HC.
;
;           This code implements a tail patch that first calls the MenuSelect
;           trap and then calls FilterMenu to determine whether the menu
;           selection was made from the MMTool menu. If it was it "does the
;           right thing."
;------------------------------------------------------------------------
MenuSelectPatch WITH      mRecord
        link      a6,#mFrame            ; Allocate the stack frame.
        movem.l   a0/d0,-(sp)           ; Save the whales and registers.
        lea       savedReturn,a0        ; This is where we save the return address.
        move.l    rtsAddr(a6),(a0)      ; Store the original return address.

lea       retFrPatch,a0         ; Where we return from MenuSelect.
        move.l    a0,rtsAddr(a6)        ; Stuff the return address so MenuSelect will come back here.

move.l    session,-(sp)         ; Send session handle to pascal func.
        jsr       SetupMenu             ; Set up the MMTools menu.

; Now call original MenuSelect.
        movem.l   (sp)+,a0/d0           ; Restore registers.
        unlk      a6                    ; Remove stack frame.
        move.l    MSAddr,-(sp)          ; Little trick to avoid "messing up registers".
        rts                             ; Go do original MS.

; Once _MenuSelect has been executed this is where it will return.
retFrPatch
        move.l    sp,-(sp)              ; Address of menuselect return (VAR param in Pascal).
        move.l    session,-(sp)         ; Send session handle to pascal func.
        jsr       FilterMenu            ; Check if we care about the event.

move.l    savedReturn,-(sp)     ; Prepare to return to original caller.
        rts ;------------------------------------------------------------------------
; Storage for patch.
;------------------------------------------------------------------------
savedReturn    ds.l    1               ; Space for the original return address.
theEventPtr    ds.l    1               ; Pointer to the event record.
MSAddr         ds.l    1               ; Original _MenuSelect routine.
session        ds.l    1               ; Session handle.

Patchend

END
```

```
History:
First written: 31.5.89  By:    Hans Peter Brøndmo (hpb)
Modified: 5.9.89 (hpb)         Included FileProcs, ToolUtils and changed MSPatch.incl pascal MSPatch.p
    link -o """MPW""HyperHelp:Nothing" -rt HHpt=6969 HHPatch.a.o dolaunch.p.o ""Libraries""interface.o
}
(SD+) { MacsBug symbols on }
(SR-) { No range checking  }

UNIT MSPatch;

INTERFACE

USES    MemTypes, QuickDraw, OSIntf, ToolIntf, PackIntf,
        CSLib, MMTypes, FileProcs, ToolUtils, LinkFile, MMDEffects;

PROCEDURE FilterMenu(VAR theChoice: MenuCvt; session: MMSesHandle);
PROCEDURE SetUpMenu(session: MMSesHandle);

IMPLEMENTATION
{****************************************************************************
 *                                                                          *
 *                                                                          *
 ****************************************************************************}

PROCEDURE   MacsBugStr(signalStr:   Str255);
    INLINE  $A9FF;

PROCEDURE FilterMenu(VAR theChoice: MenuCvt; session: MMSesHandle);
{
 This function will filter the menu passed in the event record.
}
VAR
  reply:        SFReply;
  theKeys:      KeyMap;
  aString:      Str255;
  err:          OSErr;
BEGIN
  IF theChoice.theMenuNumber = kMMMenuID THEN BEGIN
    session^^.toolFlag := TRUE; {So ModalDialog doesn't call patched GNE.}
    HiliteMenu(0);
    CASE theChoice.theItemNumber OF
    kOpenSeg:
    BEGIN
      GetKeys(theKeys);
      GetIndString(aString, kDivStrID, kUntitled);
      IF theKeys[shiftKeyCode] THEN reply := PutSegmentFile(aString)
      ELSE reply := GetSegmentFile('');
      IF reply.good THEN BEGIN
        err := OpenNewSegment(session, reply.fName, '', reply.vRefNum);
        IF err = tmfoErr THEN NotifyUser(kOutOfFiles, session)
        ELSE IF err = opWrErr THEN NotifyUser(kAlreadyOpen, session)
        ELSE IF err = memFullErr THEN NotifyUser(kOutOfMemory, session)
        ELSE IF err <> noErr THEN NotifyUser(kFileError, session);
      END;
    END;

kAutoLinkItem:
    BEGIN
      AutoLinks(session, NOT(session^^.autoLinks));
    END;

kLinkReturnItem:
    BEGIN
      LinkReturn(session, NOT(session^^.linkReturn));
    END;

OTHERWISE   ShowHideTool(session, theChoice.theItemNumber)
```

```
       END; {case}
       theChoice.theResult := 0;     {HC should not see this selection.}
       session^^.toolFlag := FALSE;
     END
   ELSE IF theChoice.theMenuNumber = kMMMenuID+5 THEN BEGIN
     ShowHideTool(session, -theChoice.theItemNumber);
     BringSeg2Front(session, theChoice.theItemNumber);
     IF NOT(WindowPeek(session^^.theTools^^.tools[kSegBoardItem].segs^^.windoid)^.visible) THEN
       SendSeg2Back(session, 1);
     theChoice.theResult := 0;     {HC should not see this selection.}
   END;
END;   {FilterMenu}

PROCEDURE SetUpMenu(session: MMSesHandle);
{
 If the shift key is down the open menu item in the MMTools menu is set to "New Browser"
 otherwise it is "Open Browser".
}
VAR
  theKeys:     KeyMap;
  aString:     Str255;
BEGIN
  GetKeys(theKeys);
  IF theKeys[shiftKeyCode] THEN GetIndString(aString, kDivStrID, kNewBrowser)
  ELSE GetIndString(aString, kDivStrID, kOpenBrowser);
  SetItem(session^^.theTools^^.mmMenu, 1, aString);
END; {SetUpMenu}

END.
```

```
; First created:    April 15, 1989
;            By:    Hans Peter Brendmo
;
;   HISTORY:
;
; This file is compiled into the resource 'MMpt'. The _CopyBits
;
; NOTE!
;   When linking this resource it is imperative that the entrypoint be at the
;   beginning of this file i.e. at "SetupPatch".
;
;   asm GNEPatch.a
;   link -c "{mpw}HyperHelp:Nothing" -rt MMpt=6969 MMPatch.a.o {Libraries}interface.o
;
;-----------------------------------------------------------------------
;       MAIN
        SEG         'GNEPatch'
        BLANKS      ON
        STRING      Pascal INCLUDE     'Traps.a'
        INCLUDE     'SysEqu.a'
        INCLUDE     '::Persuasion:VisualEqu.a'

EXPORT      GNESetup
        IMPORT      FilterEvent spRecord      RECORD    {OldA6},decr    ; PatchInstaller record.
mmSession     ds.l      1               ; icon list.
rtsAddr       ds.l      1               ; Return address
OldA6         ds.l      1               ; Space for the old a6
realGNE       ds.l      1               ; Return argument.
spFrame       equ       *               ; Size of this frame.
              ENDR
;-----------------------------------------------------------------------
; Routine:  GNESetup(session: MMSesHandle): Ptr;
;           GNESetup(install: BOOLEAN; session: MMSesHandle): Ptr;
;           Sets up patch for _GetNextEvent in HC.
;
; Sets up the GNE patch for hypercard
;-----------------------------------------------------------------------
GNESetup    PROC WITH    spRecord
        link    a6,#spFrame             ; Allocate a stack frame.
        movem.l d0/a0,-(sp)             ; Save the regs we use.

move.l  #GetNextEventNo,d0      ; Get the current GetNextEvent trap address
        _GetTrapAddress newTool         ; Get the trap address in a0 move.l  a0,realGNE(a6)          ; Return old trap address.
        lea     GetNextEventPatch,a0    ; Get the address of GNE patch.
        cmp.l   realGNE(a6),a0          ; Has trap already been patched.
        beq.s   skipPatch               ; If patch has been made don't patch again.
        lea     GNEAddr,a0              ; Storage address in a0
        move.l  realGNE(a6),(a0)        ; Store the real GNE address at end of patch.

lea     GetNextEventPatch,a0    ; Get the address of GNE patch.
        move.l  #GetNextEventNo,d0      ; _GetNextEvent patch number.
        _SetTrapAddress newTool         ; Now set it to patch (address in a0).

; Put passed values in storage for patch.
        lea     session,a0              ; Address of session's storage.
        move.l  mmSession(a6),(a0)      ; Save session so it can be referenced from patch.

skipPatch
        ; Finished
```

```
        move.l  rtsAddr(a6),mmSession(a6) ; Ugly hack! Write return address over args so we can RTS below.
        movem.l (sp)+,d0/a0         ; Restore registers.
        unlk    a6                  ; Remove stack frame.
        add.l   #4,sp               ; Remove (1) argument (but not return address).
        rts
        ENDWITH ; This is where the actual patch starts.
PatchStart ; Here is the stackFrame for the _GetNextEvent patch.
gneRecord       RECORD  (OldA6:),decr   ; PatchInstaller record.
funcReturn      ds.w    1               ; The return argument for GNE.
eventMask       ds.w    1               ; Mask parameter.
theEvent        ds.l    1               ; Event (address/ptr)
rtsAddr         ds.l    1               ; Return address
OldA6           ds.l    1               ; Space for the old a6
localStorage    ds.l    1               ; Region for m/icon rectangle.
gneFrame        equ     *               ; Size of this frame.
                ENDR
;--------------------------------------------------------------------
; Routine:  GetNextEventPatch;
;           Patch code for _GetNextEvent in HC.
;
;           This code implements a tail patch that first gets an event and then
;           decides whether to inform the caller (HC) that the event occured.
;           The "decision" (filter) is performed by the pascal function
;           FilterEvent.
;--------------------------------------------------------------------
GetNextEventPatch ; CODE IMPLEMENTING GetNextEventPatch HERE:

Patchend

END
```

```
History:
First written: 24.5.89 By:   Hans Peter Brondmo (hpb)

pascal HHInit.p
    link -c "MPWHyperHelp:Nothing" -rt HHpt=6969 HHPatch.a.o dolaunch.p.o Librariesinterface.o {$D-}  { MacsBug symbols on }
{$R-}  { No range checking  }

UNIT GNEPatch;

INTERFACE

USES    MemTypes, QuickDraw, OSIntf, ToolIntf, PackIntf,
        CSLib, MMTypes, FileProcs, LinkFile, ToolUtils, DevComm, HistoryUtils, MMDEffects;

FUNCTION    CheckSegment(session: MMSesHandle; aVidSegment: SegmentHandle): BOOLEAN;

PROCEDURE   StartNextSegment(session: MMSesHandle; aVidSegment: SegmentHandle; refVal: INTEGER);

PROCEDURE   RunVideo(aSegment: SegmentHandle; session: MMSesHandle);

PROCEDURE   DrawIcon(theIcon: Handle; theRect: Rect);

FUNCTION    GetLink(linkWind: WindowPtr; aList: LinkListHandle): LinkHandle;

PROCEDURE   LinkClick(session: MMSesHandle; clickPt: Point; OutProc: ProcPtr);

PROCEDURE   SegBoardClick(session: MMSesHandle; clickPt: Point; boardIndex: INTEGER; OutProc: ProcPtr);

PROCEDURE   VideoClick(session: MMSesHandle; clickPt: Point; OutProc: ProcPtr);

PROCEDURE   VidSegPlay(session: MMSesHandle; segName:    Str31; segFileName: Str31;
                    saveHistory: BOOLEAN; startRef: Longint);

PROCEDURE   StopSegment(session: MMSesHandle);

PROCEDURE   UpdateIndicator(session: MMSesHandle; ticking: Longint);

PROCEDURE   SendHCMessage(messString: Str255);

PROCEDURE   SendCardMessage(messString: Str255);

PROCEDURE   SetGlobal(globName: Str31; value: Str255);

PROCEDURE   FindHCSegCard(segName, segFName: StringPtr);

PROCEDURE   FilterEvent(VAR wasEvent: BOOLEAN; session: MMSesHandle; VAR anEvent: EventRecord);

IMPLEMENTATION
{*********************************************************************************
 *                                                                                *
 *                                                                                *
 *********************************************************************************}

FUNCTION    DelFromNameList(VAR listHead: SegListHndl; segName: Str31): BOOLEAN; FORWARD;
FUNCTION    GetNameList(index: INTEGER; theBoard: SegBoardHndl): SegListHndl; FORWARD;
PROCEDURE   DragPicture(VAR clickPt: Point; VAR pictRect: Rect; playing: BOOLEAN; windPort: GrafPtr;
                theMicon: MiconHandle; theIcon: PixMapHandle; session: MMSesHandle); FORWARD;
PROCEDURE   ArrowAction(theControl: ControlHandle; partCode: INTEGER); FORWARD;
PROCEDURE   DrawNameCntr(aRect: Rect; name: Str31); FORWARD;
PROCEDURE   ClearBkgndWind(session: MMSesHandle); FORWARD;
PROCEDURE   NewHCLink(session: MMSesHandle); FORWARD;

PROCEDURE   MacsBugStr(signalStr:    Str255);
    INLINE  $A9FF;

{$I CSControl.incl.p}
{$I HCComm.incl.p}
```

```
{$I HCUtils.incl.p}
{$I LinkToolUtils.incl.p}
{$I SegBoardUtils.incl.p}
{$I VideoToolUtils.incl.p}

PROCEDURE FilterEvent(VAR wasEvent: BOOLEAN; session: MMSesHandle; VAR anEvent: EventRecord);

{This function will filter the event passed in the event record.}

VAR
  whichWindow: WindowPtr;
  partCode:    INTEGER;
  toolNo:      INTEGER;
  aLink:       LinkHandle;
  globPt:      Point;

BEGIN
  session^^.toolFlag := TRUE;
  MMTask(session);              {Call repeatedly to update tools.}
  IF wasEvent THEN BEGIN
    CASE anEvent.what OF        {case on event type}
      mouseDown:                {mouse button down: call Window Mgr to find out where}
      BEGIN
        {All clicks in HC ignored.}
        partCode := FindWindow(anEvent.where, whichWindow);
        IF WindowPeek(whichWindow)^.refCon <> 1 THEN {If 1 then we're in HC.}
        CASE partCode OF inDrag:               {title bar: call my own dragging routine.}
          BEGIN
            {Calls my own "DragWindow" proc so HC can be dragged without coming to foreground.}
            ToolDrag(whichWindow, anEvent.where);
            aLink := GetLink(whichWindow, session^^.theTools^^.tools[kLinkItem].links^^.allLinks);
            IF aLink <> NIL THEN BEGIN
              globPt := whichWindow^.portRect.topLeft;
              SetPort(whichWindow);
              LocalToGlobal(globPt);
              WITH session^^ DO IF hasOverlay THEN BEGIN
                SetPort(bkgndWindow);
                GlobalToLocal(globPt);
                IF PtInRect(globPt, bkgndWindow^.portRect) THEN
                  aLink^^.linkInd.onVideo := TRUE
                ELSE BEGIN
                  LocalToGlobal(globPt);
                  aLink^^.linkInd.onVideo := FALSE;
                END;
              END;
              aLink^^.linkInd.linkPt := globPt;
              session^^.linksChanged := TRUE;
            END;
            (*ELSE BEGIN*)
            BringToFront(whichWindow); {and make it "active/front" if not a linkWindow}
            SelectSegBoard(session, whichWindow); {Only does something if whichWindow is segBoard.}
            (*END;*)
            wasEvent := FALSE;
          END; {inDrag} inContent: {body of application window: }
          BEGIN    {figure out which window we're in.}
            IF whichWindow = session^^.bkgndWindow THEN BEGIN {clicking on a link indicator???}
              {Pass the click to HC so a script can take appropriate action.}
              BkgndLinkClick(session, anEvent.where);
              wasEvent := FALSE;
            END
            ELSE BEGIN
              toolNo := ToolWindoid(whichWindow, session^^.theTools);
              IF toolNo <> 0 THEN BEGIN
                BringToFront(whichWindow);
                IF toolNo < 0 THEN BringSeg2Front(session, -toolNo);
                ClickInTool(session, toolNo, anEvent.where);
```

```
              wasEvent := FALSE
           END
         ELSE wasEvent := NOT(IndicatorClick(whichWindow,
                     session^^.theTools^^.tools[kLinkItem].links, anEvent.when));
       END;
      END; {of inContent} inGoAway:
      BEGIN
        toolNo := ToolWindoid(whichWindow, session^^.theTools);
        IF toolNo <> 0 THEN
        BEGIN
          IF TrackGoAway(whichWindow, anEvent.where) THEN ShowHideTool(session, toolNo);
          wasEvent := FALSE;
        END
        ELSE IF whichWindow = session^^.theTools^^.tools[kLinkItem].links^^.histIndicator THEN BEGIN
          IF TrackGoAway(whichWindow, anEvent.where) THEN DeleteHistory(session);
          wasEvent := FALSE;
        END;
      END;
    END; {case}
  END; {mouseDown} mouseUp:
  BEGIN
    WITH session^^.theTools^^.tools[kLinkItem].links^^ DO IF lastClickWind <> WindowPtr(-1) THEN BEGIN
      IF lastClickWind = histIndicator THEN BEGIN
        {Go up one level in link history.}
        lastClickWind := WindowPtr(-1);
        lastClickWhen := 0;
        UpALevel(session);
        wasEvent := FALSE;
      END
      ELSE BEGIN
        {"Do" the link.}
        aLink := GetLink(lastClickWind, allLinks);
        lastClickWind := WindowPtr(-1);
        lastClickWhen := 0;
        IF aLink <> NIL THEN BEGIN
          GoToLink(session, aLink);
          wasEvent := FALSE;
        END;
      END;
    END;
  END; {mouseUp} updateEvt: {window appearance needs updating}
  BEGIN
    IF session^^.bkgndWindow = WindowPtr(anEvent.message) THEN
    BEGIN {Updating the video window.}
      BeginUpdate(WindowPtr(anEvent.message));
      DrawBkgndWindow(session);
      wasEvent := FALSE;
      EndUpdate(WindowPtr(anEvent.message));
    END
    ELSE IF WindowPeek(anEvent.message)^.refcon = 1 THEN {HACK! it's HyperCard....}
    BEGIN
      {Draw whatever is on top of HC.}
      UpdateHC(session, WindowPtr(anEvent.message));
    END
    ELSE {The click was in the tools, the link indicators or other HC window.}
    BEGIN
      IF session^^.theTools^^.tools[kLinkItem].links^^.histIndicator = WindowPtr(anEvent.message) THEN BE
        {Update in "return link" indicator.}
        wasEvent := FALSE;
        BeginUpdate(WindowPtr(anEvent.message));
        DrawHistIndicator(session);
        EndUpdate(WindowPtr(anEvent.message));
      END
      ELSE BEGIN
```

```
          aLink := GetLink(WindowPtr(anEvent.message), session^^.theTools^^.tools[kLinkItem].links^^.allLin
          IF aLink <> NIL THEN BEGIN
            wasEvent := FALSE;
            BeginUpdate(WindowPtr(anEvent.message));
            DrawLinkIndicator(session, aLink);
            EndUpdate(WindowPtr(anEvent.message));
          END
          ELSE BEGIN
            toolNo := ToolWindoid(WindowPtr(anEvent.message), session^^.theTools);
            IF toolNo <> 0 THEN BEGIN
              BeginUpdate(WindowPtr(anEvent.message));
              CASE toolNo OF
                kVideoItem:
                BEGIN
                  DrawFilmTool(session^^.theTools^^.tools[kVideoItem].film);
                END; {kVideoItem} kLinkItem:
                BEGIN
                  DrawLinkTool(session);
                END;
                OTHERWISE IF toolNo < 0 THEN DrawSegBoard(session, -toolNo);
              END; {case}
              EndUpdate(WindowPtr(anEvent.message));
              wasEvent := FALSE;
            END;
          END; {if}
        END;
      END;
    END; {updateEvt} activateEvt: {Pass this event along to HC.}
    BEGIN
      toolNo := ToolWindoid(WindowPtr(anEvent.message), session^^.theTools);
      IF toolNo < 0 THEN BEGIN {Segment board.}
        IF anEvent.modifiers = activeFlag THEN HiliteControl(WindowPeek(anEvent.message)^.controlList, 254)
        ELSE HiliteControl(WindowPeek(anEvent.message)^.controlList, 0);
      END;
    END; {activateEvent}
  END; {of event CASE}
END;
session^^.toolFlag := FALSE;
END; {FilterEvent}

END.
```

```
{
  File: HCComm.incl.p
  Date: May, 1989

This file contains all the necessary stuff for communication to HC from patches and/or
  from the application version of the tools.
}

PROCEDURE SendMessage(messString: Str255; globName: Str31; theType: INTEGER);
{
  Sends a message to HyperCard using our approach which allows the tools to
  communicate with HyperCard.
}
BEGIN
  {
    SET UP COMMBLOCK FOR SENDING A MESSAGE TO HYPERCARD.
  }
END; {SendMessage}

PROCEDURE SendCardMessage(messString: Str255);
{
}
BEGIN
  SendMessage(messString, '', kSendCDMessage);
END; {SendCardMessage}

PROCEDURE SendHCMessage(messString: Str255);
{
}
BEGIN
  SendMessage(messString, '', kSendHCMessage);
END;

PROCEDURE SetGlobal(globName: Str31; value: Str255);
{
}
BEGIN
  SendMessage(value, globName, kSetGlobal);
END;
```

```
File: CSControl.incl.p
Date:  04.13.89

This file contains all the necessary stuff for accessing the video overlay board.
NOTE: The code is based on the MassMicro CS II board.

PROCEDURE GenLockOff(refVal: INTEGER);
{
 Turns on the genlock on the CS II board so we can avoid loosing synch when
 searching further than v-synch.
}
VAR
  autoGenRec:   VDAutoGenlock;
  err:          OSErr;
BEGIN
  autoGenRec.agEnable := Longint(LOCALMODE);
  err := CS_SET_AUTOGENLOCK(refVal, autogenrec);
  IF err <> noErr THEN SysBeep(5);
END;

PROCEDURE GenLockOn(refVal: INTEGER);
{
 Turns on the genlock on the CS II board.
}
VAR
  autoGenRec:   VDAutoGenlock;
  err:          OSErr;
BEGIN
    autoGenRec.agEnable := Longint(REMOTEMODE);
    err := CS_SET_AUTOGENLOCK(refVal, autogenrec);
END;
```

```
{ HCUtils.incl.p    29.5.89
                    npd

This file contains all the utilities that are used to update HC appropriately with
 videos and icons drawn on it.
}

PROCEDURE UpdateHC(session: MMSesHandle; hcWindow: WindowPtr);
{
 Update the current card by drawing any visible color icons on it.
}
VAR
  savePort:   GrafPtr;
  icons:      IconListHandle;

BEGIN
  {
   Isn't it redundant to set port when we're in "update mode".
  }
  GetPort(savePort);
  SetPort(hcWindow);
  icons := session^^.iconList;
  session^^.toolFlag := TRUE;
  IF session^^.currScreenIcon <> NIL THEN
   WHILE icons <> NIL DO BEGIN
     DrawColorPict(session^^.currScreenIcon, icons^^.iconFRef,
         icons^^.iconIndex, icons^^.iconRect);
     icons := icons^^.nextIcon;
   END;
  session^^.toolFlag := FALSE;
  SetPort(savePort);
END; {UpdateHC}

PROCEDURE HCVideoSegOut(segName, segFName: StringPtr);
{
 Write the video segment name to bkgnd field 1 of a new card in
 the stack "segment data".
}
VAR
  i:      INTEGER;
  count:  INTEGER;
  err:    OSErr;

BEGIN
  SendCardMessage(Concat('CreateSegEntry "', segName^,'"', '"', segFName^,'"'));
END;   {HCVideoSegOut}

PROCEDURE FindHCSegCard(segName, segFName: StringPtr);
{
 Find and go to the HyperCard card created for the segment <segName>
}
VAR
  compName:   STRING[63];
BEGIN
  compName := Concat(segFName^,'\',segName^);
  IF compName[0] > Char(29) THEN compName[0] := Char(29);
  SendHCMessage(Concat('go cd "',compName,'" of stack "Segment Data"'));
END; {FindHCSegCard}

PROCEDURE ClickInHC(hcWindow: WindowPtr; pt: Point);
{
 This procedure takes a window (presumably the HC window) and a point
 in global coordinates and converts the coordinates to a local HyperCard
 point.
 This is useful for the simple reason that we want clicks in the video
 window to be passed along to HC scripts.
}
VAR
  savePort:   GrafPtr;
```

```
    strV, strH:    Str255;
BEGIN
    GetPort(savePort);
    SetPort(hcWindow);
    GlobalToLocal(pt);
    NumToString(Longint(pt.h), strH);
    NumToString(Longint(pt.v), strV);
    SendHCMessage(Concat('click at ',strH,',',StrV));
    SetPort(savePort);
END; {ClickInHC}
```

```
(* File: LinkToolUtils.incl.p
   First created: 02.06.89    (hpb)
   Modified:      30.12.89    (npb)   Updated to handle HyperCard links.

This file contains code pertaining to links.
*)

PROCEDURE DrawLinkTool(session: MMSesHandle);
(*
Updates the tool on the screen redrawing the windoid
appropriately to reflect current state.
This procedure would normally be called in response to an update
event and should not be confused with the procedure below "UpdateLinkTool".
*)
VAR
  savePort: GrafPtr;
  theRect:  Rect;
  theTool:  LinkToolHndl;

PROCEDURE DrawPict(thePict: PicHandle; theRect: Rect);
  BEGIN
    IF thePict^ = NIL THEN LoadResource(Handle(thePict));
    DrawPicture(thePict, theRect);
  END;

PROCEDURE  DrawIndicator(theTool: LinkToolHndl);
  (*
   Draws the current link indicator, ie segment icon or segment hcIcon
   (Micons can be ignored since they are continously updated anyways.)
  *)
  VAR
    pRect:   Rect;
    iconRef: INTEGER;
  BEGIN
    IF theTool^^.activeLink <> NIL THEN BEGIN
      IF theTool^^.activeLink^^.linkInd.indType = kIcon THEN BEGIN
        (Draw the segment icon.)
        WITH pRect DO BEGIN
          left   := 2;
          top    := 1;
          right  := 83;
          bottom := 62;
        END;
        iconRef := GetIconRef(session, theTool^^.activeLink^^.toSegFile);
        DrawColorPict(session^^.currScreenIcon, iconRef,
          theTool^^.activeLink^^.linkInd.indicator.anIcon, pRect);
      END
      ELSE IF theTool^^.activeLink^^.linkInd.indType = kHCIcon THEN BEGIN
        WITH pRect DO BEGIN
          left   := 3;
          top    := 2;
          right  := 82;
          bottom := 61;
        END;
        EraseRect(pRect);
        (Draw the HC icon.)
        WITH pRect DO BEGIN
          left   := 10;
          top    := 11;
          right  := 74;
          bottom := 53;
        END;
        DrawPicture(PicHandle(theTool^^.activeLink^^.linkInd.indicator.aHCIcon), pRect);
      END;
    END
    ELSE BEGIN
      WITH pRect DO BEGIN
        left := 3;
        top  := 2;
```

```
          right := 82;
          bottom := 61;
        END;
        EraseRect(pRect);
      END;
   END; {DrawIndicator}

BEGIN
  theTool := session^^.theTools^^.tools[kLinkItem].links;
  GetPort(savePort);
  SetPort(theTool^^.windoid);

{Draw the pictures in their correct positions.}
  WITH theRect DO BEGIN
    left := 2;
    top := 1;
    right := 83;
    bottom := 62;
  END;
  FrameRect(theRect);

WITH theRect DO BEGIN
    left := 0;
    top := 63;
    right := 85;
    bottom := 127;
  END;
  DrawPict(theTool^^.linkPict, theRect);
  DrawIndicator(theTool);

SetPort(savePort);
END; {DrawLinkTool}

{------------------------------------------------------------------------------
 The following procedures manipulate links.
 ------------------------------------------------------------------------------}

PROCEDURE RemoveLink(aLink: LinkHandle; VAR aList: LinkListHandle);
{
 Removes <aLink> from the list <aList>.
 Sets <aList> to NIL if <aLink> is the last element in the list or to
 the next element in the list if it's at the beginning.
}
VAR
  tempList: LinkListHandle;
BEGIN
  tempList := aList;
  IF tempList <> NIL THEN IF tempList^^.theLink = aLink THEN BEGIN
    tempList := aList^^.nextLink;
    DisposHandle(Handle(aList));
    aList := tempList;
    IF tempList <> NIL THEN tempList^^.prevLink := NIL;
  END
  ELSE BEGIN
    tempList := tempList^^.nextLink;
    WHILE tempList <> NIL DO BEGIN
      IF tempList^^.theLink = aLink THEN BEGIN (Remove link element.)
        tempList^^.prevLink^^.nextLink := tempList^^.nextLink;
        IF tempList^^.nextLink <> NIL THEN
          tempList^^.nextLink^^.prevLink := tempList^^.prevLink;
        DisposHandle(Handle(tempList));
        Exit(RemoveLink);
      END;
      tempList := tempList^^.nextLink;
    END;
  END;
END; {RemoveLink}

PROCEDURE  ResetLinkRefs(session: MMSesHandle);
```

```
  Sets the in/out reference values to zero so if there are links in the segment
  the time (within the current segment element) until the link appears is
  properly updated by UpdateIndicator.

BEGIN
  WITH session^^.theTools^^.tools[kLinkItem].links^^ DO BEGIN
    nextOutRef := 0;
    nextInRef := 0;
  END;
END; {ResetLinkRefs}

FUNCTION LinkExists(segName: Str31; aList: LinkListHandle): LinkHandle;
{
  If a link to the segment named <segmentName> exists in <aList> that link's
  handle is returned. Otherwise the function returns NIL.
}
BEGIN
  WHILE aList <> NIL DO BEGIN
    IF EqualString(aList^^.theLink^^.toSegment, segName, FALSE, FALSE) THEN BEGIN
      LinkExists := aList^^.theLink;
      Exit(LinkExists);
    END
    ELSE aList := aList^^.nextLink;
  END;
  LinkExists := NIL;
END; {LinkExists}

FUNCTION LinkInList(aLink: LinkHandle; aList: LinkListHandle): BOOLEAN;
{
  Returns TRUE if the link exists in the list, FALSE otherwise.
}
BEGIN
  WHILE aList <> NIL DO BEGIN
    IF aList^^.theLink = aLink THEN BEGIN
      LinkInList := TRUE;
      Exit(LinkInList);
    END
    ELSE aList := aList^^.nextLink;
  END;
  LinkInList := FALSE;
END; {LinkInList}

FUNCTION GetLink(linkWind: WindowPtr; aList: LinkListHandle): LinkHandle;
{
  Given a link window and a link list this routine returns aLink if the window belongs
  to a link in the list and NIL otherwise.
}
BEGIN
  WHILE aList <> NIL DO BEGIN
    IF aList^^.theLink^^.linkInd.linkWind = linkWind THEN BEGIN
      GetLink := aList^^.theLink;
      Exit(GetLink);
    END
    ELSE aList := aList^^.nextLink;
  END;
  GetLink := NIL;
END; {GetLink}

PROCEDURE DrawLinkIndicator(session: MMSesHandle; aLink: LinkHandle);
{
  Draws the link indicator. If the indicator is an icon or has a title this
  procedure is responsible for updating it properly.
  GrafPort is assumed to be set to the link indicator's port.
}
VAR
  tRect:    Rect;
  theFont:  INTEGER;
  iconRef:  INTEGER;
  savePort: GrafPtr;
```

```
BEGIN
  SetPort(savePort);
  SetPort(aLink^^.linkInd.linkWind);

IF aLink^^.linkInd.windType = kTitle THEN BEGIN
    PenSize(1,1);
    MoveTo(0,12);
    LineTo(82, 12);
    GetFNum('Geneva',theFont);
    TextFont(theFont);
    TextSize(kSearchFSize);
    WITH tRect DO BEGIN
      top := 0;
      left := 1;
      bottom := -3; {routine used is for drawing text below picture}
      right := 81
    END;
    DrawNameCntr(tRect, aLink^^.toSegment);
    WITH tRect DO BEGIN
      top := 14;
      bottom := 74;
    END;
  END
  ELSE WITH tRect DO BEGIN
    top := 0;
    left := 0;
    bottom := kvIcon;
    right := khIcon;
  END;

IF aLink^^.linkInd.indType = kIcon THEN BEGIN
    iconRef := GetIconRef(session, aLink^^.toSegFile);
    DrawColorPict(session^^.currScreenIcon, iconRef, aLink^^.linkInd.indicator.anIcon, tRect);
  END
  ELSE IF aLink^^.linkInd.indType = kHCIcon THEN BEGIN
    WITH tRect DO BEGIN
      top := top+9;
      left := left+7;
      bottom := bottom-9;
      right := right-9;
    END;
    DrawPicture(PicHandle(aLink^^.linkInd.indicator.aHCIcon), tRect);
  END;
  SetPort(savePort);
END; {DrawLinkIndicator}

PROCEDURE UpdateIndicator(session: MMSesHandle; ticking: Longint);
{
 Updates the link indicators (showing/hiding them) according to the ticking
 reference.
}
VAR
  currElements:   LinkListHandle;
  allElements:    LinkListHandle;
  aLinkTool:      LinkToolHndl;
  inOutRef:       Longint;
  refCount:       Longint;
  globPt:         Point;
  screenPort:     GrafPtr;

BEGIN
  aLinkTool := session^^.theTools^^.tools[kLinkItem].links;
  WITH aLinkTool^^ DO BEGIN
    currElements := nextOut;
    allElements := nextIn;
  END;
  refCount := 0; {Only get FrameNo if we need it (for efficiency).}

IF allElements <> NIL THEN BEGIN
```

```pascal
  WITH aLinkTool^^ DO IF nextInRef = 0 THEN BEGIN
    IF refCount = 0 THEN refCount := FrameNo(session);
    nextInRef := ticking + 2*(allElements^^.theLink^^.inPoint - refCount)
  END
  ELSE IF ticking >= nextInRef THEN BEGIN
    IF refCount = 0 THEN refCount := FrameNo(session);
    WITH session^^ DO IF hasOverlay THEN SetPort(bkgndWindow);
    WHILE allElements <> NIL DO BEGIN
      IF refCount < allElements^^.theLink^^.inPoint THEN Leave;
      WITH allElements^^.theLink^^.linkInd DO BEGIN
        globPt := linkPt;
        IF onVideo AND session^^.hasOverlay THEN LocalToGlobal(globPt);
      END; {with}
      WITH globPt DO MoveWindow(allElements^^.theLink^^.linkInd.linkWind, h,v,FALSE);
      ShowHide(allElements^^.theLink^^.linkInd.linkWind, TRUE);
      allElements := allElements^^.nextLink;
    END;
    aLinkTool^^.nextIn := allElements;
    IF allElements <> NIL THEN nextInRef := ticking + 2*(allElements^^.theLink^^.inPoint - refCount)
    ELSE nextInRef := 0;
  END;
END
ELSE aLinkTool^^.nextInRef := 0;

IF currElements <> NIL THEN BEGIN
  WITH aLinkTool^^ DO IF nextOutRef = 0 THEN BEGIN
    IF refCount = 0 THEN refCount := FrameNo(session);
    nextOutRef := ticking + 2*(currElements^^.theLink^^.outPoint - refCount)
  END
  ELSE IF ticking >= nextOutRef THEN BEGIN
    IF refCount = 0 THEN refCount := FrameNo(session);
    WHILE currElements <> NIL DO BEGIN
      IF refCount < currElements^^.theLink^^.outPoint THEN Leave;
      ShowHide(currElements^^.theLink^^.linkInd.linkWind, FALSE);
      currElements := currElements^^.nextLink;
    END;
    aLinkTool^^.nextOut := currElements;
    IF currElements <> NIL THEN nextOutRef := ticking + 2*(currElements^^.theLink^^.outPoint - refCount)
    ELSE nextOutRef := 0;
  END;
END
ELSE aLinkTool^^.nextOutRef := 0;

END; {UpdateIndicator}

PROCEDURE ShowAllLinks(session: MMSesHandle);
{
 Shows all the links regardless of their in/out points.
}
VAR
  allLinks:    LinkListHandle;
  linkWindow:  WindowPtr;
  globPt:      Point;
BEGIN
  allLinks := session^^.theTools^^.tools[kLinkItem].links^^.allLinks;
  WITH session^^ DO IF hasOverlay THEN SetPort(bkgndWindow);
  WHILE allLinks <> NIL DO BEGIN
    linkWindow := allLinks^^.theLink^^.linkInd.linkWind;
    globPt := allLinks^^.theLink^^.linkInd.linkPt;
    IF allLinks^^.theLink^^.linkInd.onVideo AND session^^.hasOverlay THEN LocalToGlobal(globPt);
    WITH globPt DO MoveWindow(linkWindow, h, v, FALSE);
    ShowWindow(linkWindow);
    BringToFront(linkWindow);
    allLinks := allLinks^^.nextLink;
  END;
END; {ShowAllLinks}

PROCEDURE LinkClick(session: MMSesHandle; clickPt: Point; OutProc: ProcPtr);
{This procedure will be called when a click occurs in the Link tool.
 The procedure "outProc" should be called continuously (as often as possible)
```

```
to ensure that other tools can update their displays and links etc are shown
at the correct time.
} aLinkTool:     LinkToolHndl;
    listRect:      Rect;
    tlPoint:       Point;       {Top, left point of micon rect.}
    oldClip:       RgnHandle;
    newClip:       RgnHandle;
    screenPort:    GrafPtr;

clickType:     INTEGER;

testRect:      Rect;
    thePopUp:      MenuHandle;
    menuChoice:    MenuCvt;

tempPtr:       Ptr;
    tempHandle:    Handle;
    iconRef:       INTEGER;
    err:           INTEGER;
    tempPort:      CGrafPtr;

aFrame:        Longint;
    globPos:       Point;

aLink:         LinkHandle;
    aLinkList:     LinkListHandle;
    aMicon:        MiconHandle;
    aMiconList:    MiconListHandle;
    dummyString:   STRING[1];

aMenuStr:      Str255;

FUNCTION PutDownLink(clickPt: Point; linkPort: GrafPtr): BOOLEAN;
{
  If the clickPt (in global coordinates) is in the link tool window we should
  return FALSE. If the point is outside the link tool window return TRUE.
}
BEGIN
  SetPort(linkPort);
  GlobalToLocal(clickPt);
  IF PtInRect(clickPt, linkPort^.portRect) THEN PutDownLink := FALSE
  ELSE PutDownLink := TRUE;
END; {PutDownLink}

FUNCTION WhatFn(hitPoint: Point): INTEGER;
{Returns a part code indicating what part of the windoid the
 point 'hitPoint' occured in.
 The function returns zero 'kNoAction' if the point is not in a valid rect.
}
BEGIN
  WhatFn := kNoAction;
  SetRect(testRect, 5, 107, 32,127);   {Link in.}
  IF PtInRect(hitPoint, testRect) THEN BEGIN
    WhatFn := kLinkIn;
    Exit(WhatFn);
  END;
  SetRect(testRect, 35, 107, 62, 127);{Link out.}
  IF PtInRect(hitPoint, testRect) THEN BEGIN
    WhatFn := kLinkOut;
    Exit(WhatFn);
  END;
  SetRect(testRect, 2, 1, 83, 62);    {Link indicator rectangle}
  IF PtInRect(hitPoint, testRect) THEN BEGIN
    WhatFn := kLinkRect;
    Exit(WhatFn);
  END;
  SetRect(testRect, 62, 74, 82, 102); {Play forward.}
```

```
      IF PtInRect(hitPoint, testRect) THEN BEGIN
        WhatFn := kPlayFBtn;
        Exit(WhatFn);
      END;
      SetRect(testRect, 44, 74, 59, 102); {Step forward.}
      IF PtInRect(hitPoint, testRect) THEN BEGIN
        WhatFn := kStepFBtn;
        Exit(WhatFn);
      END;
      SetRect(testRect, 24, 74, 39, 102); {Step reverse.}
      IF PtInRect(hitPoint, testRect) THEN BEGIN
        WhatFn := kStepBBtn;
        Exit(WhatFn);
      END;
      SetRect(testRect, 4, 74, 22, 102); {Play reverse.}
      IF PtInRect(hitPoint, testRect) THEN BEGIN
        WhatFn := kPlayBBtn;
        Exit(WhatFn);
      END;
      SetRect(testRect, 3, 62, 9, 71);    {Previous link.}
      IF PtInRect(hitPoint, testRect) THEN BEGIN
        WhatFn := kNextLink;
        Exit(WhatFn);
      END;
      SetRect(testRect, 77, 62, 83, 71); {Next link.}
      IF PtInRect(hitPoint, testRect) THEN BEGIN
        WhatFn := kPrevLink;
        Exit(WhatFn);
      END;
      SetRect(testRect, 65, 107, 82, 127);{Popup.}
      IF PtInRect(hitPoint, testRect) THEN BEGIN
        WhatFn := kPopUpLink;
        Exit(WhatFn);
      END;
END; {WhatFn}

FUNCTION ReleasedInside: BOOLEAN;
{
  Returns TRUE if the mouse button was released inside the rectangle (testRect)
  that it was first clicked.
  Also hilights the rectangle as the mouse moves in to it and out from it.
}
VAR
    inverted:  BOOLEAN;
    ptWithin:  BOOLEAN;

BEGIN
    inverted := TRUE;
    InvertRect(testRect);
    ptWithin := TRUE;
    WHILE StillDown DO BEGIN
      IF ptWithin THEN BEGIN
        IF NOT inverted THEN BEGIN
          inverted := TRUE;
          InvertRect(testRect);
        END;
      END
      ELSE IF inverted THEN BEGIN
        inverted := FALSE;
        InvertRect(testRect);
      END;
      GetMouse(clickPt);
      ptWithin := PtInRect(clickPt, testRect);
    END;
    IF inverted THEN
      InvertRect(testRect);

ReleasedInside := inverted;
END; {ReleasedInside}
```

```pascal
  FUNCTION QueuePicture(index, refNum: INTEGER): OSErr;
  VAR
    posOff: Longint;
  BEGIN
    posOff := Longint(index)*Longint(kVIcon)*Longint(kHIcon);
    QueuePicture := SetFPos(refNum, fsFromStart, posOff);
  END; {QueuePicture}

BEGIN
  aLinkTool := session^^.theTools^^.tools[kLinkItem].links;
  SetPort(aLinkTool^^.windoid);
  GlobalToLocal(clickPt);
  dummyString[0] := Char(0);

clickType := WhatFn(clickPt);
  CASE clickType OF
    kLinkIn:
    BEGIN
      IF ReleasedInside THEN BEGIN
        WITH aLinkTool^^ DO IF activeLink <> NIL THEN BEGIN
          IF activeLink^^.complete THEN BEGIN
            aFrame := FrameNo(session);
            {Check for direction consistency here and then...}
            aLinkTool^^.activeLink^^.inPoint := aFrame;
            HLock(Handle(aLinkTool));
            RemoveLink(aLinkTool^^.activeLink, aLinkTool^^.allLinks);
            PlaceByIn(aLinkTool^^.activeLink, aLinkTool^^.allLinks);
            HUnlock(Handle(aLinkTool));
            aLinkTool^^.nextIn := NIL;
            WITH session^^ DO IF autoLinks THEN linksChanged := TRUE;
          END
        END
        ELSE SysBeep(5);
      END;
    END; {kLinkIn} kLinkOut:
    BEGIN
      IF ReleasedInside THEN BEGIN
        {Not using AND because of way it is evaluated. STUUUUPID Pascal.}
        WITH aLinkTool^^ DO IF activeLink <> NIL THEN BEGIN
          IF activeLink^^.complete THEN BEGIN
            aFrame := FrameNo(session);
            {Check for direction consistency here and then...}
            aLinkTool^^.activeLink^^.outPoint := aFrame;
            HLock(Handle(aLinkTool));
            RemoveLink(aLinkTool^^.activeLink, aLinkTool^^.currLinks);
            PlaceByOut(aLinkTool^^.activeLink, aLinkTool^^.currLinks);
            HUnlock(Handle(aLinkTool));
            aLinkTool^^.nextOut := NIL;
            WITH session^^ DO IF autoLinks THEN linksChanged := TRUE;
          END;
        END
        ELSE SysBeep(5);
      END;
    END; {kLinkOut} kLinkRect:
    BEGIN
      WITH pictRect DO BEGIN
        top := 2;
        left := 3;
        bottom := 62;
        right := 83;
      END;

(*
      {Where to clip.}
      newClip := NewRgn;
      *)
```

```
    oldClip := NewRgn;

{Offest the picture rectangle into local coordinate space of wmgr port.}
    LocalToGlobal(clickPt);
    LocalToGlobal(pictRect.topLeft);
    LocalToGlobal(pictRect.botRight);

WITH tlPoint DO BEGIN
      v := 0;
      h := 0;
    END;

GetCWMgrPort(CGrafPtr(screenPort));
    SetPort(screenPort);
    newClip := GetGrayRgn;
    (*
    CopyRgn(WindowPeek(session^^.bkgndWindow)^.strucRgn, newClip);
    CopyRgn(WindowPeek(aLinkTool^^.windoid)^.strucRgn, oldClip);
    UnionRgn(newClip, oldClip, newClip);
    *)
    GetClip(oldClip);
    SetClip(newClip);

IF aLinkTool^^.activeLink^^.linkInd.indType = kIcon THEN BEGIN
      iconRef := GetIconRef(session, aLinkTool^^.activeLink^^.toSegFile);
      IF QueuePicture(aLinkTool^^.activeLink^^.linkInd.indicator.anIcon, iconRef) <> noErr THEN Exit(LinkCl tempHandle := NewHandle(kVIcon*kHIcon);
      IF tempHandle = NIL THEN Exit(LinkClick);
      IF FillHandle(tempHandle, iconRef) <> noErr THEN MacsBugStr('User break: FillHandle');
      tempPtr := session^^.currScreenIcon^^.baseAddr;
      HLock(tempHandle);
      session^^.currScreenIcon^^.baseAddr := tempHandle^;

DragPicture(clickPt, pictRect, FALSE, screenPort,
                  NIL, session^^.currScreenIcon, session);

HUnlock(tempHandle);
      session^^.currScreenIcon^^.baseAddr := tempPtr;
      DisposHandle(tempHandle);
    END
    ELSE IF aLinkTool^^.activeLink^^.linkInd.indType = kHCIcon THEN BEGIN
      (*MacsBugStr('User Break: moving HC icon.');*)
      tempHandle := NewHandle(kVIcon*kHIcon);
      IF tempHandle = NIL THEN Exit(LinkClick);
      HLock(tempHandle);

{Draw the HC icon into the allocated buffer.}
      WITH testRect DO BEGIN
        top    := 11;
        left   := 10;
        bottom := 53;
        right  := 74;
      END;
      tempPort := CGrafPtr(NewPtr(sizeof(CGrafPort)));
      OpenCPort(tempPort);
      WITH tempPort^.portPixMap^^ DO BEGIN
        baseAddr := tempHandle^;
        rowBytes := kHIcon + $8000;
        IF pixelSize <> 8 THEN
        BEGIN
          pixelSize := 8;
          cmpSize   := 8;
          pixelType := 0; { chunky pixels  }
          cmpCount  := 1; { for chunky pixels }
        END;
        bounds := testRect;
      END;

SetPort(GrafPtr(tempPort));
```

```
   DrawPicture(PicHandle(aLinkTool^^.activeLink^^.linkInd.indicator.aHCIcon), testRect);
   SetPort(screenPort);
   CloseCPort(tempPort);
   DisposPtr(Ptr(tempPort));

tempPtr := session^^.currScreenIcon^^.baseAddr;
   session^^.currScreenIcon^^.baseAddr := tempHandle^;
   WITH pictRect DO BEGIN
     top := top+9;
     left := left+7;
     bottom := bottom-9;
     right := right-9;
   END;
   DragPicture(clickPt, pictRect, FALSE, screenPort, NIL, session^^.currScreenIcon, session);

HUnlock(tempHandle);
   session^^.currScreenIcon^^.baseAddr := tempPtr;
   DisposHandle(tempHandle);
END
ELSE WITH aLinkTool^^ DO
   IF activeLink^^.linkInd.indType = kMicon THEN BEGIN
     WITH activeLink^^ DO aMiconList := GetMiconList(toSegment, toSegFile, windoid, session);
     IF aMiconList <> NIL THEN
       WITH aMiconList^^ DO DragPicture(clickPt, pictRect, TRUE, screenPort, theMicon, theMicon^^.pixMap
   END;
SetClip(oldClip);
DisposeRgn(oldClip);
{
 One should be able to place link indicators anywhere. The links should appear relative to
 the screen that they are places on though.
 In other words, if they are placed on the video they should appear relative to the video.
 If they are placed in the HC window, they should appear relative to that window and
 otherwise they should appear where they are placed.
 Very well!
}
IF PutDownLink(clickPt, aLinkTool^^.windoid) THEN BEGIN
   globPos := pictRect.topLeft;     {Save global coordinates.}

WITH session^^ DO IF autoLinks THEN linksChanged := TRUE;
   aLink := aLinkTool^^.activeLink;
   {
    Check if this link has already been placed and if it has
    then simply move it over to the new position.
   }
   WITH session^^ DO IF hasOverlay THEN BEGIN
     SetPort(bkgndWindow);
     GlobalToLocal(clickPt);
     IF PtInRect(clickPt, session^^.bkgndWindow^.portRect) THEN
     BEGIN
        GlobalToLocal(pictRect.topLeft);
        aLink^^.linkInd.onVideo := TRUE;
     END
     ELSE aLink^^.linkInd.onVideo := FALSE;
   END
   ELSE aLink^^.linkInd.onVideo := FALSE;
   aLink^^.linkInd.linkPt := pictRect.topLeft;
   aLink^^.linkInd.linkRect := pictRect;

IF NOT LinkInList(aLink, aLinkTool^^.currLinks) THEN BEGIN
     {We're creating a new link.}
     aLink^^.linkInd.linkWind := GetNewWindow(aLink^^.linkInd.windType, NIL, aLinkTool^^.windoid);
     IF aLink^^.linkInd.linkWind = NIL THEN BEGIN
        aLink^^.linkInd.linkWind := WindowPtr(-1);
        Exit(LinkClick);
     END;
     aLink^^.complete := TRUE;

HLock(Handle(aLinkTool));
     PlaceByOut(aLink, aLinkTool^^.currLinks);
```

```
      PlaceByIn(aLink, aLinkTool^^.allLinks);
      HUnLock(Handle(aLinkTool));
      WITH pictRect DO BEGIN
         top := 0;
         left := 0;
         bottom := 60;
         right := 80;
      END;
      WITH aLink^^ DO aMicon := NewMicon(toSegment, toSegFile, pictRect, linkInd.linkWind, session, FALSE
    END;
    WITH globPos DO MoveWindow(aLink^^.linkInd.linkWind, h, v, FALSE);
    ShowWindow(aLink^^.linkInd.linkWind);   (in case it's not currently visible.)
    BringToFront(aLink^^.linkInd.linkWind);
  END;
  SetPort(aLinkTool^^.windoid);
END; {kLinkRect} kPlayFBtn:
IF ReleasedInside THEN BEGIN
  ClearBkgndWind(session);
  SendCmd(kPlayFwd, @dummyString, session);
END;

kStepFBtn:
IF ReleasedInside THEN BEGIN
  ClearBkgndWind(session);
  SendCmd(kStepFwd, @dummyString, session);
END;

kStepBBtn:
IF ReleasedInside THEN BEGIN
  ClearBkgndWind(session);
  SendCmd(kStepRev, @dummyString, session);
END;

kPlayBBtn:
IF ReleasedInside THEN BEGIN
  ClearBkgndWind(session);
  SendCmd(k30FPSRev, @dummyString, session);
END;

kNextLink, kPrevLink:
IF ReleasedInside THEN BEGIN
  aLink := aLinkTool^^.activeLink;
  aLinkList := aLinkTool^^.allLinks;
  IF aLink <> NIL THEN
   IF aLink^^.complete THEN BEGIN
      WHILE aLinkList <> NIL DO BEGIN {locate indicator in list and get next/previous one}
        IF aLink = aLinkList^^.theLink THEN BEGIN
           IF clickType = kPrevLink THEN BEGIN
              IF aLinkList^^.prevLink <> NIL THEN BEGIN
                 IF aLink^^.linkInd.indType = kMicon THEN
                    WITH aLink^^ DO RemoveMicon(toSegment, toSegFile, aLinkTool^^.windoid, session);
                 aLink := aLinkList^^.prevLink^^.theLink;
                 Leave;
              END
              ELSE BEGIN
                 SysBeep(5);    {at the end of list}
                 Exit(LinkClick);
              END;
           END
           ELSE BEGIN( = kNextLink}
              IF aLinkList^^.nextLink <> NIL THEN BEGIN
                 IF aLink^^.linkInd.indType = kMicon THEN
                    WITH aLink^^ DO RemoveMicon(toSegment, toSegFile, aLinkTool^^.windoid, session);
                 aLink := aLinkList^^.nextLink^^.theLink;
                 Leave;
              END
              ELSE BEGIN
                 SysBeep(5);    {at the end of list}
```

```
                Exit(LinkClick);
             END;
          END;
        END {if aLink = aLinkList^^.theLink}
        ELSE aLinkList := aLinkList^^.nextLink;
      END {while}
    END
    ELSE IF aLinkList <> NIL THEN BEGIN {not complete so delete it}
      IF aLink^^.linkInd.indType = kMicon THEN
        WITH aLink^^ DO RemoveMicon(toSegment, toSegFile, aLinkTool^^.windoid, session);
      DisposHandle(Handle(aLinkTool^^.activeLink));
      aLink := aLinkList^^.theLink;
    END
    ELSE BEGIN {Only one non-completed link. aLinkList = NIL , aLink <> NIL.}
      SysBeep(5);
      Exit(LinkClick);
    END;

WITH pictRect DO BEGIN
      top := 2;
      left := 3;
      bottom := 62;
      right := 83;
    END;
    aLinkTool^^.activeLink := aLink;
    {Not using AND because of way it is evaluated. STUUUUPID Pascal.}
    IF aLink <> NIL THEN BEGIN
      IF aLink^^.linkInd.indType = kMicon THEN
        WITH aLink^^ DO aMicon := NewMicon(toSegment, toSegFile, pictRect, aLinkTool^^.windoid, session, FA
      ELSE BEGIN {it's an icon or no more icons so cause re-draw.}
        SetPort(aLinkTool^^.windoid);
        InvalRect(pictRect);
      END
    END
    ELSE BEGIN {it's an icon or no more icons so cause re-draw.}
      SetPort(aLinkTool^^.windoid);
      InvalRect(pictRect);
    END;
  END;

kPopUpLink:
  BEGIN
    thePopUp := GetMenu(kPopUpLinkMenu);
    LocalToGlobal(clickPt);
    InsertMenu(thePopUp, -1);
    IF aLinkTool^^.activeLink <> NIL THEN BEGIN{If video segment then allow stop/play micon}
      IF aLinkTool^^.activeLink^^.toSegType = kVSEG THEN
        {We care about the toSegFile parameter here as well.}
        WITH aLinkTool^^.activeLink^^ DO IF MiconExists(toSegment, toSegFile, session) THEN BEGIN
          EnableItem(thePopUp, 2);
          GetIndString(aMenuStr, kDivStrID, kStartMiconStr);
          IF aLinkTool^^.activeLink^^.linkInd.indType = kIcon THEN SetItem(thePopUp, 2, aMenuStr);
        END;
      EnableItem(thePopUp, 6);
      EnableItem(thePopUp, 7);
    END;

menuChoice.theResult := PopUpMenuSelect(thePopUp, clickPt.v-8, clickPt.h-30, 1);
    DeleteMenu(thePopUp^^.menuID);
    DisposeMenu(thePopUp);
    IF menuChoice.theItemNumber <> 0 THEN BEGIN CASE menuChoice.theItemNumber OF
        1: {Play}
        BEGIN {Play the current segment}
          VidSegPlay(session, GetCurrSegName(session), GetRecentFName(session), FALSE, -1);
        END;
        2: {Start/Stop Micon}
        BEGIN
          SetRect(testRect, 3, 2, 83, 62);
```

```
      HLock(Handle(aLinkTool));
      WITH aLinkTool^^ DO
      IF activeLink^^.linkInd.indType = kMicon THEN BEGIN
        WITH activeLink^^ DO RemoveMicon(toSegment, toSegFile, linkInd.linkWind, session);
        WITH activeLink^^ DO RemoveMicon(toSegment, toSegFile, aLinkTool^^.windoid, session);
        HLock(Handle(activeLink));
        WITH activeLink^^ DO BEGIN
          linkInd.indType := kIcon;
          linkInd.indicator.anIcon := GetIconIndex(toSegment, toSegFile, session);
        END;
        HUnlock(Handle(activeLink));
        InvalRect(testRect);
        SetPort(activeLink^^.linkInd.linkWind);
        InvalRect(activeLink^^.linkInd.linkWind^.portRect);
      END
      ELSE IF activeLink^^.linkInd.indType = kIcon THEN BEGIN {Is Icon so start Micon}
        WITH activeLink^^ DO aMicon := NewMicon(toSegment, toSegFile, testRect, aLinkTool^^.windoid, se
        IF aMicon <> NIL THEN BEGIN
          activeLink^^.linkInd.indType := kMicon;
          IF activeLink^^.complete THEN BEGIN
            WITH testRect DO BEGIN
              top := 0;
              bottom := kvIcon;
              left := 0;
              right := khIcon;
            END;
            IF activeLink^^.linkInd.winoType = kTitle THEN OffsetRect(testRect, 1, 14);

WITH activeLink^^ DO aMicon := NewMicon(toSegment, toSegFile, testRect, linkInd.linkWind, s
          END;
        END;
      END;
      WITH session^^ DO IF autoLinks THEN linksChanged := TRUE;
      HUnlock(Handle(aLinkTool));
    END;
    4: {Make new HC link}
    BEGIN
      NewHCLink(session);
    END;
    6: {Show all links.}
      ShowAllLinks(session);

7: {Delete link.}
    BEGIN
      IF aLinkTool^^.activeLink^^.linkInd.indType = kMicon THEN BEGIN
        WITH aLinkTool^^.activeLink^^ DO
          RemoveMicon(toSegment, toSegFile, linkInd.linkWind, session);
        WITH aLinkTool^^.activeLink^^ DO
          RemoveMicon(toSegment, toSegFile, aLinkTool^^.windoid, session);
      END
      ELSE IF aLinkTool^^.activeLink^^.linkInd.indType = kHCIcon THEN BEGIN END;
      IF aLinkTool^^.activeLink^^.complete THEN BEGIN
        {Ask: Are you sure???}
        DisposeWindow(aLinkTool^^.activeLink^^.linkInd.linkWind);
        HLock(Handle(aLinkTool));
        RemoveLink(aLinkTool^^.activeLink, aLinkTool^^.currLinks);
        RemoveLink(aLinkTool^^.activeLink, aLinkTool^^.allLinks);
        HUnlock(Handle(aLinkTool));
        WITH session^^ DO IF autoLinks THEN linksChanged := TRUE;
      END;
      DisposHandle(Handle(aLinkTool^^.activeLink));
      WITH aLinkTool^^ DO BEGIN
        activeLink := NIL;
        nextInRef := 0;
        nextOutRef := 0;
        nextIn := NIL;
        nextOut := NIL;
      END;
```

```
              {Make head of currLinks active link.}
              WITH pictRect DO BEGIN
                top := 2;
                left := 3;
                bottom := kvIcon-2;
                right := khIcon+3;
              END;
              WITH aLinkTool^^ DO IF currLinks <> NIL THEN BEGIN
                activeLink := currLinks^^.theLink;
                IF activeLink^^.linkInd.indType = kMIcon THEN BEGIN
                  WITH activeLink^^ DO aMIcon := NewMIcon(toSegment, toSegFile, pictRect, windoid, session, FAL
                END;
              END; {with}
              SetPort(aLinkTool^^.windoid);
              InvalRect(pictRect);
            END;
          END; {case}
      END;
    END;
  END; {case}
END; {LinkClick}

FUNCTION IndicatorClick(theWind: WindowPtr; aLinkTool: LinkToolHndl; when: LongInt): BOOLEAN;

{This function returns true if the linkWind is a link indicator window or the link
history window.
If it is the linkWind and time stamp are placed in aLinkTool.}

VAR
  theLinkList: LinkListHandle;

PROCEDURE BeatIt;
  BEGIN
    WITH aLinkTool^^ DO BEGIN
      lastClickWhen := when;
      lastClickWind := theWind;
    END;
    IndicatorClick := TRUE;
    Exit(IndicatorClick);
  END;
BEGIN
  IF theWind = aLinkTool^^.histIndicator THEN BeatIt
  ELSE BEGIN
    theLinkList := aLinkTool^^.currLinks;
    WHILE theLinkList <> NIL DO
    IF theLinkList^^.theLink^^.linkInd.linkWind = theWind THEN BeatIt
    ELSE theLinkList := theLinkList^^.nextLink;
  END;
  IndicatorClick := FALSE;
END; {IndicatorClick}

PROCEDURE BkgndLinkClick(session: MMSesHandle; clickPt: Point);

{When a user clicks in the background window it has two meanings.
1) It was a mistake
2) It was a click on something that HC cares about in the bkgnd window.
This procedure is called in response to either of the above is true and
takes the appropriate action by simply passing the click to HC in it's
local coordinates.}

BEGIN
  WITH session^^ DO IF hasOverlay THEN BEGIN
    SetPort(bkgndWindow);
    ClickInHC(session^^.theTools^^.tools[kHCItem].hc^^.windoid, clickPt);
  END;
END; {BkgndLinkClick}

PROCEDURE Seg2LinkTool(session: MMSesHandle; segmentName, currSegFName: Str31; segType: INTEGER);
```

```
Takes the named segment (in the current segment file) and makes it the active
segment in the link tool.
An active segment is the one whose micon is currently visible in the tool and
which is being entered as a link.
If the segment has already been entered as a link, the existing link is selected,
otherwise a new one is created.

NOTE!
Due to the fact that this procedure cannot call directly back to HC, the implementation
uses some tricks when the <segType> is "kHCSeg".
The fields toSegment and toSegFile in the activeLink as well as the link indicator
are not valid until the next pass through HC when MYHCUpdate is called filling in
these fields by calling HC.

VAR
  iconIndex:    INTEGER;
  activeFName:  Str31;
  theLinkTool:  LinkToolHndl;
  pRect:        Rect;
  aMicon:       MiconHandle;
  aLink:        LinkHandle;
  savePort:     GrafPtr;

BEGIN
  theLinkTool := session^.theTools^.tools[kLinkItem].links;
  {Make a new link.}
  activeFName := GetRecentFName(session);

aLink := LinkExists(segmentName, theLinkTool^^.allLinks);
  IF aLink <> NIL THEN BEGIN{The link already exists - Must be completed.}
    IF theLinkTool^^.activeLink <> NIL THEN BEGIN {The active link is not NIL so check if completed.
      WITH theLinkTool^^.activeLink^^ DO BEGIN
        CASE linkInd.indType OF
          kHCIcon:
          BEGIN
            DisposHandle(linkInd.indicator.aHCIcon);
          END;
          kMicon:
          BEGIN
            RemoveMicon(toSegment, toSegFile, theLinkTool^^.windoid, session);
          END;
        END; {case}
      END; {with}
    END;
  END
  ELSE BEGIN {the link does not exist, so create it.}
    IF theLinkTool^^.activeLink = NIL THEN BEGIN
      aLink := LinkHandle(NewHandle(sizeof(Link)));
      IF aLink = NIL THEN {We're out of memory - oh gosh...}
        Exit(Seg2LinkTool);
    END
    ELSE IF theLinkTool^^.activeLink^^.complete THEN BEGIN
      aLink := LinkHandle(NewHandle(sizeof(Link)));
      IF aLink = NIL THEN {We're out of memory - oh gosh...}
        Exit(Seg2LinkTool);
      WITH theLinkTool^^.activeLink^^ DO RemoveMicon(toSegment, toSegFile, theLinkTool^^.windoid, session);
    END
    ELSE BEGIN
      aLink := theLinkTool^^.activeLink;
      WITH aLink^^.linkInd DO IF indType = kHCIcon THEN
        DisposHandle(indicator.aHCIcon)
      ELSE IF indType = kMicon THEN
        WITH aLink^^ DO RemoveMicon(toSegment, toSegFile, theLinkTool^^.windoid, session);
    END;
    {
      Let's assume that the current segment file contains the segment we're linking to.
      The assumption holds since this procedure is being called directly by segment browser.
    }
    {Initialize new active link.}
    WITH aLink^^ DO BEGIN
```

```pascal
        complete := FALSE;
        frSegType := kVSEG;     (Currently only linking from video segments with link tool.)
        frSegment := '';        (Don't know this until link is finished.)
        frSegFile := activeFName; (Don't know this either.)
        toSegType := segType;   (Type of segment we're linking to.)
        toSegment := segmentName; (If segType is kHCSeg this will be Card ID)
        toSegFile := currSegFName;(If segType is kHCSeg this will be Stack Name)
        toRef := 0;

inPoint := -1;
        outPoint := -1;

linkInd.linkWind := WindowPtr(-1);
        linkInd.windType := kNoTitle;
      END;
  END;
  WITH pRect DO BEGIN
    top := 2;
    bottom := kvIcon-2;
    left := 3;
    right := khIcon-3;
  END;

IF segType = kVSeg THEN BEGIN
    aMicon := NewMicon(segmentName, currSegFName, pRect, theLinkTool^^.windoid, session, FALSE);
    IF aMicon = NIL THEN BEGIN
      aLink^^.linkInd.indType := kIcon;
      aLink^^.linkInd.indicator.anIcon := GetIconIndex(segmentName, currSegFName, session);
      (Cause redraw of icon.)
    END
    ELSE BEGIN (Current indicator is MICON)
      aLink^^.linkInd.indType := kMicon;
    END;
  END
  ELSE BEGIN (segType = kHCSeg)
    aLink^^.linkInd.indType := kHCIcon;
    aLink^^.linkInd.indicator.aHCIcon := NIL;   (Updated by MMHCUpdate XCMD)
  END;

GetPort(savePort);
  SetPort(theLinkTool^^.windoid);
  InvalRect(pRect);
  SetPort(savePort);

theLinkTool^^.activeLink := aLink;
  WITH session^^ DO IF autoLinks THEN linksChanged := TRUE;
END; (Seg2LinkTool)

PROCEDURE NewHCLink(session: MMSesHandle);
{
 Due to the fact that HC cannot be called direclty from here, making a new
 link to HC is a two step process. First we make an empty link, then we set
 up the communication block so a message is sent to the MMHCUpdate XCMD. It
 fills in the blanks in the link since it can call HC requesting the necessary
 information.
}
BEGIN
  Seg2LinkTool(session, '','', kHCSeg);
  SendMessage('','',kMakeHCLink);
END; (NewHCLink)
```

```
File: SegBoardUtils.incl.p
First created: 05.30.89 - npa

PROCEDURE DrawSelectPict(currPict: PixMapHandle; theBoard: SegBoardHndl);

Draws the currently selected picture.

VAR
  savePort:    GrafPtr;
  shiftedRect: Rect;

BEGIN
  IF currPict <> NIL THEN BEGIN
    shiftedRect := currPict^^.bounds;
    OffsetRect(shiftedRect, 2, 0);
    HLock(Handle(currPict));
    CopyBits(BitMapHandle(currPict)^^, theBoard^^.windoid^.portBits,
             currPict^^.bounds, shiftedRect, srcCopy, NIL);
    HUnlock(Handle(currPict));
  END;
END; (DrawSelectPict)

PROCEDURE DrawNameCntr(aRect: Rect; name: Str31);

Draws the name centered under the rectangle aRect in local coordinates.
Assuming that the font is set and size is 10 pt.

VAR
  middle:  Point;
  textLen: INTEGER;
BEGIN
  WITH aRect DO BEGIN
    middle.h := (right - left) DIV 2 + left;
    middle.v := bottom - 12;
  END;
  textLen := StringWidth(name);
  WITH middle DO MoveTo((h-(textLen DIV 2)), v);
  DrawString(name);
END; (DrawNameCntr)

PROCEDURE DrawSegments(session: MMSesHandle; theBoard: SegBoardHndl);

Here all the icons (pictures) that are currently scrolled into view
are drawn in their correct positions.
The scroll bar should also be updated (in case the number of segments
has changed.

Currently the scroll bar scrolls one line of segments, icons at a time.

VAR
  scroll:   ControlHandle;
  cMax:     INTEGER;
  savePort: GrafPtr;

PROCEDURE DrawIconsFrom(segmentCount: INTEGER);

Draws icons (color pictures) from the offset starting
    with segmentCount*3 in the segment board.

VAR
    srIcon:     Handle;
    colorIcon:  PixMapHandle;
    nameList:   SegListHndl;
    largeRect:  Rect;
    smallRect:  Rect;
    drawRect:   Rect;
    theFont:    INTEGER;
    i:          INTEGER;
```

```
    hOffset:    INTEGER;
    vOffset:    INTEGER;

BEGIN
    segmentCount := segmentCount*kIconsPrLine;
    GetFNum('Geneva',theFont);
    TextFont(theFont);
    TextSize(kIconFSize);

SetRect(largeRect, 96,20,176,80);
    nameList := theBoard^^.segNames;
    FOR i := 1 TO segmentCount DO BEGIN
        IF nameList <> NIL THEN
            nameList := nameList^^.nextName
        ELSE Exit(DrawIconsFrom);
    END;
    {Now draw the six (or less) visible icons or pictures.}
    FOR i:= 0 TO kIconsPrLine*kLinesInBoard-1 DO BEGIN
        IF nameList = NIL THEN Leave;
        hOffset := kHIcon*(i MOD kIconsPrLine)+20*(i MOD kIconsPrLine);
        vOffset := kVIcon*(i DIV kIconsPrLine)+16*(i DIV kIconsPrLine);
        IF nameList^^.pictIndex >= 0 THEN BEGIN
            {Draw color picture from color picture file.}
            drawRect := largeRect;
            OffsetRect(drawRect, hOffset, vOffset);
            DrawColorPict(session^^.currScreenIcon, theBoard^^.iconRefNum, nameList^^.pictIndex, drawRect);
        END
        ELSE BEGIN
            {Plot "generic" icon.}
            drawRect := largeRect;
            OffsetRect(drawRect, hOffset, vOffset);
            DrawIcon(theBoard^^.filmIcon, drawRect)
        END;
        DrawNameCntr(drawRect, nameList^^.name);
        nameList := nameList^^.nextName;
    END;
END; {DrawIconsFrom}

BEGIN
    {This is based on the assumption that there will only be one control
    in this windoid.
    }
    GetPort(savePort);
    SetPort(theBoard^^.windoid);
    scroll := ControlHandle(WindowPeek(theBoard^^.windoid)^.controlList);
    cMax := ((theBoard^^.noSegs+kIconsPrLine-1) DIV kIconsPrLine)-kLinesInBoard;
    IF cMax < 0 THEN cMax := 0;
    SetCtlMax(scroll, cMax);
    DrawIconsFrom(GetCtlValue(scroll));
    SetPort(savePort);
END; {DrawSegments}

PROCEDURE DrawSegBoard(session: MMSesHandle; boardIndex: INTEGER);
{
    Updates the segment board indicated by boardIndex the screen redrawing the windoid
    appropriately to reflect current state.
    This procedure would normally be called in response to an update
    event and should not be confused with the procedure below "UpdateSegBoard".
}
VAR
    theBoard:   SegBoardHndl;
    theFile:    FileListHandle;
    savePort:   GrafPtr;
    theRect:    Rect;
    thePen:     PenState;
    theFont:    INTEGER;
    count:      INTEGER;
    r:          Rect;

PROCEDURE FillSquares(theBoard: SegBoardHndl);
```

```
      SetRect(r, 5,65,37,97);
      DrawIcon(theBoard^^.linkIcon, r);
      SetRect(r, 5,107,37,139);
      DrawIcon(theBoard^^.projectIcon, r);
      SetRect(r, 47,65,79,97);
      DrawIcon(theBoard^^.grabIcon, r);
      SetRect(r, 47,107,79,139);
      DrawIcon(theBoard^^.cameraIcon, r);
   END;

....
   theBoard := session^^.theTools^^.tools[kSegBoardItem].segs;
   theFile := session^^.openSegFiles;
   count := 1;
   WHILE (theBoard <> NIL) AND (count <> boardIndex) DO BEGIN
      theBoard := theBoard^^.nextBoard;
      theFile := theFile^^.nextFile;
      count := count+1;
   END;
   IF theBoard <> NIL THEN BEGIN
      GetPort(savePort);
      SetPort(theBoard^^.window);
      DrawControls(theBoard^^.window);

{Draw the lines.}
      PenSize(1,1);
      MoveTo(84, 0);
      LineTo(84, 170);
      MoveTo(0, 60);
      LineTo(84, 60);
      MoveTo(84, 14);
      LineTo(394, 14);
      MoveTo(42, 60);
      LineTo(42, 144);
      MoveTo(0, 102);
      LineTo(84, 102);
      MoveTo(0, 144);
      LineTo(84, 144);
      GetFNum('Geneva',theFont);
      TextFont(theFont);
      TextSize(kSearchFSize);
      MoveTo(90, 11);

SetRect(r, 86,0,394,14);
      EraseRect(r);

DrawString(Concat(theBoard^^.boardName,' >',GetCurrSegName(session)));
      MoveTo(3, 156);
      DrawString('Film/Video Group');
      MoveTo(10, 168);
      DrawString('© MIT 1989');
      {Draw the pictures in their correct positions.}
      DrawSelectPict(session^^.currScreenIcon, theBoard);
      FillSquares(theBoard);
      DrawSegments(session, theBoard);

SetPort(savePort);
   END;
END; {DrawSegBoard}

PROCEDURE DragPicture(VAR clickPt: Point; VAR pictRect: Rect; playing: BOOLEAN; windPort: GrafPtr;
                  theMicon: MiconHandle; theIcon: PixMapHandle; session: MMSesHandle);
{
Drags an icon picture around following the mouse.
The procedure assumes that the windoport port's clip region is set
correctly on entry.
}
BEGIN
```

```
  IMPLEMENTATION FOR DRAGGING A PICON/MICON AROUND ON THE SCREEN UPDATING IT
  AND THE BACKGROUND PROPERLY.

END; {DragPicture}

FUNCTION ClickedWhere(theBoard: SegBoardHndl; clickPt: Point; VAR boundRect: Rect): INTEGER;
{This function takes a clickPt in the local coordinates of the segment board and
 returns an integer indicating which segment's bounding rectangle the click occured
 in. The function takes the scrolled position of the segments into account and returns an
 integer indicating the index into the nameList.
 If the point is not within a rectangle the function returns -1.
}
VAR
    i:       INTEGER;
    hOffset: INTEGER;
    vOffset: INTEGER;
    cValue:  INTEGER;
    tempRect: Rect;

BEGIN
  ClickedWhere := -1;
  SetRect(tempRect, 96,20,176,80); {The coordinates of the upper left segment.}
  FOR i := 0 TO kIconsPrLine*kLinesInBoard-1 DO BEGIN
     hOffset := (kIcon*(i MOD kIconsPrLine)-20*(i MOD kIconsPrLine));
     vOffset := (kIcon*(i DIV kIconsPrLine)-16*(i DIV kIconsPrLine));
     boundRect := tempRect;
     OffsetRect(boundRect, hOffset, vOffset);
     IF PtInRect(clickPt, boundRect) THEN BEGIN
        cValue := i+1-GetCtlValue(WindowPeek(theBoard^^.window)^.controlList) * kIconsPrLine;
        IF cValue > theBoard^^.noSegs THEN cValue := -1;
        ClickedWhere := cValue;
        Leave;
     END;
  END;
END; {ClickedWhere}

FUNCTION AreUSure(name: Str31): BOOLEAN;
{
 Asks the user whether s/he is REALLY sure s/he wants to delete the segment <name>.
 If the segment name is empty then it returns false.
 kAreUSureID
}
VAR
   aVidSeg:    SegmentHandle;
   aDialog:    DialogPtr;
   chosenItem: INTEGER;

BEGIN
   AreUSure := FALSE;
   IF EqualString(name, '', FALSE, FALSE) THEN Exit(AreUSure)
   ELSE BEGIN
      ParamText('','Video', name,'');
      aDialog := GetNewDialog(kAreUSureID, NIL, Pointer(-1));
      IF aDialog = NIL THEN Exit(AreUSure);
      ModalDialog(NIL, chosenItem);
      IF chosenItem = 1 THEN AreUSure := TRUE;
      DisposDialog(aDialog);
   END;
END; {AreUSure}

PROCEDURE SegBoardClick(session: MMSesHandle; clickPt: Point; boardIndex: INTEGER; OutProc: ProcPtr);
{This procedure will be called when a click occurs in the SegBoard.
 The procedure "outProc" should be called continuously (as often as possible)
 to ensure that other tools can update their displays and links etc are shown
 at the correct time.
}
VAR
   aTool:   SegBoardHndl;
   theFile: FileListHandle;
```

```
count:          INTEGER;
aMovie:         MovieHandle;
aMovieList:     MovieListHandle;
controlPart:    INTEGER;
theControl:     ControlHandle;
testRect:       Rect;
segRect:        Rect;
clickRect:      Rect;
pictRect:       Rect;
segmentNo:      INTEGER;
theNameList:    SegListHndl;
aVideoSegment:  SegmentHandle;
fullSegRef:     INTEGER;
err:            OSErr;
theKeys:        KeyMap;
playing:        BOOLEAN;
thePopUp:       MenuHandle;
menuChoice:     MenuCVt;
segName:        Str31;
mTchName:       Str31;

FUNCTION WhatFn (hitPoint: Point): INTEGER;
 Returns a part code indicating what part of the window the
 point 'hitPoint' occured in.
 The function returns zero '0' if the point is not in a valid rect.

BEGIN
  WhatFn := kNoAction;
  SetRect(testRect, kSegLeft, kSegTop, kSegRight, kSegBottom);{Content rectangle, where the segments are.
  IF PtInRect(hitPoint, testRect) THEN WhatFn := kSegBoard
  ELSE BEGIN
    SetRect(testRect, 0,0,80,60);        (where the little color picture is.)
    IF PtInRect(hitPoint, testRect) THEN WhatFn := kPictureClick
    ELSE BEGIN
      SetRect(testRect, 5,66,37,97);   {Link}
      IF PtInRect(hitPoint, testRect) THEN WhatFn := kLinkClick
      ELSE BEGIN
        SetRect(testRect, 47,66,79,97); {Grab}
        IF PtInRect(hitPoint, testRect) THEN WhatFn := kGrabClick
        ELSE BEGIN
          SetRect(testRect, 5,108,37,139); {Projector}
          IF PtInRect(hitPoint, testRect) THEN WhatFn := kProjectClick
          ELSE BEGIN
            SetRect(testRect, 47,108,79,139);{Camera}
            IF PtInRect(hitPoint, testRect) THEN WhatFn := kCameraClick;
          END;
        END;
      END;
    END;
  END;
END; {WhatFn}

FUNCTION ReleasedInside: BOOLEAN;
{
 Returns TRUE if the mouse button was released inside the rectangle (testRect)
 that it was first clicked.
 Also hilights the rectangle as the mouse moves in to it and out from it.
}
VAR
  inverted:  BOOLEAN;
  ptWithin:  BOOLEAN;

BEGIN
  inverted := TRUE;
  InvertRect(testRect);
  ptWithin := TRUE;
  WHILE StillDown DO BEGIN
    IF ptWithin THEN BEGIN
      IF NOT inverted THEN BEGIN
        inverted := TRUE;
```

```
        InvertRect(testRect);
      END;
    END;
    ELSE IF inverted THEN BEGIN
      inverted := FALSE;
      InvertRect(testRect);
    END;
    GetMouse(clickPt);
    ptWithin := PtInRect(clickPt, testRect);
  END;
  IF inverted THEN
    InvertRect(testRect);

ReleasedInside := inverted;
END; {ReleasedInside}

BEGIN
  aTool := session^^.theTools^^.tools[kSegBoardItem].segs;
  theFile := session^^.openSegFiles;
  count := 1;
  WHILE (aTool <> NIL) AND (count <> boardIndex) DO BEGIN
    count := count+1;
    aTool := aTool^^.nextBoard;
    theFile := theFile^^.nextFile;
  END;
  IF aTool <> NIL THEN BEGIN
    SetPort(aTool^^.window);
    GlobalToLocal(clickPt);
    controlPart := FindControl(clickPt, aTool^^.window, theControl);
    SetRect(segRect, kSegLeft, kSegTop, kSegRight, kSegBottom);
    IF controlPart <> 0 THEN BEGIN
      IF controlPart = inThumb THEN BEGIN
        controlPart := TrackControl(theControl, clickPt, NIL{@ThumbAction});
        IF controlPart <> 0 THEN BEGIN
          EraseRect(segRect);
          DrawSegments(session, aTool);
        END;
      END
      ELSE IF (controlPart = inUpButton) OR (controlPart = inDownButton) THEN BEGIN
        controlPart := TrackControl(theControl, clickPt, @ArrowAction);
        EraseRect(segRect);
        DrawSegments(session, aTool);
      END
      ELSE IF (controlPart = inPageUp) OR (controlPart = inPageDown) THEN BEGIN
        controlPart := TrackControl(theControl, clickPt, @ArrowAction);
        EraseRect(segRect);
        DrawSegments(session, aTool);
      END;
    END
    ELSE
     CASE WhatFn(clickPt) OF
       kLinkClick:
       BEGIN
       END;

kGrabClick:
       BEGIN
       IF session^^.hasOverlay THEN IF ReleasedInside THEN
         SendCardMessage('Iconify icon,shrink');
       END;
       kProjectClick:
       BEGIN END;
       kCameraClick:
       BEGIN
          IF session^^.hasOverlay THEN IF ReleasedInside THEN
            SendCardMessage('Iconify movie,shrink');
       END;
```

```
<PictureClick>:
BEGIN
  {Here we should try to get the micon through a call to GetMiconList and
   based on the response set <playing>.}

WITH aTool^^ DO aMiconList := GetMiconList(miconName, boardName, windoid, session);
  IF aMiconList <> NIL THEN BEGIN
    aMicon := aMiconList^^.theMicon;
    playing := TRUE;
  END
  ELSE BEGIN
    aMicon := NIL;
    playing := FALSE;
  END;

WITH pictRect DO BEGIN
    top := 0;
    left := 2;
    bottom := kvIcon;   {HARDCODE}
    right := khIcon-2;  {HARDCODE}
  END;
  WITH session^^ DO
    DragPicture(clickPt, pictRect, playing, theTools^^.tools[kSegBoardItem].segs^^.windoid,
                aMicon, currScreenIcon, session);

{What segment did the user release the mouse in.}
  segmentNo := ClickedWhere(aTool, clickPt, clickRect);
  IF segmentNo >= 0 THEN BEGIN
    HLock(Handle(session^^.currScreenIcon));
    CopyBits(BitMapHandle(session^^.currScreenIcon)^^, aTool^^.windoid^.portBits,
             session^^.currScreenIcon^^.bounds, clickRect, srcCopy, NIL);
    HUnlock(Handle(session^^.currScreenIcon));
    theNameList := GetNameList(segmentNo, aTool);

IF playing THEN BEGIN {Micon for segment.}
      err := SaveMicon(theNameList^^.name, aTool^^.boardName, aMicon, session);
    END
    ELSE BEGIN {Still icon.}
      HLock(Handle(theNameList));
      err := NewSegPicture(session^^.currScreenIcon, theNameList^^.pictIndex, aTool^^.iconRefNum, sess filmSegRef := session^^.openSegFiles^^.segFileRef;
      aVideoSegment := GetVideoSeg(theNameList^^.name, filmSegRef);
      HUnlock(Handle(theNameList));
      aVideoSegment^^.segIconIndex := theNameList^^.pictIndex;
      err := UpdateVideoSeg(aVideoSegment, filmSegRef, session);
      DisposeSegment(aVideoSegment);
      DisposHandle(Handle(aVideoSegment));
    END;
  END;
END;
kSegBoard: {In one of the segment icons.}
BEGIN
  segmentNo := ClickedWhere(aTool, clickPt, clickRect);
  IF segmentNo >= 0 THEN BEGIN
    {Depending on what MODE we're in, play a segment, play a (digital) preview
     or show the HyperCard card belonging to the segment.
    } theNameList := GetNameList(segmentNo, aTool);
    thePopUp := GetMenu(kPopUpSegMenu);
    LocalToGlobal(clickPt);
    InsertMenu(thePopUp, -1);
    IF NOT MiconExists(theNameList^^.name, GetVSegFName(session), session) THEN DisableItem(thePopUp,
    IF StillDown THEN BEGIN
      menuChoice.theResult := PopUpMenuSelect(thePopUp, clickPt.v-8, clickPt.h-30, 1);
    END
    ELSE menuChoice.theItemNumber := 1; {Fast click so we play.}
    DeleteMenu(thePopUp^^.menuID);
    DisposeMenu(thePopUp);
```

```
         IF menuChoice.theItemNumber <> 0 THEN BEGIN

CASE menuChoice.theItemNumber OF
           1: {Replay segment}
           BEGIN
             VidSegPlay(session, theNameList^^.name, aTool^^.boardName, FALSE, -1);
           END;
           2: {Play Micon}
           BEGIN
             WITH pictRect DO BEGIN
               top := 0;
               left := 2;
               bottom := kvIcon;   {HARDCODE}
               right := khIcon-2;  {HARDCODE}
             END;
             segFName := GetVSegFName(session);
             RemovePortMicons(aTool^^.windoid, session);
             aMicon := NewMicon(theNameList^^.name, segFName, pictRect, aTool^^.windoid, session, true );
             aTool^^.miconName := theNameList^^.name;
           END;
           3:   {Information}
           BEGIN
             segFName := GetVSegFName(session);
             HLock Handle(theNameList));
             FindSegInfo (theNameList^^.name, (segFName);
             HUnlock Handle(theNameList));
           END;
           4:    {Link}
           BEGIN
             Seg2LinkTool(session, theNameList^^.name, GetVSegFName(session), kVSEG);
           END;
           6:   {Delete...}
           BEGIN
             IF AreUSure(theNameList^^.name) THEN BEGIN
               filmSegRef := session^^.openSegFiles^^.segFileRef;
               err := DelVideoSeg(theNameList^^.name, filmSegRef, session);
               IF err <> noErr THEN BEGIN
                 MacsBugStr('User Break: Error from DelVideoSeg.');
                 Exit(SegBoardClick);
               END;
               WITH aTool^^ DO noSegs := noSegs-1;
               {Delete from name list and invalidate window rectangle.}
               HLock(Handle(aTool));
               IF DelFromNameList(aTool^^.segNames, theNameList^^.name) THEN BEGIN
                 EraseRect(segRect);
                 DrawSegments(session, aTool);
               END;
               HUnlock(Handle(aTool));
             END;
           END;
         END; {case}
       END; {if}
     END;
   END;
 END; {case}
END {if}
END; {SegBoardClick}

-----------------------------------------------------------------------------
The following procedures manage the icon layout and file update
for the segment board.
-----------------------------------------------------------------------------

{*
PROCEDURE PutInAlpha(VAR listHead: SegListHndl; newElement: SegListHndl);

Puts a new list element in the list in alphabetical order.
```

```
VAR
  anElement:   SegListHndl;
  prevElement: SegListHndl;

BEGIN
  IF listHead = NIL THEN
    listHead := newElement
  ELSE BEGIN
    anElement := listHead;
    prevElement := NIL;
    IF IUCompString(newElement^^.name, anElement^^.name) = -1 THEN BEGIN
      {Put it in front.}
      newElement^^.nextName := anElement;
      listHead := newElement;
    END
    ELSE BEGIN
      WHILE anElement <> NIL DO BEGIN
        IF IUCompString(newElement^^.name, anElement^^.name) <> 1 THEN
          Leave;
        prevElement := anElement;
        anElement := anElement^^.nextName;
      END;
      {Insert in list.}
      newElement^^.nextName := anElement;
      IF prevElement <> NIL THEN
        prevElement^^.nextName := newElement;
    END;
  END;
END; {PutInAlpha}

FUNCTION DelFromNameList(VAR listHead: SegListHndl; segName: Str31): BOOLEAN;
{
  Remove the segment named segName from the list of segments. Delete the SegListHndl
  containing the segment name. If it's the first segment in the list then update the
  listHead.
}
VAR
  anElement:   SegListHndl;
  prevElement: SegListHndl;
BEGIN
  DelFromNameList := FALSE;
  IF listHead = NIL THEN Exit(DelFromNameList);
  anElement := listHead;
  prevElement := NIL;
  WHILE anElement <> NIL DO BEGIN
    IF EqualString(anElement^^.name, segName, FALSE, FALSE) THEN BEGIN
      IF prevElement = NIL THEN BEGIN {First element in list.}
        listHead := anElement^^.nextName;
      END
      ELSE BEGIN
        prevElement^^.nextName := anElement^^.nextName;
      END;
      { Here we ought to remove the icon from the icon list as well and update
        all the segment indexes.
      }
      DisposHandle(Handle(anElement));
      DelFromNameList := TRUE;
      Exit(DelFromNameList);
    END
    ELSE BEGIN
      prevElement := anElement;
      anElement := anElement^^.nextName;
    END;
  END;
END; {DelFromNameList}

PROCEDURE AddSegToBoard(session: MMSesHandle; aSegName: Str31; segType, refVal: INTEGER);
{
  Adds a segment name to the segment board.
  This should also cause the scroll bar to be updated if the segment comes on
```

```
a new line.
The procedure invalidates the entire segment icon region causing it to redraw.
}

VAR
  aHndl:   SegListHndl;
BEGIN
  aHndl := SegListHndl(NewHandle(sizeof(SegmentList)));
  IF aHndl = NIL THEN BEGIN {We're in trouble.}
    SysBeep(1);
    Exit(AddSegToBoard);
  END;

aHndl^^.nextName := NIL;
  aHndl^^.segType := segType;
  aHndl^^.pictIndex := -1;
  aHndl^^.hasPreview := FALSE;
  aHndl^^.name := aSegName;
  HLock(Handle(session^^.theTools^^.tools[kSegBoardItem].segs));
  WITH session^^.theTools^^.tools[kSegBoardItem].segs^^ DO BEGIN
    PutInAlpha(segNames, aHndl);
    noSegs := noSegs+1;
  END;
  HUnlock(Handle(session^^.theTools^^.tools[kSegBoardItem].segs));
  UpdateScroll(session^^.theTools^^.tools[kSegBoardItem].segs^^.noSegs);
  DrawSegBoard(session, 1);
END; {AddSegToBoard}

PROCEDURE DisposeSegNames(VAR segNames: SegListHndl);
{
 Disposes of all the segments in the list.
}
VAR
  aSegLink: SegListHndl;

BEGIN
  WHILE segNames <> NIL DO BEGIN
    aSegLink := segNames^^.nextName;
    DisposHandle(Handle(segNames));
    segNames := aSegLink;
  END;
END; {DisposeSegNames}

FUNCTION BuildSegNames(VAR listHead: SegListHndl; refVal: INTEGER): INTEGER;
{
 Builds an alphabetically ordered list of segment names.
 Called once initially from NewTools.
 the refVal parameter is the file reference number for the segment file.
}
VAR
  noSegments:  INTEGER;
  aHndl:       SegListHndl;
  bHndl:       SegListHndl;
  count:       INTEGER;
  err:         OSErr;

BEGIN
  err := NoVideoSeg(refVal, noSegments);
  {Allocate handles and sort them alphabetically.}
  IF err = noErr THEN BEGIN
    FOR count := 1 TO noSegments DO BEGIN
      aHndl := SegListHndl(NewHandle(sizeof(SegmentList)));
      IF aHndl = NIL THEN BEGIN {We're in trouble.}
        BuildSegNames := count;
        SysBeep(1);
        Exit(BuildSegNames);
      END;
      HLock(Handle(aHndl));
      WITH aHndl^^ DO BEGIN
        nextName := NIL;
        segType := kVideoType;
```

```
            PictIndex := GetPictIndex(count, refVal);
            hasPreview := FALSE;
            name := GetVideoSegName(count, refVal);
          END;
          HUnlock.Handle(aHndl);
          PutInAlpha(listHead, aHndl);
        END; {for}
      END
      ELSE BEGIN
        DisposeSegNames(listHead);
        noSegments := 0;
      END;
      BuildSegNames := noSegments;
    END; {BuildSegNames}

FUNCTION GetNameList(index: INTEGER; theBoard: SegBoardHndl): SegListHndl;
{
  Returns the index'th element of the list starting with SegListHndl.
}
VAR
  i:    INTEGER;
  list: SegListHndl;

BEGIN
  list := theBoard^^.segNames;
  IF list = NIL THEN BEGIN
    GetNameList := NIL;
    Exit(GetNameList);
  END;
  FOR i := 1 TO index-1 DO BEGIN
    list := list^^.nextName;
  END;
  GetNameList := list;
END; {GetNameList}

PROCEDURE ArrowAction(theControl: ControlHandle; partCode: INTEGER);
{
  Called repeatetively by the scrollbar arrows in the SegBoard.
}
VAR
  controlVal:   INTEGER;
  controlMax:   INTEGER;
  controlMin:   INTEGER;
  ticks:        Longint;

BEGIN
  {MMOutside;}
  controlVal := 0;
  IF partCode = inUpButton THEN controlVal := -1

ELSE IF partCode = inPageUp THEN controlVal := -2

ELSE IF partCode = inDownButton THEN controlVal := 1

ELSE IF partCode = inPageDown THEN controlVal := 2;

controlMax := GetCtlMax(theControl);
  controlMin := GetCtlMin(theControl);
  controlVal := controlVal - GetCtlValue(theControl);
  IF controlVal > controlMax THEN SetCtlValue(theControl, controlMax)
  ELSE IF controlVal < controlMin THEN SetCtlValue(theControl, controlMin)
  ELSE SetCtlValue(theControl, controlVal);

Delay(30, ticks);
  {Now figure out a way to draw the content while we're scrolling.}
END; {ArrowAction}
```

```
File: VideoToolUtils.incl.p
First created: 05.29.89   (hpo)   Wrapped in from MMFilm.incl.p for modeless patch version.

PROCEDURE RunVideo(aSegment: SegmentHandle; session: MMSesHandle);
{
 Simply starts a segment going in the correct direction.
}
VAR
  currSegment:   LLHandle;
  dummyString:   STRING[1];
BEGIN
  currSegment := aSegment^^.currSegment;
  IF currSegment <> NIL THEN
  BEGIN
    dummyString[0] := Char(0);
    WITH currSegment^^ DO BEGIN
      IF outPoint > inPoint THEN
      BEGIN
        SendCmd(kPlayFwd, @dummyString, session);       {Forward.}
      END
      ELSE IF outPoint < inPoint THEN
      BEGIN
        SendCmd(k30FPSRev, @dummyString, session);  {30 frames pr sec. backwards.}
      END;
    END; {with}
    {If runStart set to -1 we want to call CheckSegment every time from VideoTask so set it back.}
    IF aSegment^^.runStart = 0 THEN aSegment^^.runStart := TickCount
    ELSE aSegment^^.runStart := TickCount - currSegment^^.outRefVal;
  END;
END; {RunVideo}

PROCEDURE StartAtOffset(aSeg: SegmentHandle; startRef: Longint);
{
 This routine uses the startRef parameter to set up the given segment so currSegment
 is offset appropriately.
 It starts at currSegment (or segmentList if former is NIL) and moves through it
 locating the first segment for which startRef lies between the in and out point.
 Once this first segment is found it is made the currSegment.
}
VAR
  theHead:      LLHandle;
BEGIN
  theHead := aSeg^^.currSegment;
  IF theHead = NIL THEN theHead := aSeg^^.segmentList;
  WHILE theHead <> NIL DO BEGIN
    WITH theHead^^ DO BEGIN
      IF outPoint > inPoint THEN BEGIN {Segment moves forward.}
        IF (startRef <= outPoint+5) AND (startRef >= inPoint-5) THEN Leave;
      END
      ELSE IF inPoint > outPoint THEN BEGIN {Segment moves in reverse.}
        IF (startRef <= inPoint+5) AND (startRef >= outPoint-5) THEN Leave;
      END
      ELSE IF (startRef = inPoint) OR (startRef = outPoint) THEN Leave;
    END;
    theHead := theHead^^.nextElement;
  END;
  IF theHead <> NIL THEN aSeg^^.currSegment := theHead;
END; {StartAtOffset}

PROCEDURE SetupSegment(session: MMSesHandle; aSegment: SegmentHandle; refVal: INTEGER; startRef: Longint);
{
 This procedure sets up to play a given segment. It searches to the beginning of
 the segment and turns off GenLock if it has to do a long search so it does not
 loose synch.
}
VAR
  err:          OSErr;
```

```pascal
  prevSegment: LLHandle;
  currSegment: LLHandle;
  inFr, outFr: Str255;
  inNum:       LongInt;

BEGIN
  currSegment := aSegment^^.currSegment;
  IF startRef < 0 THEN BEGIN
    prevSegment := currSegment^^.prevElement;
    inNum := currSegment^^.inPoint;
  END
  ELSE BEGIN
    prevSegment := NIL;
    WITH currSegment^^ DO   {This we do for the return link}
      IF inPoint > outPoint THEN inNum := startRef-1     {Play forward.}
      ELSE IF inPoint < outPoint THEN inNum := startRef-1  {Play reverse.}
      ELSE inNum := inPoint;                              {Still.}
    END;
  NumToString(inNum, inFr);
  NumToString(currSegment^^.outPoint, outFr);
  {CAREFUL - The last dereference of prevSegment in OR clause might cause problems.}
  IF session^^.hasOverlay AND (currSegment^^.outPoint <> inNum) AND ((prevSegment = NIL) OR (ABS(inNum - prev
  BEGIN {Turn off genlock}
    GenLockOff(refVal);

{!!! Check speed here someplace.}
    SendCmd(kSearch, @inFr, session);    {Search &..}
    SendCmd(kSetMark, @outFr, session);  {.. go till.}

GenLockOn(refVal);
  END
  ELSE {Don't turn off Autogenlock.}
  BEGIN
    SendCmd(kSearch, @inFr, session);    {Search &..}
    SendCmd(kSetMark, @outFr, session);  {.. go till.}
    {!!! Check speed here.}
  END;
END; {SetupSegment}

PROCEDURE StartNextSegment(session: MMSesHandle; aVidSegment: SegmentHandle; refVal: INTEGER);
{
 Starts the next segment element of a video segment or if we're at the end of a video
 segment, it draws a final frame and resets the play parameters.
 If autoLinks is active then when we skip to new segmentElement the link tool must be
 informed so it can update its reference counts.
}
BEGIN
  WITH aVidSegment^^ DO currSegment := currSegment^^.nextElement;
  IF aVidSegment^^.currSegment <> NIL THEN
  BEGIN
    SetupSegment(session, aVidSegment, refVal, -1);
    RunVideo(aVidSegment, session);
    IF session^^.autoLinks THEN ResetLinkRefs(session);
  END
  ELSE {Were at the end of the segments so draw the still if there is one.}
  BEGIN
    IF session^^.hasOverlay THEN
    BEGIN
      {set up the "globals" with picture name and vRefNum.}
      session^^.stillName := aVidSegment^^.stillName;
      session^^.stillvRefNum := GetSegFileVRef(aVidSegment^^.sourceName, session);
      OpenAndDraw(session);
    END;
    SetGlobal('segmentPlaying', 'FALSE');
    IF session^^.linkReturn THEN UpALevel(session);
  END;
END; {StartNextSegment}

FUNCTION CheckSegment(session: MMSesHandle; aVidSegment: SegmentHandle): BOOLEAN;
```

```
{ Check whether we're close to end of a segment of a segment and if so return
  TRUE.
  This routine is provided solely for efficiency to avoid having to check segment
  every time we call. }

VAR
   currFrame:   Longint;
   outPoint:    Longint;
BEGIN
   CheckSegment := FALSE;
   currFrame := FrameNo(session);
   outPoint := aVidSegment^^.currSegment^^.outPoint;

IF outPoint > aVidSegment^^.currSegment^^.inPoint THEN
   BEGIN
      IF currFrame-5 >= outPoint THEN
      BEGIN {forward}
         {End segment.}
         aVidSegment^^.runStart := 0;
         CheckSegment := TRUE;
      END;
   END
   ELSE {reverse}
      IF currFrame-5 <= outPoint THEN
      BEGIN
         aVidSegment^^.runStart := 0;
         CheckSegment := TRUE;
      END;
END; {CheckSegment}

PROCEDURE DrawIcon(theIcon: Handle; theRect: Rect);
BEGIN
   IF theIcon^ = NIL THEN LoadResource(theIcon);
   PlotIcon(theRect, theIcon);
END;

PROCEDURE DrawFilmTool(theTool: FilmToolHndl);
{
  Updates the tool on the screen redrawing the windoid
  appropriately to reflect current state.
  This procedure would normally be called in response to an update
  event and should not be confused with the procedure below "UpdateFilmTool"
  used to update the tool with respect to the film.
}
VAR
   savePort: GrafPtr;
   theRect:  Rect;

PROCEDURE DrawPict(thePict: PicHandle; theRect: Rect);
   BEGIN
      IF thePict^ = NIL THEN LoadResource(Handle(thePict));
      DrawPicture(thePict, theRect);
   END;

PROCEDURE DrawIcon(theIcon: Handle; theRect: Rect);
   BEGIN
      IF theIcon^ = NIL THEN LoadResource(theIcon);
      PlotIcon(theRect, theIcon);
   END;

BEGIN
   GetPort(savePort);
   SetPort(theTool^^.windoid);

{Draw the pictures in their correct positions.}
   PenSize(2,2);
   MoveTo(0, 37);
   LineTo(208, 37);
   MoveTo(208, 0);
   LineTo(208, 73);
```

```
  MoveTo(246, 0);
  LineTo(246, 73);
  SetRect(theRect, 0, 1, 208, 36);
  DrawPict(theTool^^.controlPict, theRect);
  SetRect(theRect, 0, 39, 208, 73);
  DrawPict(theTool^^.shuttlePict, theRect);
  PaintRect(theTool^^.snBarRect);
  SetRect(theRect, 210, 0, 246, 47);
  DrawPict(theTool^^.inOutPict, theRect);
  SetRect(theRect, 211, 46, 244, 78);
  DrawIcon(theTool^^.stopIcon, theRect);
  SetRect(theRect, 254, 5, 286, 37);
  DrawIcon(theTool^^.animIcons[theTool^^.currIcon], theRect);

SetPort(savePort);
END; {DrawFilmTool}

---------------------------------------------------------------------------------------
The following procedures are for playing video segments.
---------------------------------------------------------------------------------------

PROCEDURE PlaySeg(session: MMSesHandle; aVidTool: FilmToolHndl; startRef: Longint);

Starts the current segment applying a selected effect to a final digital frame if
one is currently displayed.
If startRef is positive it is considered a start point for the current segment.

VAR
  aSeg:     SegmentHandle;
  keyColor: RGBColor;
  savePort: GrafPtr;
  clipRgn:  RgnHandle;
  run:      BOOLEAN;
  keyIndex: Longint;

BEGIN
  aSeg := aVidTool^^.theSegment;
  IF aSeg <> NIL THEN
  BEGIN
    IF startRef < 0 THEN WITH aSeg^^ DO {Start playing.}
    BEGIN
      currSegment := segmentList;
      runStart := 0;
    END
    ELSE BEGIN
      StartAtOffset(aSeg, startRef);
      aSeg^^.runStart := -1;         {Signal checking every loop.}
    END;

SetupSegment(session, aSeg, session^^.refVal, startRef);

IF session^^.hasOverlay THEN BEGIN
      WITH keyColor DO  {Set key color.}
      BEGIN
        red   := $0000;
        green :=$0000;
        blue  := $FFFF;
      END;
      keyIndex := Color2Index(keyColor);
      GetPort(savePort);
      SetPort(session^^.bkgndWindow);
      clipRgn := NewRgn;
      HLock(Handle(aSeg));
      IF session^^.theTools^^.tools[kVideoItem].film^^.stillPainted THEN
      WITH aSeg^^ DO BEGIN
        run := FxRun(fullScreen, stillEffect, effectSpeed, keyIndex, effectRect, clipRgn);
        session^^.theTools^^.tools[kVideoItem].film^^.stillPainted := FALSE;
      END
```

```
      ELSE RectRgn(clipRgn, session^^.bkgndWindow^.portRect);
      HUnlock(Handle(aSeg));
      DisposeRgn(session^^.keyClip);
      session^^.keyClip := clipRgn;

SetPort(savePort);
    END; {if hasOverlay}
    SetGlobal('segmentPlaying', 'TRUE');
  END;
END; {PlaySeg}

PROCEDURE VidSegPlay(session: MMSesHandle; segName: Str31; segFileName: Str31; saveHistory: BOOLEAN; startRef This procedure gets the video segment given by the
  string in <segName> and calls PlaySeg to play it.

VAR
  aSeg:       SegmentHandle;
  oldSeg:     SegmentHandle;
  aVidTool:   FilmToolHndl;
  aFileList:  FileListHandle;
  aSegBoard:  SegBoardHndl;
  savePort:   GrafPtr;
  r:          Rect;
  dummy:      INTEGER;
  whereNow:   Longint;

BEGIN
  whereNow := FrameNo(session);
  aVidTool := session^^.theTools^^.tools[kVideoItem].film;
  GetSegFileInfo(segFileName, aFileList, aSegBoard, dummy, session);
  IF aFileList <> NIL THEN BEGIN
    aSeg := GetVideoSeg(segName, aFileList^^.segFileRef);
    IF aSeg <> NIL THEN BEGIN
      aSeg^^.sourceName := segFileName;
      oldSeg := aVidTool^^.theSegment;

aVidTool^^.theSegment := aSeg;
      IF session^^.autoLinks THEN BEGIN
        IF session^^.linksChanged THEN WITH oldSeg^^ DO UpdateLinks(session, segName, sourceName);
        WITH aSeg^^ DO BuildLinks(session, segName, sourceName);
      END;

PlaySeg(session, aVidTool, startRef); {Plays current segment.}

IF session^^.autoLinks THEN
        SetupLinks(session);

IF saveHistory THEN AddHistory(session, oldSeg, whereNow);
      IF oldSeg <> NIL THEN BEGIN
        DisposeSegment(oldSeg);
        DisposHandle(Handle(oldSeg));
      END;

{Update title in segboard.}
      GetPort(savePort);
      SetPort(aSegBoard^^.windoid);
      SetRect(r, 86,0,394,14);
      InvalRect(r);
      SetPort(savePort);

{"addVideoSeg" is a script handler expected to be in home stack.}
      SendCardMessage(Concat('addVideoSeg "',segName,'","', segFileName,'"'));
    END;
  END;
END; {VidSegPlay}

PROCEDURE StopSegment(session: MMSesHandle);
{
  This stops the currently playing segment.
```

```
VAR
  dummyString: STRING[1];
BEGIN
  WITH session^^.theTools^^.tools[kVideoItem].film^^.theSegment^^ DO
  BEGIN
    currSegment := NIL;
    runStart := 0;
  END;
  dummyString[0] := Char(0);
  SendCmd(kDevStop,@dummyString, session);
  SetGlobal('segmentPlaying', 'FALSE');
END; {StopSegment}

FUNCTION GetVideoSegment(session: MMSesHandle): SegmentHandle;
{
  Returns the current video segment if there is one or NIL otherwise.
}
VAR
  aVidSeg: SegmentHandle;
BEGIN
  aVidSeg := session^^.theTools^^.tools[kVideoItem].film^^.theSegment;
  GetVideoSegment := aVidSeg;
END; {GetVideoSegment}

FUNCTION GetVSegRef(session: MMSesHandle): INTEGER;
{
  Returns the refNum for the current video segment file.
  Use this function so the current mechanism of accessing segments
  can more easily be changed at some future point.
}
BEGIN
  GetVSegRef := session^^.openSegFiles^^.segFileRef;
END;

PROCEDURE SaveSegment(session: MMSesHandle; aSegment: SegmentHandle; refVal: INTEGER);
{
  Saves the given segment if the segment has a name.
}
VAR
  err: OSErr;
  segFName: Str31;
BEGIN
  IF NOT EqualString(aSegment^^.segName, '', FALSE, FALSE) THEN
    IF AddVideoSeg(aSegment, refVal, session) = noErr THEN BEGIN
      HLock(Handle(aSegment));
      AddSegToBoard(session, aSegment^^.segName, kVideoType, refVal);
      {Write the segment to a HyperCard segment card.}
      segFName := GetVSegFName(session);
      HCVideoSegOut(@aSegment^^.segName, @segFName);
      HUnlock(Handle(aSegment));
    END;
END; {SaveSegment}

PROCEDURE GetEndPict(session: MMSesHandle; aSegment: SegmentHandle);
{
  This procedure calls the selection procedure in the digital effects
  library. The selection procedure returns the appropriate information
  such as segment name, still name and vRefNum and effect and speed.
}
VAR
  reply:      SFReply;
  savePort:   GrafPtr;
  {Alex' stuff.}
  aSegname:   Str255;
  tempStr:    Str255;
  effect:     INTEGER;
  speed:      INTEGER;
  screen:     BOOLEAN;
  fxVal:      INTEGER;
```

```
  aRect:      Rect;

BEGIN
  IF session^^.hasOverlay THEN
  BEGIN
    GetPort(savePort);
    SetPort(GrafPtr(session^^.bkgndWindow));
    aRect := GrafPtr(session^^.bkgndWindow)^.portRect;
  END
  ELSE SetRect(aRect, 0,0,480,640);
  {aRect is the rectangle of the window where the effect will be performed
   when we call FxSel and will be set to the bounding box of the effect
   region on return. The bounding box of the region is needed so FxRun can
   perform the effect and calculate the actual region later.
  }
  GetIndString(tempStr, kDivStrID, kSegNameStr);
  aSegname := tempStr;
  fxVal := FxSel(aSegname, effect, speed, screen, reply, aRect);

CASE fxVal OF
  -1:BEGIN{Error from FxSel put up a dialogue.}
       SysBeep(5);
       WITH aSegment^^ DO BEGIN
         stillName := '';
         stillDirID := 0;
       END;
     END;
   0:WITH aSegment^^ DO {Cancel}
     BEGIN
       stillName := '';
       stillDirID := 0;
     END;
   OTHERWISE IF NOT EqualString(aSegname, tempStr, FALSE, FALSE) THEN {ok}
     WITH aSegment^^ DO BEGIN
       segName := aSegname;
       stillName := reply.fName;
       stillDirID := reply.vRefNum;
       stillEffect := effect;
       effectRect := aRect;
       effectSpeed := speed;
       fullScreen := screen;
     END;
  END; {case}
  IF session^^.hasOverlay THEN SetPort(savePort);
END; {GetEndPict}

PROCEDURE ClearBkgndWind(session: MMSesHandle);
{
 Clears a still in the overlay window if one has been painted there.
}
VAR
  aFilmTool:   FilmToolHndl;

BEGIN
  IF session^^.hasOverlay THEN
  BEGIN
    HLock(Handle(session));
    aFilmTool := session^^.theTools^^.tools[kVideoItem].film;
    HLock(Handle(aFilmTool));
    WITH aFilmTool^^ DO IF stillPainted THEN
    BEGIN
      WITH session^^ DO RectRgn(keyClip, bkgndRect);
      stillPainted := FALSE;
      DrawBkgndWindow(session);
    END;
    HUnlock(Handle(aFilmTool));
    HUnlock(Handle(session));
  END;
  SetGlobal('segmentPlaying', 'FALSE');
END;    {ClearBkgndWind}
```

```
PROCEDURE VideoClick(session: MMSesHandle; clickPt: Point; OutProc: ProcPtr);
{This procedure will be called when a click occurs in the film tool.
 The procedure "outProc" should be called contineously (as often as possible)
 to ensure that other tools can update their displays and links etc are showin
 at the correct time.
}
VAR
  testRect:    Rect;
  aFilmTool:   FilmToolHndl;
  savePort:    GrafPtr;
  dummyString: STRING[1];

FUNCTION WhatFn(hitPoint: Point): INTEGER;
  {Returns a part code indicating what part of the windoid the
   point 'hitPoint' occured in.
   The function returns zero '0' if the point is not in a valid rect.
  }
  VAR
     hitCode:   INTEGER;

BEGIN
    hitCode := 0;

SetRect(testRect, 6, 5, 200, 33);        {Control rect.}
    IF PtInRect(hitPoint, testRect) THEN
    BEGIN {find the exact control button it's in.}
      {We're just being stupid and stepping through all rects here.}
      WITH testRect DO BEGIN    {Play forward.}
        top := 5;
        bottom := 34;
        left := 133;
        right := 154;
      END;
      IF PtInRect(hitPoint, testRect) THEN
      BEGIN
        WhatFn := kPlayFBtn;
        EXIT(WhatFn)
      END;

WITH testRect DO BEGIN    {Play backward.}
        left := 50;
        right := 71;
      END;
      IF PtInRect(hitPoint, testRect) THEN
      BEGIN
        WhatFn := kPlayBBtn;
        EXIT(WhatFn)
      END;

WITH testRect DO BEGIN    {Fast forward.}
        left := 154;
        right := 176;
      END;
      IF PtInRect(hitPoint, testRect) THEN
      BEGIN
        WhatFn := kFFBtn;
        EXIT(WhatFn)
      END;

WITH testRect DO BEGIN    {Fast backward.}
        left := 30;
        right := 50;
      END;
      IF PtInRect(hitPoint, testRect) THEN
      BEGIN
        WhatFn := kFBBtn;
        EXIT(WhatFn)
      END;
```

```
    WITH testRect DO BEGIN      (Step forward.)
      left := 119;
      right := 133;
    END;
    IF PtInRect(hitPoint, testRect) THEN
    BEGIN
      WhatFn := kStepFBtn;
      EXIT(WhatFn)
    END;

WITH testRect DO BEGIN      (Step backward.)
      left := 72;
      right := 86;
    END;
    IF PtInRect(hitPoint, testRect) THEN
    BEGIN
      WhatFn := kStepBBtn;
      EXIT(WhatFn)
    END;

WITH testRect DO BEGIN      (Stop.)
      left := 86;
      right := 119;
    END;
    IF PtInRect(hitPoint, testRect) THEN
    BEGIN
      WhatFn := kStopBtn;
      EXIT(WhatFn)
    END;

WITH testRect DO BEGIN      (Scan forward.)
      left := 176;
      right := 200;
    END;
    IF PtInRect(hitPoint, testRect) THEN
    BEGIN
      WhatFn := kScanFBtn;
      EXIT(WhatFn)
    END;

WITH testRect DO BEGIN      (Scan backward.)
      left := 6;
      right := 30;
    END;
    IF PtInRect(hitPoint, testRect) THEN
    BEGIN
      WhatFn := kScanBBtn;
      EXIT(WhatFn)
    END;

WhatFn := kNoAction;
    EXIT(WhatFn);
  END;

SetRect(testRect, 0, 39, 208, 73);      (Shuttle rect.)
  IF PtInRect(hitPoint, testRect) THEN
  BEGIN
    WhatFn := kShuttle;
    EXIT(WhatFn)
  END;

SetRect(testRect, 215, 2, 240, 24);     (In arrow.)
  IF PtInRect(hitPoint, testRect) THEN
  BEGIN
    WhatFn := kInPoint;
    EXIT(WhatFn)
  END;

SetRect(testRect, 215, 24, 240, 47);    (Out arrow.)
  IF PtInRect(hitPoint, testRect) THEN
```

```
  BEGIN
    WhatFn := kOutPoint;
    EXIT(WhatFn)
  END;

SetRect(testRect, 211, 47, 244, 78);    {End icon rect.}
  IF PtInRect(hitPoint, testRect) THEN
  BEGIN
    WhatFn := kEnd;
    EXIT(WhatFn);
  END;

SetRect(testRect, 254, 5, 286, 37);
  IF PtInRect(hitPoint, testRect) THEN
  BEGIN
    WhatFn := kFilmIcon;
    EXIT(WhatFn);
  END;

WhatFn := kNoAction;
END; {WhatFn}

PROCEDURE TrackBtn(inRect: Rect; cmd: INTEGER);
{Track the mouse and issue the command cmd while it's inside 'inRect'.}
VAR
  shouldDo:    BOOLEAN;    {indicates whether we've moved out of the button rect.}
  trackMouse: Point;
  count:      Longint;

BEGIN
  shouldDo := TRUE;
  count := TickCount;
  dummyString[0] := Char(0);
  SendCmd(cmd, @dummyString, session);   {Call once up front.}
  InvertRect(inRect); {the Rect we're tracking in.}
  WHILE Button DO BEGIN
    GetMouse(trackMouse);
    {Follow it and do our thing....}
    IF PtInRect(trackMouse, inRect) THEN BEGIN
      SendCmd(cmd, @dummyString, session);
      IF NOT shouldDo THEN BEGIN {It's already inverted.}
        shouldDo := TRUE;
        InvertRect(inRect);
      END;
    END
    ELSE {It's outside the button}
      IF shouldDo THEN BEGIN{It's inverted}
        shouldDo := FALSE;
        InvertRect(inRect);
        SendCmd(kDevStop,@dummyString, session);
      END;
    MMTask(session);
  END;
  IF shouldDo THEN InvertRect(inRect);
END; {TrackBtn}

PROCEDURE TrackShuttle(inRect: Rect);
VAR
  hChange:    INTEGER;
  barRect:    Rect;
  trackMouse: Point;
  startPt:    Point;
  forward:    BOOLEAN;    {TRUE if forward FALSE if backward.}
  theSpeed:   INTEGER;
  lastSpeed:  INTEGER;
  clipRgn:    RgnHandle;  {Used to save clip rgn.}

PROCEDURE DrawShuttle;
  VAR
    shRect:   Rect;
```

```
    shPict:    PicHandle;
BEGIN
  SetRect(shRect, 0, 39, 208, 73);
  shPict := aFilmTool^^.shuttlePict;
  IF shPict^ = NIL THEN LoadResource(Handle(shPict));
  DrawPicture(shPict, shRect);
END;

FUNCTION CalcSpeed(speedSeed: INTEGER): INTEGER;
{ This function returns the current speed based on the speedSeed param.
  speedSeed is simply the horizontal mouseposition in the shuttle control
  and is used to calculate the speed. A negative speed value is reverse
  and positive is forward.
}
VAR
  speedParam:    INTEGER;

BEGIN
  speedParam := ((speedSeed-kShMiddle)*kNoSpeeds) DIV kShMiddle;
  CalcSpeed := speedParam;
END;

PROCEDURE SetSpeed(theSpeed: INTEGER);
VAR
  dirCmd:    INTEGER;
BEGIN
  IF theSpeed < 0 THEN dirCmd := kDirRev    {reverse}
  ELSE dirCmd := kDirFwd;                   {forward} dummyString[0] := Char(0);
  CASE ABS(theSpeed) OF                              {STOP.}
    0: dirCmd := kDevStop;
    1: SendCmd(kSet1FPS,@dummyString, session);      {1 frame pr sec.}
    2: SendCmd(kSet2FPS,@dummyString, session);      {2 fps}
    3: SendCmd(kSet4FPS,@dummyString, session);      {4 fps}
    4: SendCmd(kSet6FPS,@dummyString, session);      {6 fps}
    5: SendCmd(kSet8FPS,@dummyString, session);      {etc...}
    6: SendCmd(kSet10FPS,@dummyString, session);
    7: SendCmd(kSet15FPS,@dummyString, session);
    8: {Play speed.}
    BEGIN
      IF theSpeed < 0 THEN SendCmd(kSet30FPS,@dummyString, session)
      ELSE dirCmd := kPlayFwd;
    END;
    9: SendCmd(kSet60FPS,@dummyString, session);
    10: SendCmd(kSet120FPS,@dummyString, session);
    11: {scan}
    BEGIN
      IF theSpeed < 0 THEN dirCmd := kScanRev    {Scan backward.}
      ELSE dirCmd := kScanFwd;                   {Scan forward}
    END;
  END;
  SendCmd(dirCmd,@dummyString, session);
END; {SetSpeed}

BEGIN {TrackShuttle}
  InsetRect(inRect, 5, 0);         {Inset so we don't drag the bar outside the shuttle rect.}
  {*barRect := aFilmTool^^.shBarRect;*}
  WITH barRect DO BEGIN
    left := kBarLeft;
    top := kShTop;
    right := kBarRight;
    bottom := kShBottom;
  END;

clipRgn := NewRgn;

startPt.h := barRect.right-5;    {middle of where bar is now.}
  WHILE Button DO
  BEGIN
```

```
   MMTask(session);
   GetMouse(trackMouse);

trackMouse.v := kShTop + 5;   {vertical doesn't matter.}

IF NOT PtInRect(trackMouse, inRect) THEN
   BEGIN {We're outside the horiz bounds of the shuttle rect.}
     IF trackMouse.h > kShRight-5 THEN trackMouse.h := kShRight-5
     ELSE trackMouse.h := kShLeft+5;
   END;
   hChange := trackMouse.h - startPt.h;   {horizontal shuttle bar movement.}

IF ABS(hChange) > 2 THEN {It's moved more than one pixel.}
   BEGIN
     EraseRect(barRect);
     GetClip(clipRgn);         {save}
     ClipRect(barRect);
     DrawShuttle;
     SetClip(clipRgn);         {restore}

WITH barRect DO
     BEGIN
       left := left+hChange;
       right := right+hChange;
     END;
     PaintRect(barRect);

startPt := trackMouse;
     theSpeed := CalcSpeed(trackMouse.h);
   END;
   SetSpeed(theSpeed);
   {Follow it and do our thing....}
 END; {while}
 dummyString[0] := Char(0);
 SendCmd(kDevStop, @dummyString, session);
 InsetRect(inRect, -5, 0);
 ClipRect(inRect);
 DrawShuttle;
 PaintRect(aFilmTool^^.shBarRect);
 SetClip(clipRgn);
 DisposeRgn(clipRgn);
END; {TrackShuttle}

{
 -----------------------------------------------------------------------
 Here are some utilities for manipulating linked lists. We probably should
 generalize these and put them somewhere else?
 -----------------------------------------------------------------------
}
FUNCTION LastElement(theList: LLHandle): LLHandle;
{
 Return the last element of theList or theList IF it is the only element in the list.
}
VAR
  anElement: LLHandle;
BEGIN
  anElement := theList;
  WHILE anElement^^.nextElement <> NIL DO
  BEGIN
    anElement := anElement^^.nextElement;
  END;
  LastElement := anElement;
END; {LastElement}

FUNCTION NewElement(VAR theList: LLHandle): LLHandle;
{
 This function creates a new list element and adds it to the end
 of theList. If theList is NIL it sets theList to the new link
 element and it returns the element.
}
```

```
VAR
   listElement:    LLHandle;
BEGIN
   {Build a new element.}
   listElement := LLHandle(NewHandle(sizeof(LinkedList)));
   IF listElement <> NIL THEN
   BEGIN
     WITH listElement^^ DO
     BEGIN
       prevElement := NIL;
       nextElement := NIL;
       inPoint  := 0;
       inRefVal := 0;
       outPoint := 0;
       outRefVal := 0;
     END; {with segmentList^^}
   END
   ELSE MacsBugStr('User Break: SERIOUS MEMORY PROBLEM.');

{If the parameter we passed in is NIL then set it to the new element.}
   IF theList = NIL THEN theList := listElement
   ELSE {add the new element to the end of the list.}
   BEGIN
     listElement^^.prevElement := LastElement(theList);
     listElement^^.prevElement^^.nextElement := listElement;
   END;
   NewElement := listElement;
END; {NewElement}

PROCEDURE ClickedIn(theRect: Rect);
{The user has clicked in the in button.
 This will either start a new video segment recording if one is
 not already ongoing. If there is an active in point already
 the click simply defines a new in point.
}
VAR
   frame:   Longint;
   segment: LLHandle;
BEGIN
   IF aFilmTool^^.inActive THEN
   BEGIN   {Specify a new in point.}
     segment := LastElement(aFilmTool^^.theSegment^^.segmentList);
     segment^^.inPoint := FrameNo(session);
     segment^^.inRefVal := 0; (*TickCount;*)
   END ELSE
   BEGIN {Create a new "entry" in this segment.}
     aFilmTool^^.inActive := TRUE;

IF NOT aFilmTool^^.theSegment^^.recording THEN BEGIN
       {Call save routine to save current segment.}
       {If this prompts then it should probably be called when the user
        hits the End button.
       }
       DisposeSegment(aFilmTool^^.theSegment); {Resets recording flag.}
       aFilmTool^^.theSegment^^.recording := TRUE;
       session^^.openSegFiles^^.segSaved := FALSE;
     END;
     HLock(Handle(aFilmTool^^.theSegment));
     segment := NewElement(aFilmTool^^.theSegment^^.segmentList);
     HUnlock(Handle(aFilmTool^^.theSegment));
     aFilmTool^^.theSegment^^.noElements := aFilmTool^^.theSegment^^.noElements+1;
     segment^^.inPoint := FrameNo(session);
     {NOTE! This isn't good enough, the value should reflect the time it takes between in/out points.}
     segment^^.inRefVal := 0;(*TickCount;*)
     InvalRect(theRect);
   END;
END; {ClickedIn}
```

```
PROCEDURE ClickedOut(theRect: Rect);
{
The user has clicked the out button.
If a video segment recording has been started with a previous click
on the in button this will define a part of that segment. If not the
procedure will simply cause the system to beep.
}
VAR
   frame:      Longint;
   segment:    LLHandle;
   inoutRect:  Rect;
BEGIN
   IF aFilmTool^^.inActive THEN
   BEGIN
      aFilmTool^^.inActive := FALSE;
      segment := LastElement(aFilmTool^^.theSegment^^.segmentList);

segment^^.outPoint := FrameNo(session);
      WITH segment^^ DO outRefVal := ABS(outPoint-inPoint)*LongInt(2); {Calculated number of ticks.}
      InvalRect(theRect);
   END
   ELSE SysBeep(5);
END; {ClickedOut}

PROCEDURE ClickedEnd(theRect: Rect);
{
When the user has clicked the in arrow and out arrow and thereby defined
a segment, they finalize the definition by clicking the end button. That
in turn causes this procedure to get called.
}
VAR
   frame:      Longint;
   inoutRect:  Rect;
BEGIN
   ClickedOut(theRect);
   IF aFilmTool^^.theSegment^^.recording THEN
   BEGIN
      aFilmTool^^.theSegment^^.recording := FALSE;
      {Cause a redraw of the in and out buttons.}
      SetRect(inoutRect, 215, 1, 241, 47);
      InvalRect(inoutRect);

GetEndPict(session, aFilmTool^^.theSegment);
      SaveSegment(session, aFilmTool^^.theSegment, session^^.openSegFiles^^.segFileRef);
      session^^.openSegFiles^^.segSaved := TRUE;
   END
   ELSE SysBeep(5);
END; {ClickedEnd}

PROCEDURE ClickedFilm(theRect: Rect);
{
User clicked in the film icon.
}
BEGIN
   IF session^^.autoLinks THEN BEGIN
      IF session^^.linksChanged THEN WITH aFilmTool^^.theSegment^^ DO UpdateLinks(session, segName, sourceNam
      WITH aFilmTool^^.theSegment^^ DO BuildLinks(session, segName, sourceName);
   END;

PlaySeg(session, aFilmTool, -1);

IF session^^.autoLinks THEN SetupLinks(session);
END;

BEGIN {VideoClick}
   StopSegment(session);
   aFilmTool := session^^.theTools^^.tools[kVideoItem].film;

GetPort(savePort);
   SetPort(aFilmTool^^.windoid);
   GlobalToLocal(clickPt);
   CASE WhatFn(clickPt) OF
```

```
  kShuttle:
  BEGIN
    ClearBkgndWind(session);
    TrackShuttle(testRect);
  END;
  kInPoint:
  BEGIN
    ClearBkgndWind(session);
    ClickedIn(testRect);
  END;
  kOutPoint:
  BEGIN
    ClearBkgndWind(session);
    ClickedOut(testRect);
  END;
  kEnd:
  BEGIN
    ClickedEnd(testRect);
  END;
  kFilmIcon:
  BEGIN
    ClickedFilm(testRect);
  END;
  kStepFBtn:
  BEGIN
    ClearBkgndWind(session);
    TrackBtn(testRect, kStepFwd);
  END;
  kStepBBtn:
  BEGIN
    ClearBkgndWind(session);
    TrackBtn(testRect, kStepRev);
  END;
  kStopBtn:
  BEGIN
    ClearBkgndWind(session);
    TrackBtn(testRect, kDevStop);
  END;
  kPlayFBtn:
  BEGIN
    ClearBkgndWind(session);
    TrackBtn(testRect, kPlayFwd);
  END;
  kPlayBBtn:
  BEGIN
    ClearBkgndWind(session);
    TrackBtn(testRect, k30FPSRev);     (30 frames pr sec.)
  END;
  kFFBtn:
  BEGIN
    ClearBkgndWind(session);
    TrackBtn(testRect, k60FPSFwd);     (60 frames pr sec.)
  END;
  kFBBtn:
  BEGIN
    ClearBkgndWind(session);
    TrackBtn(testRect, k60FPSRev);
  END;
  kScanFBtn:
  BEGIN
    ClearBkgndWind(session);
    TrackBtn(testRect, kScanFwd);
  END;
  kScanBBtn:
  BEGIN
    ClearBkgndWind(session);
    TrackBtn(testRect, kScanRev);
  END;
END; (case)
SetPort(savePort);
```

```
END; {VideoClick}
```

```
{SR-}

{*
 Modified: 31.5.89
        Modifications were made so Mimato would run with the "new" GNEPatch version of the
        tools. The new version does not have an XCMD structure where the XCMD has an event
        loop.

Mimato is the MultiMediaToolKit.
 See the file: mimato.intf.p for further specification.

To compile and link this file using Macintosh Programmer's Workshop
 (HyperXCmd.p and XCmdGlue.inc must be accessible).

asm SetupPatch.a
 pascal FileProcs.p
 cd {mpw}MultiTools:
 pascal -w Mimato.p
 link -d -m ENTRYPOINT -o "Elastic:Elastic 2:Home" -rt XCMD=4444 -sn Main=Mimato Mimato.p.o ∂
     "{Libraries}"interface.o "{PLibraries}"PasLib.o SetupPatch.a.o FileProcs.p.o "{Libraries}"CSLib:CSLib.c
     "{CLibraries}"CRuntime.o fxSel.c.o fxRun.c.o When you build your own XFCNs, if you need to load
 "{MPW}"Libraries:interface.o, then say -m ENTRYPOINT in the link statement
 to filter out all routines you don't use.

NOTE!
 The following is a list of hacks that might cause problems in future
 versions of HyperCard.
 File: WindowTool.incl.p
 Proc: ToolDrag
 Description: Uses refcon field of Window pointer to identify the card
              window in HyperCard. The card window has to be moved by
              HyperCard so for this routine we use the refCon field to
              identify the window and call HyperCard to cause it to move.
*)

{SS Mimato }     { Segment name must be the same as the command name. }

UNIT DummyUnit;

INTERFACE

USES    MemTypes, QuickDraw, OSIntf, ToolIntf, PackIntf, HyperXCmd,
        CSLib, SCLib, MMTypes, FileProcs, DevComm, LinkFile, ToolUtils, SetupPatches, VBLSetup, MMDEffects;

{Include all the TYPE and CONST declarations.}

PROCEDURE EntryPoint(paramPtr: XCmdPtr);

IMPLEMENTATION

PROCEDURE   Mimato(paramPtr: XCmdPtr); FORWARD;

{And here go the implementations.}
PROCEDURE EntryPoint(paramPtr: XCmdPtr);
BEGIN
    Mimato(paramPtr);
END;

PROCEDURE   MacsBugStr(signalStr:   Str255);
    INLINE $abff;

PROCEDURE Mimato(paramPtr: XCmdPtr);
{NOTE!
 This procedure can be called by HyperCard with a paramPtr containing arguments, a
 HyperCard callback pointer etc. etc. OR it can be called by the procedure "MMOutside".
 If the procedure MMOutside is calling paramPtr will be NIL.
 We need to do the latter so that we can reference the locally scoped procedures of
 the XCMD from the outside. F.ex. when we're dragging the windows or while a modal
```

```
dialog pops up at the end we want to be able to pass "callback" routines that can
keep our world (sequences and segments) alive.
}
VAR
  session:    MMSesHandle;{Used as a 'global' variable. Remember to set it!}

{Include these fu..... here so everyone sees them! Oh Pascal...}
{$I XCmdGlue.inc }
PROCEDURE   Fail(errNo: INTEGER); FORWARD;

PROCEDURE   VidSegPlay(session: MMSesHandle; segName: Str31; segFileName: Str31;
            saveHistory: BOOLEAN); FORWARD;

FUNCTION    FindMMSession: MMSesHandle; FORWARD;

FUNCTION    CreateMMSession(segBoardName, pathName: Str255): BOOLEAN; FORWARD;

PROCEDURE   CreateCommBlock; FORWARD;

FUNCTION    ScreenInit(sessionBuffer:MMSesHandle): BOOLEAN; FORWARD;

FUNCTION    GetCSDevice(VAR refVal: INTEGER): GDHandle; FORWARD;

FUNCTION    GetIconIndex(iconName, iconFName: Str31; session: MMSesHandle): INTEGER; FORWARD;
{$I MMTools.incl.p}
{$I Mimato.incl.p}

BEGIN
  {NOTE:
   Change all the locally scoped procedures that call FindMMSession
   since they can refer to the session variable.
   Any procedure that creates a new session should set the
   session "global" to this session.
  }
  session := FindMMSession;

WITH paramPtr^ DO
  BEGIN
    passFlag := FALSE;
    IF paramCount = 0 THEN
    BEGIN
      Fail(noArgs);
      Exit(Mimato);
    END;
  END; {with}
  {paramPtr not NIL so HyperCard called. This is the normal way of doing things.}
  IF StringMatch('INIT', paramPtr^.params[1]^) <> NIL THEN DoInit(paramPtr)
  ELSE IF StringMatch('PLAY', paramPtr^.params[1]^) <> NIL THEN DoPlay(paramPtr)
  ELSE IF StringMatch('OPEN', paramPtr^.params[1]^) <> NIL THEN DoOpen(paramPtr)
  ELSE IF StringMatch('CLOSE', paramPtr^.params[1]^) <> NIL THEN DoClose(paramPtr)
  ELSE IF StringMatch('ACTIVE', paramPtr^.params[1]^) <> NIL THEN DoActive(paramPtr)
  ELSE IF StringMatch('ADD', paramPtr^.params[1]^) <> NIL THEN DoAdd(paramPtr)
  ELSE IF StringMatch('EXCEPT', paramPtr^.params[1]^) <> NIL THEN DoExcept(paramPtr)
  ELSE IF StringMatch('EXISTS', paramPtr^.params[1]^) <> NIL THEN DoExists(paramPtr)
  ELSE IF StringMatch('AUTOLINK', paramPtr^.params[1]^) <> NIL THEN DoAuto(paramPtr)
  ELSE IF StringMatch('AUTORETURN', paramPtr^.params[1]^) <> NIL THEN DoReturnLink(paramPtr)
  ELSE IF StringMatch('REMOVE', paramPtr^.params[1]^) <> NIL THEN DoRemove(paramPtr)
  ELSE IF StringMatch('CONFIG', paramPtr^.params[1]^) <> NIL THEN DoConfig(paramPtr)
  ELSE IF StringMatch('QUIT', paramPtr^.params[1]^) <> NIL THEN DoQuit(paramPtr);
END; {mimato}

END.
```

```
{ File: MMTools.incl.p
  First created: 11.12.88    (hpb)
  Modified:      05.31.89    (hpb)    Rewritten for modeless tools.

This file contains all the procedures that are used to deal with the multi
  -media tools in this environment.
  Each set of procedures for tools are included in the seperate files for
  those tools.
}

{$I MMhc.incl.p}
{$I MMSegBoard.incl.p}
{$I MMLink.incl.p}
{$I CSControl.incl.p}
{$I MMFilm.incl.p}

FUNCTION NewTools(defaultName, defaultPath: Str255): MMToolsHandle;
{
 Create a new set of multiple media editing tools.
}
VAR
  theTools:    MMToolsHandle;
  i:           INTEGER;

BEGIN
  theTools := MMToolsHandle(NewHandle(sizeof(MMTools)));
  IF theTools <> NIL THEN
  BEGIN
    FOR i := 1 to kNoTools DO
    BEGIN
      theTools^^.visible[i] := FALSE;
      theTools^^.tools[i].theTool := NIL;
    END;
    { NOTE!
      NewSegBoard must be called last due to the fact the it needs
      file refNums for the segment files.
    }
    HLock(Handle(theTools));
    { NOTE: Get the string from resource.}
    theTools^^.tools[kVideoItem].film := NewFilmTool(defaultName,defaultPath);
    theTools^^.tools[kSegBoardItem].segs := NewSegBoard(defaultName);
    theTools^^.tools[kLinkItem].links := NewLinkTool;
    theTools^^.tools[kHCItem].hc := NewHCTool;
    HUnlock(Handle(theTools));
    {Now set up the segment name handle for the segment board.}
    HLock(Handle(theTools^^.tools[kSegBoardItem].segs));
    WITH theTools^^.tools[kSegBoardItem].segs^^ DO BEGIN
      noSegs := BuildSegNames(segNames, session^^.openSegFiles^^.segFileRef);
    END;
    HUnlock(Handle(theTools^^.tools[kSegBoardItem].segs));
  END;
  NewTools := theTools;
END; {NewTools}

PROCEDURE DisposeTools(theTools: MMToolsHandle);
{
 Dispose all tools.
}
VAR
  aSegBoard:    SegBoardHndl;
  theNextBoard: SegBoardHndl;
BEGIN
  DisposeFilmTool(theTools^^.tools[kVideoItem].film);
  aSegBoard := theTools^^.tools[kSegBoardItem].segs;
  WHILE aSegBoard <> NIL DO BEGIN
    theNextBoard := aSegBoard^^.nextBoard;
    DisposeSegBoard(session, aSegBoard^^.boardName);
    aSegBoard := theNextBoard;
  END;
```

```
  DisposeLinkTool(theTools^^.tools[kLinkItem].links);

{Unpatch & remove VBL task.}
  DisposHandle(Handle(theTools));
END; {DisposeTools}

PROCEDURE SetUpHC;
{ Set HyperCard userlevel to 1 and save the old userlevel in global var.
  Also add the tools menu here.
}
VAR
  tempHandle:  Handle;
  mmMenu:      MenuHandle;

BEGIN
  {add tool menu.}
  mmMenu := GetMenu(kMMMenuID);
  InsertMenu(mmMenu, 0);         {Put it at end of list.}
  session^^.theTools^^.mmMenu := mmMenu;
  mmMenu := GetMenu(kMMMenuID+5);
  InsertMenu(mmMenu, -1);        {Hierarchical menu.}
  session^^.theTools^^.hrMenu := mmMenu;
  WITH session^^ DO SetItem(theTools^^.hrMenu, 1, openSegFiles^^.segFileName);
  EnableItem(session^^.theTools^^.hrMenu, 1);

DrawMenuBar;
END; {SetUpHC}

PROCEDURE ResetHC;
{ Remove the tools menu from the HyperCard menubar.
  Reset the hypercard userlevel to what it was before entering tools.
}
BEGIN
  {remove tool menu.}
  IF session^^.theTools^^.mmMenu <> NIL THEN
  BEGIN
    DeleteMenu(kMMMenuID);
    ReleaseResource(Handle(session^^.theTools^^.mmMenu));
    session^^.theTools^^.mmMenu := NIL;
  END;
  DrawMenuBar;
END; {ResetHC}

{-------------------------------------------------------------------------
 The following procedures handle drawing in the background window.
 -------------------------------------------------------------------------}

PROCEDURE OpenAndDraw(session: MMSesHandle);
{Opens a PICT file with name pictName and refNum vRefNum and draws it
 in the current graf port clipping to the current clip region.
}
VAR
  err:        OSErr;
  pictRef:    INTEGER;
  pictName:   Str31;
  myPB:       ParamBlockRec;
  longCount:  Longint;
  myProcs:    CQDProcs;
  pictHand:   PicHandle;
  savePort:   GrafPtr;

BEGIN
  IF session^^.hasOverlay THEN BEGIN {Redundant but do it anyways for sure.}
    GetPort(savePort);
    SetPort(GrafPtr(session^^.bkgndWindow));
    pictName := session^^.stillName;
    err := FSOpen(pictName, session^^.stillvRefNum, pictRef);

IF err = fnfErr THEN err := FSOpen(pictName, 0, pictRef);
```

```
    IF err <> noErr THEN
    BEGIN
      SetPort(SavePort);
      EXIT(OpenAndDraw);
    END
    ELSE session^^.stillvRefNum := 0;

{Get the size of the file-512 = size of picture.}
    WITH myPB DO
    BEGIN
      ioCompletion := NIL;
      ioNamePtr := @pictName;
      ioVRefNum := session^^.stillvRefNum;
      ioVersNum := Byte(0);
      ioFDirIndex := 0;
    END;
    err := PBGetFInfo(@myPB, FALSE);
    IF err <> noErr THEN BEGIN
      SetPort(SavePort);
      EXIT(OpenAndDraw);
    END;

pictHand := PicHandle(NewHandle(myPB.ioFlLgLen - 512));
    IF pictHand = NIL THEN
    BEGIN
      err := FSClose(pictRef);
      SetPort(savePort);
      Exit(OpenAndDraw);
    END;

err := SetFPos(pictRef, fsFromStart, 512);

longCount := myPB.ioFlLgLen - 512;
    err := FSRead(pictRef, longCount, Ptr(pictHand^));

DrawPicture(pictHand, pictHand^^.picFrame);

err := FSClose(pictRef);
    session^^.theTools^^.tools[kVideoItem].film^^.stillPainted := TRUE;

DisposHandle(Handle(pictHand));
    SetPort(savePort);
  END;
END; {OpenAndDraw}

PROCEDURE DrawBkgndWindow(sessionBuffer:MMSesHandle);
{
 This procedure updates the backround video/still window.
 Updating means redrawing to the intersection of the current visrgn
 and the key region and still rect.
}
VAR
  visRgn:   RgnHandle;
  keyRgn:   RgnHandle;
  stillRgn: RgnHandle;
  keyColor: RGBColor;
  savePort: GrafPtr;

BEGIN
  IF sessionBuffer^^.hasOverLay THEN
  BEGIN
    GetPort(savePort);
    SetPort(GrafPtr(sessionBuffer^^.bkgndWindow));

{If the full screen is painted then just do a redraw.}
    IF sessionBuffer^^.theTools^^.tools[kVideoItem].film^^.stillPainted THEN
      OpenAndDraw(sessionBuffer)
    ELSE
    BEGIN
      WITH keyColor DO  {Set key color.}
```

```
    BEGIN
      red := $0000;
      green :=$0000;
      blue := $FFFF;
    END;

{Create some new regions.}
    visRgn := NewRgn;
    keyRgn := NewRgn;
    stillRgn := NewRgn;

CopyRgn(GrafPtr(sessionBuffer^^.bkgndWindow)^.visRgn, visRgn);
    CopyRgn(sessionBuffer^^.keyClip, keyRgn);
    SectRgn(keyRgn, visRgn, keyRgn);
    IF NOT EmptyRgn(keyRgn) THEN
      BEGIN {Fill the intersection with the key color.}
        {*DebugString('Paint keyClip region.');*}
        RGBForeColor(keyColor);
        PaintRgn(keyRgn);
        keyColor.blue := 0;
        RGBForeColor(keyColor);     {Set to black for copybits.}
      END;

RectRgn(stillRgn, sessionBuffer^^.bkgndRect);
    DiffRgn(stillRgn, sessionBuffer^^.keyClip, stillRgn);

SectRgn(stillRgn, visRgn, stillRgn);
    IF NOT EmptyRgn(stillRgn) THEN
    BEGIN
       {Set fore and back color to black/white???}
       GetClip(visRgn);
       SetClip(stillRgn);
       {Draw background picture.}
       OpenAndDraw(sessionBuffer);

SetClip(visRgn);    {Restore clip.}
    END;

DisposeRgn(stillRgn);
    DisposeRgn(keyRgn);
    DisposeRgn(visRgn);
   END;
   SetPort(savePort);
  END;
END; {DrawBkgndWindow}

PROCEDURE ClearBkgndWind(session: MMSesHandle);
{
 Clears a still in the overlay window if one has been painted there.
}
VAR
   aFilmTool:    FilmToolHndl;

BEGIN
   IF session^^.hasOverlay THEN
   BEGIN
     HLock(Handle(session));
     HLock(Handle(aFilmTool));
     aFilmTool := session^^.theTools^^.tools[kVideoItem].film;
     WITH session^^.theTools^^.tools[kVideoItem].film^^ DO IF stillPainted THEN
     BEGIN
       WITH session^^ DO RectRgn(keyClip, bkgndRect);
       stillPainted := FALSE;
       DrawBkgndWindow(session);
     END;
     HUnlock(Handle(aFilmTool));
     HUnlock(Handle(session));
   END;
END; {ClearBkgndWind}
```

```
FUNCTION GetIconIndex(iconName, iconFName: Str31; session: MMSesHandle): INTEGER;

Returns the index in the icon file of the segment icon named <iconName>.

VAR
   i:         INTEGER;
   list:      SegListHndl;
   theBoard: SegBoardHndl;
BEGIN
   theBoard := session^^.theTools^^.tools[kSegBoardItem].segs;
   WHILE theBoard <> NIL DO BEGIN
      IF EqualString(theBoard^^.boardName, iconFName, FALSE, FALSE) THEN Leave;
      theBoard := theBoard^^.nextBoard;
   END;
   GetIconIndex := -1;
   IF theBoard <> NIL THEN BEGIN
      list := theBoard^^.segNames;
      IF list = NIL THEN BEGIN
         Exit(GetIconIndex);
      END;
      WHILE list <> NIL DO BEGIN
         IF EqualString(iconName, list^^.name, FALSE, FALSE) THEN BEGIN
            GetIconIndex := list^^.pictIndex;
            Leave;
         END
         ELSE list := list^^.nextName;
      END;
   END;
END; {GetIconIndex}
```

```
File: MMhc.incl.p
First created: 11.18.88    (hpb)
Modified:      05.31.89    (hpb)   Support modeless tools.

This file contains all the procedures and functions pertaining to the
HyperCard tool. The utilities for communicating with HyperCard are here
as well.

FUNCTION NewHCTool: HCToolHndl;

Create a HC tool.
 We make use of the fact that the HC window has "1" in the refCon field
 to locate the hc window.

VAR
  hcWindow:    WindowPeek;
  theHCTool:   HCToolHndl;
BEGIN
  theHCTool := HCToolHndl(NewHandle(sizeof(HCTool)));
  theHCTool^^.windoid := NIL;
  hcWindow := WindowPeek(FrontWindow);
  WHILE hcWindow <> NIL DO BEGIN
     IF hcWindow^.refcon = 1 THEN BEGIN
        theHCTool^^.windoid := WindowPtr(hcWindow);
        Leave;
     END
     ELSE hcWindow := hcWindow^.nextWindow;
  END;
  NewHCTool := theHCTool;
END; {NewHCTool}

PROCEDURE AddHCMicon(miconName, miconBrowser: Str31; offset: Point);
{
 Adds a Micon to the linked list of micons that are currently playing.
}
VAR
  aMicon:   MiconHandle;
  mRect:    Rect;
BEGIN
  {Get the micon if it can be found.}
  WITH mRect DO BEGIN
     top := offset.v;
     left := offset.h;
     bottom := top+kvIcon;
     right := left+khIcon;
  END; {with}
  aMicon := NewMicon(miconName, miconBrowser, mRect,
               session^^.theTools^^.tools[kHCItem].hc^^.windoid, session, FALSE);
  IF aMicon = NIL THEN Fail(kMiconOpenError);
END; {AddHCMicon}

PROCEDURE DisposeMicon(aMicon: MiconHandle);
{
 Dispose of a micon and the micon list element that keeps it.
}
BEGIN
  DisposPixMap(aMIcon^^.pixMap);
  DisposHandle(Handle(aMicon));
END; {DisposeMicon}

PROCEDURE RemoveHCMIcon(miconName: Str31);
{
 Removes a micon with the given name from the micon list in the session.
}
BEGIN
  RemoveMicon(miconName, '', session^^.theTools^^.tools[kHCItem].hc^^.windoid, session);
END; {RemoveHCMicon}
```

```
PROCEDURE RemoveAllHCMIcons;
{
 Removes all micons from the micon list in the session.
}
(*
VAR
  mList, mTemp: MiconListHandle;
  mLast:        MiconListHandle;
  aMicon:       MiconHandle;
  hcPort:       GrafPtr;
  savePort:     GrafPtr;
*)
BEGIN
  RemovePortMicons(session^^.theTools^^.tools[kHCItem].hc^^.windoid, session);
{* mList := session^^.miconList;
  hcPort := session^^.theTools^^.tools[kHCItem].hc^^.windoid;
  GetPort(savePort);
  SetPort(hcPort);
  mLast := NIL;

WHILE mList <> NIL DO BEGIN
    mTemp := mList^^.nextMicon;
    IF mList^^.miconPort = hcPort THEN BEGIN
      InvalRect(mList^^.miconRect);
      aMicon := mList^^.theMicon;
      WITH aMicon^^ DO resetCount := resetCount-1;
      IF aMicon^^.resetCount = 0 THEN DisposeMicon(aMicon);
      DisposHandle(Handle(mList));
    END
    ELSE mLast := mList;
    IF mLast <> NIL THEN mLast^^.nextMicon := mTemp;
    mList := mTemp;
  END;
  SetPort(savePort);
  *)
END; {RemoveAllHCMIcons}

PROCEDURE AddHCIcon(iconName, iconFName: Str31; offset: Point);
{
 Adds an icon to the linked list of icons in the session.
}
VAR
   iList:    IconListHandle;
   iRect:    Rect;
   theIndex: INTEGER;
   savePort: GrafPtr;
BEGIN
   iList := IconListHandle(NewHandle(sizeof(IconList)));
   IF iList = NIL THEN Exit(AddHCIcon)
   ELSE BEGIN
     theIndex := GetIconIndex(iconName, iconFName, session);
     IF theIndex = -1 THEN BEGIN
       DisposHandle(Handle(iList));
       Fail(kIconNotFound);
       Exit(AddHCIcon);
     END;
     iList^^.iconIndex := theIndex;
     iList^^.iconFRef := GetIconRef(session, iconFName);
     iList^^.nextIcon := NIL;

iRect := BitMapHandle(session^^.currScreenIcon)^^.bounds;
     WITH iRect DO BEGIN
       right := right - left;
       bottom := bottom - top;
       topLeft := offset;
       right := right + left;
       bottom := bottom + top;
     END; {with}
     iList^^.iconRect := iRect;
```

```
      iList^^.iconName := iconName;
      iList^^.iconPort := session^^.theTools^^.tools[kHCItem].hc^^.windoid;
      GetPort(savePort);
      SetPort(session^^.theTools^^.tools[kHCItem].hc^^.windoid);
      InvalRect(iRect);
      SetPort(savePort);
   END;

WITH session^^ DO
   IF iconList = NIL THEN iconList := iList
   ELSE BEGIN {Put the new list element at head of list.}
      iList^^.nextIcon := iconList;
      iconList := iList;
   END;
END; {AddHCIcon}

PROCEDURE RemoveHCIcon(iconName: Str31);
{
 Removes a icon with the given name from the icon list in the session.
}
VAR
   iList:   IconListHandle;
   iTemp:   IconListHandle;
   savePort: GrafPtr;

BEGIN
   iList := session^^.iconList;
   IF iList <> NIL THEN BEGIN
      GetPort(savePort);
      SetPort(session^^.theTools^^.tools[kHCItem].hc^^.windoid);
      IF EqualString(iconName, iList^^.iconName, FALSE, FALSE) THEN BEGIN
         session^^.iconList := iList^^.nextIcon;
         InvalRect(iList^^.iconRect);
         DisposHandle(Handle(iList));
         SetPort(savePort);
         Exit(RemoveHCIcon);
      END;
      iTemp := iList;
      iList := iList^^.nextIcon;
      WHILE iList <> NIL DO BEGIN
         IF EqualString(iconName, iList^^.iconName, FALSE, FALSE) THEN BEGIN
            iTemp^^.nextIcon := iList^^.nextIcon;
            InvalRect(iList^^.iconRect);
            DisposHandle(Handle(iList));
            Leave;
         END;
         iTemp := iList;
         iList := iList^^.nextIcon;
      END;
      SetPort(savePort);
   END;
END; {RemoveHCIcon}

PROCEDURE RemoveAllHCIcons;
{
 Removes all icons from the icon list in the session.
}
VAR
   iList, iTemp: IconListHandle;
   savePort:     GrafPtr;

BEGIN
   GetPort(savePort);
   SetPort(session^^.theTools^^.tools[kHCItem].hc^^.windoid);
   iList := session^^.iconList;
   WHILE iList <> NIL DO BEGIN
      iTemp := iList^^.nextIcon;
      InvalRect(iList^^.iconRect);
      DisposHandle(Handle(iList));
      iList := iTemp;
```

```
  END;
  session^^.iconList := NIL;
  SetPort(savePort);
END; {RemoveAllHCIcons}
```

```
File: MMSegBoard.incl.p
First created: 01.11.89    (hpb)
Modified:      05.31.89    (hpb)    support for modeless tools.

This file contains all the procedures and functions pertaining to the
segment board.
}

{
The procedure declarations.
}

PROCEDURE DisposeSegNames(VAR segNames: SegListHndl); FORWARD;

{
--------------------------------------------------------------------------------
                              IMPLEMENTATION
--------------------------------------------------------------------------------
}

FUNCTION NewSegBoard(boardName: Str31): SegBoardHndl;
{
Creates a new board (winodoid) to control and access segments.
}
VAR
   theBoard:      SegBoardHndl;
   err:           OSErr;
   iconRefNum:    INTEGER;
   vRefNum:       INTEGER;
BEGIN
   theBoard := MakeSegBoard(boardName, NIL, session^^.hasOverlay);
   IF theBoard <> NIL THEN BEGIN
      vRefNum := session^^.openSegFiles^^.vRefNum;
      err := IconOpen(Concat(boardName, '_ICONS'), '',iconRefNum, vRefNum);
      theBoard^^.iconRefNum := iconRefNum;
      session^^.openSegFiles^^.iconFileRef := iconRefNum;
   END;
   NewSegBoard := theBoard;
END; {NewSegBoard}

{--------------------------------------------------------------------------------
 Organize the segments in a segment list.
 --------------------------------------------------------------------------------}

PROCEDURE PutInAlpha(VAR listHead: SegListHndl; newElement: SegListHndl);
{
 Puts a new list element in the list in alphabetical order.
}
VAR
   anElement:    SegListHndl;
   prevElement:  SegListHndl;

BEGIN
   (*MacsBugStr('User Break: PutInAlpha MMSegBoard.');*)
   IF listHead = NIL THEN
      listHead := newElement
   ELSE BEGIN
      anElement := listHead;
      prevElement := NIL;
      IF IUCompString(newElement^^.name, anElement^^.name) = -1 THEN BEGIN
         {Put it in front.}
         newElement^^.nextName := anElement;
         listHead := newElement;
      END
      ELSE BEGIN
         WHILE anElement <> NIL DO BEGIN
            IF IUCompString(newElement^^.name, anElement^^.name) <> 1 THEN
```

```
        Leave;
        prevElement := anElement;
        anElement := anElement^^.nextName;
      END;
      {Insert in list.}
      newElement^^.nextName := anElement;
      IF prevElement <> NIL THEN
        prevElement^^.nextName := newElement;
    END;
  END;
END; {PutInAlpha}

PROCEDURE DisposeSegNames(VAR segNames: SegListHndl);

{Disposes of all the segments in the list.}

VAR
  aSegLink: SegListHndl;

BEGIN
  {*MacsBugStr('User Break: DisposeSegNames');*}
  WHILE segNames <> NIL DO BEGIN
    aSegLink := segNames^^.nextName;
    DisposHandle(Handle(segNames));
    segNames := aSegLink;
  END;
END; {DisposeSegNames}

FUNCTION BuildSegNames(VAR listHead: SegListHndl; refVal: INTEGER): INTEGER;

{Builds an alphabetically ordered list of segment names.
 Called once initially from NewTools.
 the refVal parameter is the file reference number for the segment file.
}
VAR
  noSegments: INTEGER;
  aHndl:      SegListHndl;
  count:      INTEGER;
  err:        OSErr;

BEGIN
  err := NoVideoSeg(refVal, noSegments);
  {Allocate handles and sort them alphabetically.}
  IF err = noErr THEN BEGIN
    FOR count := 1 TO noSegments DO BEGIN
      aHndl := SegListHndl(NewHandle(sizeof(SegmentList)));
      IF aHndl = NIL THEN BEGIN {We're in trouble.}
        BuildSegNames := count;
        SysBeep(1);
        Exit(BuildSegNames);
      END;
      HLock(Handle(aHndl));
      WITH aHndl^^ DO BEGIN
        nextName := NIL;
        segType := kVideoType;
        pictIndex := GetPictIndex(count, refVal);
        hasPreview := FALSE;
        name := GetVideoSegName(count, refVal);
      END;
      HUnlock(Handle(aHndl));
      PutInAlpha(listHead, aHndl);
    END; {for}
  END
  ELSE BEGIN
    DisposeSegNames(listHead);
    noSegments := 0;
  END;
  BuildSegNames := noSegments;
END; {BuildSegNames}
```

```
{File: MMLink.incl.p
 First created: 04.01.89    (hpb)
 Modified:      05.31.89    (hpb) support for modelessness.

This file handles creating links.

{
---------------------------------------------------------------------------
                              IMPLEMENTATION
---------------------------------------------------------------------------
}

FUNCTION NewLinkTool: LinkToolHndl;
{
 Creates a new tool to control Linking.
}
VAR
  theTool:      LinkToolHndl;
  theWindoid:   WindowPtr;
  savePort:     GrafPtr;
  botRightPt:   Point;
BEGIN
  theTool := NIL;
  theWindoid := GetNewWindow(kLinkToolWindoid, NIL, Pointer(-1));
  IF theWindoid <> NIL THEN
  BEGIN
    theTool := LinkToolHndl(NewHandle(sizeof(LinkTool)));
    IF theTool <> NIL THEN
    BEGIN
      HLock(Handle(theTool));
      WITH theTool^^ DO
      BEGIN
        windoid := theWindoid;
        linkPict := PicHandle(GetResource('PICT', kLinkPict));

makingLink := FALSE;
        activeLink := NIL;
        allLinks := NIL;
        nextIn := NIL;
        currLinks := NIL;
        nextOut := NIL;

histIndicator := GetNewWindow(kWindoid, NIL, Pointer(-1));
        indType := kRLIcon;
        indicator.aMicon := NIL;
        histPict := PicHandle(GetResource('PICT', kHistPict));
        histCount := 0;
        linkHistory := NIL;
        GetPort(savePort);
        WITH session^^ DO IF hasOverlay THEN BEGIN
          SetPort(bkgndWindow);
          botRightPt := bkgndWindow^.portRect.botRight;
        END
        ELSE {Use HC port.} botRightPt := savePort^.portRect.botRight;
        LocalToGlobal(botRightPt);
        SetPort(savePort);

WITH botRightPt DO MoveWindow(histIndicator, h-khIcon-10, v-kvIcon-10, FALSE);

nextInRef := 0;
        nextOutRef := 0;

lastClickWind := WindowPtr(-1);
        lastClickWhen := 0;

SetRect(indRect, 3, 2, 83, 62);
      END;
      HUnlock(Handle(theTool));
```

```
    END
    ELSE DisposeWindow(theWindoid);
  END;
  NewLinkTool := theTool;
END; {NewLinkTool}

PROCEDURE DisposeLinkTool(theTool: LinkToolHndl);
BEGIN
  IF theTool <> NIL THEN
  BEGIN
    HLock(Handle(theTool));
    WITH theTool^^ DO
    BEGIN
      DisposeWindow(windoid);
      ReleaseResource(Handle(linkPict));
      {add other disposable fields here...}
    END;
    HUnlock(Handle(theTool));
    DisposHandle(Handle(theTool));
  END;
END;
```

```
File: MMFilm.incl.p
First created: 11.12.88    (hpb)
Modified:      05.31.89    (hpb: support for modeless version.

This file contains all the procedures and functions pertaining to the
video tool.

The procedure declarations.

-----------------------------------------------------------------------
                            IMPLEMENTATION
-----------------------------------------------------------------------

FUNCTION NewFilmTool(VAR initName: Str255; initPath: Str255): FilmToolHndl;

Creates a new tool to control film as a media.

VAR
  theTool:     FilmToolHndl;
  theWindoid:  WindowPtr;
  err:         OSErr;
  reply:       SFReply;

BEGIN
  theTool := NIL;
  theWindoid := GetNewWindow(kFilmToolWindoid, NIL, Pointer(-1));
  IF theWindoid <> NIL THEN
  BEGIN
    theTool := FilmToolHndl(NewHandle(sizeof(FilmTool)));
    IF theTool <> NIL THEN
    BEGIN
      HLock(Handle(theTool));
      WITH theTool^^ DO
      BEGIN
        windoid := theWindoid;
        animIcons[1] := GetIcon(kFilm1);
        animIcons[2] := GetIcon(kFilm2);
        animIcons[3] := GetIcon(kFilm3);
        currIcon := 1;
        playIcon := GetIcon(kPlay);
        stopIcon := GetIcon(kStop);
        controlPict := PicHandle(GetResource('PICT', kContrPict));
        shuttlePict := PicHandle(GetResource('PICT', kShutlPict));
        inOutPict := PicHandle(GetResource('PICT', kinoutPict));
        SetRect(shBarRect, kBarLeft, kShTop, kBarRight, kShBottom);
        stillPainted := FALSE;
        theSegment := SegmentHandle(NewHandle(sizeof(Segment)));
        IF theSegment = NIL THEN BEGIN
          HUnlock(Handle(theTool));
          DisposHandle(Handle(theTool));
          (*Fail(kOutOfMemory);*)
          NewFilmTool := NIL;
          Exit(NewFilmTool);
        END;

WITH theSegment^^ DO
        BEGIN
          segName := '';
          sourceName := '';
          copyRight := '';
          stillName := '';
          stillDirID := -1;
          stillEffect := kNoEffect;
```

```
        segIconIndex := -1;
        noElements := 0;
        segmentList := NIL;
        currSegment := NIL;
        recording := FALSE;
        runStart := 0;          {No currently running segment.}
      END; {with theSegment^^...}

HLock(Handle(session));
      WITH session^^ DO BEGIN
        openSegFiles := FileListHandle(NewHandle(sizeof(FileList)));

HLock(Handle(openSegFiles));
        WITH openSegFiles^^ DO BEGIN
          vRefNum := 0;
          err := MMOpen(initName, initPath, segFileRef, vRefNum);
        END;
        HUnlock(Handle(openSegFiles));

IF err <> noErr THEN
        BEGIN
          SysBeep(5);
          openSegFiles^^.segFileRef := 0;
          openSegFiles^^.segFileName := '';
          openSegFiles^^.vRefNum := 0;
        END
        ELSE openSegFiles^^.segFileName := initName;
        openSegFiles^^.nextFile := NIL;
        openSegFiles^^.iconFileRef := -1;
        openSegFiles^^.segSaved := FALSE;
      END;
      HUnlock(Handle(session));

inActive := FALSE;  {In button not currently active.}
    END; {with theTool^^..}
    HUnlock(Handle(theTool));
  END
  ELSE DisposeWindow(theWindoid);
END;
NewFilmTool := theTool;
END; {NewFilmTool}

PROCEDURE DisposeFilmTool(theTool: FilmToolHndl);
VAR
  aListElement: LLHandle;       {Used to dispose linked list.}
  bListElement: LLHandle;
  err:          OSErr;

BEGIN
  IF theTool <> NIL THEN
  BEGIN
    HLock(Handle(theTool));
    WITH theTool^^ DO
    BEGIN
      DisposeWindow(windoid);
      ReleaseResource(Handle(animIcons[1]));
      ReleaseResource(Handle(animIcons[2]));
      ReleaseResource(Handle(animIcons[3]));
      ReleaseResource(Handle(playIcon));
      ReleaseResource(Handle(stopIcon));
      ReleaseResource(Handle(controlPict));
      ReleaseResource(Handle(shuttlePict));
      ReleaseResource(Handle(inoutPict));

(*IF openSegFiles^^.segFileRef <> -1 THEN err := MMClose(openSegFiles^^.segFileRef);*)

HLock(Handle(theSegment));
      WITH theSegment^^ DO
      BEGIN
        aListElement := segmentList;
```

```
        WHILE aListElement <> NIL DO
        BEGIN   (go down the list and dispose all elements.)
          bListElement := aListElement^^.nextElement;
          DisposHandle(Handle(aListElement));
          aListElement := bListElement;
        END;
      END;
      HUnlock(Handle(theSegment));
      DisposHandle(Handle(theSegment));
      (add other disposable fields here...)
    END;
    HUnlock(Handle(theTool));
    DisposHandle(Handle(theTool));
  END;
END;   (DisposeFilmTool)

{--------------------------------------------------------------------------------
 Play segment procedures.
 These procs can also be found in "VideoUtils.incl.p" (for the GNE patch).
 --------------------------------------------------------------------------------}

PROCEDURE SetupSegment(session: MMSesHandle; aSegment: SegmentHandle; refVal: INTEGER);

{ This procedure sets up to play a given segment. It searches to the beginning of
  the segment and turns off GenLock if it has to do a long search so it does not
  loose synch. }

VAR
  inNum:       Longint;
  err:         OSErr;
  prevSegment: LLHandle;
  currSegment: LLHandle;
  inFr, outFr: Str255;

BEGIN
  currSegment := aSegment^^.currSegment;
  prevSegment := currSegment^^.prevElement;
  inNum := currSegment^^.inPoint;
  NumToString(inNum, inFr);
  NumToString(currSegment^^.outPoint, outFr);
  { CAREFUL using AND in the OR-clause because of way it is evaluated.}
  IF session^^.hasOverlay AND (currSegment^^.outPoint <> inNum) AND ((prevSegment = NIL) OR (ABS(inNum - prev
  BEGIN {Turn off genlock}
    GenLockOff(refVal);

{!!! Check speed here someplace.}
    SendCmd(kSearch, @inFr, session);   {Search &..}
    SendCmd(kSetMark, @outFr, session); {.. go till.}

GenLockOn(refVal);
  END
  ELSE {Don't turn off Autogenlock.}
  BEGIN
    SendCmd(kSearch, @inFr, session);   {Search &..}
    SendCmd(kSetMark, @outFr, session); {.. go till.}

{!!! Check speed here.}
  END;

END; {SetupSegment}

PROCEDURE PlaySeg(session: MMSesHandle; aVidTool: FilmToolHndl);
VAR
  aSeg:       SegmentHandle;
  keyColor:   RGBColor;
  savePort:   GrafPtr;
  clipRgn:    RgnHandle;
  run:        BOOLEAN;
  keyIndex:   Longint;
  globHandle: Handle;
```

```
BEGIN
    aSeg := aVidTool^^.theSegment;
    IF aSeg <> NIL THEN
    BEGIN
      WITH aSeg^^ DO (Start playing.)
      BEGIN
        currSegment := segmentList;
        runStart := 0;
      END;
      SetupSegment(session, aSeg, session^^.refVal);

IF session^^.hasOverlay THEN BEGIN
        WITH keyColor DO   (Set key color.)
        BEGIN
          red := $0000;
          green := $0000;
          blue := $FFFF;
        END;
        keyIndex := Color2Index(keyColor);
        GetPort(savePort);
        SetPort(session^^.bkgndWindow);
        clipRgn := NewRgn;
        HLock(Handle(aSeg));
        IF session^^.theTools^^.tools[kVideoItem].film^^.stillPainted THEN WITH aSeg^^ DO
        BEGIN
          run := FxRun(fullScreen, stillEffect, effectSpeed, keyIndex, effectRect, clipRgn);
          IF fullScreen THEN session^^.theTools^^.tools[kVideoItem].film^^.stillPainted := FALSE;
        END
        ELSE RectRgn(clipRgn, session^^.bkgndWindow^.portRect);

HUnlock(Handle(aSeg));
        DisposeRgn(session^^.keyClip);
        session^^.keyClip := clipRgn;

SetPort(savePort);
      END;
      globHandle := PasToZero('TRUE');
      SetGlobal('segmentPlaying', globHandle);
      DisposHandle(globHandle);
    END
    ELSE SysBeep(5);
END; (PlaySeg)

PROCEDURE VidSegExists(session: MMSesHandle; segName, segFName: Str31);
{
 This procedure checks whether the video segment given by the string in
 segName exists. It sets the HC result accordingly if not.
}
VAR
  aSeg:      SegmentHandle;
  oldSeg:    SegmentHandle;
  aFileList:FileListHandle;

BEGIN
  aFileList := session^^.openSegFiles;
  WHILE aFileList <> NIL DO BEGIN
    IF EqualString(segFName, aFileList^^.segFileName, FALSE, FALSE) THEN Leave;
    aFileList := aFileList^^.nextFile;
  END;
  IF aFileList <> NIL THEN BEGIN
    aSeg := GetVideoSeg(segName, aFileList^^.segFileRef);
    IF aSeg = NIL THEN Fail(kNoSuchSeg);
  END
  ELSE Fail(kNoSuchFile);
END; (VidSegExists)

PROCEDURE VidSegPlay(session: MMSesHandle; segName: Str31; segFileName: Str31; saveHistory: BOOLEAN);
{
 This procedure gets the video segment given by the zero terminated
```

```
  string in segNameHndl and calls PlaySeg to play it.

VAR
  aSeg:      SegmentHandle;
  oldSeg:    SegmentHandle;
  aVidTool:  FilmToolHndl;
  fileList:  FileListHandle;
  aSegBoard: SegBoardHndl;
  savePort:  GrafPtr;
  r:         Rect;

BEGIN
  aVidTool := session^^.theTools^^.tools[kVideoItem].film;
  aSegBoard := session^^.theTools^^.tools[kSegBoardItem].segs;
  fileList := session^^.openSegFiles;
  WHILE fileList <> NIL DO BEGIN
    IF EqualString(segFileName, fileList^^.segFileName, FALSE, FALSE) THEN Leave;
    fileList := fileList^^.nextFile;
    aSegBoard := aSegBoard^^.nextBoard;
  END;
  IF fileList <> NIL THEN BEGIN
    aSeg := GetVideoSeg(segName, fileList^^.segFileRef);
    IF aSeg <> NIL THEN BEGIN
      aSeg^^.sourceName := segFileName;
      oldSeg := aVidTool^^.theSegment;

aVidTool^^.theSegment := aSeg;
      IF session^^.autoLinks THEN BEGIN
        IF session^^.linksChanged THEN WITH oldSeg^^ DO UpdateLinks(session, segName, sourceName);
        WITH aSeg^^ DO BuildLinks(session, segName, sourceName);
      END;

PlaySeg(session, aVidTool);

IF session^^.autoLinks THEN
        SetupLinks(session);

(*IF saveHistory THEN AddHistory(session, oldSeg, whereNow);*)
      IF oldSeg <> NIL THEN BEGIN
        DisposeSegment(oldSeg);
        DisposHandle(Handle(oldSeg));
      END;

{Update title in segboard.}
      GetPort(savePort);
      SetPort(aSegBoard^^.windoid);
      SetRect(r, 86,0,394,14);
      InvalRect(r);
      SetPort(savePort);

{"addVideoSeg" is a script handler expected to be in home stack.}
      SendCardMessage(Concat('addVideoSeg "',segName,'","', segFileName,'"'));
    END;
  END;
END; {VidSegPlay}

{----------------------------------------------------------------------
 Utility procedures for dealing with second (overlay) screen.
 ----------------------------------------------------------------------}

PROCEDURE SetupBoard(refNum: INTEGER; aColor: RGBColor);
{
 Sets up a CSII/FX board combination.
 This procedure assumes that the current gDevice is set to the CS device.
}
VAR
  autogenRec: VDAutoGenlock;
  err:        OSErr;
  hasFX:      BOOLEAN;
  screfnum:   INTEGER;
```

```
  size:        INTEGER;
  testConfig:  INTEGER;

BEGIN
  err := CS_GET_SCREFNUM(refNum, screfnum);
  IF err <> noErr THEN BEGIN
    Exit(SetupBoard);
  END;

IF screfnum <> 0 THEN BEGIN
    hasFX := TRUE;
    (*
    { Should save board state here so it can be reset when leaving tools.}
    fxState := FIFOHandle(NewHandle(sizeof(FIFOInfo)));
    IF fxState = NIL THEN BEGIN
      HUnlock(Handle(myDigState));
      DisposHandle(Handle(myDigState));
      SaveDigitizer := NIL;
      Exit(SaveDigitizer);
    END;

fxState^^.screfNum := screfNum;
    fxState^^.csrefNum := refNum;
    HLock(Handle(fxState));
    err := SC_GET_STATE(refNum, fxState^^);
    HUnlock(Handle(fxState));
    IF err <> noErr THEN DisposNQuit(err);
    *)

err := SC_FULL_IMAGE(screfnum, refNum);

err := CS_GET_MON_CONFIG(refNum, size, testConfig); {Do this to set size param} err := CS_SET_MON_CONFIG(refNum, size, 1);
    err := CS_SET_KEY_COLOR(refNum, Color2Index(aColor));
    err := CS_MODE_RESET(refNum);
  END;

autogenRec.agEnable := INTEGER(NOT hasFX); ( turn on/off )
  err := CS_SET_AUTOGENLOCK(refNum, autogenRec);

err := CS_SET_VIDEO_OVERLAY(refNum, GRAPHICSOVERVIDEO);

END; {SetupBoard}

FUNCTION ScreenInit(sessionBuffer:MMSesHandle): BOOLEAN;
{
 If a the system does not have color QD, the function returns FALSE
 and no initialization is performed, otherwise it returns TRUE.
}
VAR
  myWorld:     SysEnvRec;
  hasColor:    BOOLEAN;
  csDevice:    GDHandle;
  currDevice:  GDHandle;
  refVal:      INTEGER;
  bkgndWindow: windowPtr;
  aColor:      RGBColor;
  anErr:       OSErr;
  storePort:   GrafPtr;
  testRect:    Rect;
  screenRgn:   RgnHandle;
  i:           INTEGER;
  myBool:      BOOLEAN;
  defaultColors:WCTabHandle;

BEGIN
  ScreenInit := TRUE;
  IF SysEnvirons(1, myWorld) = noErr THEN hasColor := myWorld.hasColorQD
  ELSE hasColor := FALSE;
```

```pascal
  IF NOT hasColor THEN BEGIN {Don't go on unless we have color QD}
    ScreenInit := FALSE;
    Exit(ScreenInit);
  END;

csDevice := GetCSDevice(refVal);
  sessionBuffer^^.hasOverLay := FALSE;
  sessionBuffer^^.csDevice := csDevice;
  sessionBuffer^^.refVal := refVal;
  sessionBuffer^^.currScreenIcon := NIL;

IF csDevice <> NIL THEN {Open a window and set the keyColor.}
  BEGIN
    bkgndWindow := WindowPtr(GetNewCWindow(4444, NIL, Pointer(-1)));
    IF bkgndWindow <> NIL THEN
    BEGIN
      sessionBuffer^^.hasOverLay := TRUE;
      SendBehind(bkgndWindow, NIL); {Send it to the very back.}
      WITH csDevice^^.gdRect DO
      BEGIN
        MoveWindow(bkgndWindow, left, top, FALSE);
        SizeWindow(bkgndWindow, right-left, bottom-top, FALSE);
      END;

currDevice := GetGDevice;
      SetGDevice(csDevice);
      GetPort(storePort);

WITH aColor DO
        BEGIN
          red   := 0;
          green := 0;
          blue  := $FFFF;
        END;
      IF NOT RealColor(aColor) THEN SysBeep(10);
      ShowHide(bkgndWindow, TRUE);
      testRect := bkgndWindow^.portRect;

SetPort(bkgndWindow);

RGBForeColor(aColor); {Foreground to blue} screenRgn := NewRgn;

RectRgn(screenRgn, testRect);
      PaintRect(testRect);
      sessionBuffer^^.keyClip := screenRgn;
      sessionBuffer^^.bkgndRect := bkgndWindow^.portRect;

SetupBoard(refVal, aColor);

SetGDevice(currDevice);
      SetPort(storePort);
      aColor.blue := 0;
      RGBForeColor(aColor); {Foreground to black.}
    END;
    sessionBuffer^^.bkgndWindow := bkgndWindow;
  END;
END; {ScreenInit}

{----------------------------------------------------------------------------}
{ ColorSpaceII specifics.                                                    }
{----------------------------------------------------------------------------}

FUNCTION GetCSDevice(VAR refVal: INTEGER): GDHandle;
{
 Try to open a ColorSpace driver for each slot and if one can be opened then
 figure out which gDevice is associated with it and return this gevice.
 So far this will stop once it finds one (1) board!
```

```
   theErr:   OSErr;
   csDevice: GDHandle;
   i:        SignedByte;

i := $09;
   csDevice := NIL;
   REPEAT
     theErr := CS_Open(i, refVal);
     IF theErr = noErr THEN
     BEGIN
       csDevice := GetDeviceList;
       WHILE csDevice <> NIL DO BEGIN
         IF csDevice^^.gdRefNum = refVal THEN Leave; {while}
         csDevice := GetNextDevice(csDevice);
       END;
       Leave; {repeat...until}
     END;
     {ELSE check if the error indicated "no slot" meaning that we've gone to far.}
     i := i+1;
   UNTIL i>$0E;
   GetCSDevice := csDevice;
END; {GetCSDevice}
```

```
{Forward declarations:
 These are included just so everyone in Pascal world knows about everyone
 else.
 NOTE:
   This file and all the procedures within it is scoped within the Mimato
   procedure. They therefore have shared access to the Mimato variables.
}

PROCEDURE Fail(errNo: INTEGER);  { set theResult }
VAR errMsg: Str255;
BEGIN
  GetIndString(errMsg, errStrID, errNo);
  paramPtr^.returnValue := PasToZero(errMsg);
END;

{$IFC UNDEFINED SuperCard}

PROCEDURE  DoConfig(paramPtr: XCmdPtr);
BEGIN
  IF session = NIL THEN
  BEGIN
    Fail(noSession);
    Exit(DoConfig);
  END;
  SetUpDevice(session);  {We'll fix this some day.}
END;  {DoConfig}

PROCEDURE  DoInit(paramPtr: XCmdPtr);
{
 This routine initialises a session. A session is initialized by creating
 a session block on the (application) heap. The session block contains history
 and state data for the session.
 If a session has already been initialized no new session is created. There
 can only be one session at a time. A session ends when HyperCard quits.
}
VAR
  aHandle: Handle;
  tempName: Str255;
  tempPath: Str255;

PROCEDURE PatchGetNextEvent(session: MMSesHandle);
  BEGIN
    aHandle := GetResource('MMpt', 6968);   {Load the patch.}
    DetachResource(aHandle);
    MoveHHi(aHandle);
    HLock(aHandle);
    session^^.origGNE := GetTrapAddress(kGNETrapNum);
    SetupGNEPatch(session, aHandle^);
    session^^.gnePatch := aHandle;
  END; {PatchGetNextEvent}

PROCEDURE PatchCopyBits(hcPort: GrafPtr; session: MMSesHandle);
  BEGIN
    aHandle := GetResource('MMpt', 6970);
    DetachResource(aHandle);
    MoveHHi(aHandle);
    HLock(aHandle);
    session^^.origCB := GetTrapAddress(kCBTrapNum);
    SetupCBPatch(hcPort, session, aHandle^);
    session^^.cbPatch := aHandle;
  END;

PROCEDURE PatchMenuSelect(session: MMSesHandle);
  BEGIN
    aHandle := GetResource('MMpt', 6967);
    DetachResource(aHandle);
    MoveHHi(aHandle);
    HLock(aHandle);
    session^^.origMS := GetTrapAddress(kMSTrapNum);
    SetupMSPatch(session, aHandle^);
```

```
      session^^.msPatch := aHandle;
   END; {PatchMenuselect}

BEGIN
   IF session = NIL THEN BEGIN
      WITH paramPtr^ DO
      IF paramCount >= 2 THEN BEGIN
         HLock(params[2]);
         ZeroToPas(params[2]^, tempName);
         HUnlock(params[2]);
         IF paramCount > 2 THEN BEGIN
            HLock(params[3]);
            ZeroToPas(params[3]^,tempPath);
            HUnlock(params[3]);
         END
         ELSE tempPath := '';
      END
      ELSE BEGIN
         GetIndString(tempName, kDivStrID, kDefaultSegName);
         GetIndString(tempPath, kDivStrID, kDefaultPathName);
      END;

IF NOT CreateMMSession(tempName,tempPath) THEN BEGIN  {Sets up the '<session> state-holder.}
         Fail(kInitErr);
         Exit(DoInit);
      END;

CreateCommBlock;
      SetUpHC;
      PatchCopyBits(session^^.theTools^^.tools[kHCItem].hc^^.windoid, session);
      PatchGetNextEvent(session);
      PatchMenuSelect(session);
      VBLInit(session);

{Make sure media device is configure properly.}
      DoConfig(paramPtr);
   END;
END; {DoInit}

{$ENDC}

PROCEDURE    DoOpen(paramPtr: XCmdPtr);
{
 This procedure opens a new segment browser.
}
VAR
   segFName: Str255;
   pathName: Str255;
   vRefVal:  INTEGER;
BEGIN
   IF session = NIL THEN
   BEGIN
      Fail(noSession);
      Exit(DoOpen);
   END;

WITH paramPtr^ DO
   BEGIN
      IF paramCount >= 2 THEN BEGIN
         HLock(params[2]);
         ZeroToPas(params[2]^, segFName);
         HUnlock(params[2]);
         IF paramCount = 3 THEN BEGIN
            HLock(params[3]);
            ZeroToPas(params[3]^, pathName);
            HUnlock(params[3]);
         END
         ELSE pathName := '';
      END
```

```
      ELSE Exit(DoOpen);
      vRefVal := 0;
      IF OpenNewSegment(session, segFName, pathName, vRefVal) <> noErr THEN
        Fail(kMiscFileErr);
    END; {with}
END; {DoOpen}

PROCEDURE   DoPlay(paramPtr: XCmdPtr);
{
 If no fourth argument is given to this procedure it is assumed that
 the name of the segment being requested played is in the currently active
 segment file (the front one.)
 Otherwise a fourth argument is expected to be the name of a segment file.
}
VAR
  segName: Str255;
  segFName: Str255;

BEGIN
  IF session = NIL THEN
  BEGIN
    Fail(noSession);
    Exit(DoPlay);
  END;
  {Get the segment name and play it too.}
  WITH paramPtr^ DO IF paramCount > 1 THEN BEGIN
    HLock(params[2]);
    ZeroToPas(params[2]^, segName);
    HUnlock(params[2]);
    IF paramCount = 2 THEN BEGIN
        VidSegPlay(session, segName, GetVSegFName(session), FALSE);
      {*
      ELSE IF StringMatch('SSEG', params[2]^) <> NIL THEN SoundSegPlay(params[3])
      ELSE IF StringMatch('SEQU', params[2]^) <> NIL THEN SequencePlay(params[3])
      *)
    END
    ELSE IF paramCount = 3 THEN BEGIN
      HLock(params[3]);
      ZeroToPas(params[3]^, segFName);
      HUnlock(params[3]);
      VidSegPlay(session, segName, segFName, FALSE);
    END;
  END;
END; {DoPlay}

PROCEDURE   DoClose(paramPtr: XCmdPtr);
{
 This procedure is called to close a sequence. Sequences are kept track of in
 linked list in the session handle.
 <params[2]> contains the name of the sequence we want to reference. If no
 session is open with the given name the command is ignored.
 You want to close a sequence once it has finished or possibly to free up space.
 If the second argument <params[2]> to DoClose is 'ALL' then all currently open
 sequences should be closed.
}
VAR
  segName:     Str255;
  aSegBoard:   SegBoardHndl;
  aFileList:   FileListHandle;
  count:       INTEGER;
BEGIN
  IF session = NIL THEN
  BEGIN
    Fail(noSession);
    Exit(DoClose);
  END;
  WITH paramPtr^ DO BEGIN
    IF paramCount = 2 THEN BEGIN
      HLock(params[2]);
      ZeroToPas(params[2]^, segName);
```

```
        HUnlock(params[2]);
        DisposeSegBoard(session, segName);
      END;
    END;
END; {DoClose}

PROCEDURE  DoActive(paramPtr: XCmdPtr);
{
 This procedure activates a segment file by making it the front
 one.
}
VAR
  segFName:    Str255;
  aFileList:   FileListHandle;
  count:       INTEGER;
BEGIN
  IF session = NIL THEN
  BEGIN
    Fail(noSession);
    Exit(DoActive);
  END;
  WITH paramPtr^ DO BEGIN
    IF paramCount = 2 THEN BEGIN
      HLock(params[2]);
      ZeroToPas(params[2]^, segFName);
      HUnlock(params[2]);
      aFileList := session^^.openSegFiles;
      count := 0;
      WHILE aFileList <> NIL DO BEGIN
        count := count+1;
        IF EqualString(segFName, aFileList^^.segFileName, FALSE, FALSE) THEN Leave;
        aFileList := aFileList^^.nextFile;
      END;
      IF aFileList <> NIL THEN BringSeg2Front(session, count);
      {"ELSE OpenSegFile..."}
    END;
  END;
END; {DoActive}

PROCEDURE DoAdd(paramPtr: XCmdPtr);
{
 Adds an element to the sessions Micon or Icon lists. If an icon is added
 to the list the Icon's rectangle should be redrawn to reflect
 the addition.
 The second parameter in the paramPtr array is the type of element
 (Micon or Icon) to add and the third is it's name. The fourth parameter
 is the top left point of the (m)icon.
}
VAR
  segName:     Str255;
  tempStr1:    Str255;
  tempStr2:    Str31;
  count, i:    INTEGER;
  offset:      Point;

BEGIN
  IF session = NIL THEN
  BEGIN
    Fail(noSession);
    Exit(DoAdd);
  END;
  WITH paramPtr^ DO BEGIN
    IF paramCount >= 4 THEN BEGIN
      HLock(params[3]);
      ZeroToPas(params[3]^, segName);
      HUnlock(params[3]);

{Get two coordinates of point}
      ZeroToPas(params[4]^, tempStr1);
      count := 0;
```

```
      FOR i := 1 TO INTEGER(tempStr1[0]) DO BEGIN
        IF tempStr1[i] = ',' THEN count := 1;
        IF count <> 0 THEN tempStr2[i-count] := tempStr1[i];
      END;
      tempStr1[0] := Char(count-1);
      tempStr2[0] := Char(i-count-1);

offset.h := INTEGER(StrToLong(tempStr1));
      offset.v := INTEGER(StrToLong(tempStr2));

{Check if we've specified a browser name too.}
      IF paramCount = 5 THEN BEGIN
        HLock(params[5]);
        ZeroToPas(params[5]^, tempStr1);
        HUnlock(params[5]);
      END
      ELSE tempStr1 := GetVSegFName(session);

IF StringMatch('MICON', params[2]^) <> NIL THEN
        AddHCMicon(segName, tempStr1, offset)
      ELSE IF StringMatch('ICON', params[2]^) <> NIL THEN
        AddHCIcon(segName, tempStr1, offset);
    END;
  END;
END; {DoAdd}

PROCEDURE  DoExcept(paramPtr: XCmdPtr);

Handles exceptions.

VAR
  tempStr:     Str255;
  tempHandle:  Handle;
BEGIN
  IF session = NIL THEN
  BEGIN
    Fail(noSession);
    Exit(DoExcept);
  END;
  WITH paramPtr^ DO
  BEGIN
    IF paramCount >= 2 THEN BEGIN
      tempStr[0] := Char(0);
      IF StringMatch('SETFRAME', params[2]^) <> NIL THEN BEGIN
        IF paramCount >= 3 THEN BEGIN
          ZeroToPas(params[3]^, tempStr);
          IF session^^.hasOverlay THEN GenLockOff(session^^.refVal);
          SendCmd(kSearch, @tempStr, session);  {Go till absoluteRef}
          IF session^^.hasOverlay THEN BEGIN
            GenLockOn(session^^.refVal);
            ClearBkgndWind(session);
          END;
        END;
      END
      ELSE IF StringMatch('GETFRAME', params[2]^) <> NIL THEN BEGIN
        paramPtr^.returnValue := PasToZero(NumToStr(FrameNo(session)));
      END
      ELSE IF StringMatch('FORWARD', params[2]^) <> NIL THEN BEGIN
        SendCmd(kPlayFwd, @tempStr, session);   {Play forward}
        IF session^^.hasOverlay THEN ClearBkgndWind(session);
      END
      ELSE IF StringMatch('REVERSE', params[2]^) <> NIL THEN BEGIN
        SendCmd(k30FPSRev, @tempStr, session);  {Play reverse}
        IF session^^.hasOverlay THEN ClearBkgndWind(session);
      END
      ELSE IF StringMatch('STOP', params[2]^) <> NIL THEN BEGIN
        WITH session^^.theTools^^.tools[kVideoItem].film^^.theSegment^^ DO
        BEGIN
          currSegment := NIL;
          runStart := 0;
```

```
        END;
        tempStr[0] := Char(0);
        SendCmd(kDevStop, @tempStr, session);
        tempHandle := PasToZero('FALSE');
        SetGlobal('segmentPlaying', tempHandle);
        DisposHandle(tempHandle);
      END
      ELSE IF StringMatch('AUDIOLEFT', params[2]^) <> NIL THEN BEGIN
        SendCmd(kLeftCh, @tempStr, session);    {Left channel on}
      END
      ELSE IF StringMatch('AUDIORIGHT', params[2]^) <> NIL THEN BEGIN
        SendCmd(kRightCh, @tempStr, session);   {Right channel on}
      END
      ELSE IF StringMatch('STEREO', params[2]^) <> NIL THEN BEGIN
        SendCmd(kStereo, @tempStr, session);    {Stereo on}
      END
      ELSE IF StringMatch('AUDIOOFF', params[2]^) <> NIL THEN BEGIN
        SendCmd(kAudioOff, @tempStr, session);  {Sound off}
      END
      ELSE IF StringMatch('EJECT', params[2]^) <> NIL THEN BEGIN
        SendCmd(kEject, @tempStr, session);     {Eject disk.}
      END
      ELSE IF StringMatch('VIDEOON', params[2]^) <> NIL THEN BEGIN
        SendCmd(kVideoOn, @tempStr, session);   {Eject disk.}
      END
      ELSE IF StringMatch('VIDEOOFF', params[2]^) <> NIL THEN BEGIN
        SendCmd(kVideoOff, @tempStr, session);  {Eject disk.}
      END
    END;
  END;
END; {DoExcept}

PROCEDURE  DoExists(paramPtr: XCmdPtr);
{
 Checks whether a segment and/or a segment browser exists.
}
VAR
  segName: Str255;
  segFName: Str255;
BEGIN
  IF session = NIL THEN
  BEGIN
    Fail(noSession);
    Exit(DoExists);
  END;
  {Get the segment name and play it too.}
  WITH paramPtr^ DO
  BEGIN
    IF paramCount >= 2 THEN BEGIN
      HLock(params[2]);
      ZeroToPas(params[2]^, segName);
      HUnlock(params[2]);
      IF paramCount >= 3 THEN BEGIN
        HLock(params[3]);
        ZeroToPas(params[3]^, segFName);
        HUnlock(params[3]);
      END
      ELSE segFName := GetVSegFName(session);
      VidSegExists(session, segName, segFName);
    END;
  END;
END; {DoExists}

PROCEDURE  DoAuto(paramPtr: XCmdPtr);
{
 Turns on/off autolinks.
}
VAR
  segName: Str255;
```

```
BEGIN
  IF session = NIL THEN
  BEGIN
    Fail(noSession);
    Exit(DoAuto);
  END;
  {Get the segment name and play it too.}
  WITH paramPtr^ DO
  BEGIN
    IF paramCount = 2 THEN
    IF StringMatch('ON', params[2]^) <> NIL THEN
      AutoLinks(session, TRUE)
    ELSE AutoLinks(session, FALSE);
  END;
END; {DoAuto}

PROCEDURE   DoReturnLink(paramPtr: XCmdPtr);
{
 Turns on/off link return.
}
BEGIN
  IF session = NIL THEN
  BEGIN
    Fail(noSession);
    Exit(DoReturnLink);
  END;
  {Get the segment name and play it too.}
  WITH paramPtr^ DO
  BEGIN
    IF paramCount = 2 THEN
    IF StringMatch('ON', params[2]^) <> NIL THEN
      LinkReturn(session, TRUE)
    ELSE LinkReturn(session, FALSE);
  END;
END; {DoReturnLink}

PROCEDURE DoRemove(paramPtr: XCmdPtr);
{
 Removes an element from the sessions Micon or Icon lists.
 The second parameter in the paramPtr array is the type of elemnt
 (Micon or Icon) to remove and the third is it's name (or "ALL" if
 all elements of the given type should be removed).
}
VAR
  segName:  Str255;

BEGIN
  IF session = NIL THEN
  BEGIN
    Fail(noSession);
    Exit(DoRemove);
  END;
  WITH paramPtr^ DO BEGIN
    IF paramCount = 3 THEN BEGIN
      HLock(params[3]);
      ZeroToPas(params[3]^, segName);
      HUnlock(params[3]);
      IF StringMatch('MICON', params[2]^) <> NIL THEN BEGIN
        IF EqualString(segName, 'ALL', FALSE, FALSE) THEN RemoveAllHCMIcons
        ELSE RemoveHCMIcon(segName);
      END
      ELSE IF StringMatch('ICON', params[2]^) <> NIL THEN BEGIN
        IF EqualString(segName, 'ALL', FALSE, FALSE) THEN RemoveAllHCIcons
        ELSE RemoveHCIcon(segName);
      END;
    END;
  END;
END; {DoRemove}

PROCEDURE   DoQuit(paramPtr: XCmdPtr);
```

```
{Check if there is an active session and if so quit tools.
 Don't end if the session is currently owned by the tools, i.e. if
 we're in the tool event loop.

PROCEDURE UnpatchTrap(originalPtr: Longint; patchHandle: Handle; trapNum: INTEGER);
  {
   This procedure will unpatch a GetNexEvent and dispose of
   the handle containing the old patch.
  }
  BEGIN
    SetTrapAddress(originalPtr, trapNum);
    HUnlock(patchHandle);
    DisposHandle(patchHandle);
  END;

BEGIN
  IF session = NIL THEN
  BEGIN
    Fail(noSession);
    Exit(DoQuit);
  END;
  ResetHC;
  DisposeTools(session^^.theTools);
  {Unpatch patches.}
  WITH session^^ DO UnpatchTrap(origMS, msPatch, kMSTrapNum);
  WITH session^^ DO UnpatchTrap(origCB, cbPatch, kCBTrapNum);
  WITH session^^ DO UnpatchTrap(origGNE, gnePatch, kGNETrapNum);
  {deinstall vbl task.}
  VBLRemove(session);
  IF session^^.hasOverLay THEN
  BEGIN
    DisposeRgn(session^^.keyClip);
    IF session^^.hasOverlay THEN DisposeWindow(session^^.bkgndWindow);
    {DisposeMicon etc..............}
  END;
  DisposHandle(Handle(session));
END; {DoQuit}

{----------------------------------------------------------------------------------}
{                                  Utilities                                       }
{----------------------------------------------------------------------------------}
FUNCTION SetupDevBlock: MDevBlockHandle;
{
 This procedure takes a communication block resource 'comB' with ID = 0
 and makes a communication block from it.
 If no such resource exists the procedure returns NIL.
}
TYPE
  ResBlockHandle = ^ResBlockPtr;
  ResBlockPtr  = ^ResBlock;
  ResBlock  = RECORD
    drvrCodeID: INTEGER;
    portConfig: INTEGER;
    theData:    INTEGER;    {Data starts here.}
  END;

VAR
  theDevBlock: MDevBlockHandle;
  theResource: ResBlockHandle;
  tempType:    ResType;
  tempID:      INTEGER;
  tempStr:     Str255;
  dataPtr:     StringPtr;
  blockLength: INTEGER;
  count:       INTEGER;

FUNCTION GetDevBlockSize(theResource: ResBlockHandle): Longint;
  {
   Based on the given resource formatted as specified for device
```

```
  blocks, this function will return the storage size that must
  be allocated to create an MDevBlock.
}
VAR
   startPtr:   StringPtr;
   allocSize:  INTEGER;
   resSize:    INTEGER;
   offset:     INTEGER;

BEGIN
   startPtr := @theResource^^.theData;
   resSize := GetHandleSize(Handle(theResource))-(sizeof(ResBlock)-2);
   allocSize := 0;
   offset := 0;
   WHILE resSize > offset DO BEGIN
      offset := offset + INTEGER(startPtr^[offset])+1;
      allocSize := allocSize+1;
   END;
   GetDevBlockSize := allocSize*sizeof(DevEntry)+sizeof(MDeviceBlock);
END; {GetDevBlockSize}

PROCEDURE FillBlockElements(theDevBlock: MDevBlockHandle; dataPtr: StringPtr; count, blockLength:INTEGER);
{
 Starting at the <count> offset into <dataPtr>, this procedure
 fills a device block handle.
}
VAR
   shortStep: INTEGER;
   i,j:       INTEGER;
BEGIN
   j := 0;
   WITH theDevBlock^^ DO WHILE count < blockLength DO BEGIN
      (*
      shortStep := INTEGER(dataPtr^[count]);
      FOR i := 0 TO shortStep DO BEGIN
         devData[j][i] := dataPtr^[count];
         count := count+1;
      END;
      MacsBugStr('User Break: MDevBlockHandle');
      *)
      devData[j] := StringPtr(Longint(dataPtr) + Longint(count))^;
      count := count + INTEGER(devData[j][0]) + 1;
      j := j+1;
   END;
END; {FillBlockElements}

BEGIN
   theDevBlock := NIL;
   theResource := ResBlockHandle(GetResource('comB', 0));
   IF theResource <> NIL THEN BEGIN
      {First allocate a handle that is big enough.}
      blockLength := GetDevBlockSize(theResource);
      theDevBlock := MDevBlockHandle(NewHandle(blockLength));
      IF theDevBlock = NIL THEN BEGIN
         ReleaseResource(Handle(theResource));
         SetupDevBlock := NIL;
         Exit(SetupDevBlock);
      END;

HLock(Handle(theResource));
      GetResInfo(Handle(theResource), tempID, tempType, tempStr);
      WITH theDevBlock^^ DO BEGIN
         nextDevice := NIL;
         driverCode := NIL; {Try loading code resource here.}
         deviceName := tempStr;
         portConfig := theResource^^.portConfig;

driver1Name := StringPtr(@theResource^^.theData)^;
         driver2Name := StringPtr(ORD(@theResource^^.theData)+ORD(driver1Name[0])+ORD(1))^;
```

```
        {These should obviously not be hardcoded in future.}
        inPortRef := -6;
        outPortRef := -7;

count := INTEGER(driver1Name[0])+INTEGER(driver2Name[0])+2;
      END; {with} dataPtr := @theResource^^.theData;
      blockLength := GetHandleSize(Handle(theResource))-sizeof(ResBlock)+2;
      FillBlockElements(theDevBlock, dataPtr, count, blockLength);

HUnlock(Handle(theResource));
      ReleaseResource(Handle(theResource));
    END;

SetupDevBlock := theDevBlock;
  END; {SetupDevBlock}

PROCEDURE CreateCommBlock;
{
 This procedure creates a communication block that the patches to the event loop
 in HC uses to send HT messages to HyperCard.
}
VAR
  blockHandle:  CommBlockHandle;

BEGIN
  blockHandle := CommBlockHandle(NewHandle(sizeof(CommBlockHeader)));
  blockHandle^^.theIdentifier := 'ver0.1KCOLBMMOC';
  {empty linked list.}.
  blockHandle^^.htMessage := NIL;
END;

FUNCTION CreateMMSession(segBoardName, pathName: Str255): BOOLEAN;
{
 This procedure creates a new multi media session. It is assumed that no
 session exists yet when this procedure is made. If one already exists the
 system will exibit unpredictable behavior.
 If a call to "FindMMSession" returns NIL it can be assumed that no session
 has been created.
}
VAR
  mmHandle:     MMSesHandle;
  r:            Rect;

FUNCTION InitPixmap(pixmap: PixMapHandle; r: Rect): BOOLEAN;
  VAR
    myBits:     Ptr;
    imageSize:  Longint;
    cTable:     CTabHandle;
    gd:         GDHandle;
    wPort:      CGrafPtr;
  BEGIN
    InitPixmap := FALSE;
    {Copy the current windowmanager port's color table.}
    GetCWMgrPort(wPort);
    CopyPixMap(wPort^.portPixMap, pixMap);
    {Initialize pix Map}
    { assumes 8 bpp }
    pixmap^^.rowBytes   := r.right - r.left;
    imageSize := Longint((r.bottom - r.top)) * Longint(pixmap^^.rowBytes);
    myBits := NewPtrClear(imageSize);

IF (myBits = NIL) THEN
      Exit(InitPixmap);

pixmap^^.rowBytes := pixmap^^.rowBytes + $8000; { be a pixmap }
    pixmap^^.baseAddr := myBits;
    pixmap^^.bounds   := r;
```

```
    IF (pixmap^^.pixelSize <> 8) THEN
    BEGIN
      pixmap^^.pixelSize := 8;
      pixmap^^.cmpSize   := 8;
      pixmap^^.pixelType := 0;   { chunky pixels    }
      pixmap^^.cmpCount  := 1;   { for chunky pixels }
    END;

InitPixmap := TRUE;
  END;  {InitPixmap}

BEGIN
  mmHandle := MMSesHandle(NewHandle(sizeof(MMSession)));
  HLock(Handle(mmHandle));
  mmHandle^^.theIdentifier := 'ver0.1NOISSESMM';
  {empty linked list.}
  {eventually we might want to read a file from the system folder containing
   the state of the session last time we entered the magazine.
  }
  session := mmHandle;
  IF NOT ScreenInit(mmHandle) THEN BEGIN
    HUnlock(Handle(mmHandle));
    DisposHandle(Handle(mmHandle));
    CreateMMSession := FALSE;
    Exit(CreateMMSession);
  END;

mmHandle^^.theTools := NewTools(segBoardName, pathName);
  mmHandle^^.devBlocks := SetupDevBlock;
  {This is necessary to create a PixMapHandle in segboard.}
  {Initialize session fields.}
  mmHandle^^.miconList := NIL;
  mmHandle^^.iconList := NIL;
  mmHandle^^.linksChanged := FALSE;
  mmHandle^^.toolFlag := FALSE;
  mmHandle^^.vblFlag := FALSE;
  mmHandle^^.autoLinks := FALSE;
  mmHandle^^.linkReturn := FALSE;
  mmHandle^^.vblTaskRec := NIL;
  IF session^^.hasOverlay THEN SendCardMessage('Iconify icon,shrink')
  ELSE BEGIN
    mmHandle^^.currScreenIcon := NewPixMap;
    SetRect(r, 0,0,khIcon,kvIcon);
    IF NOT InitPixMap(mmHandle^^.currScreenIcon, r) THEN BEGIN
      MacsBugStr('User Break: Could not initialize pix map.');
    END;
  END;

HUnlock(Handle(mmHandle));
  CreateMMSession := TRUE;
END; {CreateMMSession}

FUNCTION   FindMMSession: MMSesHandle;
{
 This function finds a session if one has been opened and returns a handle
 to it.
 If no session has been opened it returns NIL.
 A session is created to let the tool keep state. The "trick" is just to
 allocate a block of storage on the application heap and to leave the block
 floating when exiting the XCMD. We search though the heap when this Function
 is called and locate the block. The handle to it is returned by this function
 if the block is found, NIL otherwise.
}

{Define a type here to access the blockheader.}

BEGIN
 {
  CODE TO FIND STATE HANDLE.
```

```
END;
```

```
History:
First written: 27.5.89 By:   Hans Peter Brøndmo (hpb)

pascal ToolUtils.p

This unit contains general utilities for the event patch.

}
{SD-} { MacsBug symbols on }
{SR-} { No range checking }

UNIT ToolUtils;

INTERFACE

USES    MemTypes, QuickDraw, OSIntf, ToolIntf, PackIntf,
        CSLib, MMTypes, FileProcs, LinkFile, GNEPatch, HistoryUtils, MMDEffects;

CONST
    dummy =    9999;       {Just so I remember where this goes.}

PROCEDURE   ClickInTool(session: MMSesHandle; theTool: INTEGER; clickPt: Point);

PROCEDURE   ToolDrag(aWindow: WindowPtr; stPt: Point);

FUNCTION    FindMMSession: MMSesHandle;

FUNCTION    FindCommBlock: CommBlockHandle;

PROCEDURE   DragTask;

FUNCTION    ToolWindoid(aWindoid:   WindowPtr; mmTools: MMToolsHandle): INTEGER;

PROCEDURE   MMTask(session: MMSesHandle);

PROCEDURE   OpenAndDraw(session: MMSesHandle);

PROCEDURE   DrawBkgndWindow(session:MMSesHandle);

PROCEDURE   DrawColorPict(currPict: PixMapHandle; iconRef: INTEGER; index: INTEGER; aRect: Rect);

PROCEDURE   RemovePortMicons(thePort: GrafPtr; session: MMSesHandle);

PROCEDURE   RemoveMicon(miconName, segFName: Str31; miconPort: GrafPtr; session: MMSesHandle);

FUNCTION    GetIconIndex(iconName, iconFName: Str31; session: MMSesHandle): INTEGER;

PROCEDURE   ShowHideTool(session: MMSesHandle; toolNo: INTEGER);

PROCEDURE   PlaceByOut(aLink: LinkHandle;VAR oldList: LinkListHandle);

PROCEDURE   PlaceByIn(aLink: LinkHandle;VAR oldList: LinkListHandle);

PROCEDURE   AutoLinks(session: MMSesHandle; onOff: BOOLEAN);

PROCEDURE   LinkReturn(session: MMSesHandle; onOff: BOOLEAN);

PROCEDURE   BringSeg2Front(session: MMSesHandle; item: INTEGER);

PROCEDURE   SendSeg2Back(session: MMSesHandle; item: INTEGER);

PROCEDURE   SelectSegBoard(session: MMSesHandle; whichWindow: WindowPtr);

FUNCTION    MakeSegBoard(name: Str31; session: MMSesHandle; hasOverlay: BOOLEAN): SegBoardHndl;

PROCEDURE   PutInAlpha(VAR listHead: SegListHndl; newElement: SegListHndl);

FUNCTION    BuildSegNames(VAR listHead: SegListHndl; refVal: INTEGER): INTEGER;
```

```
PROCEDURE    DisposeSegNames(VAR segNames: SegListHndl);

PROCEDURE    NotifyUser(selector: INTEGER; session: MMSesHandle);

IMPLEMENTATION
{******************************************************************************
 *                                                                            *
 *                                                                            *
 ******************************************************************************}

PROCEDURE    MacsBugStr(signalStr:   Str255);
    INLINE  $abff;

PROCEDURE ClickInTool(session: MMSesHandle; theTool: INTEGER; clickPt: Point);
{ Called when a click has occured in one of the mm tools.
}
BEGIN
  CASE theTool OF
    kGlobalItem:
    BEGIN
    END;
    kVideoItem:
    BEGIN
      VideoClick(session, clickPt, @MMTask);
    END;
    kSoundItem:
    BEGIN
    END;
    kLinkItem:
    BEGIN
      LinkClick(session, clickPt, @MMTask);
    END;
    kHCItem:
    BEGIN
    END;
    OTHERWISE IF theTool < 0 THEN BEGIN
      SegBoardClick(session, clickPt, -theTool, @MMTask);
    END;
  END; {case}
END; {ClickInTool}

PROCEDURE ToolDrag(aWindow: WindowPtr; stPt: Point);
{
 Drags a window around while calling DragTask to keep Micons etc alive.
}
VAR
  draggedTo: Longint;
  savePort:  GrafPtr;
  wPort:     GrafPtr;
  limitRect: Rect;
  grayRgn:   RgnHandle;
  windowRgn: RgnHandle;
  wTopLeft:  Point;

BEGIN
  {
    IMPLEMENTATION FOR DRAGGING A WINDOW AROUND w/o CAUSING EVERYTHING ELSE
    TO DIE.
  }
END; {ToolDrag}

FUNCTION    FindHandle(idString: Str31): Handle;
{
 This function finds a handle in the application heap starting with the
 string <idString>.
 If no such handle is found it returns NIL.
}

{Define a type here to access the blockheader.}
```

```
BEGIN
  {
  CODE TO LOCATE AN "INFORMATION BLOCK" HERE.
  }

FUNCTION    FindMMSession: MMSesHandle;
{
 If no session has been opened it returns NIL.
 A session is created to let the tool keep state. The "trick" is just to
 allocate a block of storage on the application heap and to leave the block
 floating when exiting the XCMD. We search though the heap when this Function
 is called and locate the block. The handle to it is returned by this function
 if the block is found, NIL otherwise.
}
BEGIN
  FindMMSession := MMSesHandle(FindHandle('ver0.1NOISSESMM'));
END;

FUNCTION    FindCommBlock: CommBlockHandle;
{
 This function finds a commblock if one has been opened and returns a handle
 to it.
 If no commblock can be found it returns NIL.
 A commblock is created to let the tool patches communicate to HC.
}
BEGIN
  FindCommBlock := CommBlockHandle(FindHandle('ver0.1KCOLBMMOC'));
END;

PROCEDURE DragTask;
{
 Called repeatedly from DragGrayRgn to keep the world active and alive while windows
 are being dragged around.
}
BEGIN

END;

FUNCTION ToolWindoid(aWindoid: WindowPtr; mmTools: MMToolsHandle): INTEGER;
{
 This function will return the tool index if aWindoid is one of the tools exept
 if it is a segment tool. Then it will return the negative of the number of the
 segment.
 Otherwise (if it is the HC window or windoid) it returns 0.
}
VAR
   i,count:  INTEGER;
   aTool:    SegBoardHndl;
BEGIN
  ToolWindoid := 0;
  count := 0;
  FOR i := 1 to kNoTools DO
  IF i = kSegBoardItem THEN BEGIN
    aTool := mmTools^^.tools[i].segs;
    WHILE aTool <> NIL DO BEGIN
      count := count+1;
      IF aTool^^.windoid = aWindoid THEN BEGIN
        ToolWindoid := -count;
        Exit(ToolWindoid);
      END;
      aTool := aTool^^.nextBoard;
    END;
  END
  ELSE IF aWindoid = mmTools^^.tools[i].theTool^^.windoid THEN
    IF i <> kHCItem THEN BEGIN
      ToolWindoid := i;
      Exit(ToolWindoid);
    END ELSE Exit(ToolWindoid);
END; {ToolWindoid}
```

```
PROCEDURE MMTask(session: MMSesHandle);
{
Called repeatedly by the main event loop this routine is responsible
of telling all tools and thereby all media "what time it is" and thereby
what they should be doing. This routine should be called repetitively and
as often as possible.
}
VAR
  savePort:   GrafPtr;
  thisTick:   Longint;

PROCEDURE UpdateMicons(micons: MiconListHandle);
  BEGIN
    {
      CODE FOR UPDATING MICONS HERE.
    }
  END; {UpdateMicons}

PROCEDURE SegBoardTask(theBoard: SegBoardHndl);
  {
    Updates the segment board, monitors the board tasks etc. This routine
    is called by all program loops - including "on mousedown" type constructs
    and event loops. The routine is normally called indirectly though from
    the MMTask procedure.

When segments are activated it might be neat if the segment "board"/windoid
    would indicate which segment is currently active by hiliting it's icon/picture.
  }
  VAR
    segMRect:   Rect;

BEGIN
  END; {SegBoardTask}

PROCEDURE DoLinkPopup(theLinkTool: LinkToolHndl);
  {
    Causes the link popup to appear at the mouse location.
  }
  VAR
    thePopUp:    MenuHandle;
    menuChoice:  MenuCvt;
    mousePt:     Point;
    testRect:    Rect;
    lastWind:    WindowPtr;
    globPt:      Point;
    aLink:       LinkHandle;
    screenPort:  GrafPtr;
    aMiconList:  MiconListHandle;

BEGIN
    {
      lastWind has to be stored here because PopUpMenuSelect somehow
      "magically" lets the application pass through the event loop
      once before returning. The event posted seems to be "mouseUp"
      which causes the lastWind parameter to be reset by a call to
      GetLink. It's weird but true!
    }
    lastWind := theLinkTool^^.lastClickWind;
    WITH theLinkTool^^ DO BEGIN
      lastClickWind := WindowPtr(-1);
      lastClickWhen := 0;
    END;
    aLink := GetLink(lastWind, theLinkTool^^.currLinks);

thePopUp := GetMenu(kPopUpIndMenu);
    GetMouse(mousePt);
    LocalToGlobal(mousePt);
    InsertMenu(thePopUp, -1);
```

```
              IF aLink^^.toSegType = kVSeg THEN EnableItem(thePopUp, 5);

menuChoice.theResult := PopUpMenuSelect(thePopUp, mousePt.v-8, mousePt.h-30, 1);
           DeleteMenu(thePopUp^^.menuID);
           DisposeMenu(thePopUp);
           IF menuChoice.theItemNumber <> 0 THEN BEGIN CASE menuChoice.theItemNumber OF
              kGoLink:
              BEGIN
                 GoToLink(session, aLink);
              END;

kMarkLink:
              BEGIN

END;

kChangeWindow:
              BEGIN
                 WITH aLink^^ DO aMiconList := GetMiconList(toSegment, toSegFile, linkInd.linkWind, session);
                 testRect := aMiconList^^.miconRect;

CASE aLink^^.linkInd.windType OF
                    kNoTitle: WITH aLink^^.linkInd DO BEGIN
                       windType := kTitle;
                       WITH linkPt DO BEGIN
                          v := v - 14;
                          h := h - 1;
                       END;
                       OffsetRect(testRect, 1, 14);
                    END;

kTitle:
                    WITH aLink^^.linkInd DO BEGIN
                       windType := kWindoid;
                       WITH linkPt DO BEGIN
                          v := v + 14;
                          h := h + 1;
                       END;
                       OffsetRect(testRect, -1, -14);
                    END;
                    kWindoid: aLink^^.linkInd.windType := kNoTitle;
                 END; (case)

DisposeWindow(aLink^^.linkInd.linkWind);
                 aLink^^.linkInd.linkWind := GetNewWindow(aLink^^.linkInd.windType, NIL, theLinkTool^^.windoid);
                 aMiconList^^.miconPort := aLink^^.linkInd.linkWind;
                 aMiconList^^.miconRect := testRect;

WITH session^^ DO IF hasOverlay THEN SetPort(bkgndWindow)
                 ELSE BEGIN
                    GetWMgrPort(screenPort);
                    SetPort(screenPort);
                 END;
                 globPt := aLink^^.linkind.linkPt;
                 IF aLink^^.linkInd.onVideo THEN LocalToGlobal(globPt);
                 WITH globPt DO MoveWindow(aLink^^.linkInd.linkWind, h, v, FALSE);
                 ShowWindow(aLink^^.linkInd.linkWind);
                 session^^.linksChanged := TRUE;
              END;

kLinkInfo:
              BEGIN
                 HLock(Handle(aLink));
                 WITH aLink^^ DO FindHCSegCard(@toSegment, @toSegFile);
                 HUnlock(Handle(aLink));
              END;
              END; (Case)
           END; (if menuChoice)
```

```
END; (DoLinkPopup)

PROCEDURE DoHistPopup(theLinkTool: LinkToolHndl);
{
 Causes the history popup to appear at the mouse location.
}
VAR
  thePopUp:    MenuHandle;
  menuChoice:  MenuCvt;
  mousePt:     Point;
  testRect:    Rect;
  lastWind:    WindowPtr;
  globPt:      Point;
  aLink:       LinkHandle;
  screenPort:  GrafPtr;
  aMiconList:  MiconListHandle;

BEGIN
  {
    lastWind has to be stored here because PopUpMenuSelect somehow
    "magically" lets the application pass through the event loop
    once before returning. The event posted seems to be "mouseUp"
    which causes the lastWind parameter to be reset by a call to
    GetLink. It's weird but true!
  }
  lastWind := theLinkTool^^.lastClickWind;
  WITH theLinkTool^^ DO BEGIN
    lastClickWind := WindowPtr(-1);
    lastClickWhen := 0;
  END;

thePopUp := GetMenu(kPopUpHistMenu);
  GetMouse(mousePt);
  LocalToGlobal(mousePt);
  BuildHistoryMenu(theLinkTool, thePopUp);
  InsertMenu(thePopUp, -1);

menuChoice.theResult :=
    PopUpMenuSelect(thePopUp, mousePt.v-8, mousePt.h-30, theLinkTool^^.histCount+2);
  DoLinkHistory(session, menuChoice.theItemNumber);

DeleteMenu(thePopUp^^.menuID);
  DisposeMenu(thePopUp);
END; (DoHistPopup)

PROCEDURE LinkTask(theLinkTool: LinkToolHndl);
{
 Updates the Link tool, monitors the Link tasks etc. This routine
 is called by all program loops - including "on mousedown" type constructs
 and event loops. The routine is normally called indirectly though from
 the MMTask procedure.
}
BEGIN
  {FIRST. Check to see if mouse has been held down for popUp delay.}
  IF theLinkTool^^.lastClickWind <> WindowPtr(-1) THEN
    IF StillDown THEN
      IF thisTick - theLinkTool^^.lastClickWhen > kLinkClickDelay THEN
        WITH theLinkTool^^ DO IF histIndicator = lastClickWind THEN
          DoHistPopup(theLinkTool)
        ELSE DoLinkPopup(theLinkTool);

{SECOND. Check to see whether we must update link indicators.}
  IF session^^.autoLinks THEN UpdateIndicator(session, thisTick);
END; (LinkTask)

PROCEDURE VideoTask(aFilmTool: FilmToolHndl; refVal: INTEGER);
{
 Updates the filmtool, monitors the playing of video etc. This routine
 is called by all program loops - including "on mousedown" type constructs
 and event loops. The routine is normally called indirectly though from
```

```
the MMTask procedure.
The refVal parameter is a reference value for the colorspace board (driver).
}
VAR
   theRect:     Rect;
   iconCount:   INTEGER;
   vidSegment:  SegmentHandle;
   clipRgn:     RgnHandle;
   run:         BOOLEAN;
   segList:     LLHandle;
   theTicks:    Longint;
   keyColor:    RGBColor;
   tempClip:    RgnHandle;

BEGIN
  SetPort(aFilmTool^^.windoid);
  {Check if there is a video segment playing.}
  vidSegment := aFilmTool^^.theSegment;
  segList := vidSegment^^.currSegment;
  IF segList <> NIL THEN
  BEGIN
    WITH theRect DO BEGIN
      left := 254;
      top := 5;
      right := 286;
      bottom := 37;
    END;
    HLock(Handle(aFilmTool));
    WITH aFilmTool^^ DO BEGIN
      IF currIcon < 3 THEN currIcon := currIcon+1
      ELSE currIcon := 1;
      DrawIcon(animIcons[currIcon], theRect);
    END; {with}
    HUnlock(Handle(aFilmTool));

WITH vidSegment^^ DO IF (runStart = 0) OR (runStart = -1) THEN
    BEGIN {We're starting a segment.}
      RunVideo(vidSegment, session);
    END
    ELSE
    BEGIN
      {Test if we're closing in on the end of the segment.}
      IF (thisTick - vidSegment^^.runStart+30) >= (segList^^.outRefVal) THEN
      BEGIN
        IF CheckSegment(session, vidSegment) THEN
          StartNextSegment(session, vidSegment, refVal);
      END;
    END;
  END
  ELSE
    IF aFilmTool^^.theSegment^^.recording THEN
    BEGIN
      {is it time to do anything yet?}
      IF ABS(thisTick - aFilmTool^^.lastChecked) >= 30 THEN
      BEGIN
        aFilmTool^^.lastChecked := thisTick;
        IF aFilmTool^^.inActive THEN
        BEGIN
          SetRect(theRect, 214, 25, 242, 46);
        END
        ELSE
        BEGIN
          SetRect(theRect, 214, 2, 242, 23);
        END;
        SetPort(aFilmTool^^.windoid);
        tempClip := NewRgn;
        GetClip(tempClip);
        ClipRect(theRect);
        InvertRect(theRect);
        SetClip(tempClip);
```

```
      DisposeRgn(tempClip);
    END;
  END;
  {Check if there are other segments playing too.}
END; {VideoTask}

BEGIN
  GetPort(savePort);
  thisTick := TickCount; {Lets only do this once for each pass.}
  VideoTask(session^^.theTools^^.tools[kVideoItem].film, session^^.refVal);
  IF session^^.vblFlag THEN BEGIN
    session^^.vblFlag := FALSE;
    LinkTask(session^^.theTools^^.tools[kLinkItem].links);
    UpdateMicons(session^^.miconList);
  END;
  SetPort(savePort);
END; {MMTask}

{---------------------------------------------------------------------------
         Update routines for background window.
 ---------------------------------------------------------------------------}

PROCEDURE OpenAndDraw(session: MMSesHandle);
{Opens a PICT file with name pictName and refNum vRefNum and draws it
 in the current graf port clipping to the current clip region.
}
VAR
  err:        OSErr;
  pictRef:    INTEGER;
  pictName:   Str31;
  myPB:       ParamBlockRec;
  longCount:  Longint;
  myProcs:    CQDProcs;
  pictHand:   PicHandle;
  savePort:   GrafPtr;

BEGIN
  IF session^^.hasOverlay THEN BEGIN {Redundant but do it anyways fer sure.}
    GetPort(savePort);
    SetPort(GrafPtr(session^^.bkgndWindow));
    pictName := session^^.stillName;
    err := FSOpen(pictName, session^^.stillvRefNum, pictRef);

IF err = fnfErr THEN err := FSOpen(pictName, 0, pictRef);
    IF err <> noErr THEN
    BEGIN
      SetPort(SavePort);
      EXIT(OpenAndDraw);
    END;
    (*ELSE session^^.stillvRefNum := 0;*)

{Get the size of the file-512 = size of picture.}
    WITH myPB DO
    BEGIN
      ioCompletion := NIL;
      ioNamePtr := @pictName;
      ioVRefNum := session^^.stillvRefNum;
      ioVersNum := Byte(0);
      ioFDirIndex := 0;
    END;
    err := PBGetFInfo(@myPB, FALSE);
    IF err <> noErr THEN BEGIN
      SetPort(SavePort);
      EXIT(OpenAndDraw);
    END;

pictHand := PicHandle(NewHandle(myPB.ioFlLgLen - 512));
    IF pictHand = NIL THEN
    BEGIN
```

```
      err := FSClose(pictRef);
      SetPort(savePort);
      Exit(OpenAndDraw);
    END;

err := SetFPos(pictRef, fsFromStart, 512);

longCount := myPB.ioFlLgLen - 512;
    HLock(Handle(pictHand));
    err := FSRead(pictRef, longCount, Ptr(pictHand^));
    HUnlock(Handle(pictHand));

DrawPicture(pictHand, pictHand^^.picFrame);

err := FSClose(pictRef);
    session^^.theTools^^.tools[kVideoItem].film^^.stillPainted := TRUE;

DisposHandle(Handle(pictHand));
    SetPort(savePort);
  END;
END; (OpenAndDraw)

PROCEDURE DrawBkgndWindow(session: MMSesHandle);

This procedure updates the backround video/still window.
 Updating means redrawing to the intersection of the current visrgn
 and the key region and still rect.

VAR
  visRgn:   RgnHandle;
  keyRgn:   RgnHandle;
  stillRgn: RgnHandle;
  keyColor: RGBColor;
  savePort: GrafPtr;

BEGIN
  IF session^^.hasOverLay THEN
  BEGIN
    GetPort(savePort);
    SetPort(GrafPtr(session^^.bkgndWindow));

{If the full screen is painted then just do a redraw.}
    IF session^^.theTools^^.tools[kVideoItem].film^^.stillPainted THEN
      OpenAndDraw(session)
    ELSE
    BEGIN
      WITH keyColor DO   {Set key color.}
      BEGIN
        red   := $0000;
        green :=$0000;
        blue  := $FFFF;
      END;

{Create some new regions.}
      visRgn := NewRgn;
      keyRgn := NewRgn;
      stillRgn := NewRgn;

CopyRgn(GrafPtr(session^^.bkgndWindow)^.visRgn, visRgn);
      CopyRgn(session^^.keyClip, keyRgn);
      SectRgn(keyRgn, visRgn, keyRgn);
      IF NOT EmptyRgn(keyRgn) THEN
      BEGIN {Fill the intersection with the key color.}
        RGBForeColor(keyColor);
        PaintRgn(keyRgn);
        keyColor.blue := 0;
        RGBForeColor(keyColor);     {Set to black for copybits.}
      END;

RectRgn(stillRgn, session^^.bkgndRect);
```

```
      DiffRgn(stillRgn, session^^.keyClip, stillRgn);

SectRgn(stillRgn, visRgn, stillRgn);
      IF NOT EmptyRgn(stillRgn) THEN
      BEGIN
        {Set fore and back color to black/white???}
        GetClip(visRgn);
        SetClip(stillRgn);
        {Draw background picture.}
        OpenAndDraw(session);

SetClip(visRgn);    {Restore clip.}
      END;

DisposeRgn(stillRgn);
      DisposeRgn(keyRgn);
      DisposeRgn(visRgn);
    END;
    SetPort(savePort);
  END;
END; {DrawBkgndWindow}

PROCEDURE DrawColorPict(currPict: PixMapHandle; iconRef: INTEGER; index: INTEGER; aRect: Rect);

Draws an iconic (80x60) picture in aRect in the current graf port.
  <index> is an index into the file where the pictures are stored.

VAR
  aPort:       WindowPtr;
  tempHandle:  Handle;
  tempPtr:     Ptr;
  err:         OSErr;

FUNCTION QueuePicture(index, refNum: INTEGER): OSErr;
  VAR
    posOff: Longint;
  BEGIN
    posOff := Longint(index)*Longint(kVIcon)*Longint(kHIcon);
    QueuePicture := SetFPos(refNum, fsFromStart, posOff);
  END; {QueuePicture}

BEGIN
  IF currPict <> NIL THEN BEGIN

IF QueuePicture(index, iconRef) <> noErr THEN Exit(DrawColorPict);
    tempPtr := currPict^^.baseAddr;
    tempHandle := NewHandle(kVIcon*kHIcon);
    IF tempHandle = NIL THEN Exit(DrawColorPict);

err := FillHandle(tempHandle, iconRef);
    HLock(tempHandle);
    currPict^^.baseAddr := tempHandle^;
    {DRAW THE SUCKER HERE}
    HLock(Handle(currPict));
    GetPort(aPort);
    CopyBits(BitMapHandle(currPict)^^, aPort^.portBits,
             currPict^^.bounds, aRect, srcCopy, NIL);
    HUnlock(Handle(currPict));

HUnLock(tempHandle);
    currPict^^.baseAddr := tempPtr;
    DisposHandle(tempHandle);
  END;
END; {DrawColorPict}

PROCEDURE ShowHideTool(session: MMSesHandle; toolNo: INTEGER);
{
 Toggle the visibility of a tool and set a checkmark in the menu
 corresponding to the visibility of the tool.
}
```

```
VAR
  checked:   BOOLEAN;
  count:     INTEGER;
  segBoard:  SegBoardHndl;
  theWind:   WindowPtr;
  theMenu:   MenuHandle;
  theKeys:   KeyMap;
BEGIN
  IF toolNo < 0 THEN BEGIN   {Hierarchical segment menu}
    toolNo := - toolNo;
    segBoard := session^^.theTools^^.tools[kSegBoardItem].segs;
    count := 1;
    theWind := NIL;
    WHILE (segBoard <> NIL) AND (count <> toolNo) DO BEGIN
      count := count+1;
      segBoard := segBoard^^.nextBoard;
    END;
    IF segBoard <> NIL THEN BEGIN
      GetKeys(theKeys);
      IF theKeys[shiftKeyCode] THEN BEGIN
        DisposeSegBoard(session, segBoard^^.boardName);
        theWind := NIL;
      END
      ELSE BEGIN
        theWind := segBoard^^.windoid;
        theMenu := session^^.theTools^^.hrMenu;
        checked := NOT(WindowPeek(theWind)^.visible);
      END;
    END;
  END
  ELSE IF toolNo > 0 THEN BEGIN
    WITH session^^.theTools^^ DO
    BEGIN
      checked := NOT visible[toolNo];
      visible[toolNo] := checked;   {Toggle}
    END;
    theMenu := session^^.theTools^^.mmMenu;
    theWind := session^^.theTools^^.tools[toolNo].theTool^^.windoid;
  END;

IF theWind <> NIL THEN BEGIN
    CheckItem(theMenu, toolNo, checked);
    ShowHide(theWind, checked);
    BringToFront(theWind);
  END;
END; {ShowHideTool}

PROCEDURE AutoLinks(session: MMSesHandle; onOff: BOOLEAN);
{
Turns on/off the autoLink feature.
Turning on links sets everything up and expects that UpdateIndicator will be called
on a regular basis in the main program loop to show and hide links.

Turning off links removes all exlisting links.
}
VAR
  aMenuStr:    Str255;
BEGIN
  IF session^^.autoLinks = onOff THEN Exit(AutoLinks);

IF onOff THEN GetIndString(aMenuStr, kDivStrID, kLinkOffStr)
  ELSE GetIndString(aMenuStr, kDivStrID, kLinkOnStr);
  SetItem(session^^.theTools^^.mmMenu, kAutoLinkItem, aMenuStr);

session^^.autoLinks := onOff;
  IF onOff THEN BEGIN {Turning it on.}
    {No update.}
    session^^.linksChanged := FALSE;
    BuildLinks(session, GetCurrSegName(session), GetRecentFName(session));
```

```
      SetupLinks(session);
    END
  ELSE BEGIN  {turning it off.}
    UpdateLinks(session, GetCurrSegName(session), GetRecentFName(session)); {Turning it off.}
    DisposeLinks(session);
    END;
END; {AutoLinks}

PROCEDURE LinkReturn(session: MMSesHandle; onOff: BOOLEAN);
{
 Turns on/off the linkreturn feature.
}
BEGIN
  CheckItem(session^^.theTools^^.mmMenu, kLinkReturnItem, onOff);
  session^^.linkReturn := onOff;
END; {LinkReturn}

PROCEDURE   PlaceByIn(aLink: LinkHandle;VAR oldList: LinkListHandle);
{
 Place aLink in the linkList sorted in the list according too it's in
 reference number.

NOTE:
 This currently ONLY works properly for segments running "forward".
 The sorting should be modified to take into account which of the sections of a
 segment the in/out points refer to.
}
VAR
  newLink:      LinkListHandle;
  tempLink:     LinkListHandle;
  lastLink:     LinkListHandle;

BEGIN
  newLink := LinkListHandle(NewHandle(sizeof(LinkList)));
  IF newLink = NIL THEN BEGIN
    DisposeWindow(aLink^^.linkInd.linkWind);
    aLink^^.linkInd.linkWind := WindowPtr(-1);
    Exit(PlaceByIn);
    END;

WITH newLink^^ DO BEGIN
    theLink := aLink;
    prevLink := NIL;
  END;
  IF oldList = NIL THEN BEGIN
    newLink^^.nextLink := NIL;
    oldList := newLink;
  END
  ELSE BEGIN
    tempLink := oldList;
    WHILE tempLink <> NIL DO BEGIN {Not using AND because of way it is evaluated.}
      IF tempLink^^.theLink^^.inPoint >= aLink^^.inPoint THEN Leave;
      lastLink := tempLink;
      tempLink := tempLink^^.nextLink;
    END;

IF tempLink = NIL THEN BEGIN        {the end of list so add link.}
      lastLink^^.nextLink := newLink;   {Point to next link item.}
      newLink^^.prevLink := lastLink;   {Point back from previous head.}
      newLink^^.nextLink := NIL;
    END
    ELSE IF tempLink^^.prevLink = NIL THEN BEGIN    (at the head of list.}
      newLink^^.nextLink  := tempLink;
      tempLink^^.prevLink := newLink;
      oldList := newLink;               {Put new link at head of list.}
    END
    ELSE BEGIN                          {Insert in middle.}
      newLink^^.nextLink := tempLink;
      newLink^^.prevLink := tempLink^^.prevLink;
      tempLink^^.prevLink^^.nextLink := newLink;
```

```
      tempLink^^.prevLink := newLink;
    END
  END;
END; (PlaceByIn)

PROCEDURE    PlaceByOut(aLink: LinkHandle;VAR oldList: LinkListHandle);

Place aLink in the linkList sorted in the list according too it's out
reference number.

NOTE:
This currently ONLY works properly for segments running "forward".
The sorting should be modified to take into account which of the sections of a
segment the in/out points refer to.

VAR
  newLink:   LinkListHandle;
  tempLink:  LinkListHandle;
  lastLink:  LinkListHandle;

BEGIN
  newLink := LinkListHandle(NewHandle(sizeof(LinkList)));
  IF newLink = NIL THEN BEGIN
    DisposeWindow(aLink^^.linkInd.linkWind);
    aLink^^.linkInd.linkWind := WindowPtr(-1);
    Exit(PlaceByOut);
  END;

WITH newLink^^ DO BEGIN
    theLink := aLink;
    prevLink := NIL;
  END;
  IF oldList = NIL THEN BEGIN
    newLink^^.nextLink := NIL;
    oldList := newLink;
  END
  ELSE BEGIN
    tempLink := oldList;
    lastLink := NIL;
    WHILE tempLink <> NIL DO BEGIN  {Not using AND because of way it is evaluated.}
      IF tempLink^^.theLink^^.outPoint >= aLink^^.outPoint THEN Leave;
      lastLink := tempLink;
      tempLink := tempLink^^.nextLink;
    END;

IF tempLink = NIL THEN BEGIN         {the end of list so add link.}
      lastLink^^.nextLink := newLink;    {Point to next link item.}
      newLink^^.prevLink := lastLink;    {Point back from previous head.}
      newLink^^.nextLink := NIL;
    END
    ELSE IF tempLink^^.prevLink = NIL THEN BEGIN    {at the head of list.}
      newLink^^.nextLink := tempLink;
      tempLink^^.prevLink := newLink;
      oldList := newLink;                {Put new link at head of list.}
    END
    ELSE BEGIN                           {Insert in middle.}
      newLink^^.nextLink := tempLink;
      newLink^^.prevLink := tempLink^^.prevLink;
      tempLink^^.prevLink^^.nextLink := newLink;
      tempLink^^.prevLink := newLink;
    END
  END;
END; {PlaceByOut}

PROCEDURE DisposeMicon(theMicon: MiconHandle);
BEGIN
  DisposPixMap(theMicon^^.pixMap);
  DisposHandle(Handle(theMicon));
END; {DisposeMicon}
```

```
PROCEDURE DiscardMList(theList, prevList: MiconListHandle; session: MMSesHandle);
{
 Discards <theList>. theList <> NIL.
}
VAR
  aMicon:     MiconHandle;
  savePort: GrafPtr;
BEGIN
  IF prevList = NIL THEN session^^.miconList := theList^^.nextMicon
  ELSE prevList^^.nextMicon := theList^^.nextMicon;
  GetPort(savePort);
  SetPort(theList^^.miconPort);
  InvalRect(theList^^.miconRect);
  SetPort(savePort);
  aMicon := theList^^.theMicon;
  WITH aMicon^^ DO resetCount := resetCount-1;
  IF aMicon^^.resetCount = 0 THEN DisposeMicon(aMicon);
  DisposHandle(Handle(theList));
END; {DiscardMList}

PROCEDURE RemovePortMicons(thePort: GrafPtr; session: MMSesHandle);
{
 Removes all micons for a port.
}
VAR
  aMiconList:    MiconListHandle;
  lastMiconList:MiconListHandle;
  nextMiconList:MiconListHandle;
BEGIN
  aMiconList := session^^.miconList;
  lastMiconList := NIL;
  WHILE aMiconList <> NIL DO BEGIN
    IF aMiconList^^.miconPort = thePort THEN BEGIN
      nextMiconList := aMiconList^^.nextMicon;
      DiscardMList(aMiconList, lastMiconList, session);
      aMiconList := nextMiconList;
    END
    ELSE BEGIN
      lastMiconList := aMiconList;
      aMiconList := aMiconList^^.nextMicon;
    END;
  END; {while}
END; {RemovePortMicons}

PROCEDURE RemoveMicon(miconName, segFName: Str31; miconPort: GrafPtr; session: MMSesHandle);
{
 This procedure takes a miconName, a segment file name and a grafPtr and
 disposes of the element in the Linked list which matches those arguments if any.
 The miconHandle counter is decremented. If this causes it to become zero
 (meaning that there are no other MiconList elements pointing to it) the actual
 micon is disposed of as well.

If segFName is "", then it is ignored and the first micon with the name <miconName>
 in the port <miconPort> is removed.
}
VAR
  aMiconList:    MiconListHandle;
  lastMiconList:MiconListHandle;

BEGIN
  aMiconList := session^^.miconList;
  lastMiconList := NIL;
  WHILE aMiconList <> NIL DO BEGIN
    IF aMiconList^^.miconPort = miconPort THEN
     IF EqualString(miconName, aMiconList^^.miconName, FALSE, FALSE) THEN
      IF (segFName[0] = Char(0)) OR EqualString(segFName, aMiconList^^.segFName, FALSE, FALSE) THEN BEGIN
        DiscardMList(aMiconList, lastMiconList, session);
        Exit(RemoveMicon);
      END;
    lastMiconList := aMiconList;
```

```pascal
    aMiconList := aMiconList^^.nextMicon;
  END; {while}
END; {RemoveMicon}

FUNCTION GetIconIndex(iconName, iconFName: Str31; session: MMSesHandle): INTEGER;
{
 Returns the index in the icon file of the segment icon named <iconName>.
}
VAR
  i:        INTEGER;
  list:     SegListHndl;
  theBoard: SegBoardHndl;
BEGIN
  theBoard := session^^.theTools^^.tools[kSegBoardItem].segs;
  WHILE theBoard <> NIL DO BEGIN
    IF EqualString(theBoard^^.boardName, iconFName, FALSE, FALSE) THEN Leave;
    theBoard := theBoard^^.nextBoard;
  END;
  GetIconIndex := -1;
  IF theBoard <> NIL THEN BEGIN
    list := theBoard^^.segNames;
    IF list = NIL THEN BEGIN
      Exit(GetIconIndex);
    END;
    WHILE list <> NIL DO BEGIN
      IF EqualString(iconName, list^^.name, FALSE, FALSE) THEN BEGIN
        GetIconIndex := list^^.pictIndex;
        Leave;
      END
      ELSE list := list^^.nextName;
    END;
  END;
END; {GetIconIndex}

PROCEDURE  BringSeg2Front(session: MMSesHandle; item: INTEGER);
{
 Brings the <item> element of segment board to the front of the list.
}
VAR
  aSegBoard:    SegBoardHndl;
  lastSegBoard: SegBoardHndl;
  aSegFile:     FileListHandle;
  lastSegFile:  FileListHandle;
  count:        INTEGER;
  theMenu:      MenuHandle;
  aMark:        Char;

BEGIN
  aSegBoard := session^^.theTools^^.tools[kSegBoardItem].segs;
  lastSegBoard := NIL;
  aSegFile := session^^.openSegFiles;
  lastSegFile := NIL;
  count:= 1;
  WHILE (aSegBoard <> NIL) AND (count <> item) DO BEGIN
    count := count+1;
    lastSegBoard := aSegBoard;
    aSegBoard := aSegBoard^^.nextBoard;
    lastSegFile := aSegFile;
    aSegFile := aSegFile^^.nextFile;
  END;
  IF (aSegBoard <> NIL) AND (lastSegBoard <> NIL) THEN BEGIN
    lastSegBoard^^.nextBoard := aSegBoard^^.nextBoard;
    aSegBoard^^.nextBoard := session^^.theTools^^.tools[kSegBoardItem].segs;
    session^^.theTools^^.tools[kSegBoardItem].segs := aSegBoard;

lastSegFile^^.nextFile := aSegFile^^.nextFile;
    aSegFile^^.nextFile := session^^.openSegFiles;
    session^^.openSegFiles := aSegFile;

theMenu := session^^.theTools^^.hrMenu;
```

```
    GetItemMark(theMenu, item, aMark);
    DelMenuItem(theMenu, item);
    InsMenuItem(theMenu, session^^.openSegFiles^^.segFileName, 0);
    SetItemMark(theMenu, 1, aMark);
  END;
END; {BringSeg2Front}

PROCEDURE SendSeg2Back(session: MMSesHandle; item: INTEGER);
{
 This procedure takes the <item> segment board and places it at the end of
 the segment board list.
 The openSegmentFiles holder is correspondingly updated.
}
VAR
  aSegBoard:    SegBoardHndl;
  lastSegBoard: SegBoardHndl;
  aSegFile:     FileListHandle;
  lastSegFile:  FileListHandle;
  count:        INTEGER;
  theMenu:      MenuHandle;
  aMark:        Char;
BEGIN
  aSegBoard := session^^.theTools^^.tools[kSegBoardItem].segs;
  lastSegBoard := NIL;
  aSegFile := session^^.openSegFiles;
  lastSegFile := NIL;
  count := 1;
  WHILE (aSegBoard <> NIL) AND (count <> item) DO BEGIN
    lastSegBoard := aSegBoard;
    aSegBoard := aSegBoard^^.nextBoard;
    lastSegFile := aSegFile;
    aSegFile := aSegFile^^.nextFile;
  END;
  IF aSegBoard <> NIL THEN BEGIN
    IF lastSegBoard <> NIL THEN BEGIN {We're not at the head of list.}
      lastSegBoard^^.nextBoard := aSegBoard^^.nextBoard;
      lastSegFile^^.nextFile := aSegFile^^.nextFile;
    END
    ELSE IF aSegBoard^^.nextBoard <> NIL THEN BEGIN {We are at head.}
      session^^.theTools^^.tools[kSegBoardItem].segs := aSegBoard^^.nextBoard;
      session^^.openSegFiles := aSegFile^^.nextFile;
    END;

{Re-use <lastSegBoard>.}
    lastSegBoard := aSegBoard;
    lastSegFile := aSegFile;
    WHILE lastSegBoard^^.nextBoard <> NIL DO BEGIN {Find end of list.}
      lastSegBoard := lastSegBoard^^.nextBoard;
      lastSegFile := lastSegFile^^.nextFile;
    END;
    {Place segment at the end of file.}
    lastSegBoard^^.nextBoard := aSegBoard;
    aSegBoard^^.nextBoard := NIL;
    lastSegFile^^.nextFile := aSegFile;
    aSegFile^^.nextFile := NIL;

theMenu := session^^.theTools^^.hrMenu;
    GetItemMark(theMenu, item, aMark);
    DelMenuItem(theMenu, item);
    AppendMenu(theMenu, aSegFile^^.segFileName);
    SetItemMark(theMenu, CountMItems(theMenu), aMark);
  END;
END; {SendSeg2Back}

PROCEDURE SelectSegBoard(session: MMSesHandle; whichWindow: WindowPtr);
{
 This procedure is called when a Segment board contained in <whichWindow>
 should be selected.
}
VAR
```

```
    theBoard:       SegBoardHndl;
    count:          INTEGER;
BEGIN
    theBoard := session^^.theTools^^.tools[kSegBoardItem].segs;
    count := 1;
    WHILE theBoard <> NIL DO BEGIN
        IF theBoard^^.windoid = whichWindow THEN Leave;  {Not using AND because of way it is evaluated.}
        count := count+1;
        theBoard := theBoard^^.nextBoard;
    END;
    IF theBoard <> NIL THEN BEGIN
        BringSeg2Front(session, count);
    END;
END; {SelectSegBoard}

FUNCTION MakeSegBoard(name: Str31; session: MMSesHandle; hasOverlay: BOOLEAN): SegBoardHndl;
{
 Creates a new segment board. If <session> = NIL then it is not updated but
 a new segment board is still returned. this functionality is supported so
 the routine can be used on startup.

Should check to see if seg board is on locked volume before adding active m/icon buttons.
}
VAR
    theBoard:       SegBoardHndl;
    oldBoard:       SegBoardHndl;
    theWindoid:     WindowPtr;
    theScroll:      ControlHandle;
    err:            OSErr;

BEGIN
    theBoard := NIL;
    theWindoid := WindowPtr(GetNewWindow(kSegBoardWindoid, NIL, Pointer(-1)));
    IF theWindoid <> NIL THEN
    BEGIN
        theScroll := GetNewControl(kSegBoardWindoid, theWindoid);
        theBoard := SegBoardHndl(NewHandle(sizeof(SegBoard)));
        IF theBoard <> NIL THEN
        BEGIN
            HLock(Handle(theBoard));
            WITH theBoard^^ DO
            BEGIN
                windoid := theWindoid;
                animIcons[1] := NIL;
                animIcons[2] := NIL;
                animIcons[3] := NIL;
                IF hasOverLay THEN BEGIN
                    linkIcon := GetIcon(kGrayLinkID);
                    grabIcon := GetIcon(kGrabID);
                    projectIcon := GetIcon(kGrayProjectID);
                    cameraIcon := GetIcon(kCameraID);
                END
                ELSE BEGIN
                    linkIcon := GetIcon(kGrayLinkID);
                    grabIcon := GetIcon(kGrayGrabID);
                    projectIcon := GetIcon(kGrayProjectID);
                    cameraIcon := GetIcon(kGrayCameraID);
                END;
                filmIcon := GetIcon(kFilm1);

{Fill the noSegs and segNames fields.}
                noSegs := 0;
                segNames := NIL;
                boardName := name;
                nextBoard := NIL;
            END;
            HUnlock(Handle(theBoard));

IF session <> NIL THEN BEGIN
                theBoard^^.nextBoard := session^^.theTools^^.tools[kSegBoardItem].segs;
```

```
        session^^.theTools^^.tools[kSegBoardItem].segs := theBoard;
      END;
    END;
    ELSE DisposeWindow(theWindoid);
  END;
  MakeSegBoard := theBoard;
END; (MakeSegBoard)

PROCEDURE PutInAlpha(VAR listHead: SegListHndl; newElement: SegListHndl);
{
 Puts a new list element in the list in alphabetical order.
}
VAR
  anElement:   SegListHndl;
  prevElement: SegListHndl;

BEGIN
  IF listHead = NIL THEN
    listHead := newElement
  ELSE BEGIN
    anElement := listHead;
    prevElement := NIL;
    IF IUCompString(newElement^^.name, anElement^^.name) = -1 THEN BEGIN
      {Put it in front.}
      newElement^^.nextName := anElement;
      listHead := newElement;
    END
    ELSE BEGIN
      WHILE anElement <> NIL DO BEGIN
        IF IUCompString(newElement^^.name, anElement^^.name) <> 1 THEN
          Leave;
        prevElement := anElement;
        anElement := anElement^^.nextName;
      END;
      {Insert in list.}
      newElement^^.nextName := anElement;
      IF prevElement <> NIL THEN
        prevElement^^.nextName := newElement;
    END;
  END;
END; {PutInAlpha}

FUNCTION BuildSegNames(VAR listHead: SegListHndl; refVal: INTEGER): INTEGER;
{
 Builds an alphabetically ordered list of segment names.
 Called once initially from NewTools.
 the refVal parameter is the file reference number for the segment file.
}
VAR
  noSegments:  INTEGER;
  aHndl:       SegListHndl;
  bHndl:       SegListHndl;
  count:       INTEGER;
  err:         OSErr;

BEGIN
  err := NoVideoSeg(refVal, noSegments);
  {Allocate handles and sort them alphabetically.}
  IF err = noErr THEN BEGIN
    FOR count := 1 TO noSegments DO BEGIN
      aHndl := SegListHndl(NewHandle(sizeof(SegmentList)));
      IF aHndl = NIL THEN BEGIN {We're in trouble.}
        BuildSegNames := count;
        SysBeep(1);
        Exit(BuildSegNames);
      END;
      HLock(Handle(aHndl));
      WITH aHndl^^ DO BEGIN
        nextName := NIL;
        segType := kVideoType;
```

```
          pictIndex := GetPictIndex(count, refVal);
          hasPreview := FALSE;
          name := GetVideoSegName(count, refVal);
        END;
        HUnlock(Handle(aHndl));
        PutInAlpha(listHead, aHndl);
      END; (for)
    END
    ELSE BEGIN
      DisposeSegNames(listHead);
      noSegments := 0;
    END;
    BuildSegNames := noSegments;
END; (BuildSegNames)

PROCEDURE DisposeSegNames(VAR segNames: SegListHndl);
{
  Disposes of all the segments in the list.
}
VAR
   aSegLink: SegListHndl;

BEGIN
   WHILE segNames <> NIL DO BEGIN
     aSegLink := segNames^^.nextName;
     DisposHandle(Handle(segNames));
     segNames := aSegLink;
   END;
END; (DisposeSegNames)

PROCEDURE NotifyUser(selector: INTEGER; session: MMSesHandle);
{
  Puts up an alert to the user with the appropriate message according to the
  given selector.

Selectors:
    kOutOfMemory
    kOutOfFiles
    kFileError
}
VAR
    aDialog:      DialogPtr;
    alertStr:     Str255;
    item:         Handle;
    theType:      INTEGER;
    dRect:        Rect;
    chosenItem:   INTEGER;
    saveFlag:     BOOLEAN;
    savePort:     GrafPtr;
BEGIN
    aDialog := GetNewDialog(kAlertsID, NIL, Pointer(-1));
    IF aDialog = NIL THEN BEGIN
      SysBeep(5);
      Exit(NotifyUser);
    END;
    GetPort(savePort);
    SetPort(aDialog);
    GetIndString(alertStr, kAlertsID, selector);
    GetDItem(aDialog, 1, theType, item, dRect); (The button.)
    InsetRect(dRect,-4,-4);
    PenSize(3,3);
    FrameRoundRect(dRect,18,18);
    PenSize(1,1);
    GetDItem(aDialog, 2, theType, item, dRect); (The text box)
    SetIText(item, alertStr);
    SetPort(savePort);
    WITH session^^ DO BEGIN
      saveFlag := toolFlag;
      toolFlag := TRUE;
    END;
```

```
  ModalDialog(NIL, chosenItem);
  session^^.toolFlag := saveFlag;
  DisposDialog(aDialog);
END; {NotifyUser}

END.
```

```
{
 File: LinkFile.p
 First created: 06.04.89  (hpb)

pascal LinkFile.p

This file handles setting up links and saving them as resources in the res
 fork of the current segment file.
 The resources are of type LINK and are identified by the name of the segment
 they belong to.
}
{SD-} { MacsBug symbols on }
{SR-} { No range checking  }

UNIT LinkFile;

INTERFACE

USES    MemTypes, QuickDraw, OSIntf, ToolIntf, PackIntf,
        CSLib, MMTypes, GNEPatch, FileProcs, ToolUtils, DevComm, HistoryUtils;

TYPE
    LinkDataHandle = ^LinkDataPtr;
    LinkDataPtr = ^LinkData;
    LinkData = RECORD
      noEntries:    INTEGER;     {Number of links in this list.}
      theLinks:     ARRAY [1..1] OF LINK;
    END;

PROCEDURE GoToLink(session: MMSesHandle; aLink: LinkHandle);
PROCEDURE UpdateLinks(session: MMSesHandle; segName, segFName: Str31);
PROCEDURE BuildLinks(session: MMSesHandle; segName, segFName: Str31);
PROCEDURE SetupLinks(session: MMSesHandle);
PROCEDURE DisposeLinks(session: MMSesHandle);

IMPLEMENTATION
{***************************************************************************
*                                                                          *
*                                                                          *
****************************************************************************}

(*
PROCEDURE    MacsBugStr(signalStr:   Str255);
    INLINE  $abff;
*)
PROCEDURE GoToLink(session: MMSesHandle; aLink: LinkHandle);
{
 This procedure goes to the selected link.
}
VAR
  theSeg:    SegmentHandle;
BEGIN
  IF aLink^^.toSegType <> kHCSeg THEN BEGIN
     {NOTE: aLink is not valid after we return from VidSegPlay.}
     WITH aLink^^ DO SendCardMessage(Concat('linkClick "', toSegment, '","',toSegFile,'"'));
     WITH aLink^^ DO VidSegPlay(session, toSegment, toSegFile, TRUE, -1);
  END
  ELSE BEGIN {This is a link to HC.}
     SendHCMessage('push cd');
     SendHCMessage(Concat('go ', aLink^^.toSegment, ' of ',aLink^^.toSegFile));
     StopSegment(session);
     theSeg := session^^.theTools^^.tools[kVideoItem].film^^.theSegment;
     AddHistory(session, theSeg, FrameNo(session));
     IF session^^.autoLinks THEN BEGIN
        IF session^^.linksChanged THEN WITH theSeg^^ DO UpdateLinks(session, segName, sourceName);
        DisposeLinks(session);
     END;
  END;
END; {GoToLink}
```

```pascal
PROCEDURE DisposeLinks(session: MMSesHandle);
{
 Disposes all current links and resets appropriate fields in link tool.
}
VAR
  actLink:    LinkHandle;
  allList:    LinkListHandle;
  currList:   LinkListHandle;
  tempList:   LinkListHandle;
  toolWind:   GrafPtr;
  savePort:   GrafPtr;
  aRect:      Rect;

BEGIN
  {Now remove the link list. NOTE! Assumes same number of links in currLinks as allLinks.}
  WITH session^^.theTools^^.tools[kLinkItem].links^^ DO BEGIN
    actLink := activeLink;
    allList := allLinks;
    currList := currLinks;
  END;

toolWind := session^^.theTools^^.tools[kLinkItem].links^^.windoid;
  IF actLink <> NIL THEN WITH actLink^^ DO IF linkInd.indType = kMicon THEN
    RemoveMicon(toSegment, toSegFile, toolWind, session);

WHILE allList <> NIL DO BEGIN
    WITH allList^^.theLink^^ DO IF linkInd.indType = kMicon THEN
      RemoveMicon(toSegment, toSegFile, linkInd.linkWind, session);
    DisposeWindow(allList^^.theLink^^.linkInd.linkWind);
    tempList := allList^^.nextLink;
    DisposHandle(Handle(allList^^.theLink));
    DisposHandle(Handle(allList));
    allList := tempList;
    tempList := currList^^.nextLink;
    DisposHandle(Handle(currList));
    currList := tempList;
  END;
  IF actLink <> NIL THEN
    IF NOT(actLink^^.complete) THEN DisposHandle(Handle(actLink));

WITH session^^.theTools^^.tools[kLinkItem].links^^ DO BEGIN
    nextIn := NIL;
    nextOut := NIL;
    allLinks := NIL;
    currLinks := NIL;
    activeLink := NIL;
    nextInRef := 0;
    nextOutRef := 0;
  END;
  {Clear the window...}
  GetPort(savePort);
  SetPort(toolWind);
  WITH aRect DO BEGIN
    top := 2;
    left := 3;
    bottom := 62;
    right := 83;
  END;
  InvalRect(aRect);
  SetPort(savePort);
END; {DisposeLinks}

FUNCTION Links2Res(links: LinkListHandle; theRes:Handle): OSErr;
{
 Converts the list of links to a contigeous string of data which can be
 stored as a resource.
}
VAR
  theLinkData: LinkDataHandle;
  size:        Longint;
```

```
count:          INTEGER;
tempList:       LinkListHandle;
err:            INTEGER;

BEGIN
  tempList := links;
  size := 0;
  WHILE tempList <> NIL DO BEGIN
    size := size+1;
    tempList := tempList^^.nextLink;
  END;
  SetHandleSize(theRes, (size*sizeof(Link)) + sizeof(LinkData)-sizeof(Link));
  err := MemError;
  IF err <> noErr THEN BEGIN
    Links2Res := err;
    Exit(Links2Res);
  END;

theLinkData := LinkDataHandle(theRes);

FOR count := 1 TO size DO BEGIN
    theLinkData^^.theLinks[count] := links^^.theLink^^;
    links := links^^.nextLink;
  END;
  theLinkData^^.noEntries := size;

Links2Res := noErr;
END; {Links2Res}

FUNCTION Res2Links(session: MMSesHandle; theRes:Handle): LinkListHandle;
{
 Converts a resource of type LinkData to a linked list of links.

This procedure both creates the links (as well as loading indicator micons etc)
 as well as creating a linked list of the links.
}
VAR
  theLinkData:  LinkDataHandle;
  count:        INTEGER;
  linkRect:     Rect;
  newLink:      LinkHandle;
  linkMicon:    MiconHandle;
  linkHead:     LinkListHandle;
  newElement:   LinkListHandle;
  lastElement:  LinkListHandle;
  tempWindow:   WindowPtr;
  tempHandle:   Handle;

BEGIN
  theLinkData := LinkDataHandle(theRes);
  newElement := LinkListHandle(NewHandle(sizeof(LinkList)));
  IF newElement = NIL THEN BEGIN
    Res2Links := NIL;
    Exit(Res2Links);
  END;

Res2Links := newElement;
  lastElement := NIL;
  newElement^^.nextLink := NIL;

FOR count := 1 TO theLinkData^^.noEntries DO BEGIN
    newLink := LinkHandle(NewHandle(sizeof(Link)));
    IF newLink = NIL THEN BEGIN
      DisposHandle(Handle(newElement));
      IF count = 1 THEN Res2Links := NIL;
      Exit(Res2Links);
    END;
    newLink^^ := theLinkData^^.theLinks[count];

tempWindow := GetNewWindow(newLink^^.linkInd.windType, NIL, WindowPtr(-1));
```

```
    IF tempWindow = NIL THEN  BEGIN
      DisposHandle(Handle(newLink));
      DisposHandle(Handle(newElement));
      IF count = 1 THEN Res2Links := NIL;
      Exit(Res2Links);
    END;

newLink^^.linkInd.linkWind := tempWindow;
    IF newLink^^.linkInd.indType = kHCIcon THEN BEGIN
      tempHandle := GetNamedResource('PICT', newLink^^.toSegment);
      DetachResource(tempHandle);
      newLink^^.linkInd.indicator.aHCIcon := tempHandle;
    END
    ELSE BEGIN
      IF newLink^^.linkInd.indType = kMicon THEN BEGIN
        WITH linkRect DO IF newLink^^.linkInd.windType = kTitle THEN BEGIN
          top := 14;
          left := 1;
          bottom := kvIcon+14;
          right := khIcon+1
        END
        ELSE BEGIN
          top := 0;
          left := 0;
          bottom := kvIcon;
          right := khIcon;
        END;

WITH newLink^^ DO linkMicon := NewMicon(toSegment, toSegFile, linkRect, tempWindow, session, FALSE);
      END;
      IF (linkMicon = NIL) OR (newLink^^.linkInd.indType = kIcon) THEN BEGIN
        newLink^^.linkInd.indType := kIcon;
        WITH newLink^^ DO newLink^^.linkInd.indicator.anIcon :=
            GetIconIndex(toSegment, toSegFile, session);
      END
      ELSE newLink^^.linkInd.indicator.aMicon := linkMicon;
    END;
    newElement^^.theLink := newLink;

newElement^^.prevLink := lastElement;
    IF lastElement <> NIL THEN lastElement^^.nextLink := newElement; {Point forward.}

IF count <= theLinkData^^.noEntries THEN BEGIN
      lastElement := newElement;
      newElement := LinkListHandle(NewHandle(sizeof(LinkList)));
      newElement^^.nextLink := NIL;
    END;
  END;
END; {Res2Links}

PROCEDURE SetupLinks(session: MMSesHandle);
{
Makes the links that have -1 as their inPoint visible.
Sets up the next link so it is ready to be ordered.
Does same for out points.
}
VAR
  allElements:  LinkListHandle;
  currElements: LinkListHandle;
  inOut:        Longint;
  linkWindow:   WindowPtr;
  globPt:       Point;
BEGIN
  WITH session^^.theTools^^.tools[kLinkItem].links^^ DO BEGIN
    allElements := allLinks;
    currElements := currLinks;
  END;
  {Set up in.}
  IF allElements <> NIL THEN
    inOut := allElements^^.theLink^^.inPoint;
```

```
  WITH session^^ DO IF hasOverlay THEN SetPort(bkgndWindow);
  WHILE (allElements <> NIL) AND (inOut = -1) DO BEGIN
    linkWindow := allElements^^.theLink^^.linkInd.linkWind;
    globPt := allElements^^.theLink^^.linkInd.linkPt;
    IF session^^.hasOverlay AND allElements^^.theLink^^.linkInd.onVideo THEN
      LocalToGlobal(globPt);
    WITH globPt DO MoveWindow(linkWindow, h, v, FALSE);
    ShowWindow(linkWindow);
    allElements := allElements^^.nextLink;
    IF allElements <> NIL THEN inOut := allElements^^.theLink^^.inPoint;
  END;
  {Set up out.}
  IF currElements <> NIL THEN inOut := currElements^^.theLink^^.outPoint;
  WHILE (currElements <> NIL) AND (inOut = -1) DO BEGIN
    currElements := currElements^^.nextLink;
    IF currElements <> NIL THEN inOut := currElements^^.theLink^^.outPoint;
  END;

WITH session^^.theTools^^.tools[kLinkItem].links^^ DO BEGIN
    nextIn := allElements;
    nextOut := currElements;
  END;
END; {SetupLinks}

PROCEDURE UpdateHCPicts(theLinks: LinkListHandle);
{
 This procedure goes through a list of links and checks whether any of the
 HC link pictures have to be written.
 If so a new resource is created for the picture and it is written.
 It is assumed that the segment file for the appropriate browser is
 open when this procedure is called.
}
VAR
  aLink:    LinkHandle;
  theRes:   Handle;
  theResID: INTEGER;
BEGIN
  WHILE theLinks <> NIL DO BEGIN
    aLink := theLinks^^.theLink;
    IF aLink^^.linkInd.indType = kHCIcon THEN BEGIN
      theRes := GetNamedResource('PICT', aLink^^.toSegment);
      IF theRes = NIL THEN BEGIN
        theRes := aLink^^.linkInd.indicator.aHCIcon;
        theResID := UniqueID('PICT');
        AddResource(theRes, 'PICT', theResID, aLink^^.toSegment);
        IF ResError <> noErr THEN  BEGIN
          Exit(UpdateHCPicts);
        END;
      END
      ELSE theRes := aLink^^.linkInd.indicator.aHCIcon;
      ChangedResource(theRes);
      WriteResource(theRes);
    END;
    theLinks := theLinks^^.nextLink;
  END; {while}
END; {UpdateHCPicts}

PROCEDURE UpdateLinks(session: MMSesHandle; segName, segFName: Str31);
{
 Updates a 'LINK' resource with the name <segName> in the segment file
 called <segFName>.
 This procedure need only be called if session^^.linksChanged = TRUE.
}
VAR
  refNum:   INTEGER;
  theRes:   Handle;
  theResID: INTEGER;
  vRefNum:  INTEGER;
  theLinks: LinkListHandle;
  currList: LinkListHandle;
```

```
    tempList: LinkListHandle;
    saveVRef: INTEGER;
    volName: Str255;
    err:     OSErr;

BEGIN
  theLinks := session^^.theTools^^.tools[kLinkItem].links^^.allLinks;
  IF session^^.linksChanged THEN BEGIN
    vRefNum := GetSegFileVRef(segFName, session);
    refNum := OpenRFPerm(segFName, vRefNum, fsCurPerm);
    IF theLinks <> NIL THEN BEGIN
      IF refNum = -1 THEN BEGIN
        err := GetVol(@volName, saveVRef);
        err := SetVol(NIL, vRefNum);
        CreateResFile(segFName);
        err := SetVol(NIL, saveVRef);
        refNum := OpenRFPerm(segFName, vRefNum, fsCurPerm);
        IF refNum = -1 THEN BEGIN
          SysBeep(5);
          Exit(UpdateLinks);
        END;
      END;

theRes := GetNamedResource('LINK', segName);
      IF theRes = NIL THEN BEGIN
        theRes := NewHandle(0);
        theResID := UniqueID('LINK');
        AddResource(theRes, 'LINK', theResID, segName);
        IF ResError <> noErr THEN  BEGIN
          CloseResFile(refNum);
          Exit(UpdateLinks);
        END;
      END;

IF Links2Res(theLinks, theRes) <> noErr THEN  BEGIN
        CloseResFile(refNum);
        Exit(UpdateLinks);
      END;

ChangedResource(theRes);
      WriteResource(theRes);

UpdateHCPicts(theLinks);
      CloseResFile(refNum);
    END
    ELSE BEGIN {theRes = NIL so there are no more links for the segment.}
      IF refNum = -1 THEN Exit(UpdateLinks)
      ELSE BEGIN
        theRes := GetNamedResource('LINK', segName);
        IF theRes <> NIL THEN BEGIN
          RmveResource(theRes);
          DisposHandle(theRes);
        END;
        CloseResFile(refNum);
      END;
    END;
  END;
  session^^.linksChanged := FALSE;
END; {UpdateLinks}

PROCEDURE BuildLinks(session: MMSesHandle; segName, segFName: Str31);
{
This procedure builds links for the segment called <segName> in the segment
file called <segFName> and places those links in the link tool.
It is up to the procedure that monitors the links to display them at the
right time.
}
VAR
  aTool:   LinkToolHndl;
  aMicon:  MiconHandle;
```

```
  savePort:      GrafPtr;
  aRect:         Rect;
  theLinks:      LinkListHandle;
  allElements:   LinkListHandle;
  currElements:  LinkListHandle;
  refNum:        INTEGER;
  vRefNum:       INTEGER;
  theRes:        Handle;
BEGIN
  aTool := session^^.theTools^^.tools[kLinkItem].links;
  IF aTool^^.activeLink <> NIL THEN DisposeLinks(session);

vRefNum := GetSegFileVRef(segFName, session);
  refNum := OpenRFPerm(segFName, vRefNum, fsCurPerm);
  IF refNum = -1 THEN BEGIN
    Exit(BuildLinks);
  END;

theRes := GetNamedResource('LINK', segName);
  IF theRes = NIL THEN BEGIN
    CloseResFile(refNum);
    Exit(BuildLinks);
  END;

theLinks := Res2Links(session, theRes);
  CloseResFile(refNum);
  IF theLinks <> NIL THEN BEGIN
    allElements := theLinks;
    currElements := NIL;
    WHILE theLinks <> NIL DO BEGIN
      PlaceByOut(theLinks^^.theLink, currElements);
      theLinks := theLinks^^.nextLink;
    END;
    WITH aTool^^ DO BEGIN
      allLinks := allElements;
      currLinks := currElements;
      activeLink := allElements^^.theLink;
      WITH aRect DO BEGIN
        top := 2;
        left := 3;
        bottom := 62;
        right := 83;
      END;
      IF activeLink^^.linkInd.indType = kMicon THEN BEGIN
        WITH activeLink^^ DO aMicon := NewMicon(toSegment, toSegFile, aRect, aTool^^.windoid, session, FALSE)
        IF aMicon = NIL THEN BEGIN
          WITH activeLink^^ DO BEGIN
            linkInd.indType := kIcon;
            activeLink^^.linkInd.indicator.anIcon := GetIconIndex(toSegment, toSegFile, session);
          END; {with}
        END;
      END;
      IF activeLink^^.linkInd.indType <> kMicon THEN
      BEGIN {invalidate link tool rectangle.}
        GetPort(savePort);
        SetPort(aTool^^.windoid);
        InvalRect(aRect);
        SetPort(savePort);
      END;
    END;
  END;
END; {BuildLinks}

END.
```

```
{ File:     DevComm.p
  Created:  30.5.89    (hpb)
  Modified: 22.11.89   (hpb)
            Changed to handle new/general driver architecture.
            26.11.89   (hpb)
            Pulled out as separate unit.

This file contains the procedures needed to communicate with media devices.
}

{$D-} { MacsBug symbols on }
{$R-} { No range checking }

UNIT DevComm;

INTERFACE

USES    MemTypes, QuickDraw, OSIntf, ToolIntf, PackIntf,
        CSLib, MMTypes, FileProcs, ToolUtils, LinkFile, HistoryUtils, MMDEffects;

PROCEDURE   SendCmd(theCommand: INTEGER; argument: StringPtr; session: MMSesHandle);

FUNCTION    FrameNo(session: MMSesHandle): Longint;

PROCEDURE   SetupDevice(session: MMSesHandle);

IMPLEMENTATION
{****************************************************************************
 *                                                                          *
 *                                                                          *
 ****************************************************************************}

PROCEDURE   MacsBugStr(signalStr:   Str255);
    INLINE  $abff;

{
 The following procedures implement the low level calls to the serial port.
}

FUNCTION SendSPort(outString: StringPtr; outPort: INTEGER; session: MMSesHandle): OSErr;
{
 Send the characters in the outSting to the designated port.
}
VAR
  length:   Longint;
  err:      OSErr;
BEGIN
  length := Longint(outString^[0]);
  err := FSWrite(outPort, length, @outString^[1]);
  IF err <> noErr THEN err := FSWrite(outPort, length, @outString^[1]);
  SendSPort := err;
END; {SendSPort}

FUNCTION RecvUpToAck(mDevHandle: MDevBlockHandle; timeOut: Longint): OSErr;
{
 Receive characters up to acknowledge char (clear recv buffer). Try for timeOut ticks.
}
VAR
  inChar:   SignedByte;
  termChar: SignedByte;
  length:   Longint;
  err:      OSErr;
  startTick:Longint;

BEGIN
  err := noErr;
  IF mDevHandle^^.devData[kAckChar][0] > Char(0) THEN BEGIN
    startTick := TickCount;
    {assuming single acknowledge character.}
```

```
    termChar := SignedByte(mDevHandle^^.devData[kAckChar][1]);
    WHILE startTick+timeOut > TickCount DO BEGIN
      err := SerGetBuf(mDevHandle^^.inPortRef, length);
      IF err <> noErr THEN Leave;
      IF length > 0 THEN BEGIN
        length := 1;
        err := FSRead(mDevHandle^^.inPortRef, length, @inChar);
        IF (inChar = termChar) OR (err <> noErr) THEN Leave;
      END;
    END; {while}
    (*IF TickCount >= startTick+timeOut THEN err := -1;*)
  END;
  RecvUpToAck := err;
END; {RecvUpToAck}

FUNCTION Recv2Term(inString: StringPtr; mDevHandle: MDevBlockHandle; timeOut: Longint): OSErr;
{
 Try receiving characters from the serial port for timeOut ticks or until
 a termination character is encountered.
}
VAR
  termChar: SignedByte;
  inChar:   SignedByte;
  count:    INTEGER;
  err:      OSErr;
  startTick:Longint;
  length:   Longint;
  serPort:  INTEGER;

BEGIN
  err := noErr;
  IF mDevHandle^^.devData[kInTerm][0] > Char(0) THEN BEGIN
    WITH mDevHandle^^ DO BEGIN
      termChar := SignedByte(devData[kInTerm][1]);   {Assuming single character. f.ex. CR.}
      serPort := inPortRef;
    END;
    startTick := TickCount;
    count := 0;
    WHILE startTick+timeOut > TickCount DO BEGIN
      err := SerGetBuf(serPort, length);
      IF err <> noErr THEN Leave;
      IF length > 0 THEN BEGIN
        length := 1;             {Read only one character at a time.}
        err := FSRead(serPort, length, @inChar);
        IF (inChar = termChar) OR (err <> noErr) THEN Leave
        ELSE BEGIN
          count := count+1;
          inString^[count] := Char(inChar);
        END;
      END;
    END; {while}
    (* TIMEOUT IF TickCount >= startTick+timeOut THEN err := -1;*)
    inString^[0] := Char(count);
  END
  ELSE inString^[0] := Char(0);
  Recv2Term := err;
END; {Recv2Term}

PROCEDURE  BuildCommand(aCommand: INTEGER; argument: StringPtr; outStrPtr: StringPtr; mDevHandle: MDevBlockH
{
 Based on the given command identifier, this procedure builds <outStr> to be sent
 to the external device.
}
VAR
  i, count:   INTEGER;
  tempStr:    Str31;

PROCEDURE AppendStr(origStr: StringPtr; newStr: StringPtr);
  {
    Appends <newStr> to <oldStr>.
```

```
  VAR
    count:     INTEGER;
    i, j:      INTEGER;
  BEGIN
    count := INTEGER(newStr^[0]);
    j := INTEGER(origStr^[0])+1;
    FOR i := 1 to count DO BEGIN
      origStr^[j] := newStr^[i];
      j := j+1;
    END;
    origStr^[0] := Char(j-1);
  END; {AppendStr}

BEGIN
  outStrPtr^[0] := Char(0);
  WITH mDevHandle^^ DO BEGIN
    count := INTEGER(devData[kFormat][0]);
    IF count > 0 THEN BEGIN
      FOR i := 1 to count DO
        CASE devData[kFormat][i] OF
        's': {Start marker.}
          IF devData[kStartChar][0] > Char(0) THEN AppendStr(outStrPtr, StringPtr(@devData[kStartChar]));
        'c': {Command}
          IF devData[aCommand][0] > Char(0) THEN AppendStr(outStrPtr, StringPtr(@devData[aCommand]));
        'a': {Argument}
          IF argument^[0] > Char(0) THEN AppendStr(outStrPtr, argument);
        'e': {End marker.}
          IF devData[kEndChar][0] > Char(0) THEN AppendStr(outStrPtr, StringPtr(@devData[kEndChar]));
        END; {case}
    END; {if}
  END; {with}
END; {BuildCommand}

{*******************************************************************************
*                           The Global procs & fns                             *
*******************************************************************************}

PROCEDURE SendCmd(theCommand: INTEGER; argument: StringPtr; session: MMSesHandle);
{
 Send a command to the player and wait for the ack.
}
VAR
  outStr:       Str31;
  mDevHandle:   MDevBlockHandle;
  drvrResponse: BOOLEAN;
  err:          OSErr;
BEGIN
  mDevHandle := session^^.devBlocks;
  IF mDevHandle^^.driverCode <> NIL THEN BEGIN
  (*
    FUNCTION MDrvrProc(fnType: INTEGER; argument: Str31; mDevHandle: MDevBlockHandle): BOOLEAN;
    MDrvrProcPtr = ^MDrvrProc;

drvrResponse := mDevHandle^^.driverCode(theCommand, argument, mDevHandle);
  *)
  END
  ELSE drvrResponse := FALSE;

IF NOT drvrResponse THEN BEGIN
    BuildCommand(theCommand, argument, @outStr, session^^.devBlocks);
    err := SendSPort(@outStr, mDevHandle^^.outPortRef, session);
    IF err <> noErr THEN Exit(SendCmd);
    err := RecvUpToAck(session^^.devBlocks, 180);
    IF err <> noErr THEN Exit(SendCmd);
  END;
END; {SendCmd}

FUNCTION FrameNo(session: MMSesHandle): Longint;
{
```

```
Return the current frame number.

VAR
  str:      Str31;
  outStr:   Str31;
  frame:    Longint;
  err:      OSErr;

BEGIN
  { Get the current frame number... }
  str[0] := Char(0);
  FrameNo := 0;
  BuildCommand(kFrameReq, @str, @outStr, session^^.devBlocks);
  IF SendSPort(@outStr, session^^.devBlocks^^.outPortRef, session) <> noErr THEN Exit(FrameNo);
  err := Recv2Term(@str, session^^.devBlocks, 30);
  IF str[0] <= Char(1) THEN BEGIN {Try one more time PLEASE?}
    IF Recv2Term(@str, session^^.devBlocks, 30) <> noErr THEN Exit(FrameNo);
  END;
  {Convert it to a long.}
  IF str[0] <> Char(0) THEN BEGIN
    StringToNum(str, frame);
    FrameNo := frame;
  END;
END; {FrameNo}

PROCEDURE SetupDevice(session: MMSesHandle);
{ Initialize the device and the serial port.}
VAR portNumber: INTEGER;
    inPort,    outPort: INTEGER;
    actualIn,  actualOut: INTEGER;
    shakes:    SerShk;
    bdRate:    INTEGER;

BEGIN
  portNumber := 1; {modem port - hardwired for now.}
  if (portNumber < 1) or (portNumber > 2) then SysBeep(5);

if portNumber = 1 then
      begin
          inPort := -6; outPort := -7;
      end
  else
      begin
          inPort := -8; outPort := -9;
      end;
  if (OpenDriver('.AOut',actualOut) <> noErr) or (OpenDriver('.AIn',actualIn) <> noErr) then
      NotifyUser(kSerProblem, session); {*Fail(kSerialErr);*}
  if (actualOut <> outPort) or (actualIn <> inPort) then NotifyUser(kSerProblem, session); {*Fail(kSerialErr)
  with shakes do
      begin
          fXOn := 0; fCTS := 0; {xon := CHR(17); xoff := CHR(19);} errs := 0; evts := 0; fInX := 0;
      end;

IF SerHShake(actualIn,shakes) <> noErr then NotifyUser(kSerProblem, session); {*Fail(kSerialErr);*}
  IF SerHShake(actualOut,shakes) <> noErr then NotifyUser(kSerProblem, session); {*Fail(kSerialErr);*} bdRate := baud4800+stop10+noParity+data8;
  IF SerReset(actualIn, bdRate) <> noErr THEN  NotifyUser(kSerProblem, session); {*Fail(kSerialErr);*}
  IF SerReset(actualOut, bdRate) <> noErr THEN  NotifyUser(kSerProblem, session); {*Fail(kSerialErr);*}

{Reset the player.}
  {*IF initPlayer THEN SendCmd('SA');*}
END; {SetupDevice}

END.
```

```
{ File: HistoryUtils.incl.p
  First created: November 10th, 1989
  Hans Peter Brøndmo This file provides history related routines.

}
{$R-} { No range checking }

UNIT HistoryUtils;

INTERFACE

USES    MemTypes, QuickDraw, OSIntf, ToolIntf, PackIntf,
        CSLib, MMTypes, FileProcs, ToolUtils, LinkFile, GNEPatch;

PROCEDURE   BuildHistoryMenu(theTool: LinkToolHndl; histMenu: MenuHandle);

PROCEDURE   DrawHistIndicator(session: MMSesHandle);

PROCEDURE   DoLinkHistory(session: MMSesHandle; histSelect: INTEGER);

PROCEDURE   UpALevel(session: MMSesHandle);

PROCEDURE   AddHistory(session: MMSesHandle; histSeg: SegmentHandle; frameRef: Longint);

PROCEDURE   DeleteHistory(session: MMSesHandle);

IMPLEMENTATION

{
  Link history.
}

PROCEDURE BuildHistoryMenu(theTool: LinkToolHndl; histMenu: MenuHandle);
{
  Builds a history menu based on the link tool's history list.
}
VAR
  aHistHndl:    HistListHandle;
BEGIN
  aHistHndl := theTool^^.linkHistory;
  WHILE aHistHndl <> NIL DO BEGIN
    InsMenuItem(histMenu, aHistHndl^^.origSegName, 0);
    aHistHndl := aHistHndl^^.nextHistory;
  END;
END; {BuildHistoryMenu}

PROCEDURE DrawHistIndicator(session: MMSesHandle);
{
 Draws the indicator in a history windoid.
 If it's a micon nothing is done. If it's a picon the picon is redrawn and
 if it's the "Return link", that picture is redrawn.
}
VAR
  aRect:        Rect;
  savePort:     GrafPtr;
  iconRef:      INTEGER;
  theTool:      LinkToolHndl;
BEGIN
  theTool := session^^.theTools^^.tools[kLinkItem].links;
  GetPort(savePort);
  SetPort(theTool^^.histIndicator);
  WITH aRect DO BEGIN
    top := 0;
    left := 0;
    bottom := kVIcon;
    right := kHIcon;
  END;
  CASE theTool^^.indType OF
```

```
    kRLIcon:
    BEGIN
      {Perhaps we don't need to save port and set port since we're
       only being called in response to update.
      }
      {If picture resource is made purgable then check that it's loaded before calling
       DrawPicture here.
      }
      IF theTool^^.histPict^ = NIL THEN LoadResource(Handle(theTool^^.histPict));
      DrawPicture(theTool^^.histPict, aRect);
    END;
    kIcon:
    BEGIN
      iconRef := GetIconRef(session, theTool^^.linkHistory^^.origSegFName);
      DrawColorPict(session^^.currScreenIcon, iconRef, theTool^^.indicator.anIcon, aRect);
    END;
  END; {case}
  SetPort(savePort);
END; {DrawHistIndicator}

PROCEDURE DoLinkHistory(session: MMSesHandle; histSelect: INTEGER);
{
 Given a selection indicator this routine "does" history.
 All history items "below and including" the histSelect indicator are
 removed. If the history list becomes empty the return link windoid is hidden.
 If the indicator type is kIcon or kMicon, the appropriate indicator for
 the next history element up is placed in the indicator.

Changing indicator goes like this: RLIcon -> Icon -> Micon -> RLIcon...
}
VAR
  theTool:      LinkToolHndl;
  aHistList:    HistListHandle;
  nextHistList: HistListHandle;
  itemCount:    INTEGER;
  aRect:        Rect;
  savePort:     GrafPtr;
  tempMicon:    MiconHandle;
BEGIN
  theTool := session^^.theTools^^.tools[kLinkItem].links;
  itemCount := theTool^^.histCount;

IF histSelect > itemCount THEN BEGIN {Change indicator}
    WITH aRect DO BEGIN
      top := 0;
      left := 0;
      bottom := kVIcon;
      right := kHIcon;
    END;
    CASE theTool^^.indType OF
      kRLIcon: {Currently rlIcon, change to picon.}
      BEGIN
        theTool^^.indType := kIcon;
        WITH theTool^^.linkHistory^^ DO theTool^^.indicator.anIcon :=
          GetIconIndex(origSegName, origSegFName, session);
      END;

kIcon: {Currently picon, change to Micon.}
      BEGIN
        WITH theTool^^.linkHistory^^ DO tempMicon :=
          NewMicon(origSegName, origSegFName, aRect, theTool^^.histIndicator, session, FALSE);
        IF tempMicon = NIL THEN BEGIN
          theTool^^.indType := kRLIcon;
          theTool^^.indicator.aMicon := NIL;
        END
        ELSE BEGIN
          theTool^^.indicator.aMicon := tempMicon;
          theTool^^.indType := kMicon;
          Exit(DoLinkHistory);
        END;
```

```
      END;

kMicon: (currently micon, change to RLIcon)
    BEGIN
      theTool^^.indType := kRLIcon;
      RemovePortMicons(theTool^^.histIndicator, session);
      theTool^^.indicator.aMicon := NIL;
    END;
  END; (case)
  GetPort(savePort);
  SetPort(theTool^^.histIndicator);
  InvalRect(aRect);
  SetPort(savePort);
END
ELSE IF histSelect > 0 THEN BEGIN (Move up the history list.)
  theTool^^.histCount := histSelect-1;

IF theTool^^.indType = kMicon THEN BEGIN (Remove the micon.)
    RemovePortMicons(theTool^^.histIndicator, session);
    theTool^^.indicator.aMicon := NIL;
  END;

itemCount := itemCount+1-histSelect;
  nextHistList := theTool^^.linkHistory;
  WHILE itemCount > 0 DO BEGIN
    aHistList := nextHistList;
    nextHistList := aHistList^^.nextHistory;
    IF itemCount > 1 THEN DisposHandle(Handle(aHistList));
    itemCount := itemCount-1;
  END;
  theTool^^.linkHistory := nextHistList;
  WITH aHistList^^ DO VidSegPlay(session, origSegName, origSegFName, FALSE, outRef);
  WITH aHistList^^ DO SendCardMessage(Concat('linkReturn "',origSegName,'","', origSegFName,'"'));
  IF NOT(session^^.autoLinks) THEN AutoLinks(session, TRUE);   (When going back in history we turn on links.
  DisposHandle(Handle(aHistList));
  If nextHistList = NIL THEN BEGIN
    ShowHide(theTool^^.histIndicator, FALSE);
  END
  ELSE CASE theTool^^.indType OF
    kMicon:
    BEGIN (Add a micon.)
      WITH aRect DO BEGIN
        top := 0;
        left := 0;
        bottom := kVIcon;
        right := kHIcon;
      END;
      WITH nextHistList^^ DO theTool^^.indicator.aMicon :=
        NewMicon(origSegName, origSegFName, aRect, theTool^^.histIndicator, session, FALSE);
      (FILL IN PICON IF NewMicon returns NIL.)
    END;
    kIcon:
    BEGIN
      WITH aRect DO BEGIN
        top := 0;
        left := 0;
        bottom := kVIcon;
        right := kHIcon;
      END;
      WITH nextHistList^^ DO theTool^^.indicator.anIcon :=
        GetIconIndex(origSegName, origSegFName, session);
      GetPort(savePort);
      SetPort(theTool^^.histIndicator);
      InvalRect(aRect);
      SetPort(savePort);
    END;
  END; (case)
END;
END; (DoLinkHistory)
```

```
PROCEDURE UpALevel(session: MMSesHandle);
{
 Takes us up one level in history list.
}
BEGIN
  DoLinkHistory(session, session^^.theTools^^.tools[kLinkItem].links^^.histCount);
END;

PROCEDURE AddHistory(session: MMSesHandle; histSeg: SegmentHandle; frameRef: Longint);
{
 Adds to the history list.
}
VAR
  theTool:    LinkToolHndl;
  firstHist:  HistListHandle;
  newHist:    HistListHandle;
  aMicon:     MiconHandle;
  aRect:      Rect;

PROCEDURE HistIcon;
  {
   Adds a hist icon.
   This naturally assumes that the variables theTool, newHist and aRect are set properly
   on entry.
  }
  VAR savePort: GrafPtr;
  BEGIN
    WITH newHist^^ DO theTool^^.indicator.anIcon :=
      GetIconIndex(origSegName, origSegFName, session);
    GetPort(savePort);
    SetPort(theTool^^.histIndicator);
    InvalRect(aRect);
    SetPort(savePort);
  END; (HistIcon)
BEGIN
  theTool   := session^^.theTools^^.tools[kLinkItem].links;
  firstHist := theTool^^.linkHistory;
  newHist   := HistListHandle(NewHandle(sizeof(HistList)));
  IF newHist = NIL THEN Exit(AddHistory);
  WITH newHist^^ DO BEGIN
    nextHistory := firstHist;
    origSegName := histSeg^^.seqName;
    origSegFName := histSeg^^.sourceName;
    outRef := frameRef;
  END;
  theTool^^.linkHistory := newHist;

WITH aRect DO BEGIN
    top    := 0;
    left   := 0;
    bottom := kVIcon;
    right  := kHIcon;
  END;
  CASE theTool^^.indType OF
    kMicon:
    BEGIN
      RemovePortMicons(theTool^^.histIndicator, session);
      WITH newHist^^ DO aMicon :=
        NewMicon(origSegFName, origSegFName, aRect, theTool^^.histIndicator, session, FALSE);
      IF aMicon <> NIL THEN theTool^^.indicator.aMicon := aMicon
      ELSE HistIcon;
    END;
    kIcon: {Get new icon index and iconFRef and cause update.}
      HistIcon;
  END;
  WITH theTool^^ DO BEGIN
    histCount := histCount+1;
    IF histCount = 1 THEN BEGIN
      ShowHide(histIndicator, TRUE);
      BringToFront(histIndicator);
```

```
    END;
  END;
END; {AddHistory}

PROCEDURE DeleteHistory(session: MMSesHandle);
{
 Removes the history record and hides the hidicator.
}
VAR
  theTool:       LinkToolHndl;
  aHistList:     HistListHandle;
  nextHistList:  HistListHandle;
  itemCount:     INTEGER;
  aRect:         Rect;
  savePort:      GrafPtr;
  tempMicon:     MiconHandle;
BEGIN
  theTool := session^^.theTools^^.tools[kLinkItem].links;
  theTool^^.histCount := 0;
  aHistList := theTool^^.linkHistory;
  IF aHistList <> NIL THEN BEGIN
    IF theTool^^.indType = kMicon THEN BEGIN
      RemovePortMicons(theTool^^.histIndicator, session);
      theTool^^.indicator.aMicon := NIL;
     END;
    WHILE aHistList <> NIL DO BEGIN
      nextHistList := aHistList^^.nextHistory;
      DisposHandle(Handle(aHistList));
      aHistList := nextHistList;
    END;
    theTool^^.linkHistory := NIL;
    ShowHide(theTool^^.histIndicator, FALSE);
  END;
END; {DeleteHistory}

END.
```

```
{$R-}

(*
    FileProcs are the procedures that handle file access in the
    MultiMediaToolKit.

NOTE!
    There is a fair amount of unoptimized code in this file. A greater
    degree of code sharing can easily be achieved.

To compile and link this file using Macintosh Programmer's Workshop
    (HyperXCmd.p and XCmdGlue.inc must be accessible).

pascal -w FileProcs.p --> FileProcs.p.o

When you build your own XFCNs, if you need to load
    "{MPW}"Libraries:interface.o, then say -m ENTRYPOINT in the link statement
    to filter out all routines you don't use.
*)

UNIT FileProcs;

INTERFACE

USES    MemTypes, QuickDraw, OSIntf, ToolIntf, PackIntf,
        CSLib, MMTypes, ToolUtils, HyperXCmd;

FUNCTION    GetSegFileVRef(segFName: Str31; session: MMSesHandle): INTEGER;

FUNCTION    GetIconRef(session: MMSesHandle; segFName: Str31): INTEGER;

FUNCTION    GetCurrSegName(session: MMSesHandle): Str31;

FUNCTION    GetRecentFName(session: MMSesHandle): Str31;

FUNCTION    GetVSegFName(session: MMSesHandle): Str31;

PROCEDURE   GetSegFileInfo(segFName: Str31; VAR aFileList: FileListHandle;
                VAR aSegBoard: SegBoardHndl; VAR item: INTEGER; session: MMSesHandle);

FUNCTION    GetVideoSeg(segName: Str31; refNum: INTEGER): SegmentHandle;

FUNCTION    NoVideoSeg(refNum: INTEGER; VAR count: INTEGER): OSErr;

PROCEDURE   DisposeSegment(aSegment: SegmentHandle);

FUNCTION    GetVideoSegName(index: INTEGER; refNum: INTEGER): Str31;

FUNCTION    GetSegPictIndex(segName: Str31; refNum: INTEGER): INTEGER;

FUNCTION    GetPictIndex(index: INTEGER; refNum: INTEGER): INTEGER;

FUNCTION    AddVideoSeg(aSegment: SegmentHandle; refNum: INTEGER; session: MMSesHandle): OSErr;

FUNCTION    DelVideoSeg(segName: Str31; refNum: INTEGER; session: MMSesHandle): OSErr;

FUNCTION    UpdateVideoSeg(videoSeg: SegmentHandle; refNum: INTEGER; session: MMSesHandle): OSErr;

FUNCTION    NewSegPicture(smallPicture: PixMapHandle; VAR pictIndex: INTEGER; refNum: INTEGER; session: MMSes FUNCTION    SaveMicon(segName, segFName: Str31; micon: MiconHandle; session: MMSesHandle): OSErr;

FUNCTION    MiconExists(segName, segFName: Str31; session: MMSesHandle): BOOLEAN;

FUNCTION    GetMiconList(segName, segFName: Str31; miconPort: GrafPtr; session: MMSesHandle): MiconListHandle FUNCTION    NewMiconList(aMicon: MiconHandle; aSegName, aSegFName: Str31; aMiconRect: Rect; aMiconPort: GrafP FUNCTION    NewMicon(segName, segFName: Str31; miconRect: Rect; miconPort: GrafPtr;
```

```
                    session: MMSesHandle; reportError: BOOLEAN): MiconHandle;

PROCEDURE   Add2MiconList(VAR aMiconList: MiconListHandle; aNewMiconList: MiconListHandle);

FUNCTION    OpenNewSegment(session: MMSesHandle; name: Str255; pathName: Str255;
                    vRefVal: INTEGER): OSErr;

PROCEDURE   DisposeSegBoard(session: MMSesHandle; fileName: Str31);

FUNCTION    MMOpen(VAR name: Str255; pathName: Str255; VAR refNum: INTEGER; VAR vRefVal: INTEGER): OSErr;

FUNCTION    IconOpen(name: Str255; pathName: Str255; VAR refNum: INTEGER; vRefVal: INTEGER): OSErr;

FUNCTION    MMClose(name: Str31; session: MMSesHandle): OSErr;

FUNCTION    FillHandle(aHandle: Handle; refNum: INTEGER): OSErr;

FUNCTION    GetSegmentFile(name: Str255): SFReply;

FUNCTION    PutSegmentFile(fileName: Str31): SFReply;

IMPLEMENTATION

PROCEDURE   MacsBugStr(signalStr:   Str255);
    INLINE  $a9ff;

FUNCTION GetSegFileVRef(segFName: Str31; session: MMSesHandle): INTEGER;
{
 Returns the vRefNum for the given <segFName>.
}
VAR
  theFileList: FileListHandle;
BEGIN
  theFileList := session^^.openSegFiles;
  WHILE theFileList <> NIL DO BEGIN
    IF EqualString(segFName, theFileList^^.segFileName, FALSE, FALSE) THEN Leave;
    theFileList := theFileList^^.nextFile;
  END;
  IF theFileList <> NIL THEN GetSegFileVRef := theFileList^^.vRefNum
  ELSE GetSegFileVRef := 0;
END; {GetSegFileVRef}

FUNCTION GetIconRef(session: MMSesHandle; segFName: Str31): INTEGER;
{
 This function finds a segment board with name segFName and returns it's
 icon file reference number.
}
VAR
  aSegTool:   SegBoardHndl;
BEGIN
  aSegTool := session^^.theTools^^.tools[kSegBoardItem].segs;
  WHILE aSegTool <> NIL DO BEGIN
    IF EqualString(aSegTool^^.boardName, segFName, FALSE, FALSE) THEN Leave;
    aSegTool := aSegTool^^.nextBoard;
  END;
  IF aSegTool <> NIL THEN GetIconRef := aSegTool^^.iconRefNum
  ELSE GetIconRef := 0;
END; {GetIconRef}

FUNCTION GetCurrSegName(session: MMSesHandle): Str31;
{
 Return the name of the current segment.
}
BEGIN
  GetCurrSegName := session^^.theTools^^.tools[kVideoItem].film^^.theSegment^^.segName;
END;

FUNCTION GetRecentFName(session: MMSesHandle): Str31;
{
 Return name of the segment file that last segment was played
```

```
from.

BEGIN
  GetRecentFName := session^^.theTools^^.tools[kVideoItem].film^^.theSegment^^.sourceName;
END;

FUNCTION GetVSegFName(session: MMSesHandle): Str31;
{
Returns the name for the front most video segment file.
Use this function so the current mechanism of accessing segments
can more easily be changed at some future point.
}
BEGIN
  GetVSegFName := session^^.openSegFiles^^.segFileName;
END;

PROCEDURE  GetSegFileInfo(segFName: Str31; VAR aFileList: FileListHandle; VAR aSegBoard: SegBoardHndl;
                         VAR item: INTEGER; session: MMSesHandle);
{
This procedure returns <aFileList> and <aSegBoard> if a <segFName> match was found in the session.
<count> contains the number of the segBoard in the list.
}
VAR
  count:         INTEGER;
  theSegBoard:   SegBoardHndl;
  theFileList:   FileListHandle;

BEGIN
  theSegBoard := session^^.theTools^^.tools[kSegBoardItem].segs;
  theFileList := session^^.openSegFiles;
  count := 1;
  WHILE theFileList <> NIL DO BEGIN
    IF EqualString(segFName, theFileList^^.segFileName, FALSE, FALSE) THEN BEGIN
      item := count;
      aFileList := theFileList;
      aSegBoard := theSegBoard;
      Exit(GetSegFileInfo);
    END;
    theFileList := theFileList^^.nextFile;
    theSegBoard := theSegBoard^^.nextBoard;
    count := count+1;
  END;
  count := 0;
  aFileList := NIL;
  aSegBoard := NIL;
END; {GetSegFileInfo}

{-------------------------------------------------------------------------
  Video segment procedures.
-------------------------------------------------------------------------}

FUNCTION GetVideoSeg(segName: Str31; refNum: INTEGER): SegmentHandle;
{Returns a handle to the video segment named segName if it is found in the
 file referenced by refNum. If no such file exists or if the named segment
 cannot be found, the function returns NIL.
}
VAR
  count:   INTEGER;
  posOff:  Longint;
  err:     OSErr;

FUNCTION Comb4Seg(count: INTEGER): SegmentHandle;
  {Combs the file for a segment matching the name segName.
   The function returns FALSE if no matching segment is found, otherwise
   if returns true and places the new segment in "seg".
   "count" is the number of segments in the file references by refNum.
  }
  VAR
    seg:        SegmentHandle;
    noSegList:  INTEGER;
```

```pascal
    newLL:      LLHandle;
    lastLL:     LLHandle;

BEGIN
    seg := SegmentHandle(NewHandle(sizeof(Segment)));
    IF seg = NIL THEN Exit(GetVideoSeg);

err := noErr;
    WHILE (count > 0) AND (err = noErr) DO {Check each segment in the file.}
    BEGIN
      count := count -1;
      {Call FillHandle in stead?}
      posOff := Longint(sizeof(Segment));
      HLock(Handle(seg));
      err := FSRead(refNum, posOff, Ptr(seg^));
      HUnlock(Handle(seg));
      noSegList := seg^^.noElements;

IF EqualString(seg^^.segName, segName, FALSE, FALSE) THEN
      BEGIN
        {Load the segment list creating new handles for it.}
        seg^^.segmentList := NIL;
        lastLL := NIL;

WHILE noSegList > 0 DO
        BEGIN
          noSegList := noSegList-1;
          newLL := LLHandle(NewHandle(sizeof(LinkedList)));
          posOff := Longint(sizeof(LinkedList));
          HLock(Handle(newLL));
          err := FSRead(refNum, posOff, Ptr(newLL^));
          HUnlock(Handle(newLL));

IF seg^^.segmentList = NIL THEN seg^^.segmentList := newLL;
          IF lastLL <> NIL THEN lastLL^^.nextElement := newLL;
          newLL^^.prevElement := lastLL;
          newLL^^.nextElement := NIL;
          lastLL := newLL;
        END; {while}
        Comb4Seg := seg;
        Exit(Comb4Seg);
      END
      ELSE {skip the segment list.}
      BEGIN
        posOff := Longint(noSegList*sizeof(LinkedList));
        err := SetFPos(refNum, fsFromMark, posOff);
        IF err <> noErr THEN SysBeep(5);
      END;
    END; {while}
    {Didn't find it.}
    DisposHandle(Handle(seg));
    Comb4Seg := NIL;
  END; {Comb4Seg}

BEGIN {GetVideoSeg}
  GetVideoSeg := NIL;

err := NoVideoSeg(refNum, count);
  IF err = noErr THEN
  BEGIN
    GetVideoSeg := Comb4Seg(count);
  END;
END; {GetVideoSeg}

PROCEDURE DisposeSegment(aSegment: SegmentHandle);
{
 Disposes of the linked segment list of the given segment and
 "clears" the fields of the segment itself.
 NOTE!
   This does not save the segment. It should be saved first with
```

```
   a call to SaveSegment.
}
VAR
  aList:    LLHandle;
  bList:    LLHandle;
BEGIN
  WITH aSegment^^ DO BEGIN
    segName := '';
    stillName := '';
    stillDirID := 0;
    stillEffect := kNoEffect;
    recording := FALSE;
    aList := segmentList;
  END;

WHILE aList <> NIL DO
  BEGIN
    bList := aList^^.nextElement;
    DisposHandle(Handle(aList));
    aList := bList;
  END;

WITH aSegment^^ DO BEGIN
    segmentList := NIL;
    segIconIndex := -1;
    noElements := 0;
  END;
END; {DisposeSegment}

FUNCTION NoVideoSeg(refNum: INTEGER; VAR count: INTEGER): OSErr;
{Returns the number of video segments in the file in the file referenced
 by refNum. If there was a problem referencing the file or if it's empty
 the function returns a value to indicate this.
}
VAR
  posOff:   Longint;
  err:      OSErr;

BEGIN
  posOff := 2;   {Point to logical beginning of file.}
  err := SetFPos(refNum, fsFromStart, posOff);
  posOff := 2;
  NoVideoSeg := FSRead(refNum, posOff, @count);
END; {NoVideoSeg}

FUNCTION IndexedSegment(index: INTEGER; refNum: INTEGER): SegmentHandle;
{
 Returns a handle to the indexed segment or NIL if index out of range or
 error in reading file.
 NOTE!
 This only returns the main segment body, not the linked list of video segments.
}
VAR
  posOff:   Longint;
  count:    INTEGER;
  err:      OSErr;
  seg:      SegmentHandle;

PROCEDURE ErrHandle(err: OSerr);
  BEGIN
    IF err <> noErr THEN
    BEGIN
      HUnlock(Handle(seg));
      DisposHandle(Handle(seg));
      EXIT(IndexedSegment);
    END;
  END;

BEGIN
  IndexedSegment := NIL;
```

```
    seg := SegmentHandle(NewHandle(sizeof(Segment)));
    IF seg = NIL THEN Exit(IndexedSegment);

err := NoVideoSeg(refNum, count); {Leaves file mark at first segment}
    IF (err <> noErr) OR (index > count) THEN EXIT(IndexedSegment);

HLock(Handle(seg));
    WHILE index > 0 DO
    BEGIN
      index := index-1;

posOff := sizeof(Segment);
      ErrHandle(FSRead(refNum, posOff, Ptr(seg^)));
      posOff := seg^^.noElements*sizeof(LinkedList);
      ErrHandle(SetFPos(refNum, fsFromMark, posOff));
    END;
    HUnlock(Handle(seg));
    IndexedSegment := seg;
END; {IndexedSegment}

FUNCTION GetVideoSegName(index: INTEGER; refNum: INTEGER): Str31;
{Returns the name of the index-th segment in the segment file referenced by
 refNum.
}
VAR
  seg:     SegmentHandle;

BEGIN
  GetVideoSegName := '';
  seg := IndexedSegment(index, refNum);
  IF seg = NIL THEN Exit(GetVideoSegName);

GetVideoSegName := seg^^.segName;
  DisposHandle(Handle(seg));
END; {GetVideoSegName}

FUNCTION GetSegPictIndex(segName: Str31; refNum: INTEGER): INTEGER;
{Returns the icon index of the named segment in the segment file referenced by
 refNum.

See also "GetIconIndex" in File ToolUtils.p
}
VAR
  seg:     SegmentHandle;

BEGIN
  GetSegPictIndex := -1;
  seg := GetVideoSeg(segName, refNum);
  IF seg = NIL THEN Exit(GetSegPictIndex);

GetSegPictIndex := seg^^.segIconIndex;
  DisposeSegment(seg);
  DisposHandle(Handle(seg));
END; {GetSegPictIndex}

FUNCTION GetPictIndex(index: INTEGER; refNum: INTEGER): INTEGER;
{Returns the icon index of the index-th segment in the segment file referenced by
 refNum.
}
VAR
  seg:     SegmentHandle;

BEGIN
  GetPictIndex := -1;
  seg := IndexedSegment(index, refNum);
  IF seg = NIL THEN Exit(GetPictIndex);

GetPictIndex := seg^^.segIconIndex;
  DisposHandle(Handle(seg));
END; {GetPictIndex}
```

```
FUNCTION QueueSegment(name: Str31; refNum: INTEGER): OSErr;
{
 Finds a segment with the segment name <name> and positions the file marker at
 the beginning of that segment.
}
VAR
  seg:         SegmentHandle;
  noSegList:   INTEGER;
  lastMark:    Longint;
  posOff:      Longint;
  count:       INTEGER;
  err:         OSErr;

BEGIN
  seg := SegmentHandle(NewHandle(sizeof(Segment)));
  IF seg = NIL THEN BEGIN
    QueueSegment := -1;
    Exit(QueueSegment);
  END;

QueueSegment := noErr;
  err := NoVideoSeg(refNum, count);
  WHILE (count > 0) AND (err = noErr) DO {Check each segment in the file.}
  BEGIN
    count := count -1;
    err := GetFPos(refNum, lastMark);
    {Call FillHandle in stead?}
    posOff := Longint(sizeof(Segment));
    HLock(Handle(seg));
    err := FSRead(refNum, posOff, Ptr(seg^));
    IF err <> noErr THEN BEGIN
      QueueSegment := err;
      Leave;
    END;
    HUnlock(Handle(seg));
    noSegList := seg^^.noElements;

IF EqualString(seg^^.segName, name, FALSE, FALSE) THEN
    BEGIN {Position the mark and leave.}
      QueueSegment := SetFPos(refNum, fsFromStart, lastMark);
      Leave;
    END
    ELSE {skip the segment list.}
    BEGIN
      posOff := Longint(noSegList*sizeof(LinkedList));
      err := SetFPos(refNum, fsFromMark, posOff);
      IF err <> noErr THEN BEGIN
        QueueSegment := err;
        Leave;
      END;
    END;
  END; {while}
  {Didn't find it.}
  DisposHandle(Handle(seg));
END; {QueueSegment}

FUNCTION WriteSegment(aSegment: SegmentHandle; refNum: INTEGER; session:MMSesHandle): OSErr;
{
 Writes out only the main segment block, not the linked list of video segments.
}
VAR
  posOff:      Longint;
  listElement: LLHandle;
  err:         OSErr;
BEGIN
  posOff := Longint(sizeof(Segment));
  listElement := aSegment^^.currSegment;  {Save while written to file.}
  aSegment^^.currSegment := NIL;
  HLock(Handle(aSegment));
```

```
  err := FSWrite(refNum, posOff, Ptr(aSegment^));
  HUnlock(Handle(aSegment));
  WriteSegment := err;
  IF err <> noErr THEN {we've got a serious problem!}
  BEGIN
    NotifyUser(kcnwFile, session);
  END;
  aSegment^^.currSegment := listElement;    {restore}
END; {WriteSegment}

FUNCTION AddVideoSeg(aSegment: SegmentHandle; refNum: INTEGER; session: MMSesHandle): OSErr;
{Adds a new video segment to the file referenced by refNum. If the segment
 cannot be added or the refNum file cannot be written to, an appropriate
 error is returned by the function.
}
VAR
  posOff:      Longint;
  verCount:    Longint;     {Version number and segment count.}
  count, i:    INTEGER;
  err:         OSErr;
  seg:         SegmentHandle;
  listElement: LLHandle;

BEGIN
  AddVideoSeg := noErr;
  err := NoVideoSeg(refNum, count);
  IF err = noErr THEN
  BEGIN
    i := count;
    {Skip (move mark) to end of file.}
    seg := SegmentHandle(NewHandle(sizeof(Segment)));
    IF seg = NIL THEN BEGIN
      NotifyUser(kOutOfMemory, session);
      Exit(AddVideoSeg);
    END;
    WHILE i > 0 DO
    BEGIN
      err := FillHandle(Handle(seg), refNum);
      IF err <> noErr THEN BEGIN
        DisposHandle(Handle(seg));
        NotifyUser(kFileError, session);
        AddVideoSeg := err;
        Exit(AddVideoSeg);
      END;
      posOff := seg^^.noElements*sizeof(LinkedList);
      err := SetFPos(refNum, fsFromMark, posOff);
      IF err <> noErr THEN BEGIN
        DisposHandle(Handle(seg));
        NotifyUser(kFileError, session);
        AddVideoSeg := err;
        Exit(AddVideoSeg);
      END;
      i := i-1;
    END;
    DisposHandle(Handle(seg));
  END
  ELSE IF err = eofErr THEN
  BEGIN
    verCount := 0;   {version = 0, count = 0}
    posOff := 4;          {four bytes.}
    err := FSWrite(refNum, posOff, @verCount);
    count := 0;
  END
  ELSE Exit(AddVideoSeg);

{The mark should be positioned properly at this pt so now write out the handle(s).}
  err := WriteSegment(aSegment, refNum, session);
  IF err <> noErr THEN BEGIN
    NotifyUser(kcnwFile, session);
    AddVideoSeg := err;
```

```
    Exit(AddVideoSeg);
  END;

listElement := aSegment^^.segmentList;
  FOR i := 1 TO aSegment^^.noElements DO
  BEGIN
    posOff := sizeof(LinkedList);
    HLock(Handle(listElement));
    err := FSWrite(refNum, posOff, Ptr(listElement^));
    HUnlock(Handle(ListElement));
    IF err <> noErr THEN
    BEGIN
      NotifyUser(kcnwFile, session);
      AddVideoSeg := err;
      Exit(AddVideoSeg);
    END;
    listElement := listElement^^.nextElement;
  END;

{Finally update length indicator.}
  count := count + 1;
  posOff := 2;
  err := SetFPos(refNum, fsFromStart, posOff);
  err := FSWrite(refNum, posOff, @count);   {Write 'count' (2 bytes).}
END;  {AddVideoSeg}

FUNCTION DelVideoSeg(segName: Str31; refNum: INTEGER; session:MMSesHandle): OSErr;
{Attempts to delete the segment 'segName' from the file referenced by refNum.
 If the attempt is not successful an appropriate error code is returned.
 Otherwise the function returns noErr.
 NOTE: This function does not remove an actual handle to a segment, rather it
 deletes a segment from a segment file.
}
VAR
  err:      OSErr;
  curPos:   Longint;
  startPos: Longint;
  posOff:   Longint;
  toPos:    Longint;
  endPos:   Longint;
  hSize:    Longint;
  tempH:    Handle;
  seg:      SegmentHandle;
  count:    INTEGER;

BEGIN
  {First get the segment to figure out how long it is.}
  err := QueueSegment(segName, refNum);
  IF err <> noErr THEN BEGIN
    DelVideoSeg := err;
    Exit(DelVideoSeg);
  END;
  err := GetFPos(refNum, curPos);
  err := GetEOF(refNum, endPos);
  {
   Calculate size of the segment and put marker at startPos at the
   beginning of the next segment.
  }
  seg := SegmentHandle(NewHandle(sizeof(Segment)));
  IF seg = NIL THEN BEGIN
    NotifyUser(kOutOfMemory, session);
    Exit(DelVideoSeg);
  END;
  err := FillHandle(Handle(seg), refNum);
  IF err <> noErr THEN BEGIN
    DisposHandle(Handle(seg));
    NotifyUser(kFileError, session);
    Exit(DelVideoSeg);
  END;
  posOff := seg^^.noElements*sizeof(LinkedList);
```

```
  err := SetFPos(refNum, fsFromMark, posOff);
  IF err <> noErr THEN NotifyUser(kFileError, session);
  err := GetFPos(refNum, startPos);
  IF err <> noErr THEN NotifyUser(kFileError, session);

hSize := endPos - startPos;
  tempH := NewHandle(hSize);
  IF tempH = NIL THEN BEGIN
    DisposHandle(Handle(seg));
    NotifyUser(kOutOfMemory, session);
    Exit(DelVideoSeg);
  END;

err := FillHandle(Handle(tempH), refNum);
  IF err <> noErr THEN BEGIN
    DisposHandle(tempH);
    DisposHandle(Handle(seg));
    NotifyUser(kFileError, session);
    Exit(DelVideoSeg);
  END;

err := SetFPos(refNum, fsFromStart, curPos);
  HLock(tempH);
  err := FSWrite(refNum, hSize, tempH^);
  HUnlock(tempH);
  err := SetEOF(refNum, endPos-(startPos-curPos));  {Move end LEOF marker back.}

DisposHandle(tempH);
  DisposHandle(Handle(seg));

err := NoVideoSeg(refNum, count);
  count := count-1;
  posOff := 2;
  err := SetFPos(refNum, fsFromStart, posOff);
  posOff := 2;
  err := FSWrite(refNum, posOff, @count);   {Write 'count' (2 bytes).}

DelVideoSeg := noErr;
END; {DelVideoSeg}

FUNCTION UpdateVideoSeg(videoSeg: SegmentHandle; refNum: INTEGER; session:MMSesHandle): OSErr;
{
 This function updates the segment videoSeg by rewriting it to the file referred to
 by refNum.
 NOTE!
 In the future this function should rewrite the entire segment (including the in/out pts)
 updating segments of variable length.
}
VAR
  count:    INTEGER;
  err:      OSErr;
BEGIN
  err := NoVideoSeg(refNum, count);
  IF err = noErr THEN BEGIN
    err := QueueSegment(videoSeg^^.segName, refNum);
    IF err <> noErr THEN BEGIN
      UpdateVideoSeg := err;
      Exit(UpdateVideoSeg);
    END;
    err := WriteSegment(videoSeg, refNum, session);
    IF err <> noErr THEN BEGIN
      UpdateVideoSeg := err;
      Exit(UpdateVideoSeg);
    END;
  END;
  UpdateVideoSeg := err;
END; {UpdateVideoSeg}

{-------------------------------------------------------------------------------
                The following routines access the file containing
```

```
                            the small pictures for segments.
  -------------------------------------------------------------------------}

FUNCTION NewSegPicture(smallPicture: PixMapHandle; VAR pictIndex: INTEGER; refNum: INTEGER; session: MMSesHan
{
 NewSegPicture writes the bit map data for a small segment picture to the file
 referenced by refNum. If pictIndex is -1 it is assumed that the segment for which
 smallPicture belongs does not already have a picture. Therefore the picture is
 added to the end of the file and it's index is returned in pictIndex. Otherwise the
 current picture indexed by pictIndex is overwritten with the new picture data.
}
VAR
  posOff:   Longint;
  temp:     Longint;
  err:      OSErr;
  pictPtr:  Ptr;

BEGIN
  posOff := kHIcon*kVIcon;
  IF pictIndex = -1 THEN BEGIN
    {Calculate offset to EOF - this will become picture's index.}
    err := GetEOF(refNum, temp);
    pictIndex := INTEGER(temp DIV posOff);

err := SetFPos(refNum, fsFromLEOF, 0); {Put it at end.}
  END
  ELSE BEGIN
    err := SetFPos(refNum, fsFromStart, posOff*Longint(pictIndex));
  END;
  IF err <> noErr THEN BEGIN
    NotifyUser(kFileError, session);
    NewSegPicture := err;
    Exit(NewSegPicture);
  END;

pictPtr := smallPicture^^.baseAddr;
  err := FSWrite(refNum, posOff, pictPtr);
  IF err <> noErr THEN NotifyUser(kFileError, session);
  NewSegPicture := err;
END; {NewSegPicture}

FUNCTION GetSegPicture(VAR pictData: Handle; pictIndex: INTEGER; refNum: INTEGER; session: MMSesHandle): OSEr
{
 The intent of this function is to get small picture data from the file referred to
 by refNum. The data if it is found, is returned in a new handle. The calling
 procedure must be responsible for disposing the handle.
 pictIndex is an index into the picture data file.
}
VAR
  posOff:   Longint;
  err:      OSErr;

BEGIN
  pictData := NIL;
  err := -1;
  IF pictIndex <> -1 THEN BEGIN
    posOff := kHIcon*kVIcon;
    err := SetFPos(refNum, fsFromStart, posOff*Longint(pictIndex));
    IF err <> noErr THEN BEGIN
      NotifyUser(kFileError, session);
      GetSegPicture := err;
      Exit(GetSegPicture);
    END;
    pictData := NewHandle(posOff);

err := FillHandle(pictData, refNum);
    IF err <> noErr THEN BEGIN
      NotifyUser(kFileError, session);
      DisposHandle(pictData);
      pictData := NIL;
```

```
   END;
  END;

GetSegPicture := err;

END; {GetSegPicture}

{ -------------------------------------------------------------------------------
                       Digital movie saving routines.
              The naming convention currently adopted for storing digital
              movie samples is to use the segment name and append the prefix
              _MICON to it.
  ------------------------------------------------------------------------------- }
FUNCTION SaveMicon(segName, segFName: Str31; micon: MiconHandle; session: MMSesHandle): OSErr;
{
 Saves a digital video segment to a file named <name>_MICON.
 If a file already exists the old content is over written (should prompt user)
 and if one does not exist, a new file is created.
}
VAR
  err:     OSErr;
  refNum:  INTEGER;
  vRefVal: INTEGER;
  outName: Str255;
  posOff:  Longint;
  tempPM:  PixMapHandle;

BEGIN
  outName := Concat(segName,'_MICON'); {Add UID to beginning of micon name. It should reflect segment file.}
  vRefVal := GetSegFileVRef(segName, session);
  err := FSOpen(outName, vRefVal, refNum);
  IF err = fnfErr THEN BEGIN {File doesn't exist yet.}
      err := Create(outName, vRefVal, 'HPmm', 'micn');
      err := FSOpen(outName, vRefVal, refNum);
  END;

IF err = noErr THEN BEGIN
    HLock(Handle(micon));
    tempPM := micon^^.pixMap;
    micon^^.pixMap := NIL;
    posOff := GetHandleSize(Handle(micon));
    err := SetFPos(refNum, fsFromStart, 0);
    err := FSWrite(refNum, posOff, Ptr(micon^));
    err := SetEOF(refNum, posOff);
    micon^^.pixMap := tempPM;
    HUnlock(Handle(micon));
    err := FSClose(refNum);
  END;
  SaveMicon := err;
END; {SaveMicon}

FUNCTION MiconExists(segName, segFName: Str31; session: MMSesHandle): BOOLEAN;
{
 This routine simply checks to see whether there exists a vigital dideo
 file corresponding to the name given in <name>.
}
VAR
  outName: Str255;
  err:     OSErr;
  fndrInfo: FInfo;
BEGIN
  outName := Concat(segName,'_MICON');
  err := GetFInfo(outName, GetSegFileVRef(segFName, session), fndrInfo);
  IF err = fnfErr THEN MiconExists := FALSE
  ELSE MiconExists := TRUE;
END; {MiconExists}

PROCEDURE Add2MiconList(VAR aMiconList: MiconListHandle; aNewMiconList: MiconListHandle);
{
 Adds <aNewMiconList> after <aMiconList>. If <aMiconList> is NIL then it is set to <aNewMiconList>.
```

```
BEGIN
  IF aMiconList = NIL THEN aMiconList := aNewMiconList
  ELSE BEGIN
    aNewMiconList^^.nextMicon := aMiconList^^.nextMicon;
    aMiconList^^.nextMicon := aNewMiconList;
  END;
END; {Add2MiconList}

FUNCTION NewMiconList(aMicon: MiconHandle; aSegName, aSegFName: Str31; aMiconRect: Rect; aMiconPort: GrafPtr)
{
  Creates a new micon list element.
}
VAR
  tempMiconList:    MiconListHandle;
BEGIN
  tempMiconList := MiconListHandle(NewHandle(sizeof(MiconList)));
  IF tempMiconList <> NIL THEN BEGIN
    WITH tempMiconList^^ DO BEGIN
      theMicon := aMicon;
      miconRect := aMiconRect;
      miconName := aSegName;
      segFName := aSegFName;
      miconPort := aMiconPort;
      nextMicon := NIL;
    END;
    WITH aMicon^^ DO resetCount := resetCount + 1;
  END;
  NewMiconList := tempMiconList;
END; {NewMiconList}

FUNCTION GetMiconList(segName, segFName: Str31; miconPort: GrafPtr; session: MMSesHandle): MiconListHandle;
{
  Returns a MiconList element that contains a micon named <segName> in the file <segFName> with the
  port <miconPort>.
  If <miconPort> is NIL the procedure returns the first list element matching both <segName>
  and <segFName>.
}
VAR
  aMiconList:   MiconListHandle;

PROCEDURE BeatIt;
  BEGIN
    GetMiconList := aMiconList;
    Exit(GetMiconList);
  END;
BEGIN
  aMiconList := session^^.miconList;
  WHILE aMiconList <> NIL DO BEGIN
    IF EqualString(segName, aMiconList^^.miconName, FALSE, FALSE) THEN
      IF EqualString(segFName, aMiconList^^.segFName, FALSE, FALSE) THEN
        IF miconPort = NIL THEN BeatIt
        ELSE IF aMiconList^^.miconPort = miconPort THEN BeatIt;
    aMiconList := aMiconList^^.nextMicon;
  END; {while}
  GetMiconList := NIL;
END; {GetMiconList}

FUNCTION NewMicon(segName, segFName: Str31; miconRect: Rect;
                  miconPort: GrafPtr; session: MMSesHandle; reportError: BOOLEAN): MiconHandle;
{
  Looks for a file with the name <segFName>_MICON and returns it's micon
  if the file is found.
  A new entry is added in the session miconList.

If the micon has already been opened a copy of the existing micon's handle is returned.
}
VAR
  err:          OSErr;
  refNum:       INTEGER;
```

```
  posOff:          Longint;
  tempPM:          PixMapHandle;
  micon:           MiconHandle;
  aNewMiconList:   MiconListHandle;
  aMiconList:      MiconListHandle;

BEGIN
  aMiconList := GetMiconList(segName,segFName, NIL, session);
  IF aMiconList <> NIL THEN BEGIN
    aNewMiconList := NewMiconList(aMiconList^^.theMicon, segName, segFName, miconRect, miconPort);
    IF aNewMiconList <> NIL THEN BEGIN
      Add2MiconList(aMiconList, aNewMiconList);
      NewMicon := aMiconList^^.theMicon;
    END
    ELSE NewMicon := NIL;
  END
  ELSE BEGIN
    err := FSOpen(Concat(segName,'_MICON'), GetSegFileVRef(segFName, session), refNum);
    IF err = fnfErr THEN BEGIN {File doesn't exist}
      NewMicon := NIL;
      Exit(NewMicon);
    END
    ELSE IF err = tmfoErr THEN BEGIN
      IF reportError THEN NotifyUser(kOutOfFiles, session);
      NewMicon := NIL;
      Exit(NewMicon);
    END
    ELSE IF err <> noErr THEN BEGIN
      IF reportError THEN NotifyUser(kFileError, session);
      NewMicon := NIL;
      Exit(NewMicon);
    END;

err := SetFPos(refNum, fsFromStart, 0);
    micon := MiconHandle(NewHandle(Longint(kSecCount)*Longint(kFramesPrSec)*
             Longint(khIcon)*Longint(kvIcon)+sizeof(MiconHeader)));
    IF micon = NIL THEN BEGIN
      err := FSClose(refNum);
      NewMicon := NIL;
      Exit(NewMicon);
    END;
    tempPM := NewPixMap;
    CopyPixMap(session^^.currScreenIcon, tempPM);

err := FillHandle(Handle(micon), refNum);
    err := FSClose(refNum);
    micon^^.pixMap := tempPM;
    micon^^.updateCount := 0;
    micon^^.resetCount := 0;
    micon^^.lastTick := 0;
    micon^^.bufSize := GetHandleSize(Handle(micon))-sizeof(MiconHeader);
    micon^^.offset := 0;
    aNewMiconList := NewMiconList(micon, segName, segFName, miconRect, miconPort);
    IF aNewMiconList <> NIL THEN BEGIN
      HLock(Handle(session));
      Add2MiconList(session^^.miconList, aNewMiconList);
      HUnLock(Handle(session));
      NewMicon := micon;
    END
    ELSE BEGIN
      DisposPixMap(micon^^.pixMap);
      DisposHandle(Handle(micon));
      IF reportError THEN NotifyUser(kOutOfMemory, session);
      NewMicon := NIL;
    END;
  END;
END; {NewMicon}

{-----------------------------------------------------------------------------
            Low level routines for accessing files.
```

```
-------------------------------------------------------------------------------}
FUNCTION OpenNewSegment(session: MMSesHandle; name: Str255; pathName: Str255;
                        vRefVal: INTEGER): OSErr;
{
 Opens a new segment file and it's corresponding icon file.

This procedure also creates a new segment browser window for the
 opened segment file.
}
VAR
  err:         INTEGER;
  iconFRef:    INTEGER;
  segFRef:     INTEGER;
  segFileList: FileListHandle;
  aSegBoard:   SegBoardHndl;
  watch:       CursHandle;
BEGIN
  watch := GetCursor(watchCursor);
  SetCursor(watch^^);

segFileList := FileListHandle(NewHandle(sizeof(FileList)));
  IF segFileList = NIL THEN BEGIN
    OpenNewSegment := memFullErr;
    InitCursor;
    Exit(OpenNewSegment);
  END;

err := MMOpen(name, pathName, segFRef, vRefVal);
  IF err <> noErr THEN BEGIN
    DisposHandle(Handle(segFileList));
    OpenNewSegment := err;
    InitCursor;
    Exit(OpenNewSegment);
  END;
  err := IconOpen(Concat(name, '_ICONS'), pathName, iconFRef, vRefVal);
  IF err <> noErr THEN BEGIN
    DisposHandle(Handle(segFileList));
    OpenNewSegment := err;
    err := FSClose(segFRef);
    InitCursor;
    Exit(OpenNewSegment);
  END;

aSegBoard := MakeSegBoard(name, session, session^^.hasOverlay);
  IF aSegBoard = NIL THEN BEGIN
    DisposHandle(Handle(segFileList));
    OpenNewSegment := memFullErr;
    err := FSClose(segFRef);
    err := FSClose(iconFRef);
    InitCursor;
    Exit(OpenNewSegment);
  END;

WITH session^^ DO IF openSegFiles = NIL THEN segFileList^^.nextFile := NIL
  ELSE segFileList^^.nextFile := openSegFiles;
  session^^.openSegFiles := segFileList;

WITH session^^.openSegFiles^^ DO BEGIN
    segFileRef := segFRef;
    segFileName := name;
    iconFileRef := iconFRef;
    vRefNum := vRefVal;
  END;

aSegBoard^^.iconRefNum := iconFRef;
  HLock(Handle(aSegBoard));
  WITH aSegBoard^^ DO
    noSegs := BuildSegNames(segNames, segFileList^^.segFileRef);
```

```
  HUnlock(Handle(aSegBoard));

InsMenuItem(session^^.theTools^^.hrMenu, name, 0);
  EnableItem(session^^.theTools^^.hrMenu, 1);
  InitCursor;
  OpenNewSegment := noErr;
END; {OpenNewSegment}

PROCEDURE DisposeSegBoard(session: MMSesHandle; fileName: Str31);
{
 Disposes the active segBoard in the session.
}
VAR
  err:          OSErr;
  openSegs:     FileListHandle;
  lastSegF:     FileListHandle;
  theBoard:     SegBoardHndl;
  lastBoard:    SegBoardHndl;
  segFileRef:   INTEGER;
  iconFileRef:  INTEGER;
  count:        INTEGER;
  segSaved:     BOOLEAN;
BEGIN
  theBoard := session^^.theTools^^.tools[kSegBoardItem].segs;
  lastBoard := NIL;
  openSegs := session^^.openSegFiles;
  lastSegF := NIL;
  count := 1;
  WHILE theBoard <> NIL DO BEGIN
    IF EqualString(theBoard^^.boardName, fileName, FALSE, FALSE) THEN BEGIN
      IF lastBoard <> NIL THEN BEGIN
        lastBoard^^.nextBoard := theBoard^^.nextBoard;
        lastSegF^^.nextFile := openSegs^^.nextFile;
      END
      ELSE BEGIN {we are at head of list.}
        session^^.theTools^^.tools[kSegBoardItem].segs := theBoard^^.nextBoard;
        session^^.openSegFiles := openSegs^^.nextFile;
      END;
      Leave;
    END;
    lastBoard := theBoard;
    theBoard := theBoard^^.nextBoard;
    lastSegF := openSegs;
    openSegs := openSegs^^.nextFile;
    count := count+1;
  END; {while}

IF theBoard <> NIL THEN BEGIN
    {Remove icon/micon}
    RemovePortMicons(theBoard^^.windoid, session);
    DelMenuItem(session^^.theTools^^.hrMenu, count);

segFileRef := openSegs^^.segFileRef;
    iconFileRef := openSegs^^.iconFileRef;
    segSaved := openSegs^^.segSaved;
    DisposHandle(Handle(openSegs));
    HLock(Handle(theBoard));
    WITH theBoard^^ DO
    BEGIN
      DisposeSegNames(segNames);
      KillControls(windoid);
      err := FSClose(iconFileRef);
      err := FSClose(segFileRef);
      DisposeWindow(windoid);
      {add other disposable fields here...}
    END;
    HUnlock(Handle(theBoard));
    DisposHandle(Handle(theBoard));
  END;
END; {DisposeSegBoard}
```

```
FUNCTION MMOpen(VAR name: Str255; pathName: Str255; VAR refNum: INTEGER; VAR vRefVal: INTEGER): OSErr;
 (Tries to open a file with the filename 'name' located in the
  system folder. If successful the ref number for the file is
  returned in refNum and noErr is returned as the function result.
  If a fnfErr is returned on the first attempt, a the procedure tries
  to create a new file with the name 'name' and file type 'VSEG'.

Otherwise an appropriate function result is returned by the function.
  This function should be used to open files containing sequence and
  segment data.
 }
VAR
  err:         OSErr;
  where:       Point;
  reply:       SFReply;
  fName:       Str255;
  paramBlock:  WDPBRec;
  vInfoBlock:  HParamBlockRec;
BEGIN
  err := FSOpen(Concat(pathName, name), vRefVal, refNum);
  MMOpen := err;
  IF err <> noErr THEN
    IF err = fnfErr {fileNotFound} THEN {Create a file.}
     BEGIN
       {Do FSOpen with option to create new file.}
       reply := GetSegmentFile(name); (*PutSegmentFile(name);*)
       IF reply.good THEN BEGIN
         err := Create(reply.fName, reply.vRefNum, 'HPmm', 'VSEG');
         MMOpen:= FSOpen(reply.fName, reply.vRefNum, refNum);
         vRefVal := reply.vRefNum;
         name := reply.fName;
       END
       ELSE MMOpen := err;
     END
    ELSE MMOpen := err
  ELSE IF vRefVal = 0 THEN BEGIN
    {If vRefVal is zero then a complete or partial pathName gives
     the volume specification.
    }
    WITH paramBlock DO BEGIN
      ioCompletion := NIL;
      ioNamePtr := @pathName;
      ioVRefNum := 0;
      ioWDProcID := Longint('ERIK'); {Finder ID}
      ioWDDirID := 0;        {Start in default (set by application) directory.}
    END;
    err := PBOpenWD(@paramBlock, FALSE);
    vRefVal := paramBlock.ioVRefNum;
  END;
END; {MMOpen}

FUNCTION IconOpen(name: Str255; pathName: Str255; VAR refNum: INTEGER; vRefVal: INTEGER): OSErr;
{Tries to open a file with the filename 'name' located in the
 system folder. If successful the ref number for the file is
 returned in refNum and noErr is returned as the function result.
 If a fnfErr is returned on the first attempt, a the procedure tries
 to create a new file with the name 'name' and file type 'ICON'.

Otherwise an appropriate function result is returned by the function.
 This function should be used to open files containing sequence and
 segment data.
}
VAR
  err:     OSErr;
BEGIN
  err := FSOpen(name, vRefVal, refNum);
  IconOpen := err;
  IF err <> noErr THEN
    IF err = fnfErr {fileNotFound} THEN {Create a file.}
```

```pascal
  BEGIN
    err := Create(name, vRefVal, 'HPmm', 'ICON');
    IconOpen:= FSOpen(name, vRefVal, refNum);
  END;
END; {IconOpen}

FUNCTION MMClose(name: Str31; session: MMSesHandle): OSErr;
{Closed a file referenced by refNum returning noErr if the file was
 successfully closed and the appropriate error message if not.
}
VAR
  refNum:   INTEGER;
BEGIN
  MMClose := FSClose(refNum);
END;

FUNCTION FillHandle(aHandle: Handle; refNum: INTEGER): OSErr;
{Fills the handle starting at the current mark position in the file referenced
 by refNum.
}
VAR
  hSize:    Longint;
BEGIN
  hSize := GetHandleSize(aHandle);
  HLock(aHandle);
  FillHandle := FSRead(refNum, hSize, aHandle^);
  HUnlock(aHandle);
END;

FUNCTION GetSegmentFile(name: Str255): SFReply;
{
 Gets the name and volume refNum for a segment file.
}
VAR
  where:          Point;
  aReply:         SFReply;
  myFileTypes:    SFTypeList;
  numFileTypes:   INTEGER;
  myString:       Str255;

BEGIN
  where.h := 100;
  where.v := 60;
  numFileTypes := 1;         {PICT Files only.}
  myFileTypes[0] := 'VSEG';
  GetIndString(myString, kDivStrID, kOpenSegFile);
  ParamText(Concat(myString, name),'','','');
  SFPGetFile(where, '', NIL, numFileTypes, myFileTypes, NIL, aReply, -4444, NIL);
  GetSegmentFile := aReply;
END; {GetSegmentFile}

FUNCTION PutSegmentFile(fileName: Str31): SFReply;
{
}
VAR
  err:      OSErr;
  where:    Point;
  reply:    SFReply;
  prompt:   Str31;
BEGIN
  where.h := 30;
  where.v := 30;
  prompt := 'New segment file:';
  SFPutFile(where, prompt, fileName, NIL, reply);
  IF reply.good THEN BEGIN
    err := Create(reply.fName, reply.vRefNum, 'HPmm', 'VSEG');
    IF err = noErr THEN err := Create(Concat(reply.fName, '_ICONS'), reply.vRefNum, 'HPmm', 'ICON');
  END;
  PutSegmentFile := reply;
```

```
END;

END.
```

```
{$R-}

(*
    Mimato is the MultiMediaToolKit.
    See the file: mimato.intf.p for further specification.

To compile and link this file using Macintosh Programmer's Workshop
    (HyperXCmd.p and XCmdGlue.inc must be accessible).

pascal -w MMHCUpdate.p
    link -o -m ENTRYPOINT "Elastic:Elastic 2:Home" -rt XCMD=1111 -sn Main=MMHCUpdate MMHCUpdate.p.o When you build your own XFCNs, if you need to load
    "{MPW}"Libraries:interface.c, then say -m ENTRYPOINT in the link statement
    to filter out all routines you don't use.
*)

{$S MMHCUpdate}     ( Segment name must be the same as the command name. )

UNIT DummyUnit;

INTERFACE

USES    MemTypes, QuickDraw, OSIntf, ToolIntf, PackIntf,
        MMTypes, HyperXCmd;

{Include all the TYPE and CONST declarations.}

PROCEDURE EntryPoint(paramPtr: XCmdPtr);

IMPLEMENTATION

PROCEDURE   MMHCUpdate(paramPtr: XCmdPtr); FORWARD;
FUNCTION    FindCommBlock: CommBlockHandle; FORWARD;

{And here go the implementations.}
PROCEDURE EntryPoint(paramPtr: XCmdPtr);
BEGIN
    MMHCUpdate(paramPtr);
END;

PROCEDURE   MacsBugStr(signalStr:   Str255);
    INLINE  $abff;

PROCEDURE MMHCUpdate(paramPtr: XCmdPtr);
{
 This XCMD locates the patch communication block in the heap and calls HC
 with all the ht statements in that block.
}
VAR
  commblock:    CommBlockHandle;
  session:      MMSesHandle;
  theHTList:    HTListHandle;
  tempList:     HTListHandle;
  globHandle:   Handle;

{Include these fu..... here so everyone sees them! Oh Pascal...}
{$I XCmdGlue.inc }
{$I GrabUtil.incl.p}

(*****************************************************************
                    Functions for making HyperCard link.
   *****************************************************************)
  FUNCTION GetCardName:Str31;
  {
   Returns the ID (in ascii) of the current card.
  }
  VAR
    tempHandle:     Handle;
```

```
    tempStr:      Str255;
BEGIN
    tempHandle := EvalExpr('the name of this cd');
    HLock(tempHandle);
    ZeroToPas(tempHandle^, tempStr);
    HUnlock(tempHandle);
    DisposHandle(tempHandle);
    GetCardName := tempStr;
END; {GetCardName}

FUNCTION GetCardID:Str31;
{
    Returns the ID (in ascii) of the current card.
}
VAR
    tempHandle: Handle;
    tempStr:      Str255;
BEGIN
    tempHandle := EvalExpr('the ID of this cd');
    HLock(tempHandle);
    ZeroToPas(tempHandle^, tempStr);
    HUnlock(tempHandle);
    DisposHandle(tempHandle);
    GetCardID := tempStr;
END; {GetCardID}

FUNCTION GetStackName:Str31;
{
    Returns the name of the current stack.
}
VAR
    tempHandle: Handle;
    tempStr:      Str255;
BEGIN
    tempHandle := EvalExpr('the name of this stack');
    HLock(tempHandle);
    ZeroToPas(tempHandle^, tempStr);
    HUnlock(tempHandle);
    DisposHandle(tempHandle);
    GetStackName := tempStr;
END; {GetStackName}

FUNCTION GetCardIcon:Handle;
{
 This procedure makes a copy of the current card causing a mini
 picture of it to be placed in the scrap. This scrap picture is then
 placed in a handle and returned.
}
VAR
    tempHandle: Handle;
    pictSize:     Longint;
    offset:     Longint;

BEGIN
END; {GetCardIcon}

PROCEDURE CompleteHCLink(aLinkTool: LinkToolHndl);
{
 This procedure will complete a new link to the current hypercard card.
 First we get a link indicator by iconifying the current card, then
 we get the name of the card and the stack so we can link to it.

NOTE!
 The link must already have been created and be active through a call to
 Seg2LinkTool in the patched tools.
 The completion occurs here since the tools cannot directly call hypercard
 to get the necessary information to complete the link.
}

BEGIN
```

```
    {
     CODE FOR COMPLETING A HC LINK BY GETTING ITS MINIATURIZED CARD ICON.
    }
 END; {MakeHCLink}

BEGIN
 {
   GET THE COMMBLOCK
   THEN SEND APPROPRIATE MESSAGES TO HYPERCARD.
 }
END; {MMHCUpdate}

FUNCTION FindCommBlock: CommBlockHandle;
{
 This function finds a commblock if one has been created and returns a handle
 to it.
 If no commblock can be found it returns NIL.
 A commblock is created to communicate between the patched tools and HC. The "trick" is
 just to allocate a block of storage on the application heap and to leave the block
 floating when exiting the XCMD. We search though the heap when this Function
 is called and locate the block. The handle to it is returned by this function
 if the block is found, NIL otherwise.
}

{Define a type here to access the blockheader.}

BEGIN
 {
   CODE TO LOCATE A CONTROL BLOCK HERE.
 }
END; {FindCommBlock}

END.
```

```
{$R-}

{*
    Iconify must be used after initializing the MultiMediaToolKit.
    See the file: Mimato.p for further specification.

To compile and link this file using Macintosh Programmer's Workshop
    (HyperXCmd.p and XCmdGlue.inc must be accessible).

cd {mpw}MultiTools:
    asm GetDCEHandle.a
    c DigCGlue.c
    pascal Iconify.p
    link -m ENTRYPOINT -o "Elastic:Elastic Charles:Windoids" -rt XCMD=999 -sn Main=Iconify Iconify.p.o ∂
        DigCGlue.c.o GetDCEHandle.a.o "{Libraries}"interface.o "{PLibraries}"PasLib.o "{Libraries}"CSLib:CSLi When you build your own XFCNs, if you need to load
    "{MPW}"Libraries:interface.o, then say -m ENTRYPOINT in the link statement
    to filter out all routines you don't use.

NOTE!
    The following is a list of hacks that might cause problems in future
    versions of HyperCard.
    File: WindowTool.incl.p
    Proc: ToolDrag
    Description: Uses refcon field of Window pointer to identify the card
                 window in HyperCard. The card window has to be moved by
                 HyperCard so for this routine we use the refCon field to
                 identify the window and call HyperCard to cause it to move.
*}

{$S Iconify}   { Segment name must be the same as the command name. }

UNIT DummyUnit;

INTERFACE

USES    MemTypes, QuickDraw, OSIntf, ToolIntf, PackIntf,
        CSLib, SCLib, DigCGlue, MMTypes, ToolUtils, DevComm, Fileprocs, Filters, HyperXCmd;

{Include all the TYPE and CONST declarations.}
CONST
    COMP_OUT    = 0;
    COMP_IN     = 1;
    BLUE_EXT    = 2;
    GREEN_EXT   = 3;
    RED_EXT     = 4;
    BLUE_DEC    = 5;
    GREEN_DEC   = 6;
    RED_DEC     = 7;

{Resolution of scan buffers.}
    kHorizRes   = 320;
    kVertRes    = 240;

{Board types.}
    kFX         = 1;
    kCSII       = 2;

TYPE
    {This record is used to save the state of the boards when digitizing.}
    DigSaveState = RECORD
        boardType:      INTEGER;       {kFX, kCSII...}
        {The save parameters.}
        overlay:        Longint;
        size:           INTEGER;
        interlacemode:  INTEGER;
        autoGenRec:     VDAutoGenlock;
        fxState:        FIFOHandle;
    END;
```

```
    DigStatePtr = ^DigSaveState;
    DigStateHandle = ^DigStatePtr;

PROCEDURE EntryPoint(paramPtr: XCmdPtr);

IMPLEMENTATION

PROCEDURE Iconify(paramPtr: XCmdPtr); FORWARD;
PROCEDURE Digitize(slotBase:Longint; aPixMap:PixMapHandle; shrink, average: BOOLEAN; g_buffer, b_buffer: Ptr)
FUNCTION  ScanAPixMap(refNum: INTEGER; shrink, average: BOOLEAN; aPixMap: PixMapHandle; session: MMSesHandle)
FUNCTION  InitPixmap(pixmap: PixMapHandle; r: Rect): BOOLEAN; FORWARD;
PROCEDURE Shrink2Icon(VAR r: Rect; r_buffer, g_buffer, b_buffer: Ptr; doAverage:BOOLEAN); FORWARD;
FUNCTION  SaveDigitizer(refNum: INTEGER; session: MMSesHandle): DigStateHandle; FORWARD;
PROCEDURE RestoreDigitizer(refNum: INTEGER; mySaveState: DigStateHandle); FORWARD;
PROCEDURE DisposePort(aPort: CGrafPtr); FORWARD;
FUNCTION  SetUpPort(refNum: INTEGER; VAR aNewPort: CGrafPtr): PixMapHandle; FORWARD;

{And here go the implementations.}
PROCEDURE EntryPoint(paramPtr: XCmdPtr);
BEGIN
    Iconify(paramPtr);
END;

PROCEDURE  MacsBugStr(signalStr:   Str255);
    INLINE  $abff;

PROCEDURE Iconify(paramPtr: XCmdPtr);
{NOTE!
10.10.89 - Outdated description...
This procedure can be called by HyperCard with a paramPtr containing arguments, a
HyperCard callback pointer etc. etc. OR it can be called by the procedure "MMOutside".
If the procedure MMOutside is calling paramPtr will be NIL.
We need to do the latter so that we can reference the locally scoped procedures of
the XCMD from the outside. F.ex. when we're dragging the windows or while a modal
dialog pops up at the end we want to be able to pass "callback" routines that can
keep our world (sequences and segments) alive....
}
VAR
  scannedPict:  PixMapHandle;
  toBitMap:     BitMapHandle;
  session:      MMSesHandle;{Used as a 'global' variable. Remember to set it!}
  savePort:     GrafPtr;
  mPort:        GrafPtr;
  aNewPort:     CGrafPtr;
  theSegFName:  Str31;
  mRect:        Rect;
  shrinkIt:     BOOLEAN;
  secCount:     Longint;
  imageSize:    Longint;
  numStr:       Str255;
  buffer:       MiconHandle;
  theKeys:      KeyMap;
  average       BOOLEAN;
  aMiconList:   MiconListHandle;
  aBoard:       SegBoardHndl;

{$I XCmdGlue.inc }
{$I GrabUtil.incl.p}

PROCEDURE MacsBugStr(signalStr:   Str255);
      INLINE  $abff;

PROCEDURE DisposeMicon(buffer: MiconHandle);
  BEGIN
    DisposPixMap(buffer^^.pixMap);
    DisposHandle(Handle(buffer));
  END;

FUNCTION GetMovie(buffer: MiconHandle; average: BOOLEAN): BOOLEAN;
```

```
VAR
  anAutoGenRec:   VDAutoGenlock;
  i:              INTEGER;
  count:          INTEGER;
  rowBytes:       INTEGER;
  refNum:         INTEGER;
  aPixMap:        PixMapHandle;
  imageSize:      Longint;
  r:              Rect;
  g_buffer:       Ptr;
  b_buffer:       Ptr;
  bufPtr:         Ptr;
  aNewPort:       CGrafPtr;
  slotBase:       Longint;
  anEvent:        EventRecord;
  charCode:       Char;
  overlay:        Longint;
  watch:          CursHandle;
  digState:       DigStateHandle;
  dummyString:    STRING[1];

BEGIN
  GetMovie := FALSE;

refNum := session^^.refVal;
  aPixMap := SetUpPort(refNum, aNewPort);
  IF aPixMap = NIL THEN BEGIN
    DisposHandle(Handle(buffer));
    NotifyUser(kOutOfMemory, session);
    Exit(GetMovie);
  END;

rowBytes   := INTEGER(BitAnd(Longint(aPixMap^^.rowBytes), $00007FFF));
  WITH aPixMap^^.bounds DO imageSize := Longint((bottom - top)) * Longint(rowBytes);

{ reserve two temporary buffers }
  g_buffer := NewPtr(imageSize);
  IF g_buffer = NIL THEN BEGIN
    DisposPtr(aPixMap^^.baseAddr);
    DisposHandle(Handle(buffer));
    aPixMap^^.baseAddr := NIL;
    DisposPixMap(aPixMap);
    DisposePort(aNewPort);
    NotifyUser(kOutOfMemory, session);
    Exit(GetMovie);
  END;

b_buffer := NewPtr(imageSize);
  IF b_buffer = NIL THEN BEGIN
    DisposPtr(aPixMap^^.baseAddr);
    DisposHandle(Handle(buffer));
    aPixMap^^.baseAddr := NIL;
    DisposPixMap(aPixMap);
    DisposePort(aNewPort);
    DisposPtr(g_buffer);
    NotifyUser(kOutOfMemory, session);
    Exit(GetMovie);
  END;

watch := GetCursor(watchCursor);
  SetCursor(watch^^);
  WITH r DO BEGIN
    top := 0;
    bottom := kvIcon;
    left := 2;
    right := khIcon+2;
  END;

MoveHHi(Handle(buffer));
  HLock(Handle(buffer));
```

```
    dummyString[0] := Char(0);
    Longint(bufPtr) := Longint(@buffer^^.frames);
    count := kSecCount * kFramesPrSec;

digState := SaveDigitizer(refNum, session);
    slotBase := GetDCEHandle(refNum)^^.dCtlDevBase;
    FOR i := 1 TO count DO BEGIN
      {Check if the user has hit cmd-period during the last loop.}
      session^^.toolFlag := TRUE;
      IF GetNextEvent(keyDownMask, anEvent) THEN BEGIN
        session^^.toolFlag := FALSE;
        IF BitAnd(anEvent.modifiers, cmdKey) <> 0 THEN BEGIN
          charCode := Char(BitAnd(anEvent.message, charCodeMask));
          IF charCode = '.' THEN BEGIN
            RestoreDigitizer(refNum, digState);
            HUnlock(Handle(buffer));
            DisposHandle(Handle(buffer));
            DisposePort(aNewPort);
            DisposPtr(aPixMap^^.baseAddr);
            aPixMap^^.baseAddr := NIL;
            DisposPixMap(aPixMap);
            DisposPtr(g_buffer);
            DisposPtr(b_buffer);
            InitCursor;
            Exit(GetMovie);
          END;
        END;
      END
      ELSE session^^.toolFlag := FALSE;

Digitize(slotBase, aPixMap, shrinkIt, average, g_buffer, b_buffer);
      HLock(Handle(aPixMap));
      BlockMove(aPixMap^^.baseAddr, bufPtr, buffer^^.frameSize);
      Longint(bufPtr) := Longint(bufPtr) + buffer^^.frameSize;

{Advance the source.}
      SendCmd(kStepFwd, @dummyString, session);
      SendCmd(kStepFwd, @dummyString, session);

{Update the browser.}
      CopyBits(BitMapHandle(aPixMap)^^, session^^.theTools^^.tools[kSegBoardItem].theTool^^.windoid^.portBits
              aPixMap^^.bounds, r, srcCopy, NIL);
      HUnlock(Handle(aPixMap));
    END; {for}

HUnlock(Handle(buffer));
    DisposePort(aNewPort);
    DisposPtr(g_buffer);
    DisposPtr(b_buffer);
    RestoreDigitizer(refNum, digState);

InitCursor;
    buffer^^.pixMap := aPixMap;
    GetMovie := TRUE;
  END; {GetMovie}

BEGIN
  {NOTE!
   Change all the locally scoped procedures that call FindMMSession
   since they can refer to the session variable.
   Any procedure that creates a new session should set the
   session "global" to this session.
  }
  session := FindMMSession;

WITH paramPtr^ DO
  BEGIN
    passFlag := FALSE;
    IF paramCount = 0 THEN
```

```
      BEGIN
        SysBeep(5);
        Exit(Iconify);
      END;
    END; {with}

IF session <> NIL THEN
    BEGIN
      {Now scan a screen.}
      IF StringMatch('SHRINK', paramPtr^.params[2]^) <> NIL THEN shrinkIt := TRUE
      ELSE shrinkIt := FALSE;

GetKeys(theKeys);
      IF theKeys[shiftKeyCode] THEN average:= FALSE
      ELSE average := TRUE;

theSegFName := GetVSegFName(session);
      mPort := session^^.theTools^^.tools[kSegBoardItem].segs^^.windoid;
      session^^.theTools^^.tools[kSegBoardItem].segs^^.miconName := '';

IF StringMatch('MOVIE', paramPtr^.params[1]^) <> NIL THEN
      BEGIN
        RemovePortMicons(mPort, session);
        IF paramPtr^.paramCount = 3 THEN
        BEGIN
          ZeroToPas(paramPtr^.params[3]^, numStr);
          secCount := StrToLong(numStr);
        END
        ELSE secCount := kSecCount;

IF shrinkIt THEN imageSize := khIcon*kvIcon
        ELSE imageSize := kHorizRes*kVertRes;

buffer := MiconHandle(NewHandle(secCount*kFramesPrSec*imageSize+sizeof(MiconHeader)));
        IF buffer <> NIL THEN
        BEGIN
          buffer^^.frameSize := imageSize;
          buffer^^.bufSize := GetHandleSize(Handle(buffer))-sizeof(MiconHeader);;
          buffer^^.offset := 0;
          buffer^^.lastTick := 0;
          buffer^^.updateCount := 0;
          buffer^^.resetCount := 0;

IF GetMovie(buffer, average) THEN BEGIN
            WITH mRect DO BEGIN
              top := 0;
              left := 2;
              bottom := kvIcon;
              right := khIcon+2;
            END;
            aMiconList := NewMiconList(buffer, 'New Micon', theSegFName, mRect, mPort);
            session^^.theTools^^.tools[kSegBoardItem].segs^^.miconName := 'New Micon';
            Add2MiconList(session^^.miconList, aMiconList);
          END;
        END
        ELSE NotifyUser(kOutOfMemory, session);
      END
      ELSE IF StringMatch('ICON', paramPtr^.params[1]^) <> NIL THEN
      BEGIN
        RemovePortMicons(mPort, session);
        scannedPict := SetUpPort(session^^.refVal, aNewPort);
        IF scannedPict <> NIL THEN BEGIN
          IF ScanAPixMap(session^^.refVal, shrinkIt,NOT average, scannedPict, session) THEN BEGIN
            IF session^^.currScreenIcon <> NIL THEN
            BEGIN
              DisposPtr(session^^.currScreenIcon^^.baseAddr);
              DisposPixMap(PixMapHandle(session^^.currScreenIcon));
            END;
            session^^.currScreenIcon := scannedPict;
```

```
        IF WindowPeek(session^^.theTools^^.tools[kSegBoardItem].theTool^^.windoid)^.visible THEN
          BEGIN
            GetPort(savePort);
            aBoard := session^^.theTools^^.tools[kSegBoardItem].segs;
            WHILE aBoard <> NIL DO BEGIN
              SetPort(aBoard^^.windoid);
              InvalRect(scannedPict^^.bounds);
              aBoard := aBoard^^.nextBoard;
            END;
            SetPort(savePort);
          END;
        END
        ELSE BEGIN
          DisposPtr(scannedPict^^.baseAddr);
          DisposPixMap(scannedPict);
        END;
        DisposePort(aNewPort);
      END;
    END
    ELSE SysBeep(5);
  END;
END; {Iconify}

{------------------------------------------------------------------------
The following procedures were initially adopted from the C examples used to illustrate
how to build an XCMD to digitize pictures into HyperCard.
The base examples were supplied by William May of Mass Micro Systems.
------------------------------------------------------------------------}

FUNCTION SaveDigitizer(refNum: INTEGER; session: MMSesHandle): DigStateHandle;
{
 Saves the digitizer state and returns a stateHandle appropriately configured to reflect
 the saved state.
}
VAR
  myDigState:       DigStateHandle;
  oldAutoGenRec:    VDAutoGenlock;
  autogenRec:       VDAutoGenlock;
  ticks:            Longint;
  err:              OSErr;
  screfnum:         INTEGER;
  dummy:            INTEGER;

PROCEDURE DigitizerError(err: INTEGER);
  BEGIN
    NotifyUser(kDigProblem, session);
    Exit(SaveDigitizer);
  END;

PROCEDURE DisposNQuit(err: INTEGER);
  BEGIN
    DisposHandle(Handle(myDigState^^.fxState));
    HUnlock(Handle(myDigState));
    DisposHandle(Handle(myDigState));
    DigitizerError(err);
  END;

BEGIN
  { get old genlock and overlay parameters }
  myDigState := DigStateHandle(NewHandle(sizeof(DigSaveState)));
  IF myDigState = NIL THEN BEGIN
    SaveDigitizer := NIL;
    Exit(SaveDigitizer);
  END;

HLock(Handle(myDigState));
  WITH myDigState^^ DO BEGIN
    err := CS_GET_SCREFNUM(refNum, screfnum);
    IF err <> noErr THEN BEGIN
      HUnlock(Handle(myDigState));
```

```
      DisposHandle(Handle(myDigState));
      DigitizerError(err);
      Exit(SaveDigitizer);
    END;

IF screfnum <> 0 THEN BEGIN
      boardType := kFX;
      fxState := FIFOHandle(NewHandle(sizeof(FIFOInfo)));
      IF fxState = NIL THEN BEGIN
        HUnlock(Handle(myDigState));
        DisposHandle(Handle(myDigState));
        SaveDigitizer := NIL;
        Exit(SaveDigitizer);
      END;

fxState^^.screfNum := screfNum;
      fxState^^.csrefNum := refNum;
      HLock(Handle(fxState));
      err := SC_GET_STATE(refNum, fxState^^);
      HUnlock(Handle(fxState));
      IF err <> noErr THEN DisposNQuit(err);

err := SC_FULL_IMAGE(screfnum, refNum);
      IF err <> noErr THEN DisposNQuit(err);

{we don't freeze video since we might be digitizing a series of frames.} err := CS_GET_MON_CONFIG(refNum, size, interlaceMode);
      IF err <> noErr THEN DisposNQuit(err);
      err := CS_SET_MON_CONFIG(refNum, size, 0);
      IF err <> noErr THEN DisposNQuit(err);
      err := CS_MODE_RESET(refNum);
      IF err <> noErr THEN DisposNQuit(err);
    END
    ELSE boardType := kCSII;

err := CS_GET_AUTOGENLOCK(refNum, autogenRec);
    IF err <> noErr THEN DisposNQuit(err);
    err := CS_GET_VIDEO_OVERLAY(refNum, overlay);
    IF err <> noErr THEN DisposNQuit(err);
  END; {with}
  HUnlock(Handle(myDigState));

autogenRec.agEnable := INTEGER(TRUE); { turn on/off }

IF (CS_SET_AUTOGENLOCK(refNum, autogenRec) <> noErr) THEN BEGIN
    SaveDigitizer := myDigState;
    Exit(SaveDigitizer);
  END;

err := CS_SET_VIDEO_OVERLAY(refNum, GRAPHICSOVERVIDEO);

{ delay a half of a second to make sure board has genlocked }
  Delay(30, ticks);

SaveDigitizer := myDigState;
END; {SaveDigitizer}

PROCEDURE RestoreDigitizer(refNum: INTEGER; mySaveState: DigStateHandle);
{
 This resores the boards after digitization and then dealocates the digSaveState handle.
}
VAR
  err:      OSErr;
BEGIN
  HLock(Handle(mySaveState));
  WITH mySaveState^^ DO BEGIN
    IF boardType = kFX THEN BEGIN {restore the FX.}
      err := CS_SET_MON_CONFIG(refNum, size, interlaceMode);
      err := CS_MODE_RESET(refNum);
```

```
      HLock(Handle(fxState));
      err := SC_SET_FIFO(refNum, fxState^^);
      HUnlock(Handle(fxState));
    END;
    {Now restore the CSII.}
    err := CS_SET_AUTOGENLOCK(refNum, autogenRec);
    err := CS_SET_VIDEO_OVERLAY(refNum, overlay);
  END;
  HUnlock(Handle(mySaveState));
  WITH mySaveState^^ DO IF boardType = kFX THEN DisposHandle(Handle(fxState));
  DisposHandle(Handle(mySaveState));
END; {RestoreDigitizer}

PROCEDURE DisposePort(aPort: CGrafPtr);
{
 This removes a CGrafPort w/o touching its pixMap.
}
BEGIN
  aPort^.portPixMap := NIL; {BURN AND DIE?}
  CloseCPort(aPort);
  DisposPtr(Ptr(aPort));
END;

FUNCTION SetUpPort(refNum: INTEGER; VAR aNewPort: CGrafPtr): PixMapHandle;
{

}
VAR
  oldPort:          CGrafPtr;
  myGD, oldGD:      GDHandle;
  mypixmap:         PixMapHandle;
  result:           BOOLEAN;
  r:                Rect;

BEGIN
  SetUpPort := NIL;
  { get the current graphics device }
  oldGD := GetGDevice;
  GetPort(GrafPtr(oldPort));

{ find our gDevice }
  myGD := GetDeviceList;
  WHILE (myGD^^.gdRefNum <> refNum) DO
    myGD := GetNextDevice(myGD);

{ set to our GDevice while we are setting up a CGrafPort }
  IF (myGD <> NIL) THEN
    SetGDevice(myGD);

aNewPort := CGrafPtr(NewPtr(sizeof(CGrafPort)));
  IF aNewPort = NIL THEN BEGIN
    InitCursor;
    Exit(SetUpPort);
  END
  ELSE OpenCPort(aNewPort);
  mypixmap := aNewPort^.portPixMap;

{Hardwire scan-size for now.}
  WITH r DO
  BEGIN
    top := 0;
    left := 0;
    right := kHorizRes;
    bottom := kVertRes;
  END;
  result := InitPixmap(mypixmap, r);
  { and restore the old GDevice }
  SetGDevice(oldGD);
  SetPort(GrafPtr(oldPort));
```

```
    IF NOT result THEN BEGIN
      CloseCPort(aNewPort);
      DisposPtr(Ptr(aNewPort));
      Exit(SetUpPort);
    END;

SetUpPort := mypixmap;
END; {SetUpPort}

FUNCTION ScanAPixMap(refNum: INTEGER; shrink, average: BOOLEAN; aPixMap: PixMapHandle; session: MMSesHandle):
VAR
  watch:            CursHandle;
  slotBase:         Longint;
  rowBytes:         INTEGER;
  imageSize:        Longint;
  g_buffer, b_buffer:Ptr;
  overlay:          Longint;
  anAutoGenRec:     VDAutoGenlock;
  digState:         DigStateHandle;

BEGIN
  ScanAPixMap := FALSE;

{ reserve two temporary buffers }
  rowBytes  := INTEGER(BitAnd(Longint(aPixmap^^.rowBytes), $00007FFF));
  WITH aPixMap^^.bounds DO imageSize := Longint((bottom - top)) * Longint(rowBytes);

g_buffer := NewPtr(imageSize);
  IF g_buffer = NIL THEN BEGIN
    NotifyUser(kOutOfMemory, session);
    Exit(ScanAPixMap);
  END;

b_buffer := NewPtr(imageSize);
  IF b_buffer = NIL THEN
  BEGIN
    DisposPtr(g_buffer);
    NotifyUser(kOutOfMemory, session);
    Exit(ScanAPixMap);
  END;

watch := GetCursor(watchCursor);
  SetCursor(watch^^);

digState := SaveDigitizer(refNum, session);
  IF digState = NIL THEN BEGIN
    DisposPtr(g_buffer);
    DisposPtr(b_buffer);
    InitCursor;
    NotifyUser(kOutOfMemory, session);
    Exit(ScanAPixMap);
  END;

slotBase := GetDCEHandle(refNum)^^.dCtlDevBase;
  Digitize(slotBase, aPixMap, shrink, average, g_buffer, b_buffer);

DisposPtr(g_buffer);
  DisposPtr(b_buffer);

RestoreDigitizer(refNum, digState);
  InitCursor;
  ScanAPixMap := TRUE;
END; {ScanAPixMap}

PROCEDURE Digitize(slotBase:Longint; aPixMap:PixMapHandle; shrink, average: BOOLEAN;
                   g_buffer, b_buffer: Ptr);
{
 Two tempqrary buffers and an initialized pixmap are given to this routine so it can digitize
 a 320x240 image and shrink it to a 80x60 postage stamp picon.
```

```
VAR
  r_buffer:   Ptr;
  rowBytes:   INTEGER;
  baseAddr:   Ptr;
  imageSize:  Longint;
  clut:       CTabHandle;
  r:          Rect;

BEGIN
  r := aPixMap^^.bounds;

{ we always use at least one buffer }
  r_buffer := aPixMap^^.baseAddr;

p_320x240(Ptr(slotBase), r_buffer, RED_DEC);
  p_320x240(Ptr(slotBase), g_buffer, GREEN_DEC);
  p_320x240(Ptr(slotBase), b_buffer, BLUE_DEC);
  { restore board state }
  pEndCapture(Ptr(slotBase));

IF shrink THEN BEGIN
    Shrink2Icon(r, r_buffer, g_buffer, b_buffer, average);
    aPixMap^^.bounds := r;
    aPixMap^^.rowbytes := r.right-r.left + $8000;
  END;

WITH r DO pNormalize(Longint(right), Longint(bottom), r_buffer, g_buffer, b_buffer);

clut := aPixMap^^.pmTable;
  WITH r DO pCompressSystemD(r_buffer, g_buffer, b_buffer, Longint(right), Longint(bottom), clut);
END; {Digitize}

FUNCTION InitPixmap(pixmap: PixMapHandle; r: Rect): BOOLEAN;
VAR
  myBits:     Ptr;
  imageSize:  Longint;
  cTable:     CTabHandle;
  gd:         GDHandle;
BEGIN
  InitPixmap := FALSE;
  { assumes 8 bpp }
  pixmap^^.rowBytes := r.right - r.left;
  imageSize := Longint((r.bottom - r.top)) * Longint(pixmap^^.rowBytes);
  myBits := NewPtr(imageSize);

IF (myBits = NIL) THEN
    Exit(InitPixmap);

pixmap^^.rowBytes := pixmap^^.rowBytes + $8000;   { be a pixmap }
  pixmap^^.baseAddr := myBits;
  pixmap^^.bounds   := r;

IF (pixmap^^.pixelSize <> 8) THEN
  BEGIN
    pixmap^^.pixelSize := 8;
    pixmap^^.cmpSize   := 8;
    pixmap^^.pixelType := 0;      { chunky pixels    }
    pixmap^^.cmpCount  := 1;      { for chunky pixels }
  END;

{ allocate a CLUT }
  { the pixmap will have a handle to the GDevice CLUT. Do not dispose of it!!! }
  pixmap^^.pmTable :=
      CTabHandle(NewHandle(sizeof(ColorTable) + 256 * sizeof(ColorSpec)));
  cTable := pixmap^^.pmTable;
  IF (cTable = NIL) OR (MemError <> noErr) THEN
  BEGIN
    DisposPtr(myBits);
```

```
    Exit(InitPixmap);
  END;

cTable^^.ctSeed      := GetCTSeed;
  cTable^^.transIndex  := 0;   { this is a pixmap, not a device }
  cTable^^.ctSize      := 255; { 256 entries }

InitPixmap := TRUE;
END;   {InitPixmap}

PROCEDURE Shrink2Icon(VAR r: Rect; r_buffer, g_buffer, b_buffer: Ptr; doAverage:BOOLEAN);
{
 Shrinks three 320x240 RGB buffers to an icon 40x30 (or 80x60?)
 The rectangle variable contains the rectangle in local buffer coordinates
 on entrance and is modified to reflec the size of the icon.
}
VAR
  vertSample:  INTEGER;
  horizSample: INTEGER;
  aFilter:     FilterHandle;

FUNCTION MakeFilter(vSample, hSample: INTEGER): FilterHandle;
  {

}
  TYPE
    IntegerPtr =   ^INTEGER;
  VAR
    tempFilter:    FilterHandle;
    i,j:           INTEGER;
    hMiddle,vMiddle:INTEGER;
    averageCount:  INTEGER;
    vStepCount:    INTEGER;
    hStepCount:    INTEGER;
    coeffCount:    INTEGER;
    tempPtr:       IntegerPtr;
  BEGIN
    tempFilter := FilterHandle(NewHandle(Longint(vSample*hSample*2)+4));
    hMiddle := (hSample+1) DIV 2;
    vMiddle := (vSample+1) DIV 2;
    averageCount := 0;
    hStepCount := 0;
    vStepCount := 0;

Longint(tempPtr) := Longint(@tempFilter^^.theCoeffs);
    FOR i:=1 TO vSample DO BEGIN
      IF i - vMiddle <= 0 THEN vStepCount := vStepCount + 1 {Increment until we're at middle.}
      ELSE BEGIN
        {If middle of odd length count then decrement: 1 2 3 2 1, even length don't decrement: 1 2 2 1}
        IF i - vMiddle = 1 THEN vStepCount := vStepCount - INTEGER(BitAnd(Longint(vMiddle),1))
        {otherwise we're beyond middle so decrement.}
        ELSE vStepCount := vStepCount - 1;
      END;
      FOR j := 1 TO hSample DO BEGIN
        IF j - hMiddle <= 0 THEN hStepCount := hStepCount + 1
        ELSE BEGIN {Beyond middle.}
          {If odd length count then decrement: 1 2 3 2 1, even length don't decrement: 1 2 2 1}
          IF j - hMiddle = 1 THEN hStepCount := hStepCount - INTEGER(BitAnd(Longint(hMiddle),1))
          {otherwise we're beyond middle so decrement.}
          ELSE hStepCount := hStepCount - 1;
        END;
        {Accumulate value * weight.}
        coeffCount := hStepCount*vStepCount;

tempPtr^ := coeffCount;
        Longint(tempPtr) := Longint(tempPtr)+2;
        {accumulate total filter value so this need not be calculated more than once.}
        averagecount := averagecount + coeffCount;
      END; {for j...}
      {*MacsBugStr('User Break: Making table.');*}
```

```
      Longint(tempPtr) := Longint(@tempFilter^^.theCoeffs) + Longint(i)*Longint(vSample*2);
      hStepCount := 0;
    END; {for i...}
    tempFilter^^.coeffSum := averageCount;
    MakeFilter := tempFilter;
  END; {MakeFilter}

PROCEDURE ShrinkBuffer(a_buffer: Ptr; vSample, hSample: INTEGER; aFilter: FilterHandle);
  {Currently based on the assumption that the buffer is 320x240x8bits at
   the start. Sampling of the data is done at vertical intervals of vSample
   and horizontal rates of hSample.
  }
  VAR
    toPtr, frPtr:   Ptr;
    i,j:            INTEGER;
  BEGIN
    toPtr := a_buffer;
    frPtr := a_buffer;
    FOR i:= 1 TO kvIcon DO BEGIN
      {This loop should subsample kvIcon scan lines.}
      FOR j:= 1 TO khIcon DO BEGIN
        {This should subsample khIcon samples per scan line.}
        IF doAverage THEN toPtr^ := Average(frPtr, vSample, hSample, kHorizRes, aFilter^)
        ELSE toPtr^ := frPtr^;
        Longint(toPtr) := Longint(toPtr)+Longint(1);
        Longint(frPtr) := Longint(frPtr) + Longint(hSample);
      END;
      Longint(frPtr) := Longint(frPtr) + Longint((vSample-1)*kHorizRes);
    END;
  END; {ShrinkBuffer}

BEGIN
  vertSample := (kVertRes+kvIcon-1) DIV kvIcon;
  horizSample := (kHorizRes+khIcon-1) DIV khIcon;
  aFilter := MakeFilter(vertSample, horizSample);
  HLock(Handle(aFilter));
  ShrinkBuffer(r_buffer, vertSample, horizSample, aFilter);
  ShrinkBuffer(g_buffer, vertSample, horizSample, aFilter);
  ShrinkBuffer(b_buffer, vertSample, horizSample, aFilter);
  HUnlock(Handle(aFilter));
  WITH r DO BEGIN
    bottom := top + kvIcon;
    right := left + khIcon;
  END;
END;    {Shrink2Icon}

END.
```

```
UNIT Filters;

INTERFACE

USES MemTypes, MMTypes;

FUNCTION Average(frPtr: Ptr; vSamle, hSampe, kHSpace: INTEGER; aFilter: FilterPtr):Byte;

END.
```

```
;   File:       Filter.a
;   Author:     Hans Peter Brondmo
;   Date:       Sat, Dec 9, 1989
;
;
            BLANKS   ON
            STRING   Pascal
            MACHINE  MC68020

INCLUDE  'Traps.a'
            INCLUDE  'SysEqu.a'

EXPORT   Average

;-----------------------------------------------------------------------------
; FUNCTION Average(frPtr: Ptr; vSamle, hSampe, kHSpace: INTEGER; aFilter: FilterPtr);
;
; NOTE
;   If the filter is larger than a 5x5 we'll be introuble since we're only using
;   integer arithmetic.
;-----------------------------------------------------------------------------
avgFrame        RECORD   {OldA6},decr    ; Stack frame.
retVal          ds.w     1               ; The returned averaged value.
frPtr           ds.l     1               ; Pointer to original data.
vSample         ds.w     1               ; vertical sample block.
hSample         ds.w     1               ; horizontal sample block.
kHSize          ds.w     1               ; horizontal buffer size.
aFilter         ds.l     1               ; filter weights.
rtsAddr         ds.l     1               ; Return address
OldA6           ds.l     1               ; Space for the old a6
avgSize         equ      *               ; Size of this frame.
                ENDR
;
;

Average         PROC

; CODE FOR FILTERING IMAGE DATA.
                ENDP

END
```

```c
/* File: DigCGlue.c
   Created: 1.8.89

This file contains the glue needed to call the C library functions used to
   digitice NTSC images using the ColorSpaceII board.
*/ include <windows.h>
include <osutils.h>
#include <Types.h>
#include <QuickDraw.h>
#include <Events.h>
#include <Memory.h>
#include <Packages.h>
#include <Dialogs.h>
#include <CursorCtl.h>
#include <toolutils.h>
#include <controls.h>
#include <resources.h>
#include <files.h>
include <strings.h> pascal void p_320x240(slotBase, buffer, channel)
char    *slotBase;
unsigned char *buffer;
int     channel;
{
   _320x240(slotBase, buffer, channel);
} pascal void p_384x288(slotBase, buffer, channel)
char    *slotBase;
unsigned char *buffer;
int     channel;
{
   _384x288(slotBase, buffer, channel);
} pascal void pEndCapture(slotBase)
char    *slotBase;
{
   EndCapture(slotBase);
} pascal void pnormalize(width, heigth, r_buffer, g_buffer, b_buffer)
int     width, heigth;
unsigned char   *r_buffer, *g_buffer, *b_buffer;
{
   normalize(width, heigth, r_buffer, g_buffer, b_buffer);
} pascal void pCompressSystemD(r_buffer, g_buffer, b_buffer, width, heigth, clut)
unsigned char   *r_buffer, *g_buffer, *b_buffer;
int     width, heigth;
CTabHandle  clut;
{
   CompressSystemD(r_buffer, g_buffer, b_buffer, width, heigth, clut);
}
```

What is claimed is:

1. An apparatus for organizing image source material comprising a sequence of frames, comprising:
   a. means for defining a plurality of image subsegments selected from the image source material;
   b. means for defining a first image segment including a plurality of non-contiguously stored subsegments;
   c. means for associating the first segment with a plurality of image frames selected therefrom;
   d. a single display means for sequentially and repeatedly displaying so as to convey a perception of motion, during presentation of a second image segment or portion thereof, the plurality of image frames as a miniature image icon on the display means; and
   e. operator-responsive means for receiving a command representing selection of the plurality of image frames and for responding thereto by causing the display means to interrupt presentation of the second image segment or portion thereof and contiguously display the subsegments of the segment associated with the selected plurality of image frames.

2. The apparatus of claim 1 wherein the source material is stored on a digital storage medium.

3. The apparatus of claim 2 wherein the segment-defining means defines a plurality of subsequents by sets of numbers, each of which corresponds to any two frames chosen from the image source material and indicates the location of the frames on the digital storage medium, the sets being stored as an ordered array.

4. The apparatus of claim 1 further comprising:
   a. means for associating a first segment or portion thereof with a plurality of other segments;
   b. means for representing each of the other segments on the display means, simultaneously with the first segment or portion thereof, by sequentially and repeatedly displaying, so as to convey a perception of motion, a plurality of image frames chosen from each such other segment; and
   c. operator-responsive means for interrupting display of the first segment and displaying a second segment in lieu thereof in response to selection of the plurality of image frames associated with the second segment;
   d. means for sequentially and repetitively displaying so as to convey a perception of motion, simultaneously with the second segment or portions thereof, pluralities of image frames representative of other segments associated with the second segment or portions thereof; and
   e. operator-responsive means for interrupting display of the second segment and displaying a third segment in lieu thereof in response to selection of the plurality of image frames associated with the third segment, or, if no third-segment selection is made, returning to the first segment at the point of interruption after display of the second segment is completed.

5. The apparatus of claim 4 further comprising means for varying the transition between the first segment and the other segment.

6. The apparatus of claim 4 further comprising means for displaying the remainder of the first segment upon completion of display of the other segment.

7. The apparatus of claim 4 further comprising means for storing information descriptive of the association and displayable on the display means.

8. The apparatus of claim 7 further comprising means for suppressing display of at least one plurality of image frames in response to the descriptive information.

9. The apparatus of claim 1 wherein the display means is further adapted to display text and/or graphic information, and further comprising:
   a. means for storing at least one block of text and/or graphic information;
   b. means for storing at least one set of visual information representative of the block and associating the visual information therewith;
   c. means for associating a segment with at least one block of text and/or graphic information; and
   d. means for interrupting display of a first segment and displaying a set of visual information associated with the block, and thereafter automatically or upon user command returning to the first segment or block at the point of interruption.

10. The apparatus of claim 9 further comprising means for returning to display of the first segment or first block upon completion of display of the other segment or upon command.

11. The apparatus of claim 9 further comprising means for storing information descriptive of the association and displayable on the display means.

12. The apparatus of claim 11 further comprising means for suppressing display of at least one plurality of image frames or set of visual information in response to the descriptive information.

13. The apparatus of claim 12 further comprising means for storing identifiers of a plurality of segments, and for sequentially displaying the segments.

14. An apparatus for organizing image source material comprising a sequence of frames, comprising:
   a. first storage means for storing image source material;
   b. second digital storage means for storing pointers to beginning and end points of at least one subsegment selected from the source material;
   c. a single display means for displaying video images;
   d. a user interface for accepting commands from an operator to designate contents of the display means and to specify data defining a segment, and for transferring the data to the second storage means, the data comprising:
      i. pointers to beginning and end points, on the first storage means, of at least one subsegment selected from the source material in the order in which the at least one subsegment is to be displayed as a contiguous image segment, and
      ii. pointers to locations, on the first storage means, of a plurality of image frames representative of the segment, in the order in which the plurality of image frames is to be displayed; and
   e. an image server for causing the display means;
      i. to sequentially and repeatedly display so as to convey a perception of motion, during presentation of an image segment or portion thereof, the plurality of image frames in the specified order as a miniature image icon superposed on the currently displayed image segment, and
      ii. being responsive to the user interface, to interrupt the currently displayed image segment and display the at least one subsegment in the specified order upon entry of a command by the operator designating the associated plurality of image frames, and thereafter or upon user command to return to the interrupted image segment at the point of interrupt.

* * * * *